United States Patent
Kim et al.

(10) Patent No.: US 10,107,887 B2
(45) Date of Patent: Oct. 23, 2018

(54) SYSTEMS AND METHODS FOR DISPLAYING A USER INTERFACE

(71) Applicant: QUALCOMM Incorporated, San Diego, CA (US)

(72) Inventors: Lae-Hoon Kim, San Diego, CA (US); Erik Visser, San Diego, CA (US); Phuong Lam Ton, San Diego, CA (US); Jeremy Patrick Toman, San Diego, CA (US); Jeffrey Clinton Shaw, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 13/835,881

(22) Filed: Mar. 15, 2013

(65) Prior Publication Data
US 2013/0275872 A1 Oct. 17, 2013

Related U.S. Application Data

(60) Provisional application No. 61/713,447, filed on Oct. 12, 2012, provisional application No. 61/714,212, (Continued)

(51) Int. Cl.
*G01S 3/80* (2006.01)
*H04R 3/00* (2006.01)
(Continued)

(52) U.S. Cl.
CPC ............ *G01S 3/8006* (2013.01); *G01B 21/00* (2013.01); *G01S 3/80* (2013.01); *G01S 5/18* (2013.01);
(Continued)

(58) Field of Classification Search
CPC ... G06F 3/0484; G06F 3/0482; G06F 3/04842
(Continued)

(56) References Cited

U.S. PATENT DOCUMENTS 4,982,375 A 1/1991 Ng
5,561,641 A 10/1996 Nishimori et al.
(Continued)

FOREIGN PATENT DOCUMENTS

CN 101122636 A 2/2008
CN 101350931 A 1/2009
(Continued)

OTHER PUBLICATIONS

Tamai Y et al: "Real-time 2 dimensional sound source localization by 128-channel huge microphone array", Robot and Human Interactive Communication, 2004, ROMAN 2004, 13th IEEE International Workshop on Kurashiki, Okayama, Japan Sep. 20-22, 2004, Piscataway, NJ, USA, IEEE, US, Sep. 20, 2004 (Sep. 20, 2004), pp. 65-70, XP010755252, DOI: 10.1100/ROMAN.2004.1374731ISBN: 978-0-7803-8570-2.
(Continued)

*Primary Examiner* — David Choi
(74) *Attorney, Agent, or Firm* — Austin Rapp & Hardman, P.C.

(57) ABSTRACT

A method for displaying a user interface on an electronic device is described. The method includes presenting a user interface. The user interface includes a coordinate system. The coordinate system corresponds to physical coordinates based on sensor data. The method also includes providing a sector selection feature that allows selection of at least one sector of the coordinate system. The method further includes providing a sector editing feature that allows editing the at least one sector.

74 Claims, 95 Drawing Sheets

Related U.S. Application Data filed on Oct. 15, 2012, provisional application No. 61/624,181, filed on Apr. 13, 2012, provisional application No. 61/642,954, filed on May 4, 2012, provisional application No. 61/726,336, filed on Nov. 14, 2012.

(51) Int. Cl.

| | | |
|---|---|---|
| *H04R 1/08* | (2006.01) | |
| *G01B 21/00* | (2006.01) | |
| *G06F 3/0484* | (2013.01) | |
| *G06F 3/16* | (2006.01) | |
| *G01S 15/87* | (2006.01) | |
| *G01S 5/18* | (2006.01) | |
| G01S 15/02 | (2006.01) | |
| G01S 3/808 | (2006.01) | |
| G10L 21/0216 | (2013.01) | |
| G06F 1/16 | (2006.01) | |

(52) U.S. Cl.
CPC ............ *G01S 5/186* (2013.01); *G01S 15/876* (2013.01); *G06F 3/0484* (2013.01); *G06F 3/167* (2013.01); *H04R 1/08* (2013.01); *H04R 3/00* (2013.01); *H04R 3/005* (2013.01); *G01S 3/8083* (2013.01); *G01S 15/025* (2013.01); *G06F 1/1633* (2013.01); *G10L 2021/02166* (2013.01)

(58) Field of Classification Search
USPC ......................................................... 715/716
See application file for complete search history.

(56) References Cited

U.S. PATENT DOCUMENTS

| | | | |
|---|---|---|---|
| 5,774,562 A | 6/1998 | Furuya et al. | |
| 5,864,632 A * | 1/1999 | Ogawa | G06T 17/05 382/113 |
| 6,339,758 B1 | 1/2002 | Kanazawa et al. | |
| 6,850,496 B1 | 2/2005 | Knappe et al. | |
| 7,626,889 B2 | 12/2009 | Seltzer et al. | |
| 7,712,038 B2 | 5/2010 | Brand et al. | |
| 7,788,607 B2 | 8/2010 | Boillot et al. | |
| 7,880,668 B1 * | 2/2011 | Krause | G01S 7/04 342/136 |
| 7,952,962 B2 | 5/2011 | Walley et al. | |
| 7,983,720 B2 | 7/2011 | Chen | |
| 8,005,237 B2 | 8/2011 | Tashev et al. | |
| 8,174,934 B2 * | 5/2012 | Li | G01S 3/8086 367/124 |
| 8,310,656 B2 | 11/2012 | Zalewski | |
| 8,369,184 B2 | 2/2013 | Calhoun | |
| 8,509,703 B2 | 8/2013 | Chen et al. | |
| 8,705,778 B2 * | 4/2014 | Zhan | G10L 19/008 348/116 |
| 9,069,065 B1 | 6/2015 | Coley et al. | |
| 9,615,176 B2 | 4/2017 | Pereira et al. | |
| 2002/0048376 A1 | 4/2002 | Ukita | |
| 2002/0122072 A1 * | 9/2002 | Selker | G06F 3/0482 715/834 |
| 2003/0009329 A1 | 1/2003 | Stahl et al. | |
| 2005/0047611 A1 | 3/2005 | Mao | |
| 2006/0117261 A1 * | 6/2006 | Sim | G10H 1/0066 715/727 |
| 2006/0133622 A1 | 6/2006 | Chen | |
| 2007/0016875 A1 * | 1/2007 | Santos-Gomez | G06F 3/0481 715/798 |
| 2007/0255571 A1 | 11/2007 | Noh et al. | |
| 2008/0019589 A1 * | 1/2008 | Yoon | G06K 9/00355 382/165 |
| 2008/0079723 A1 | 4/2008 | Hanson et al. | |
| 2008/0101624 A1 | 5/2008 | Schentrup et al. | |
| 2008/0259731 A1 | 10/2008 | Happonen | |
| 2008/0269930 A1 * | 10/2008 | Yamashita | G10L 19/008 700/94 |
| 2009/0122023 A1 | 5/2009 | Kikuoka | |
| 2009/0122198 A1 | 5/2009 | Thorn | |
| 2009/0149202 A1 | 6/2009 | Hill et al. | |
| 2009/0296991 A1 * | 12/2009 | Anzola | G06F 3/011 382/107 |
| 2009/0310444 A1 | 12/2009 | Hiroe | |
| 2010/0054085 A1 | 3/2010 | Wolff et al. | |
| 2010/0095234 A1 * | 4/2010 | Lane | G06F 3/0416 715/773 |
| 2010/0123785 A1 * | 5/2010 | Chen | H04N 5/23219 348/207.11 |
| 2010/0142327 A1 | 6/2010 | Kepesi et al. | |
| 2010/0195838 A1 | 8/2010 | Bright | |
| 2010/0226210 A1 | 9/2010 | Kordis et al. | |
| 2010/0241959 A1 * | 9/2010 | Ng | G06F 3/165 715/716 |
| 2010/0303247 A1 | 12/2010 | Sinivaara | |
| 2010/0323652 A1 | 12/2010 | Visser et al. | |
| 2010/0325529 A1 * | 12/2010 | Sun | G06F 17/30905 715/234 |
| 2011/0038489 A1 | 2/2011 | Visser et al. | |
| 2011/0054891 A1 * | 3/2011 | Vitte | H04R 3/005 704/233 |
| 2011/0103614 A1 * | 5/2011 | Cheung | H04R 1/403 381/94.1 |
| 2011/0106865 A1 * | 5/2011 | Boss | G06F 17/24 708/200 |
| 2011/0130176 A1 | 6/2011 | Magrath et al. | |
| 2011/0158419 A1 | 6/2011 | Theverapperuma et al. | |
| 2011/0164769 A1 * | 7/2011 | Zhan | G10L 19/008 381/307 |
| 2011/0206214 A1 | 8/2011 | Christoph et al. | |
| 2011/0222372 A1 | 9/2011 | O'Donovan et al. | |
| 2011/0222698 A1 | 9/2011 | Asao et al. | |
| 2011/0234543 A1 * | 9/2011 | Gardenfors | G06F 3/005 345/175 |
| 2011/0271186 A1 * | 11/2011 | Owens | G06F 3/04847 715/716 |
| 2011/0293103 A1 | 12/2011 | Park et al. | |
| 2011/0299695 A1 | 12/2011 | Nicholson | |
| 2011/0305347 A1 | 12/2011 | Wurm | |
| 2011/0307251 A1 | 12/2011 | Tashev et al. | |
| 2011/0317848 A1 | 12/2011 | Ivanov et al. | |
| 2012/0020485 A1 | 1/2012 | Visser et al. | |
| 2012/0026837 A1 * | 2/2012 | Li | G01S 3/8086 367/127 |
| 2012/0052872 A1 | 3/2012 | Do | |
| 2012/0057081 A1 * | 3/2012 | Petersson | G06F 3/04883 348/734 |
| 2012/0071151 A1 | 3/2012 | Abramson et al. | |
| 2012/0076316 A1 | 3/2012 | Zhu et al. | |
| 2012/0099732 A1 | 4/2012 | Visser | |
| 2012/0117470 A1 * | 5/2012 | Michelstein | G09B 19/0053 715/709 |
| 2012/0120218 A1 | 5/2012 | Flaks et al. | |
| 2012/0158629 A1 * | 6/2012 | Hinckley | G06F 3/038 706/15 |
| 2012/0163677 A1 * | 6/2012 | Thorn | G06K 9/00221 382/115 |
| 2012/0182429 A1 | 7/2012 | Forutanpour et al. | |
| 2012/0183149 A1 | 7/2012 | Hiroe | |
| 2012/0207317 A1 | 8/2012 | Abdollahzadeh et al. | |
| 2012/0224456 A1 | 9/2012 | Visser et al. | |
| 2012/0263315 A1 | 10/2012 | Hiroe | |
| 2012/0284619 A1 | 11/2012 | Myllyla et al. | |
| 2013/0272097 A1 | 10/2013 | Kim et al. | |
| 2013/0272538 A1 | 10/2013 | Kim et al. | |
| 2013/0272539 A1 | 10/2013 | Kim et al. | |
| 2013/0275077 A1 | 10/2013 | Kim | |
| 2013/0275872 A1 * | 10/2013 | Kim | G01S 3/8006 715/716 |

(56) References Cited

U.S. PATENT DOCUMENTS

| | | |
|---|---|---|
| 2013/0275873 A1 | 10/2013 | Shaw et al. |
| 2015/0139426 A1 | 5/2015 | Tammi et al. |

FOREIGN PATENT DOCUMENTS

| | | |
|---|---|---|
| CN | 101592728 A | 12/2009 |
| CN | 105073073 A | 11/2015 |
| EP | 1331490 A1 | 7/2003 |
| EP | 1566772 A2 | 8/2005 |
| EP | 1887831 A2 | 2/2008 |
| EP | 2196150 A1 | 6/2010 |
| FR | 2962235 A1 | 1/2012 |
| JP | H05333988 A | 12/1993 |
| JP | 2006261900 A | 9/2006 |
| JP | 2009246827 A | 10/2009 |
| JP | 2013522938 A | 6/2013 |
| WO | WO-2004063862 A2 | 7/2004 |
| WO | 2008051661 A1 | 5/2008 |
| WO | 2008139018 A1 | 11/2008 |
| WO | 2011076286 A1 | 6/2011 |
| WO | 2011106443 A1 | 9/2011 |

OTHER PUBLICATIONS

A. Farina et al., "A spherical microphone array for synthesizing virtual directive microphones in live broadcasting and in poswt production", AES 40th international Conference, Tokyo, Japan, Oct. 8, 2010 (Oct. 8, 2010), pp. 1-11, XP002712200.

International Search Report and Written Opinion—PCT/US2013/035926—ISA/EPO—Sep. 18, 2013.

Kubota Y., et al., "3D Auditory Scene Visualizer with Face Tracking: Design and Implementation for Auditory Awareness Compensation", Universal Communication, 2008. ISUC '08. Second International Symposium on, IEEE, Piscataway, NJ, USA, Dec. 15, 2008 (Dec. 15, 2008), pp. 42-49, XP031378922, ISBN: 978-0-7695-3433-6, p. 48, left-hand column, paragraph "4.2 User Interface with face tracking"-p. 18-26, left-hand column, paragraph "5. Discussion"; figures 6-8.

Mizumoto T., et al., "Design and implementation of selectable sound separation on the Texai telepresence system using HARK", Robotics and Automation (ICRA), 2011 IEEE International Conference on, IEEE, May 9, 2011 (May 9, 2011), pp. 2130-2137, XP032033716, DOI: 10.1109/ICRA.2011.5979849 ISBN: 978-1-61284-386-5 p. 2132, left-hand column, paragraph "B Overview of Selectable sound separation"-paragraph C. Integration of HARK and Texai; figures 3,6.

Kubota Y., et al., "Design and Implementation of 3D Auditory Scene Visualizer Towards Auditory Awareness With Face Tracking," Tenth IEEE International Symposium on Multimedia, 2008, pp. 468-476, ISBN 978-0-7695-3454-1.

Kubota Y., et al., "Face-Tracked Auditory Scene Visualization towards Auditory Awareness", Proceedings of 71st National Conference (4) Interface Computer and Human Society, Japan, The Information Processing Society of Japan, Mar. 10, 2009, pp. 4-181 to 4-182.

Yoshida M., et al., "Recording and Playback System with Auditory Scene Visualization", Proceedings of 69th National Conference (2) Artificial Intelligence and Cognitive Science, Japan, The Information Processing Society of Japan, Mar. 6, 2007, pp. 2-577-2-578.

\* cited by examiner

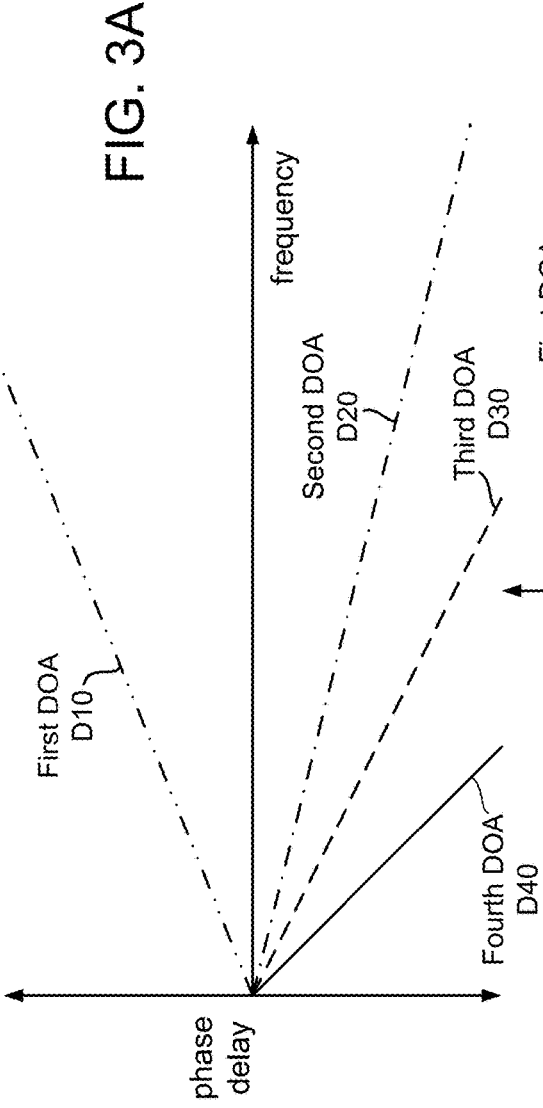
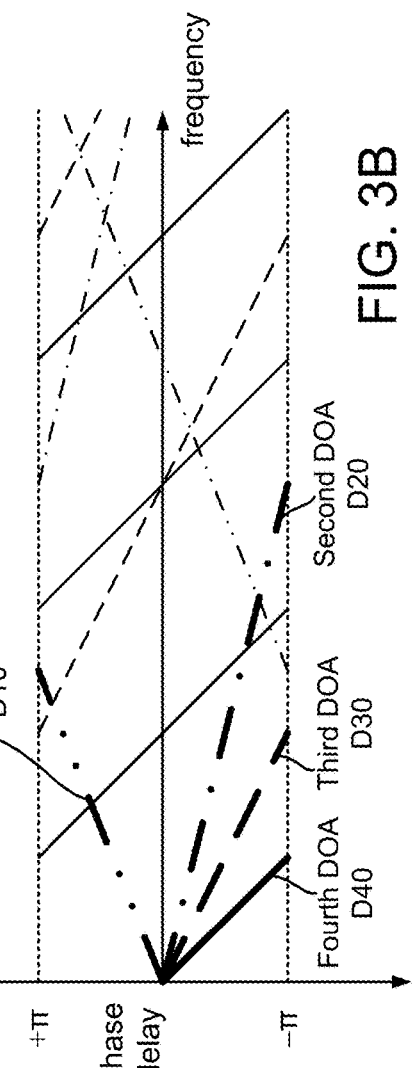

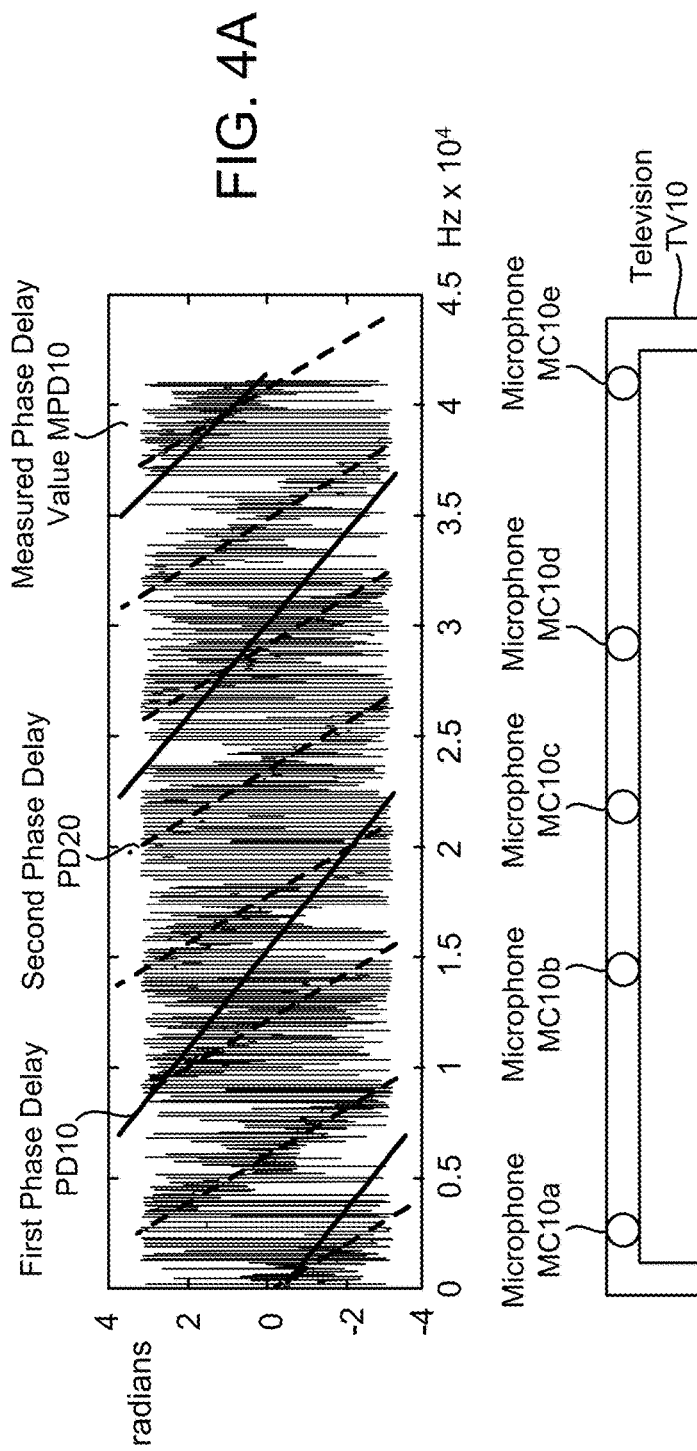

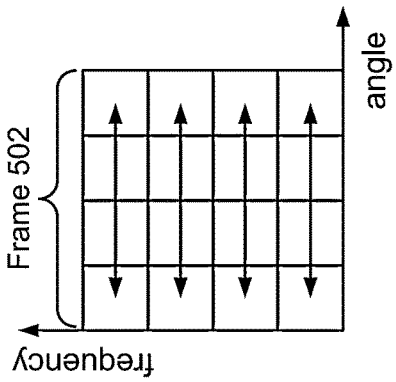
FIG. 5B
FIG. 5C
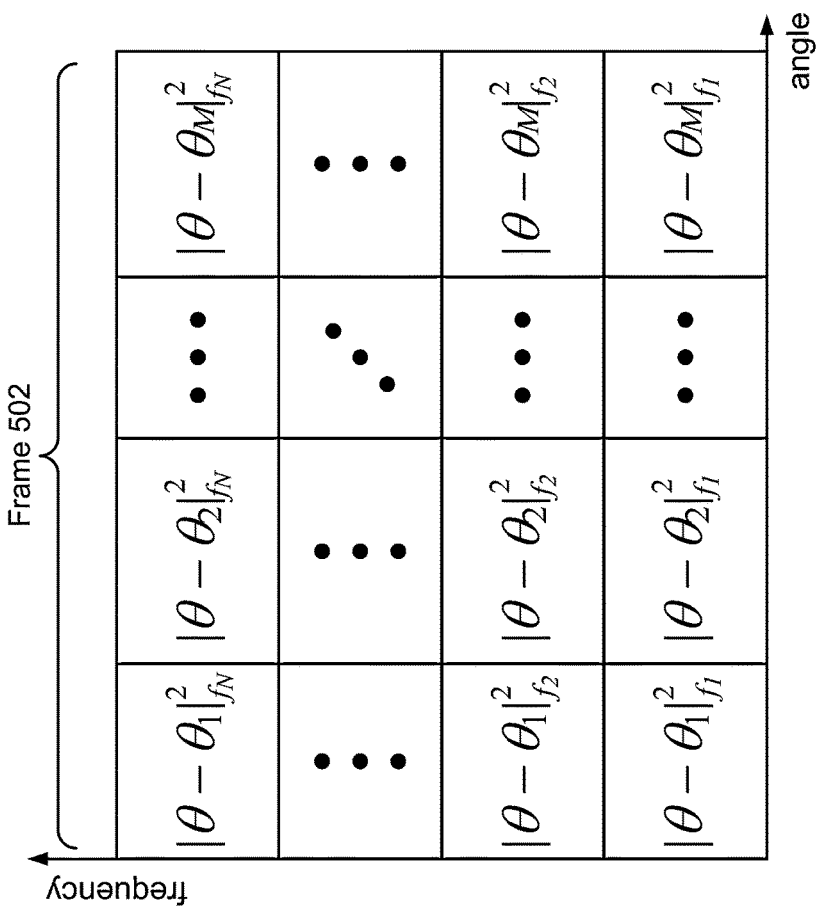
FIG. 5A

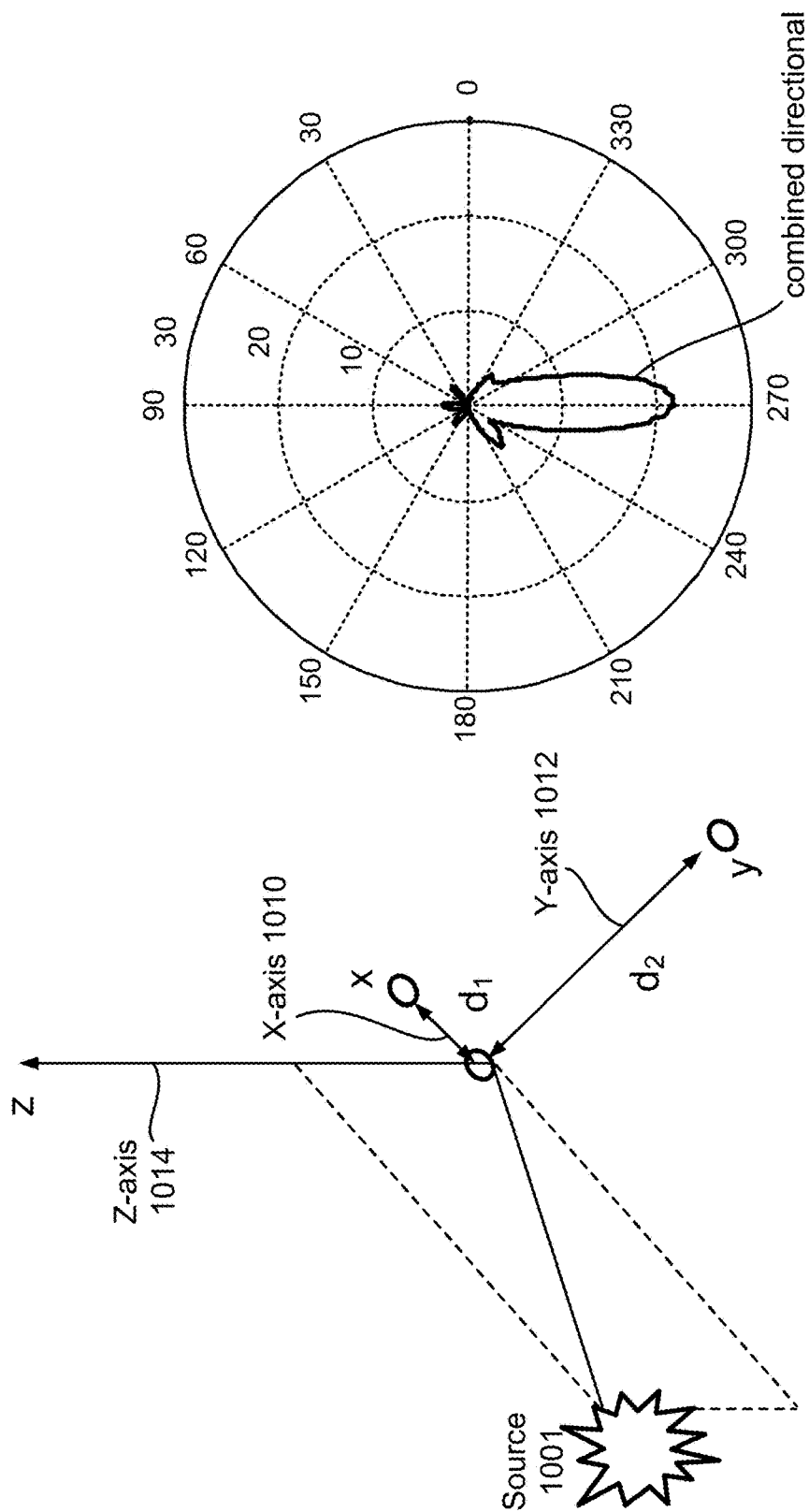

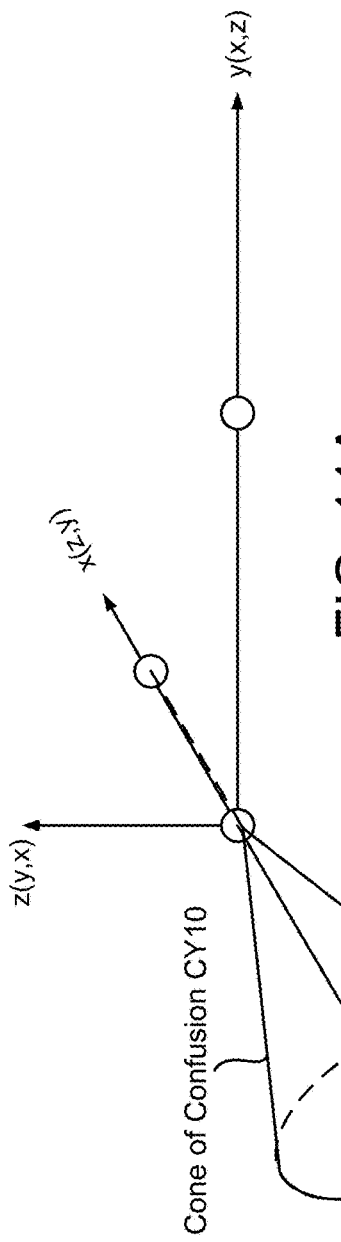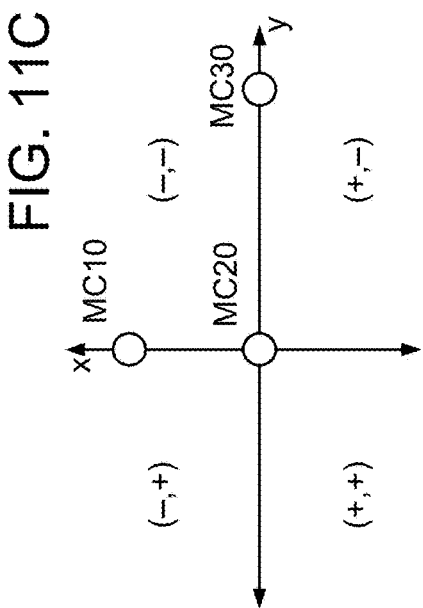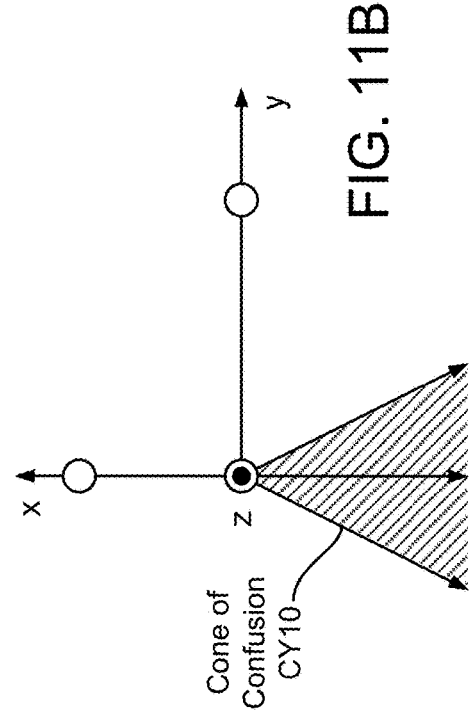

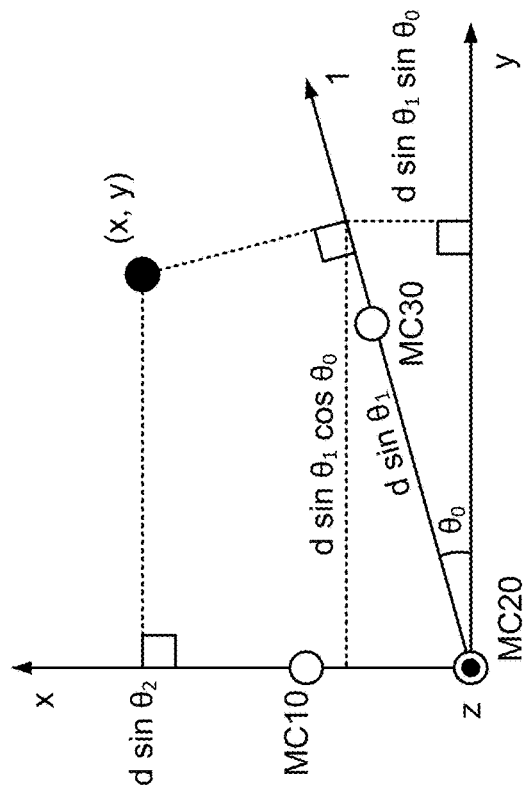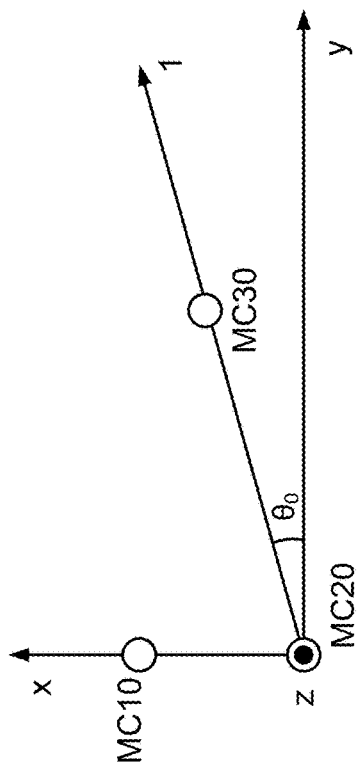

$$\underbrace{\left( \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix} + \lambda \cdot I \right)^{-1} \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} x_{1,1} \\ x_{1,2} \\ x_{2,1} \\ x_{2,2} \end{bmatrix} = \begin{bmatrix} y_1 \\ y_2 \\ y_3 \end{bmatrix}}_{\text{Beamformer BF10}}$$

FIG. 14A

$$\underbrace{\left( \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix} + \lambda \cdot I \right)^{-1} \begin{bmatrix} d^1_{1,1} & d^2_{1,1} & d^3_{1,1} \\ d^1_{1,2} & d^2_{1,2} & d^3_{1,2} \\ d^1_{2,1} & d^2_{2,1} & d^3_{2,1} \\ d^1_{2,2} & d^2_{2,2} & d^3_{2,2} \end{bmatrix}^H \begin{bmatrix} x_{1,1} \\ x_{1,2} \\ x_{2,1} \\ x_{2,2} \end{bmatrix} = \begin{bmatrix} y_1 \\ y_2 \\ y_3 \end{bmatrix}}_{\text{Beamformer BF10}}$$

$$\underset{i}{\mathrm{argmax}} \underbrace{\begin{bmatrix} d^i_{1,1} \\ d^i_{1,2} \\ d^i_{2,1} \\ d^i_{2,2} \end{bmatrix}}_{\text{Normalization N10}}$$

FIG. 14B

$$\underbrace{\left(\begin{bmatrix} d^1_{1,1} & \cdots & d^N_{1,1} \\ d^1_{1,2} & \cdots & d^N_{1,2} \\ d^1_{2,1} & \cdots & d^N_{2,1} \\ d^1_{2,2} & \cdots & d^N_{2,2} \\ \vdots & \ddots & \vdots \\ d^1_{M,1} & \cdots & d^N_{M,1} \\ d^1_{M,2} & \cdots & d^N_{M,2} \end{bmatrix}^H \begin{bmatrix} d^1_{1,1} & \cdots & d^N_{1,1} \\ d^1_{1,2} & \cdots & d^N_{1,2} \\ d^1_{2,1} & \cdots & d^N_{2,1} \\ d^1_{2,2} & \cdots & d^N_{2,2} \\ \vdots & \ddots & \vdots \\ d^1_{M,1} & \cdots & d^N_{M,1} \\ d^1_{M,2} & \cdots & d^N_{M,2} \end{bmatrix} + \lambda \cdot I \right)^{-1} \begin{bmatrix} d^1_{1,1} & \cdots & d^N_{1,1} \\ d^1_{1,2} & \cdots & d^N_{1,2} \\ d^1_{2,1} & \cdots & d^N_{2,1} \\ d^1_{2,2} & \cdots & d^N_{2,2} \\ \vdots & \ddots & \vdots \\ d^1_{M,1} & \cdots & d^N_{M,1} \\ d^1_{M,2} & \cdots & d^N_{M,2} \end{bmatrix}^H}_{\text{Beamformer BF10}} \begin{bmatrix} x_{1,1} \\ x_{1,2} \\ x_{2,1} \\ x_{2,2} \\ \vdots \\ x_{M,1} \\ x_{M,2} \end{bmatrix} = \begin{bmatrix} y_1 \\ y_2 \\ y_3 \end{bmatrix}$$

FIG. 16A $$\underbrace{\left( d^1_{1,1}, d^1_{1,2} \right)}_{\text{Steering Vector SV10a}} = \left( \exp\left(-\frac{j2\pi f 0.073 \sin(\theta_1)}{c}\right), 1 \right)$$

$$\underbrace{\left( d^1_{2,1}, d^1_{2,2} \right)}_{\text{Steering Vector SV10b}} = \left( \exp\left(-\frac{j2\pi f 0.036 \sin(\theta_2)}{c}\right), 1 \right)$$

FIG. 16B

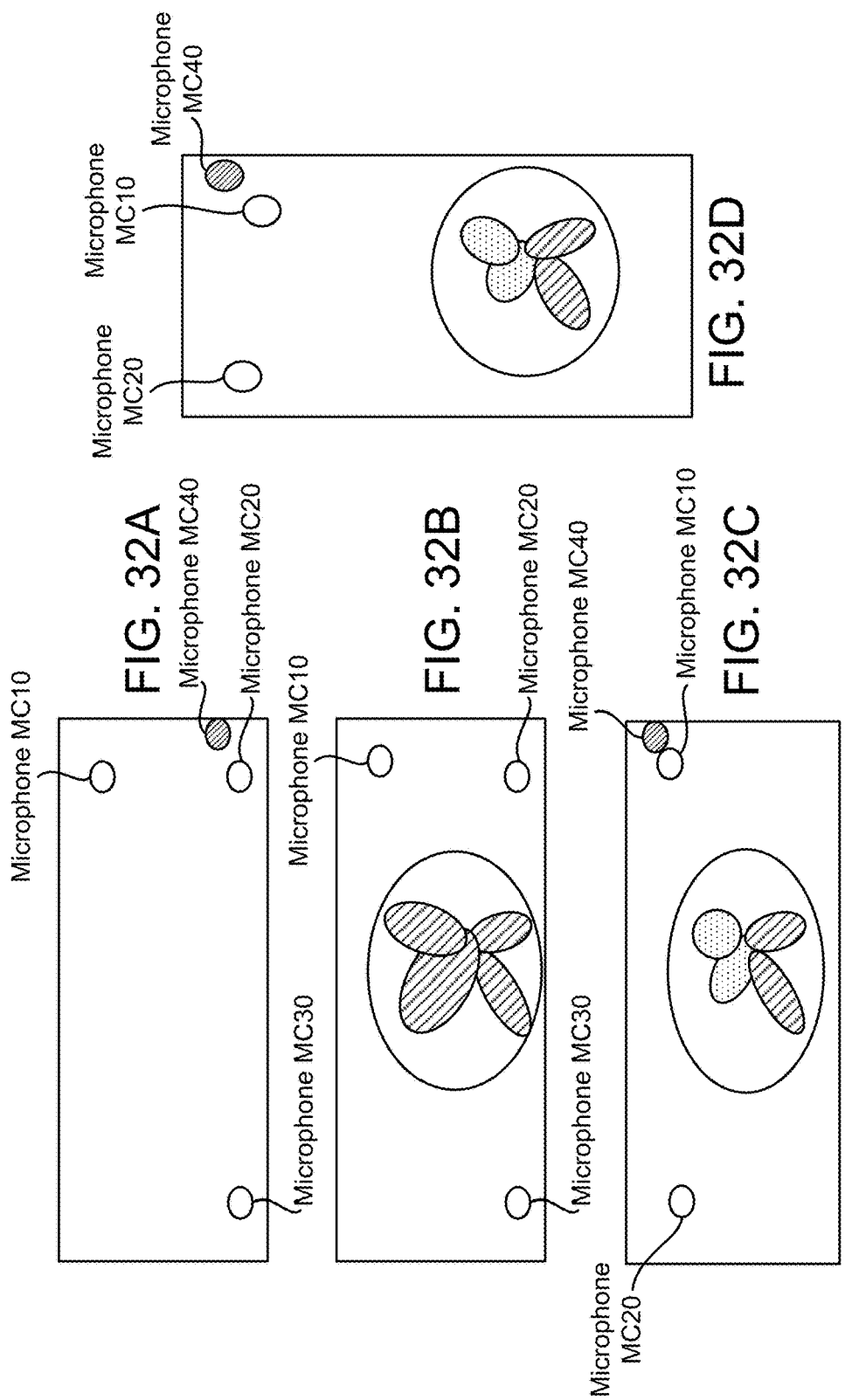

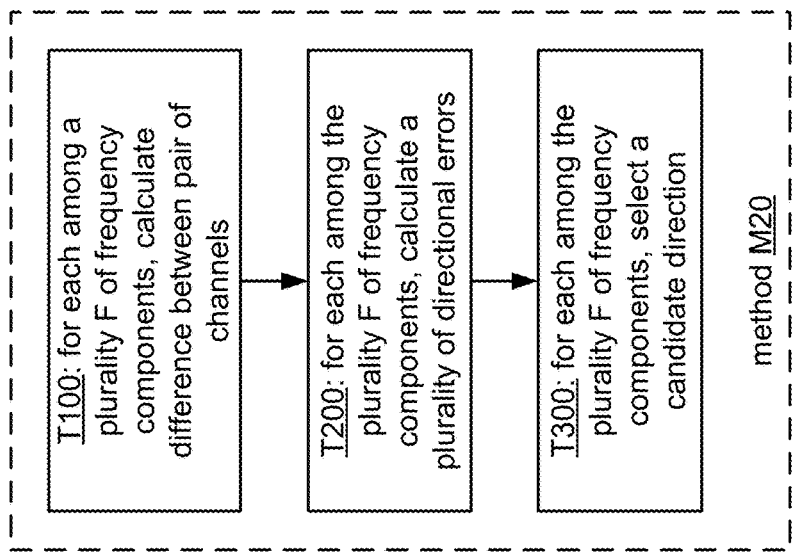
FIG. 33D
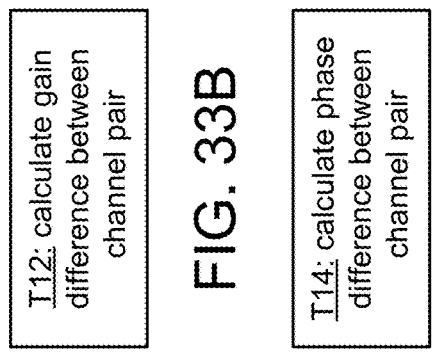
FIG. 33B
FIG. 33C
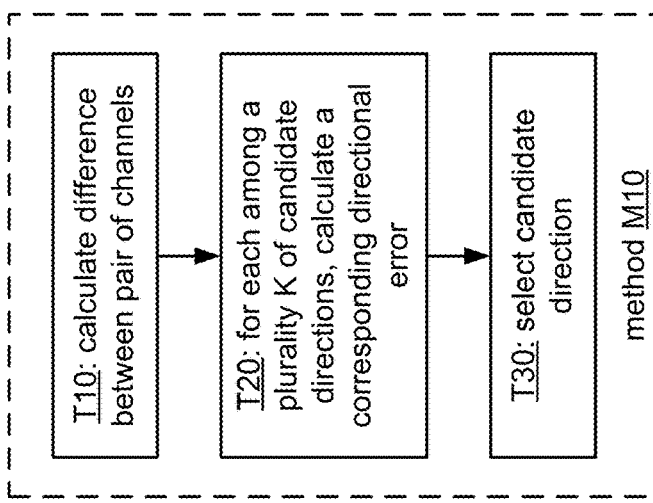
FIG. 33A

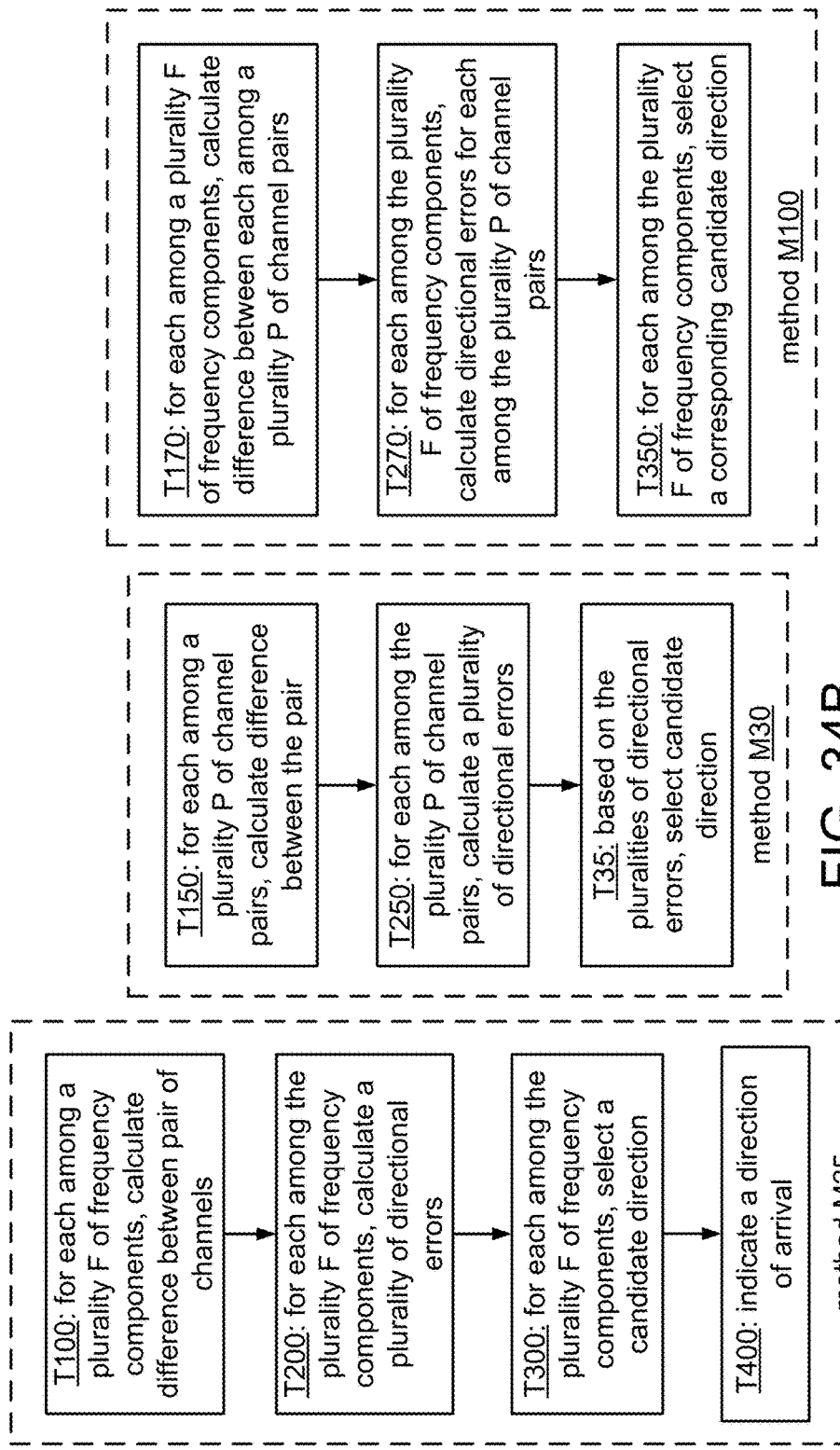

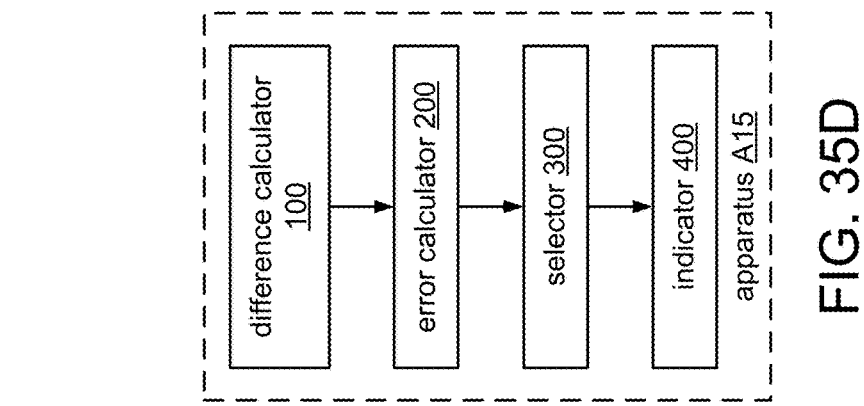
FIG. 35D
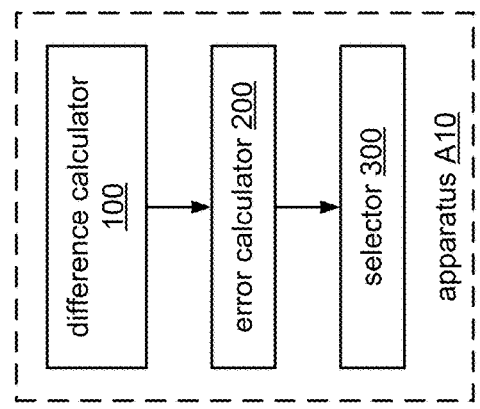
FIG. 35B
FIG. 35C
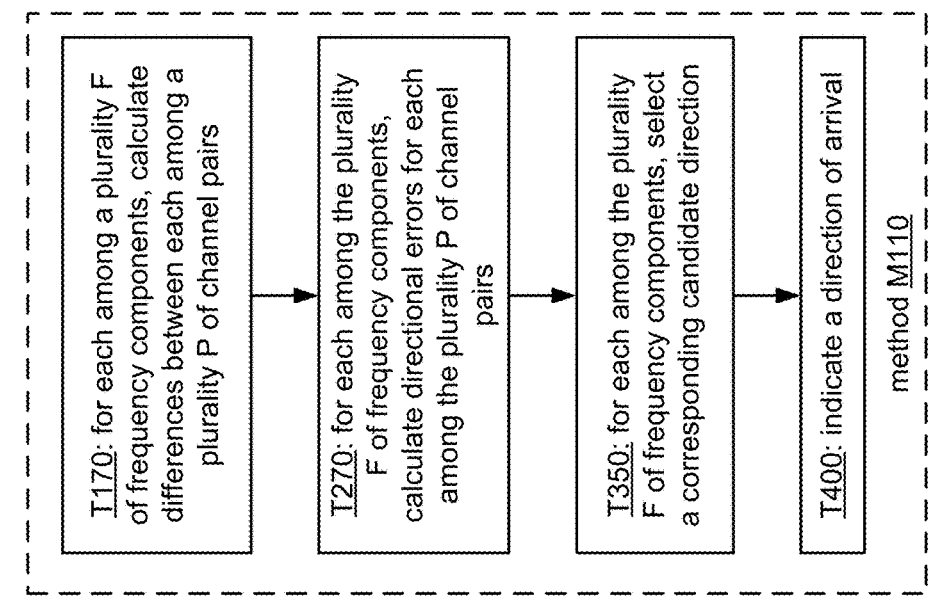
FIG. 35A

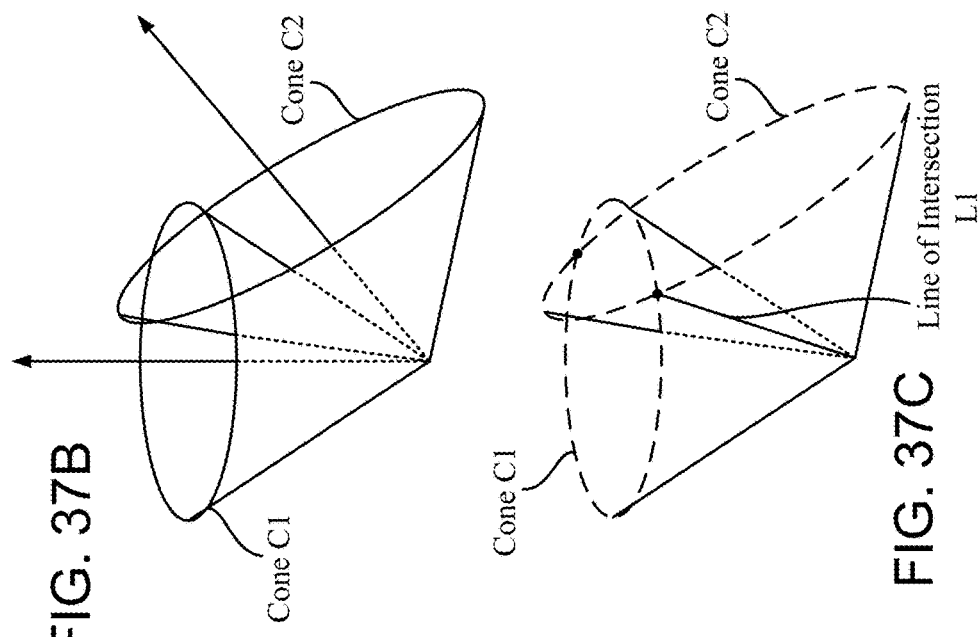
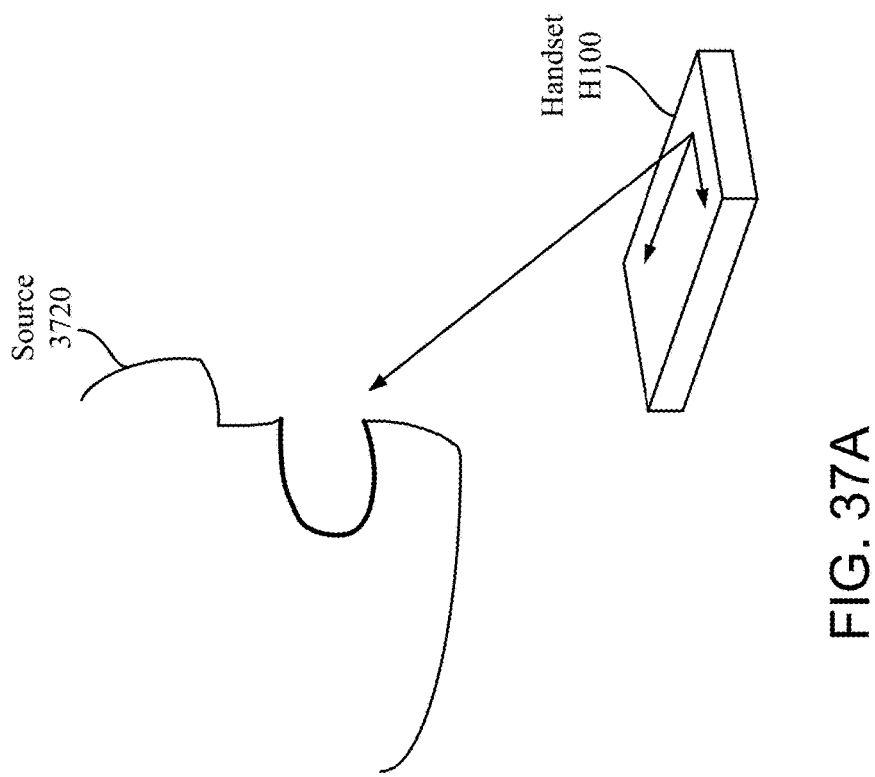
FIG. 37B
FIG. 37C
FIG. 37A

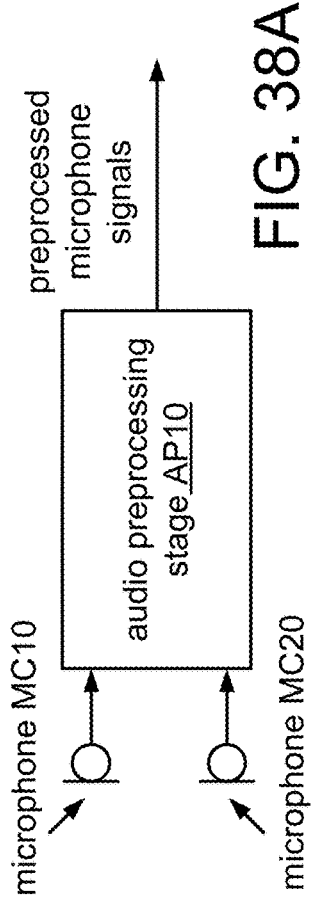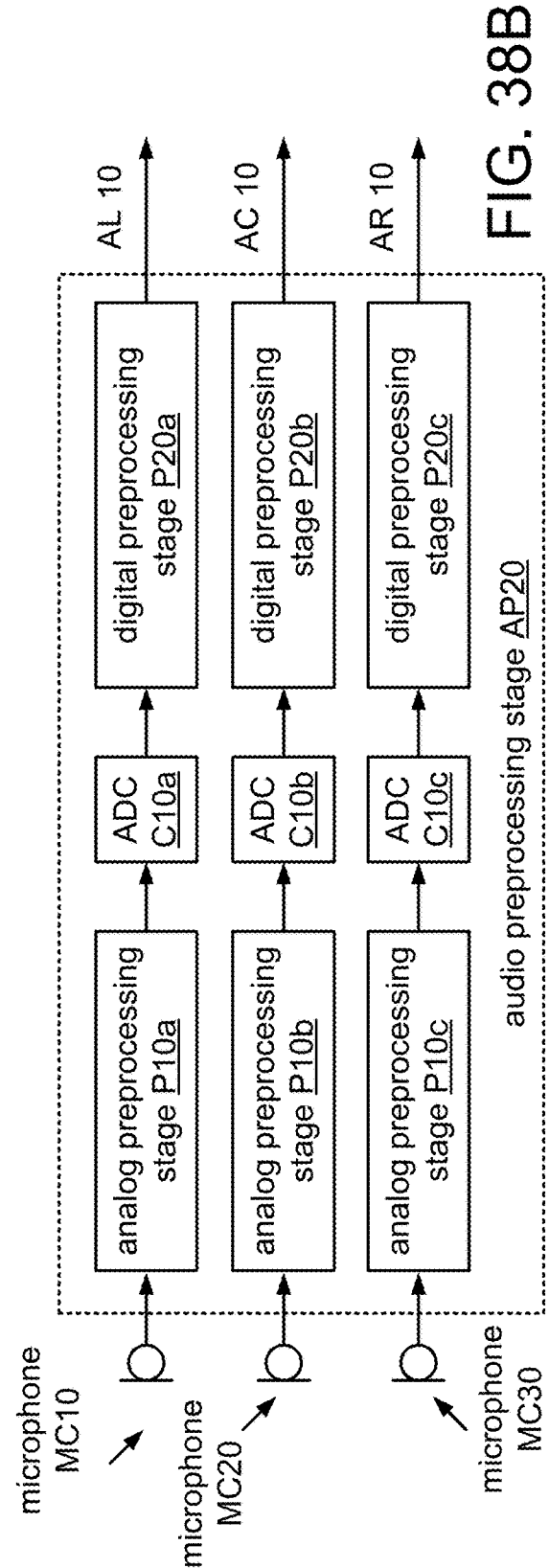

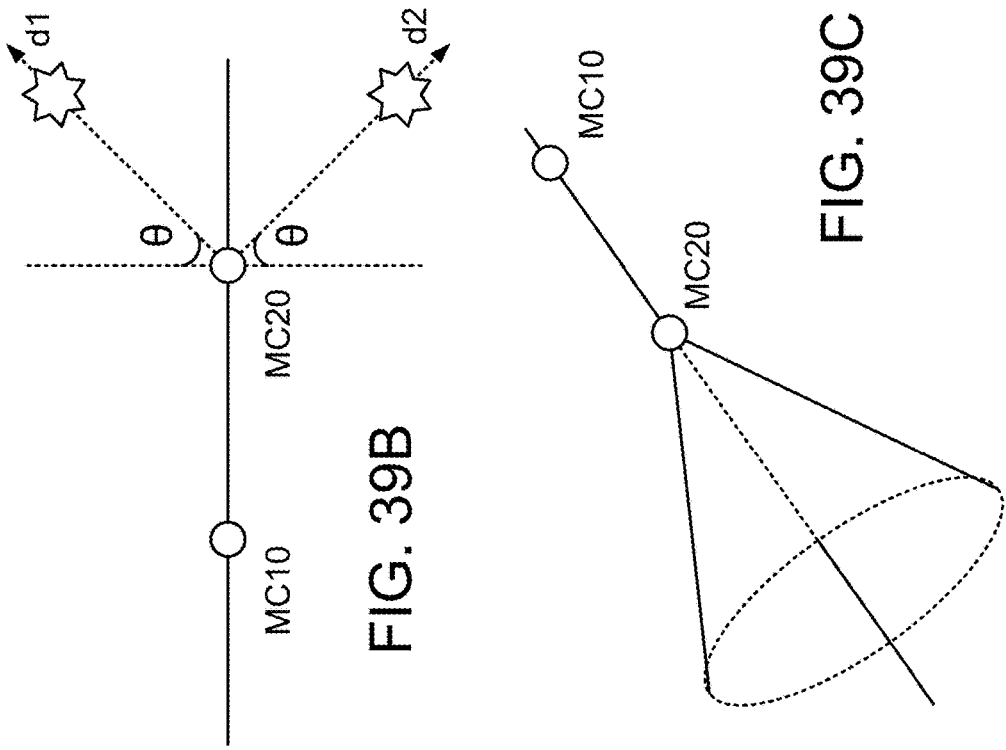
FIG. 39B
FIG. 39C
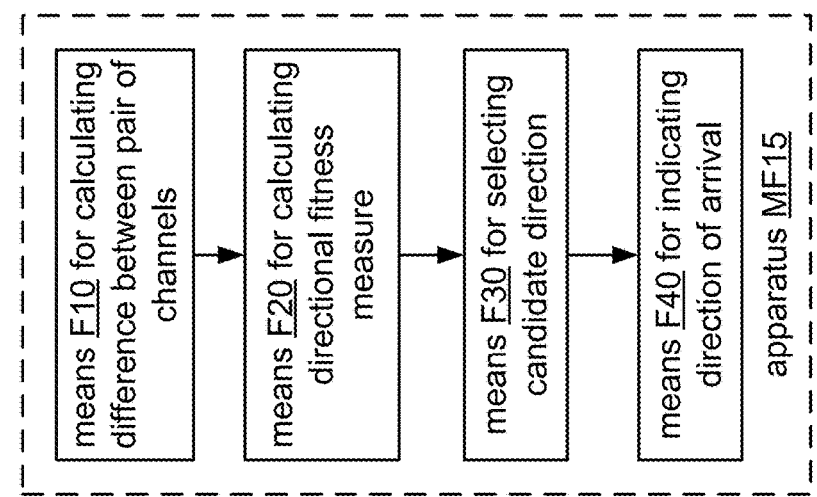
FIG. 39A

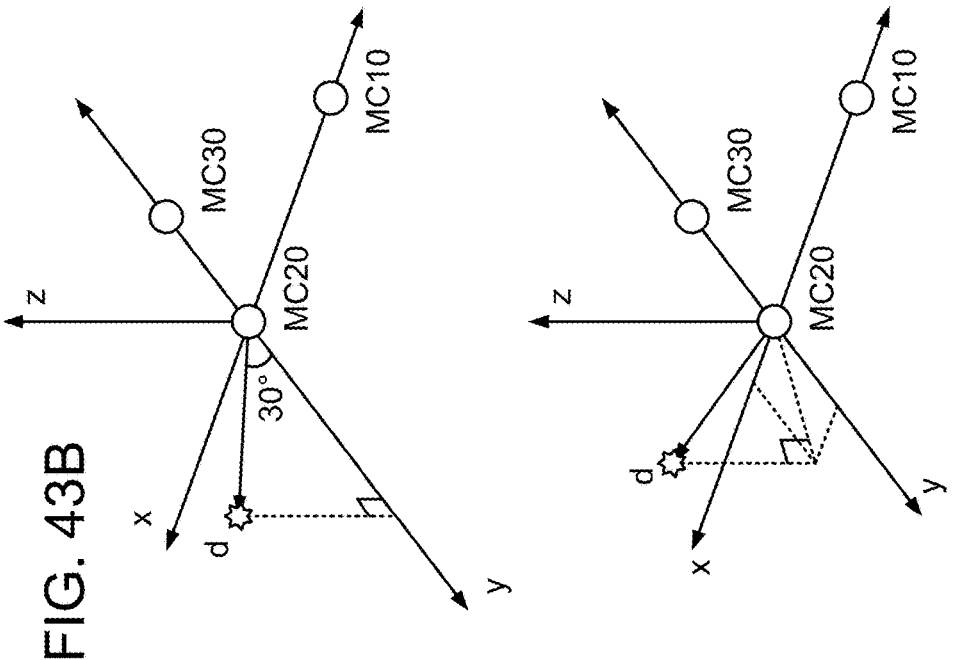
FIG. 43B
FIG. 43C
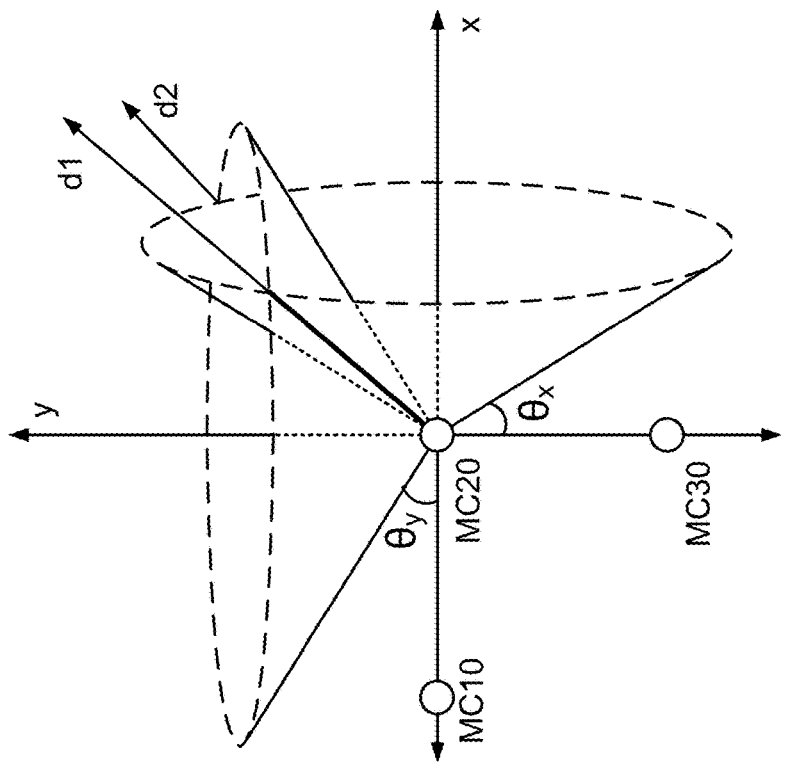
FIG. 43A

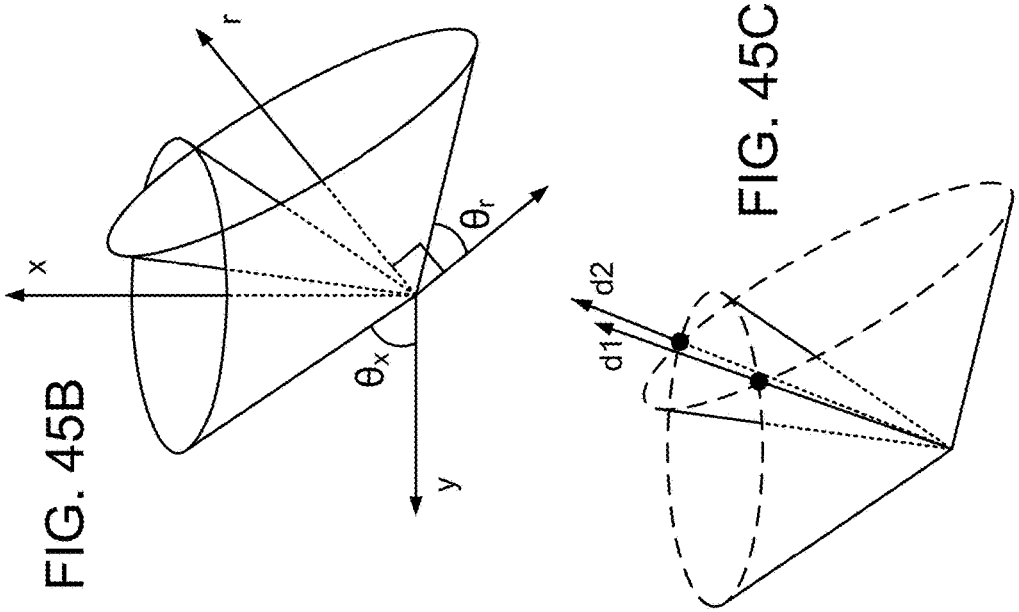
FIG. 45B
FIG. 45C
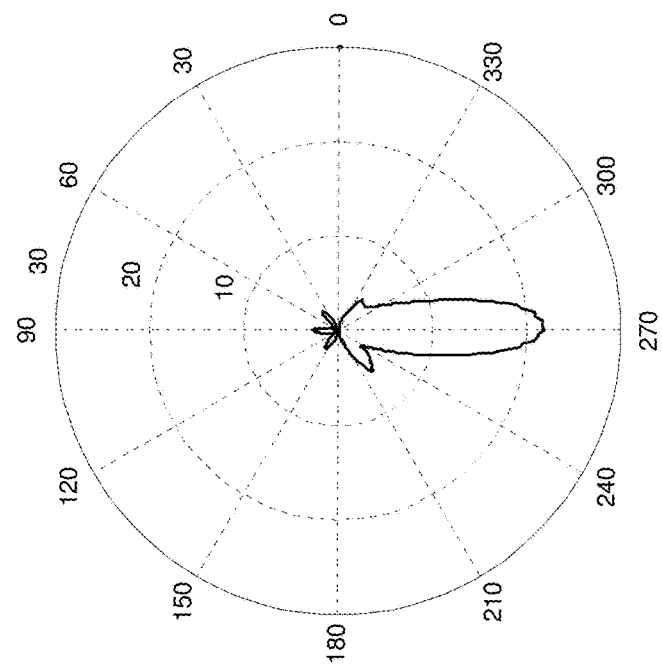
FIG. 45A

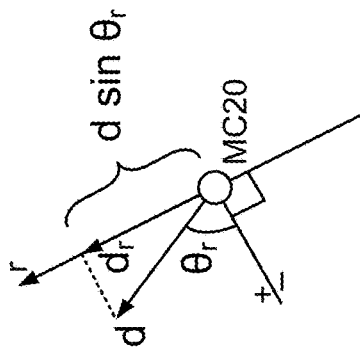
FIG. 46C
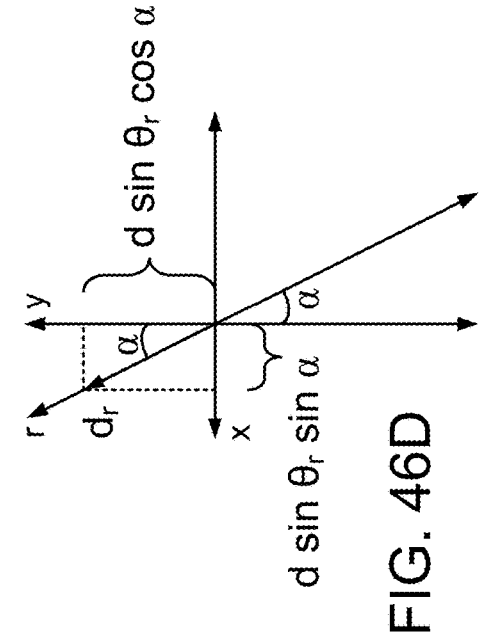
FIG. 46E
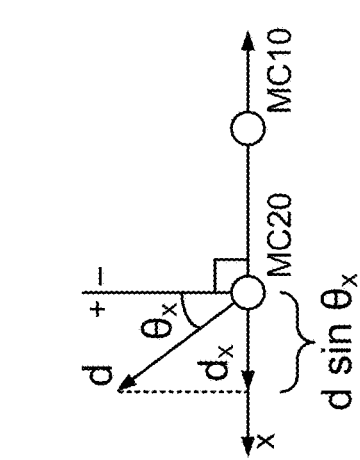
FIG. 46B
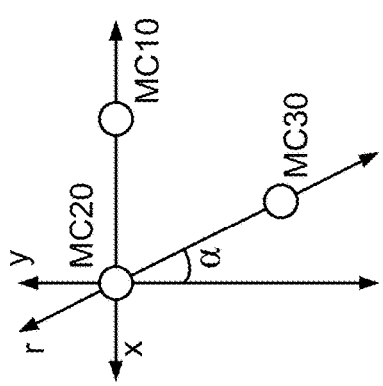
FIG. 46A
FIG. 46D

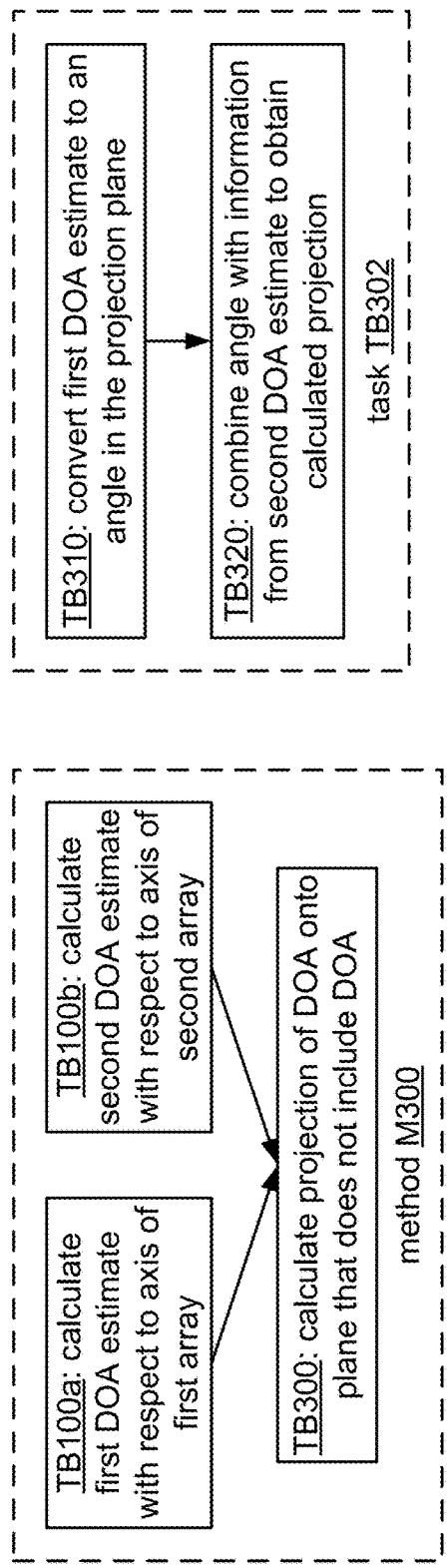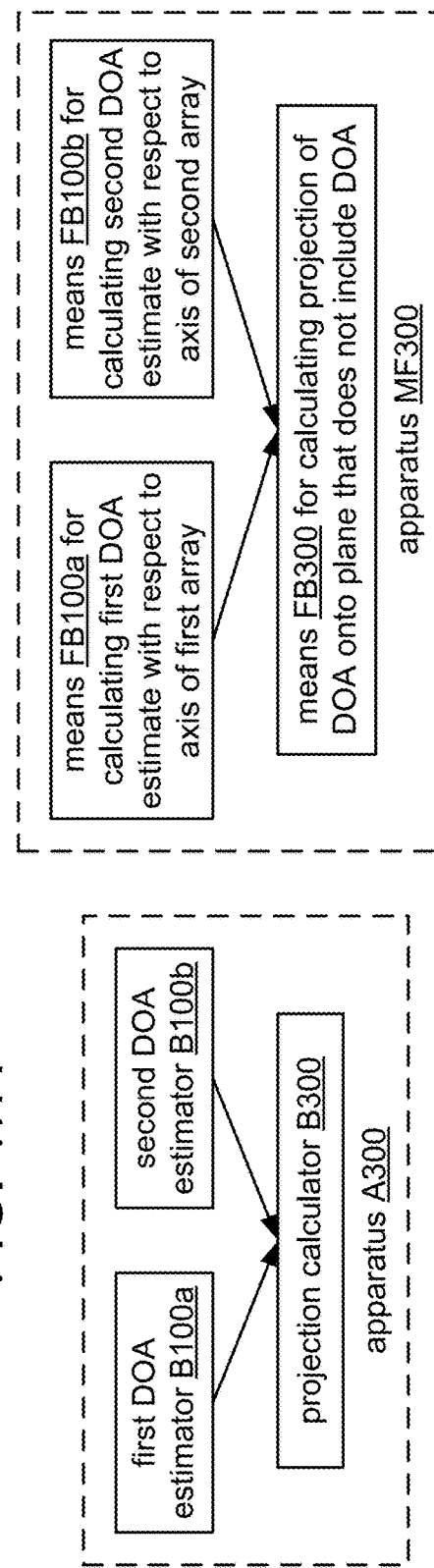

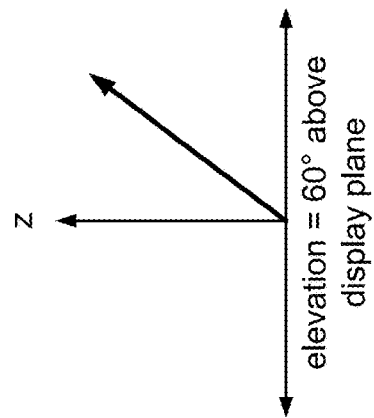
FIG. 49B
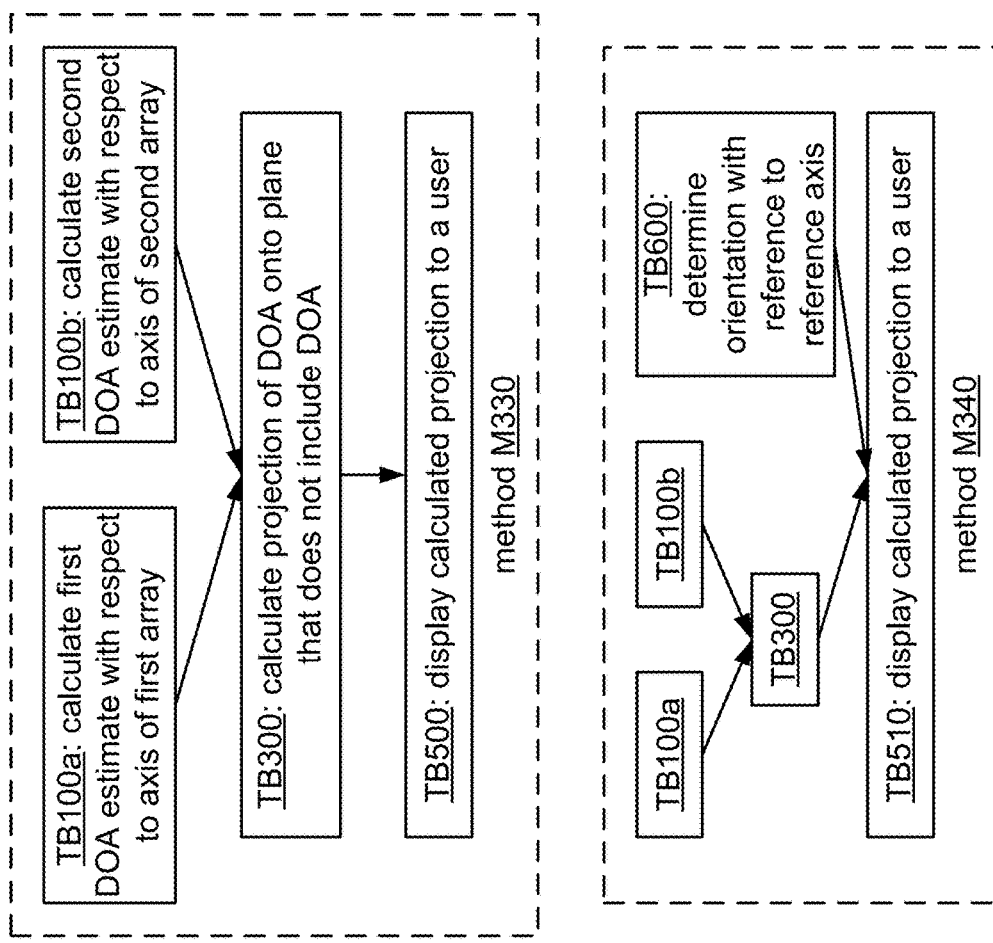
FIG. 49A
FIG. 49C

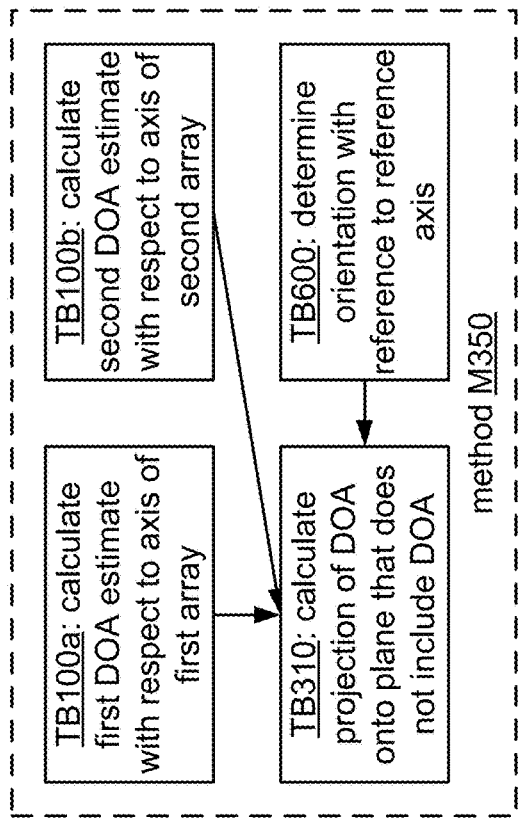
FIG. 53B
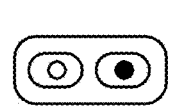
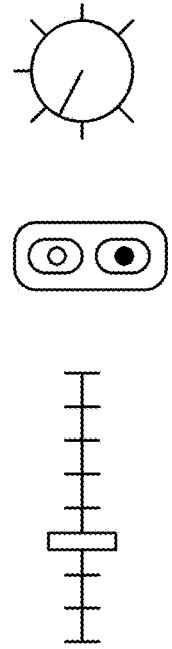
FIG. 53C
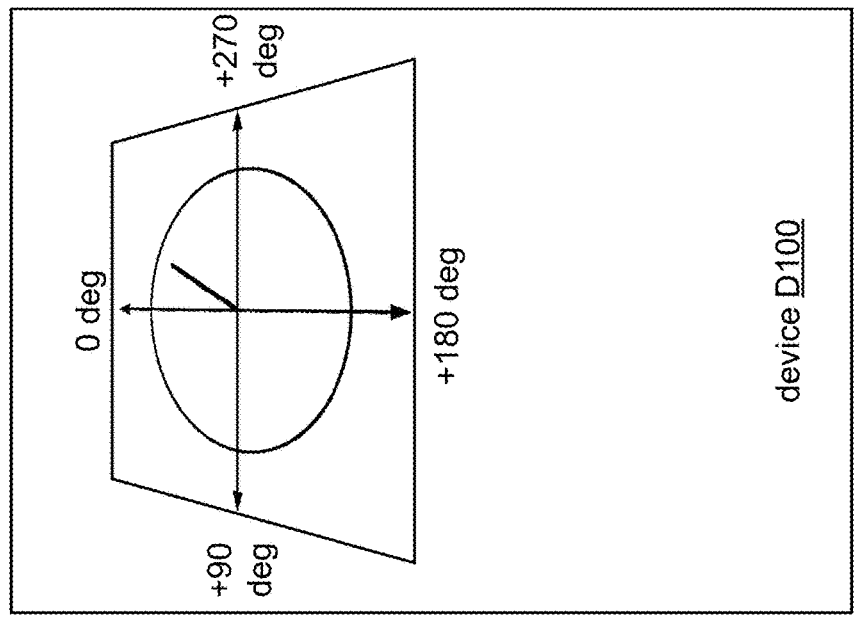
FIG. 53A

SYSTEMS AND METHODS FOR DISPLAYING A USER INTERFACE

RELATED APPLICATIONS

This application is related to and claims priority from U.S. Provisional Patent Application Ser. No. 61/713,447 filed Oct. 12, 2012, for "SYSTEMS AND METHODS FOR MAPPING COORDINATES," U.S. Provisional Patent Application Ser. No. 61/714,212 filed Oct. 15, 2012, for "SYSTEMS AND METHODS FOR MAPPING COORDINATES," U.S. Provisional Application Ser. No. 61/624,181 filed Apr. 13, 2012, for "SYSTEMS, METHODS, AND APPARATUS FOR ESTIMATING DIRECTION OF ARRIVAL," U.S. Provisional Application Ser. No. 61/642,954, filed May 4, 2012, for "SYSTEMS, METHODS, AND APPARATUS FOR ESTIMATING DIRECTION OF ARRIVAL" and U.S. Provisional Application No. 61/726,336, filed Nov. 14, 2012, for "SYSTEMS, METHODS, AND APPARATUS FOR ESTIMATING DIRECTION OF ARRIVAL."

TECHNICAL FIELD

The present disclosure relates generally to electronic devices. More specifically, the present disclosure relates to systems and methods for displaying a user interface.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smart phones, computers, etc.) use audio or speech signals. These electronic devices may code speech signals for storage or transmission. For example, a cellular phone captures a user's voice or speech using a microphone. The microphone converts an acoustic signal into an electronic signal. This electronic signal may then be formatted (e.g., coded) for transmission to another device (e.g., cellular phone, smart phone, computer, etc.), for playback or for storage.

Noisy audio signals may pose particular challenges. For example, competing audio signals may reduce the quality of a desired audio signal. As can be observed from this discussion, systems and methods that improve audio signal quality in an electronic device may be beneficial.

SUMMARY

A method for displaying a user interface on an electronic device is described. The method includes presenting a user interface. The user interface includes a coordinate system. The coordinate system corresponds to physical coordinates based on sensor data. The method also includes providing a sector selection feature that allows selection of at least one sector of the coordinate system. The method further includes providing a sector editing feature that allows editing the at least one sector.

The method may include displaying a directionality of at least one audio signal captured by at least one microphone. The at least one audio signal may include a voice signal. The method may include displaying an icon corresponding to the at least one audio signal. Displaying an icon may include displaying at an icon for a target audio signal and/or an icon for an interference audio signal.

The method may include passing audio signals indicated within the at least one sector. The method may include attenuating audio signals not indicated within the at least one sector. The method may include indicating image data from one or more image sensors. The method may include passing image data based on the one or more sectors.

The method may include displaying at least one touch point corresponding to the at least one sector. The method may also include receiving a touch input corresponding to the at least one touch point. The method may further include editing the at least one sector based on the touch input.

The method may include aligning at least a part of the user interface with a reference plane. The reference plane may be horizontal. Aligning at least a part of the user interface may include mapping a two-dimensional polar plot into a three-dimensional display space.

The physical coordinates may be earth coordinates. The physical coordinates may represent a physical space independent of earth coordinates. The coordinate system may maintain an orientation independent of electronic device orientation.

The method may include recognizing an audio signature. The method may also include looking up the audio signature in a database. The method may further include obtaining identification information corresponding to the audio signature. The method may additionally include displaying the identification information on the user interface. The identification information may be an image of a person corresponding to the audio signature. The method may include providing a fixed mode and an editable mode. The method may include padding a selected sector.

At least one of the sector selection feature and the sector editing feature may operate based on single-touch input and/or multi-touch input. The sector selection feature may enable selection of multiple sectors at once. The sector editing feature may enable adjusting the sector based on single- or multi-touch input. The sector selection feature may be based on one or more swipe inputs. The one or more swipe inputs may indicate a circular region. The one or more swipe inputs may be a single swipe.

An electronic device is also described. The electronic device includes a display. The display presents a user interface. The user interface includes a coordinate system. The coordinate system corresponds to physical coordinates based on sensor data. The display provides a sector selection feature that allows selection of at least one sector of the coordinate system. The display also provides a sector editing feature that allows editing the at least one sector.

A computer-program product for displaying a user interface is also described. The computer-program product includes a non-transitory tangible computer-readable medium with instructions. The instructions include code for causing an electronic device to present a user interface. The user interface includes a coordinate system. The coordinate system corresponds to physical coordinates based on sensor data. The instructions also include code for causing the electronic device to provide a sector selection feature that allows selection of at least one sector of the coordinate system. The instructions further include code for causing the electronic device to provide a sector editing feature that allows editing the at least one sector.

An apparatus for displaying a user interface is also described. The apparatus includes means for presenting a user interface. The user interface includes a coordinate system. The coordinate system corresponds to physical coordinates based on sensor data. The apparatus also includes means for providing a sector selection feature that allows selection of at least one sector of the coordinate system. The apparatus additionally includes means for providing a sector editing feature that allows editing the at least one sector.

BRIEF DESCRIPTION OF THE DRAWINGS

FIG. 3A shows plots of unwrapped phase delay vs. frequency for four different directions of arrival (DOAs);

FIG. 3B shows plots of wrapped phase delay vs. frequency for the same four different directions of arrival as depicted in FIG. 3A;

FIG. 4A shows an example of measured phase delay values and calculated values for two DOA candidates;

FIG. 4B shows a linear array of microphones arranged along the top margin of a television screen;

FIG. 5A shows an example of calculating DOA differences for a frame;

FIG. 5B shows an example of calculating a DOA estimate;

FIG. 5C shows an example of identifying a DOA estimate for each frequency;

FIG. 10A shows an example of a speakerphone application;

FIG. 10B shows a mapping of pair-wise DOA estimates to a 360° range in the plane of the microphone array;

FIGS. 11A-B show an ambiguity in the DOA estimate;

FIG. 11C shows a relation between signs of observed DOAs and quadrants of an x-y plane;

FIG. 13A shows an example of microphone pairs along non-orthogonal axes;

FIG. 13B shows an example of use of the array of FIG. 13A to obtain a DOA estimate with respect to the orthogonal x and y axes;

FIGS. 14A-14B show examples of pair-wise normalized beamformer/null beamformers (BFNFs) for a two-pair microphone array;

FIG. 16A shows an example of a pair-wise BFNF for frequencies in which the matrix $A^H A$ is not ill-conditioned;

FIG. 16B shows examples of steering vectors;

FIG. 32A shows a telephone design, and FIGS. 32B-32D show use of such a design in various modes with corresponding visualization displays;

FIG. 33A shows a flowchart for a method M10 according to a general configuration;

FIG. 33B shows an implementation T12 of task T10;

FIG. 33C shows an implementation T14 of task T10;

FIG. 33D shows a flowchart for an implementation M20 of method M10;

FIG. 34A shows a flowchart for an implementation M25 of method M20;

FIG. 34B shows a flowchart for an implementation M30 of method M10;

FIG. 34C shows a flowchart for an implementation M100 of method M30;

FIG. 35A shows a flowchart for an implementation M110 of method M100;

FIG. 35B shows a block diagram of an apparatus A5 according to a general configuration;

FIG. 35C shows a block diagram of an implementation A10 of apparatus A5;

FIG. 35D shows a block diagram of an implementation A15 of apparatus A10;

FIG. 37A illustrates a use of a device to represent a three-dimensional direction of arrival in a plane of the device;

FIG. 37B illustrates an intersection of the cones of confusion that represent respective responses of microphone arrays having non-orthogonal axes to a point source positioned outside the plane of the axes;

FIG. 37C illustrates a line of intersection of the cones of FIG. 37B;

FIG. 38A shows a block diagram of an audio preprocessing stage;

FIG. 38B shows a block diagram of a three-channel implementation of an audio preprocessing stage;

FIG. 39A shows a block diagram of an implementation of an apparatus that includes means for indicating a direction of arrival;

FIG. 39B shows an example of an ambiguity that results from the one-dimensionality of a DOA estimate from a linear array;

FIG. 39C illustrates one example of a cone of confusion;

FIG. 43A shows an example that is similar to FIG. 41A but depicts a more general case in which the source is located above the x-y plane;

FIG. 43B shows another example of a 2-D microphone array whose axes define an x-y plane and a source that is located above the x-y plane;

FIG. 43C shows an example of such a general case in which a point source is elevated above the plane defined by the array axes;

FIG. 45A shows a plot obtained by applying an alternate mapping;

FIG. 45B shows an example of intersecting cones of confusion associated with responses of linear microphone arrays having non-orthogonal axes x and r to a common point source;

FIG. 45C shows the lines of intersection of cones;

FIG. 46A shows an example of a microphone array;

FIG. 46B shows an example of obtaining a combined directional estimate in the x-y plane with respect to orthogonal axes x and y with observations ($\theta_x$, $\theta_r$) from an array as shown in FIG. 46A;

FIG. 46C illustrates one example of a projection;

FIG. 46D illustrates one example of determining a value from the dimensions of a projection vector;

FIG. 46E illustrates another example of determining a value from the dimensions of a projection vector;

FIG. 47A shows a flowchart of a method according to another general configuration that includes instances of tasks;

FIG. 47B shows a flowchart of an implementation of a task that includes subtasks;

FIG. 47C illustrates one example of an apparatus with components for performing functions corresponding to FIG. 47A;

FIG. 47D illustrates one example of an apparatus including means for performing functions corresponding to FIG. 47A;

FIG. 49A shows a flowchart of another implementation of a method;

FIG. 49B illustrates one example of an indication of an estimated angle of elevation relative to a display plane;

FIG. 49C shows a flowchart of such an implementation of another method that includes a task;

FIG. 53A shows an example of a mapped display of the DOA as projected onto the world reference plane;

FIG. 53B shows a flowchart of such another implementation of a method;

FIG. 53C illustrates examples of interfaces including a linear slider potentiometer, a rocker switch and a wheel or knob;

FIG. 80 illustrates more examples of the sector editing feature of the user interface;

FIG. 81 illustrates more examples of the sector editing feature of the user interface;

FIG. 82 illustrates an example of the user interface with a coordinate system oriented independent of electronic device orientation;

FIG. 83 illustrates another example of the user interface with the coordinate system oriented independent of electronic device orientation;

FIG. 84 illustrates another example of the user interface with the coordinate system oriented independent of electronic device orientation;

FIG. 85 illustrates another example of the user interface with the coordinate system oriented independent of electronic device orientation;

FIG. 86 illustrates more examples of the user interface with the coordinate system oriented independent of electronic device orientation;

FIG. 87 illustrates another example of the user interface with the coordinate system oriented independent of electronic device orientation;

FIG. 88 is a block diagram illustrating another configuration of the user interface in which systems and methods for displaying a user interface on an electronic device may be implemented;

FIG. 89 is a flow diagram illustrating another configuration of a method for displaying a user interface on an electronic device;

FIG. 90 illustrates an example of the user interface coupled to a database;

FIG. 91 is a flow diagram illustrating another configuration of a method for displaying a user interface on an electronic device;

Figure 92:
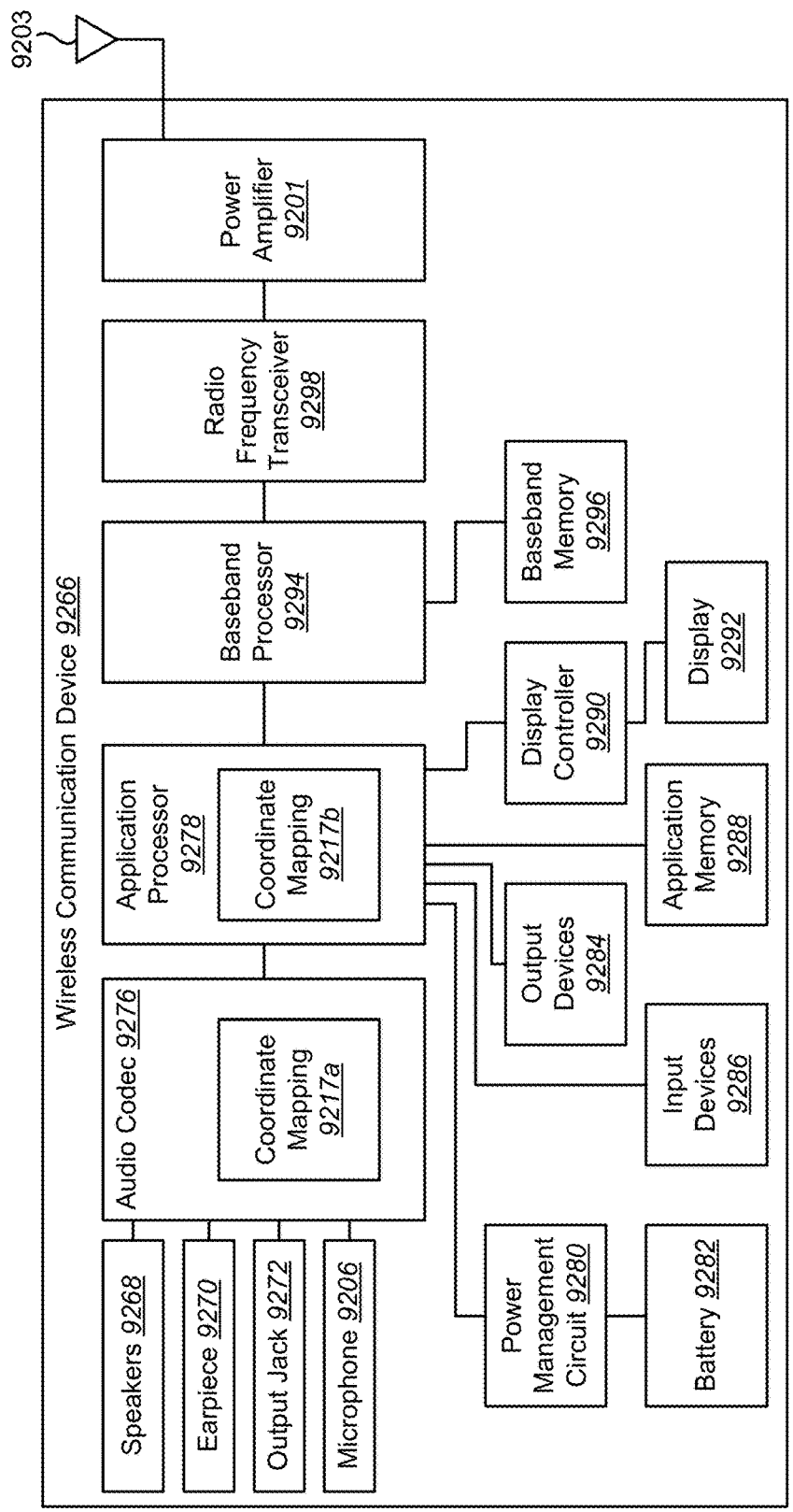
Figure 93:
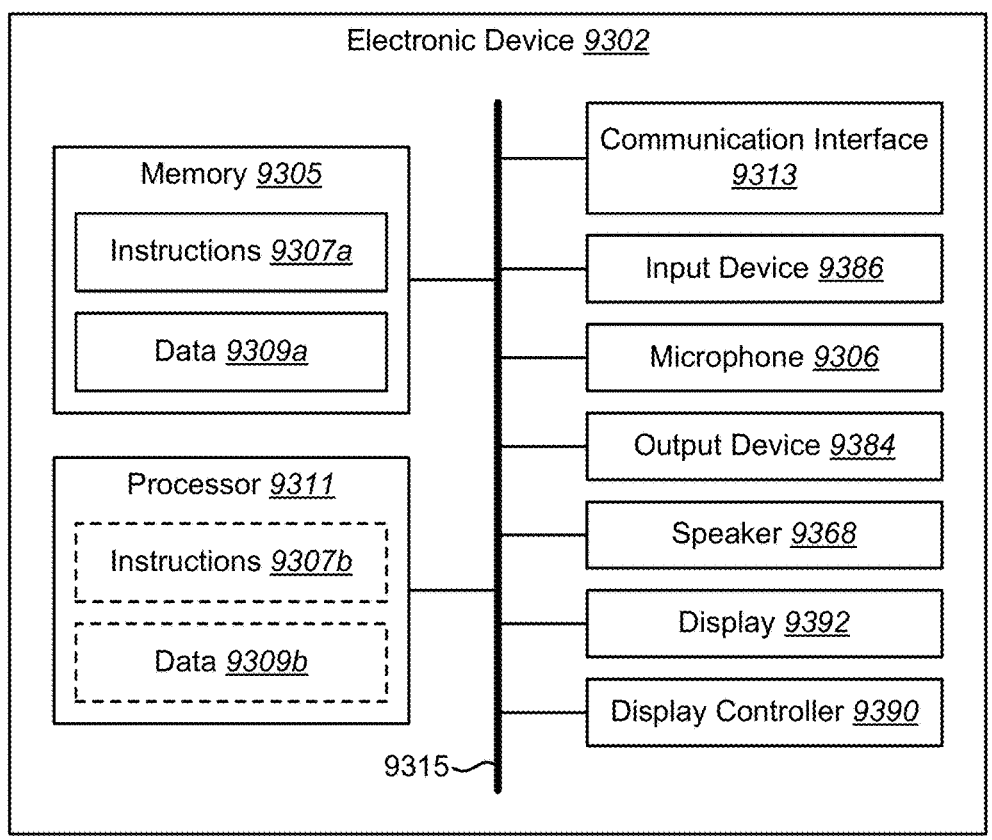
Figure 94:
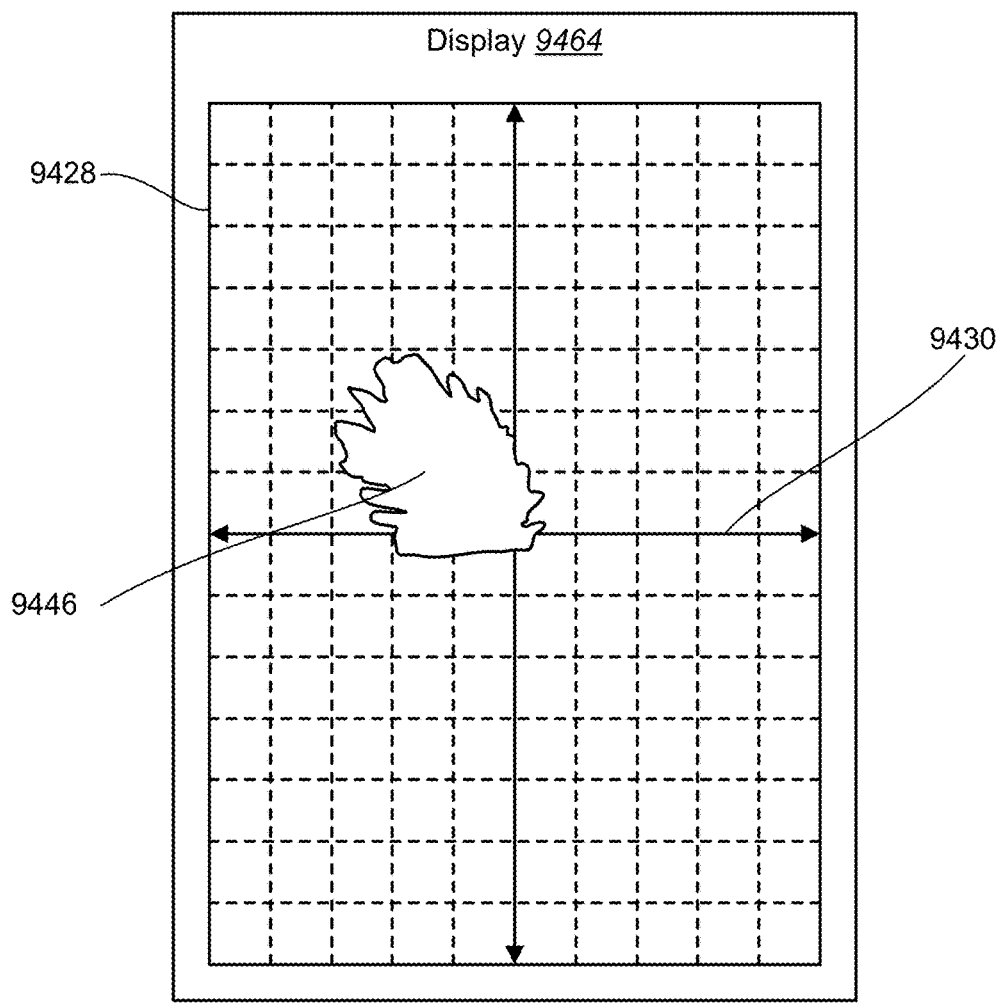

FIG. 92 is a block diagram illustrating one configuration of a wireless communication device in which systems and methods for mapping a source location may be implemented;

FIG. 93 illustrates various components that may be utilized in an electronic device; and FIG. 94 illustrates another example of a user interface.

DETAILED DESCRIPTION

The 3rd Generation Partnership Project (3GPP) is a collaboration between groups of telecommunications associations that aims to define a globally applicable 3rd generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

It should be noted that, in some cases, the systems and methods disclosed herein may be described in terms of one or more specifications, such as the 3GPP Release-8 (Rel-8), 3GPP Release-9 (Rel-9), 3GPP Release-10 (Rel-10), LTE, LTE-Advanced (LTE-A), Global System for Mobile Communications (GSM), General Packet Radio Service (GPRS), Enhanced Data Rates for GSM Evolution (EDGE), Time Division Long-Term Evolution (TD-LTE), Time Division Synchronous Code Division Multiple Access (TD-SCDMA), Frequency-Division Duplexing Long-Term Evolution (FDD-LTE), UMTS, GSM EDGE Radio Access Network (GERAN), Global Positioning System (GPS), etc. However, at least some of the concepts described herein may be applied to other wireless communication systems. For example, the term electronic device may be used to refer to a User Equipment (UE). Furthermore, the term base station may be used to refer to at least one of the terms Node B, Evolved Node B (eNB), Home Evolved Node B (HeNB), etc.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B" or "A is the same as B"). Similarly, the term "in response to" is used to indicate any of its ordinary meanings, including "in response to at least." Unless otherwise indicated, the terms "at least one of A, B, and C" and "one or more of A, B, and C" indicate "A and/or B and/or C."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample (or "bin") of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

A. Systems, Methods and Apparatus for Estimating Direction of Arrival

A method of processing a multichannel signal includes calculating, for each of a plurality of different frequency components of the multichannel signal, a difference between a phase of the frequency component in each of a first pair of channels of the multichannel signal, to obtain a plurality of phase differences. This method also includes estimating an error, for each of a plurality of candidate directions, between the candidate direction and a vector that is based on the plurality of phase differences. This method also includes selecting, from among the plurality of candidate directions, a candidate direction that corresponds to the minimum among the estimated errors. In this method, each of said first pair of channels is based on a signal produced by a corresponding one of a first pair of microphones, and at least one of the different frequency components has a wavelength that is less than twice the distance between the microphones of the first pair.

It may be assumed that in the near-field and far-field regions of an emitted sound field, the wavefronts are spherical and planar, respectively. The near-field may be defined as that region of space that is less than one wavelength away from a sound receiver (e.g., a microphone array). Under this definition, the distance to the boundary of the region varies inversely with frequency. At frequencies of two hundred, seven hundred, and two thousand hertz, for example, the distance to a one-wavelength boundary is about 170, forty-nine, and seventeen centimeters, respectively. It may be useful instead to consider the near-field/far-field boundary to be at a particular distance from the microphone array (e.g., fifty centimeters from a microphone of the array or from the centroid of the array, or one meter or 1.5 meters from a microphone of the array or from the centroid of the array).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. Features and/or elements depicted in a Figure may be combined with at least one features and/or elements depicted in at least one other Figures.

Figure 1:
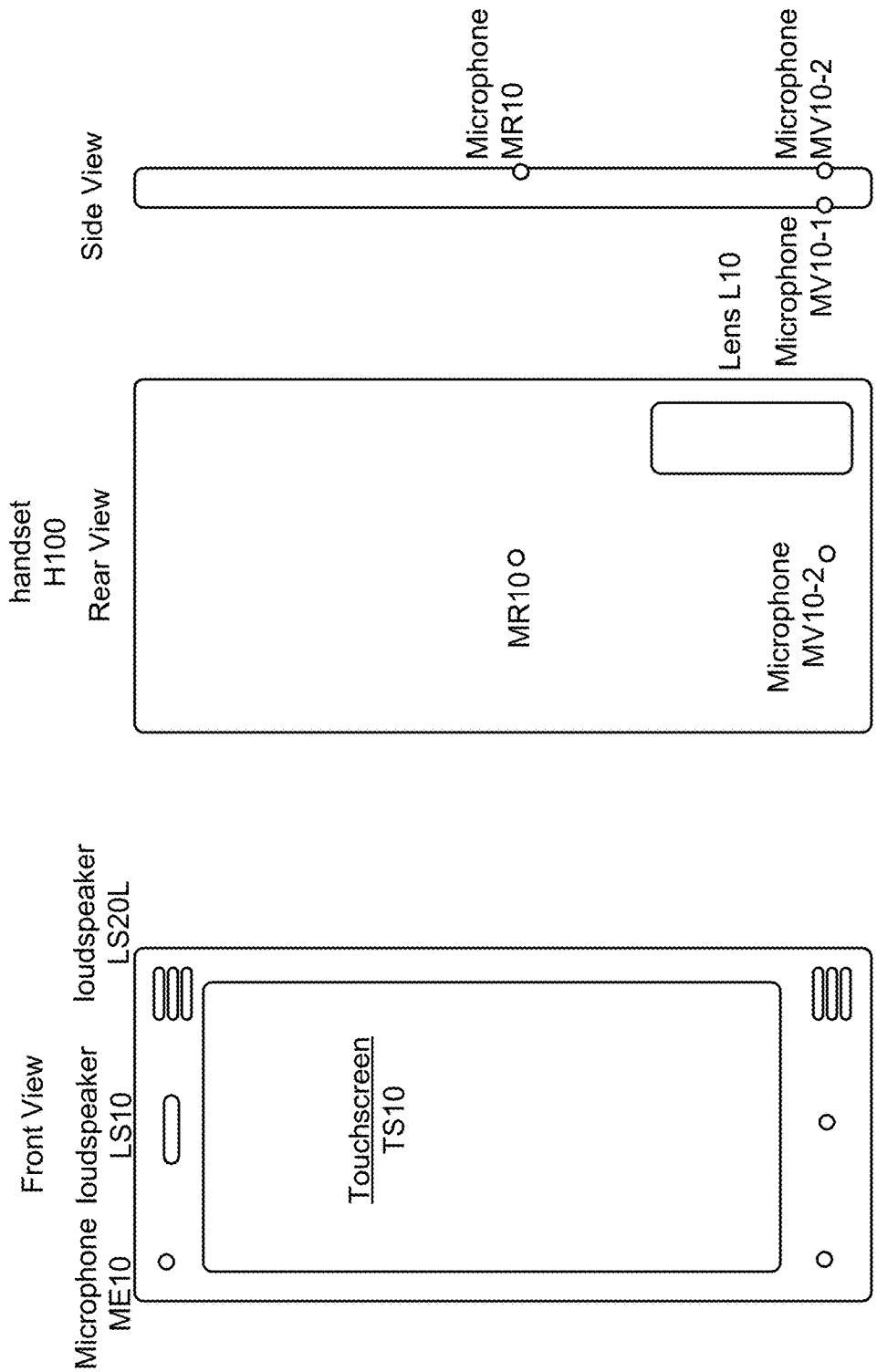
FIG. 1 shows multiple views of a multi-microphone handset.

FIG. 1 shows an example of a multi-microphone handset H100 (e.g., a multi-microphone device) that includes a first microphone pair MV10-1, MV10-3 whose axis is in a left-right direction of a front face of the device, and a second microphone pair MV10-1, MV10-2 whose axis is in a front-back direction (i.e., orthogonal to the front face). Such an arrangement may be used to determine when a user is speaking at the front face of the device (e.g., in a browse-talk mode). The front-back pair may be used to resolve an ambiguity between front and back directions that the left-right pair typically cannot resolve on its own. In some implementations, the handset H100 may include one or more loudspeakers LS10, L20L, LS20R, a touchscreen TS10, a lens L10 and/or one or more additional microphones ME10, MR10.

In addition to a handset as shown in FIG. 1, other examples of audio sensing devices that may be implemented to include a multi-microphone array and to perform a method as described herein include portable computing devices (e.g., laptop computers, notebook computers, netbook computers, ultra-portable computers, tablet computers, mobile Internet devices, smartbooks, smartphones, etc.), audio- or video-conferencing devices, and display screens (e.g., computer monitors, television sets).

A device as shown in FIG. 1 may be configured to determine the direction of arrival (DOA) of a source signal by measuring a difference (e.g., a phase difference) between the microphone channels for each frequency bin to obtain an indication of direction, and averaging the direction indications over all bins to determine whether the estimated direction is consistent over all bins. The range of frequency bins that may be available for tracking is typically constrained by the spatial aliasing frequency for the microphone pair. This upper limit may be defined as the frequency at which the wavelength of the signal is twice the distance, d, between the microphones. Such an approach may not support accurate tracking of source DOA beyond one meter and typically may support only a low DOA resolution. Moreover, dependence on a front-back pair to resolve ambiguity may be a significant constraint on the microphone placement geometry, as placing the device on a surface may effectively occlude the front or back microphone. Such an approach also typically uses only one fixed pair for tracking.

It may be desirable to provide a generic speakerphone application such that the multi-microphone device may be placed arbitrarily (e.g., on a table for a conference call, on a car seat, etc.) and track and/or enhance the voices of individual speakers. Such an approach may be capable of dealing with an arbitrary target speaker position with respect to an arbitrary orientation of available microphones. It may also be desirable for such an approach to provide instantaneous multi-speaker tracking/separating capability. Unfortunately, the current state of the art is a single-microphone approach.

It may also be desirable to support source tracking in a far-field application, which may be used to provide solutions for tracking sources at large distances and unknown orientations with respect to the multi-microphone device. The multi-microphone device in such an application may include an array mounted on a television or set-top box, which may be used to support telephony. Examples include the array of a Kinect device (Microsoft Corp., Redmond, Wash.) and arrays from Skype (Microsoft Skype Division) and Samsung Electronics (Seoul, KR). In addition to the large source-to-device distance, such applications typically also suffer from a bad signal-to-interference-noise ratio (SINR) and room reverberation.

It is a challenge to provide a method for estimating a three-dimensional direction of arrival (DOA) for each frame of an audio signal for concurrent multiple sound events that is sufficiently robust under background noise and reverberation. Robustness can be obtained by maximizing the number of reliable frequency bins. It may be desirable for such a method to be suitable for arbitrarily shaped microphone array geometry, such that specific constraints on microphone geometry may be avoided. A pair-wise 1-D approach as described herein can be appropriately incorporated into any geometry.

The systems and methods disclosed herein may be implemented for such a generic speakerphone application or far-field application. Such an approach may be implemented to operate without a microphone placement constraint. Such an approach may also be implemented to track sources using available frequency bins up to Nyquist frequency and down to a lower frequency (e.g., by supporting use of a microphone pair having a larger inter-microphone distance). Rather than being limited to a single pair for tracking, such an approach may be implemented to select a best pair among all available pairs. Such an approach may be used to support source tracking even in a far-field scenario, up to a distance of three to five meters or more, and to provide a much higher DOA resolution. Other potential features include obtaining an exact 2-D representation of an active source. For best results, it may be desirable that each source is a sparse broadband audio source, and that each frequency bin is mostly dominated by no more than one source.

FIG. 33A shows a flowchart for a method M10 according to a general configuration that includes tasks T10, T20 and T30. Task T10 calculates a difference between a pair of channels of a multichannel signal (e.g., in which each channel is based on a signal produced by a corresponding microphone). For each among a plurality K of candidate directions, task T20 calculates a corresponding directional error that is based on the calculated difference. Based on the K directional errors, task T30 selects a candidate direction.

Method M10 may be configured to process the multichannel signal as a series of segments. Typical segment lengths range from about five or ten milliseconds to about forty or fifty milliseconds, and the segments may be overlapping (e.g., with adjacent segments overlapping by 25% or 50%) or non-overlapping. In one particular example, the multichannel signal is divided into a series of non-overlapping segments or "frames," each having a length of ten milliseconds. In another particular example, each frame has a length of twenty milliseconds. A segment as processed by method M10 may also be a segment (i.e., a "subframe") of a larger segment as processed by a different operation, or vice versa.

Examples of differences between the channels include a gain difference or ratio, a time difference of arrival, and a phase difference. For example, task T10 may be implemented to calculate the difference between the channels of a pair as a difference or ratio between corresponding gain values of the channels (e.g., a difference in magnitude or energy). FIG. 33B shows such an implementation T12 of task T10.

Task T12 may be implemented to calculate measures of the gain of a segment of the multichannel signal in the time domain (e.g., for each of a plurality of subbands of the signal) or in a frequency domain (e.g., for each of a plurality of frequency components of the signal in a transform domain, such as a fast Fourier transform (FFT), discrete cosine transform (DCT), or modified DCT (MDCT) domain). Examples of such gain measures include, without limitation, the following: total magnitude (e.g., sum of absolute values of sample values), average magnitude (e.g., per sample), root mean square (RMS) amplitude, median magnitude, peak magnitude, peak energy, total energy (e.g., sum of squares of sample values), and average energy (e.g., per sample).

In order to obtain accurate results with a gain-difference technique, it may be desirable for the responses of the two microphone channels to be calibrated relative to each other. It may be desirable to apply a low-pass filter to the multichannel signal such that calculation of the gain measure is limited to an audio-frequency component of the multichannel signal.

Task T12 may be implemented to calculate a difference between gains as a difference between corresponding gain measure values for each channel in a logarithmic domain (e.g., values in decibels) or, equivalently, as a ratio between the gain measure values in a linear domain. For a calibrated microphone pair, a gain difference of zero may be taken to indicate that the source is equidistant from each microphone (i.e., located in a broadside direction of the pair), a gain difference with a large positive value may be taken to indicate that the source is closer to one microphone (i.e., located in one endfire direction of the pair), and a gain difference with a large negative value may be taken to indicate that the source is closer to the other microphone (i.e., located in the other endfire direction of the pair).

In another example, task T10 from FIG. 33A may be implemented to perform a cross-correlation on the channels to determine the difference (e.g., calculating a time-difference-of-arrival based on a lag between channels of the multichannel signal).

In a further example, task T10 is implemented to calculate the difference between the channels of a pair as a difference between the phase of each channel (e.g., at a particular frequency component of the signal). FIG. 33C shows such an implementation T14 of task T10. As discussed below, such calculation may be performed for each among a plurality of frequency components.

For a signal received by a pair of microphones directly from a point source in a particular direction of arrival (DOA) relative to the axis of the microphone pair, the phase delay differs for each frequency component and also depends on the spacing between the microphones. The observed value of the phase delay at a particular frequency component (or "bin") may be calculated as the inverse tangent (also called the arctangent) of the ratio of the imaginary term of the complex FFT coefficient to the real term of the complex FFT coefficient.

Figure 2A:
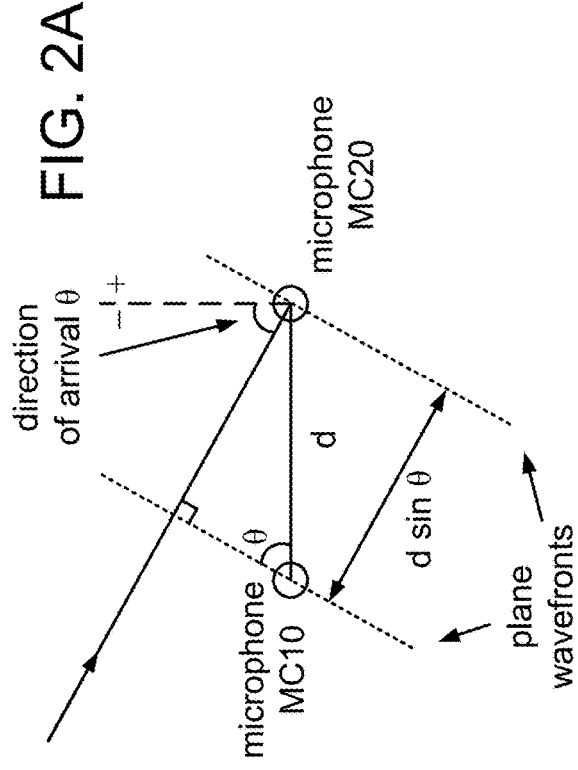
FIG. 2A shows a far-field model of plane wave propagation relative to a microphone pair.
Figure 2B:
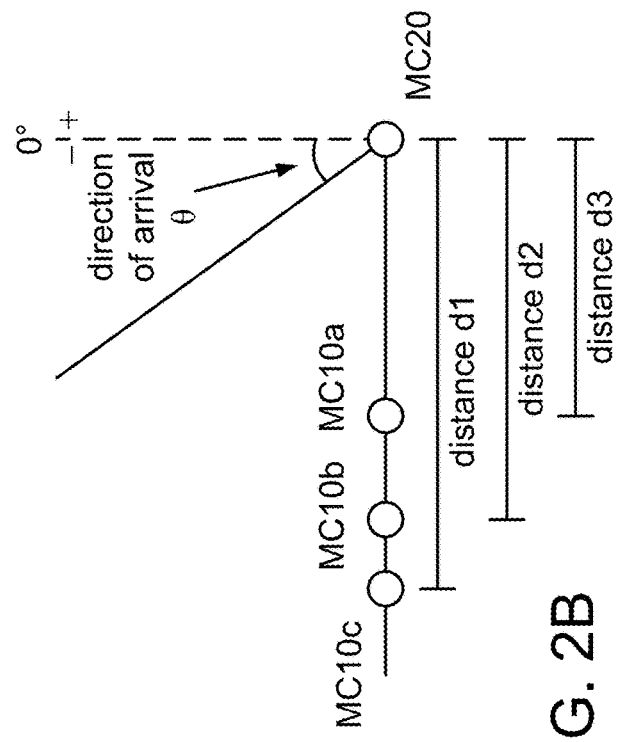
FIG. 2B shows multiple microphone pairs in a linear array.

As shown in FIG. 2A, the phase delay value $\Delta\varphi_f$ for a source S01 for at least one microphone MC10, MC20 at a particular frequency, f, may be related to source DOA under a far-field (i.e., plane-wave) assumption as $$\Delta\varphi_f = 2\pi f \frac{d\sin\theta}{c},$$

where d denotes the distance between the microphones MC10, MC20 (in meters), θ denotes the angle of arrival (in radians) relative to a direction that is orthogonal to the array axis, f denotes frequency (in Hz), and c denotes the speed of sound (in m/s). As will be described below, the DOA estimation principles described herein may be extended to multiple microphone pairs in a linear array (e.g., as shown in FIG. 2B). For the ideal case of a single point source with no reverberation, the ratio of phase delay to frequency $\Delta\varphi_f$ will have the same value $$2\pi f \frac{d\sin\theta}{c}$$

over all frequencies. As discussed in more detail below, the DOA, θ, relative to a microphone pair is a one-dimensional measurement that defines the surface of a cone in space (e.g., such that the axis of the cone is the axis of the array).

Such an approach is typically limited in practice by the spatial aliasing frequency for the microphone pair, which may be defined as the frequency at which the wavelength of the signal is twice the distance d between the microphones. Spatial aliasing causes phase wrapping, which puts an upper limit on the range of frequencies that may be used to provide reliable phase delay measurements for a particular microphone pair.

FIG. 3A shows plots of unwrapped phase delay vs. frequency for four different DOAs D10, D20, D30, D40. FIG. 3B shows plots of wrapped phase delay vs. frequency for the same DOAs D10, D20, D30, D40, where the initial portion of each plot (i.e., until the first wrapping occurs) are shown in bold. Attempts to extend the useful frequency range of phase delay measurement by unwrapping the measured phase are typically unreliable.

Task T20 may be implemented to calculate the directional error in terms of phase difference. For example, task T20 may be implemented to calculate the directional error at frequency f, for each of an inventory of K DOA candidates, where 1≤k≤K, as a squared difference $e_{ph\_f\_k}=(\Delta\varphi_{ob\_f}-\Delta\varphi_{k\_f})^2$ (alternatively, an absolute difference $e_{ph\_f\_k}=|\Delta\varphi_{ob\_f}-\Delta\varphi_{k\_f}|$) between the observed phase difference and the phase difference corresponding to the DOA candidate.

Instead of phase unwrapping, a proposed approach compares the phase delay as measured (e.g., wrapped) with pre-calculated values of wrapped phase delay for each of an inventory of DOA candidates. FIG. 4A shows such an example that includes angle vs. frequency plots of the (noisy) measured phase delay values MPD10 and the phase delay values PD10, PD20 for two DOA candidates of the inventory (solid and dashed lines), where phase is wrapped to the range of pi to minus pi. The DOA candidate that is best matched to the signal as observed may then be determined by calculating a corresponding directional error for each DOA candidate, $\theta_i$, and identifying the DOA candidate value that corresponds to the minimum among these directional errors. Such a directional error may be calculated, for example, as an error, $e_{ph\_k}$, between the phase delay values, $\Delta\varphi_{k\_f}$, for the k-th DOA candidate and the observed phase delay values $\Delta\varphi_{ob\_f}$. In one example, the error, $e_{ph\_k}$, is expressed as $\|\Delta\varphi_{ob\_f}-\Delta\varphi_{k\_f}\|_f^2$ over a desired range or other set F of frequency components, i.e. as the sum $$e_{ph\_k} = \sum_{f\in F}(\Delta\varphi_{ob\_f}-\Delta\varphi_{k\_f})^2$$

of the squared differences between the observed and candidate phase delay values over F. The phase delay values, $\Delta\varphi_{k\_f}$ for each DOA candidate, $\theta_k$, may be calculated before run-time (e.g., during design or manufacture), according to known values of c and d and the desired range of frequency components f, and retrieved from storage during use of the device. Such a pre-calculated inventory may be configured to support a desired angular range and resolution (e.g., a uniform resolution, such as one, two, five, six, ten, or twelve degrees; or a desired non-uniform resolution) and a desired frequency range and resolution (which may also be uniform or non-uniform).

It may be desirable to calculate the directional error (e.g., $e_{ph\_f}$, $e_{ph\_k}$) across as many frequency bins as possible to increase robustness against noise. For example, it may be desirable for the error calculation to include terms from frequency bins that are beyond the spatial aliasing frequency. In a practical application, the maximum frequency bin may be limited by other factors, which may include available memory, computational complexity, strong reflection by a rigid body (e.g., an object in the environment, a housing of the device) at high frequencies, etc.

A speech signal is typically sparse in the time-frequency domain. If the sources are disjoint in the frequency domain, then two sources can be tracked at the same time. If the sources are disjoint in the time domain, then two sources can be tracked at the same frequency. It may be desirable for the array to include a number of microphones that is at least equal to the number of different source directions to be distinguished at any one time. The microphones may be omnidirectional (e.g., as may be typical for a cellular telephone or a dedicated conferencing device) or directional (e.g., as may be typical for a device such as a set-top box).

Such multichannel processing is generally applicable, for example, to source tracking for speakerphone applications. Such a technique may be used to calculate a DOA estimate for a frame of the received multichannel signal. Such an approach may calculate, at each frequency bin, the error for each candidate angle with respect to the observed angle, which is indicated by the phase delay. The target angle at that frequency bin is the candidate having the minimum error. In one example, the error is then summed across the frequency bins to obtain a measure of likelihood for the candidate. In another example, one or more of the most frequently occurring target DOA candidates across all frequency bins is identified as the DOA estimate (or estimates) for a given frame.

Such a method may be applied to obtain instantaneous tracking results (e.g., with a delay of less than one frame). The delay is dependent on the FFT size and the degree of overlap. For example, for a 512-point FFT with a 50% overlap and a sampling frequency of 16 kilohertz (kHz), the resulting 256-sample delay corresponds to sixteen milliseconds. Such a method may be used to support differentiation of source directions typically up to a source-array distance of two to three meters, or even up to five meters.

The error may also be considered as a variance (i.e., the degree to which the individual errors deviate from an expected value). Conversion of the time-domain received signal into the frequency domain (e.g., by applying an FFT) has the effect of averaging the spectrum in each bin. This averaging is even more obvious if a subband representation is used (e.g., mel scale or Bark scale). Additionally, it may be desirable to perform time-domain smoothing on the DOA estimates (e.g., by applying a recursive smoother, such as a first-order infinite-impulse-response filter). It may be desirable to reduce the computational complexity of the error calculation operation (e.g., by using a search strategy, such as a binary tree, and/or applying known information, such as DOA candidate selections from one or more previous frames).

Even though the directional information may be measured in terms of phase delay, it is typically desired to obtain a result that indicates source DOA. Consequently, it may be desirable to implement task T20 to calculate the directional error at frequency f, for each of an inventory of K DOA candidates, in terms of DOA rather than in terms of phase delay.

An expression of directional error in terms of DOA may be derived by expressing wrapped phase delay at frequency f (e.g., the observed phase delay, $\Delta\varphi_{ob\_f}$, as a function $\Psi_{f\_wr}$ of the DOA, $\theta$, of the signal, such as $$\Psi_{f\_wr}(\theta) = \mod\left(-2\pi f \frac{d\sin\theta}{c} + \pi, 2\pi\right) - \pi).$$

We assume that this expression is equivalent to a corresponding expression for unwrapped phase delay as a function of DOA, such as $$\Psi_{f\_un}(\theta) = -2\pi f \frac{d\sin\theta}{c},$$

except near discontinuities that are due to phase wrapping. The directional error, $e_{ph\_f\_k}$, may then be expressed in terms of observed DOA, $e_{ob}$, and candidate DOA, $\theta_k$, as $e_{ph\_f\_k}=|\Psi_{f\_wr}(\theta_{ob})-\Psi_{f\_wr}(\theta_k)|\equiv|\Psi_{f\_un}(\theta_{ob})-\Psi_{f\_un}(\theta_k)|$ or $e_{ph\_f\_k}=(\Psi_{f\_wr}(\theta_{ob})-\Psi_{f\_wr}(\theta_k))^2=(\Psi_{f\_un}(\theta_{ob})-\Psi_{f\_un}(\theta_k))^2$, where the difference between the observed and candidate phase delay at frequency f is expressed in terms of observed DOA at frequency f, $\theta_{ob\_f}$, and candidate DOA, $\theta_k$, as $$\Psi_{f\_un}(\theta_{ob}) - \Psi_{f\_un}(\theta_k) = \frac{-2\pi fd}{c}(\sin\theta_{ob\_f} - \sin\theta_k).$$

A directional error, $e_{ph\_k}$, across F may then be expressed in terms of observed DOA, $\theta_{ob}$, and candidate DOA, $\theta_k$, as $e_{ph\_k}=\|\Psi_{f\_wr}(\theta_{ob})-\Psi_{f\_wr}(\theta_k)\|_f^2=\|\Psi_{f\_un}(\theta_b)-\Psi_{f\_un}(\theta_k)\|_f^2$.

We perform a Taylor series expansion on this result to obtain the following first-order approximation:

$$\frac{-2\pi fd}{c}(\sin\theta_{ob\_f} - \sin\theta_k) \approx (\theta_{ob\_f} - \theta_k)\frac{-2\pi fd}{c}\cos\theta_k,$$

which is used to obtain an expression of the difference between the DOA $\theta_{ob\_f}$ as observed at frequency f and DOA candidate $\theta_k$:

$$(\theta_{ob\_f} - \theta_k) \cong \frac{\Psi_{f\_un}(\theta_{ob}) - \Psi_{f\_un}(\theta_k)}{\frac{2\pi fd}{c}\cos\theta_k}.$$

This expression may be used (e.g., in task T20), with the assumed equivalence of observed wrapped phase delay to unwrapped phase delay, to express the directional error in terms of DOA ($e_{DOA\_f\_k}$, $e_{DOA\_k}$) rather than phase delay ($e_{ph\_f\_k}$, $e_{ph\_k}$):

$$e_{DOA\_f\_k} = (\theta_b - \theta_k)^2 \cong \frac{(\Psi_{f\_wr}(\theta_{ob}) - \Psi_{f\_wr}(\theta_k))^2}{\left(\frac{2\pi fd}{c}\cos\theta_k\right)^2},$$

$$e_{DOA\_k} = \|\theta_{ob} - \theta_k\|_f^2 \cong \frac{\|\Psi_{f\_wr}(\theta_{ob}) - \Psi_{f\_wr}(\theta_k)\|_f^2}{\left\|\frac{2\pi fd}{c}\cos\theta_k\right\|_f^2},$$

where the values of $\lfloor\Psi_{f\_wr}(\theta_{ob}), \Psi_{f\_wr}(\theta_k)\rfloor$ are defined as $\lfloor\Delta\psi_{ob\_f}, \Delta\psi_{k\_f}\rfloor$.

To avoid division with zero at the endfire directions ($\theta=+/-90°$), it may be desirable to implement task T20 to perform such an expansion using a second-order approximation instead, as in the following:

$$|\theta_{ob} - \theta_k| \cong \begin{cases} -|C/B|, & \theta_i = 0(\text{broadwise}) \\ \left|\frac{-B + \sqrt{B^2 - 4AC}}{2A}\right|, & \text{otherwise} \end{cases},$$

where $A=(\pi fd \sin\theta_k)/c$, $B=(-2\pi fd \cos\theta_k)/c$, and $C=-(\Psi_{f\_un}(\theta_{ob})-\Psi_{c\_un}(\theta_k))$. As in the first-order example above, this expression may be used, with the assumed equivalence of observed wrapped phase delay to unwrapped phase delay, to express the directional error in terms of DOA as a function of the observed and candidate wrapped phase delay values.

FIGS. 5A-5C depict a plurality of frames 502. As shown in FIG. 5A, a directional error based on a difference between observed and candidate DOA for a given frame of the received signal may be calculated in such manner (e.g., by task T20) at each of a plurality of frequencies f of the received microphone signals (e.g., $\forall f\in F$) and for each of a plurality of DOA candidates $\theta_k$. It may be desirable to implement task T20 to perform a temporal smoothing operation on each directional error e according to an expression such as $e_s(n)=\beta e_s(n+1)+(1-\beta)e(n)$ (also known as a first-order IIR or recursive filter), where $e_s(n-1)$ denotes the smoothed directional error for the previous frame, $e_s(n)$ denotes the current unsmoothed value of the directional error, $e_s(n)$ denotes the current smoothed value of the directional error, and $\beta$ is a smoothing factor whose value may be selected from the range from zero (no smoothing) to one (no updating). Typical values for smoothing factor $\beta$ include 0.1, 0.2, 0.25, 0.3, 0.4 and 0.5. It is typical, but not necessary, for such an implementation of task T20 to use the same value of $\beta$ to smooth directional errors that correspond to different frequency components. Similarly, it is typical, but not necessary, for such an implementation of task T20 to use the same value of $\beta$ to smooth directional errors that correspond to different candidate directions. As demonstrated in FIG. 5B, a DOA estimate for a given frame may be determined by summing the squared differences for each candidate across all frequency bins in the frame to obtain a directional error (e.g., $e_{ph\_k}$ or $e_{DOA\_k}$) and selecting the DOA candidate having the minimum error. Alternatively, as demonstrated in FIG. 5C, such differences may be used to identify the best-matched (i.e. minimum squared difference) DOA candidate at each frequency. A DOA estimate for the frame may then be determined as the most frequent DOA across all frequency bins.

Based on the directional errors, task T30 selects a candidate direction for the frequency component. For example, task T30 may be implemented to select the candidate direction associated with the lowest among the K directional errors produced by task T20. In another example, task T30 is implemented to calculate a likelihood based on each directional error and to select the candidate direction associated with the highest likelihood.

Figure 6B:
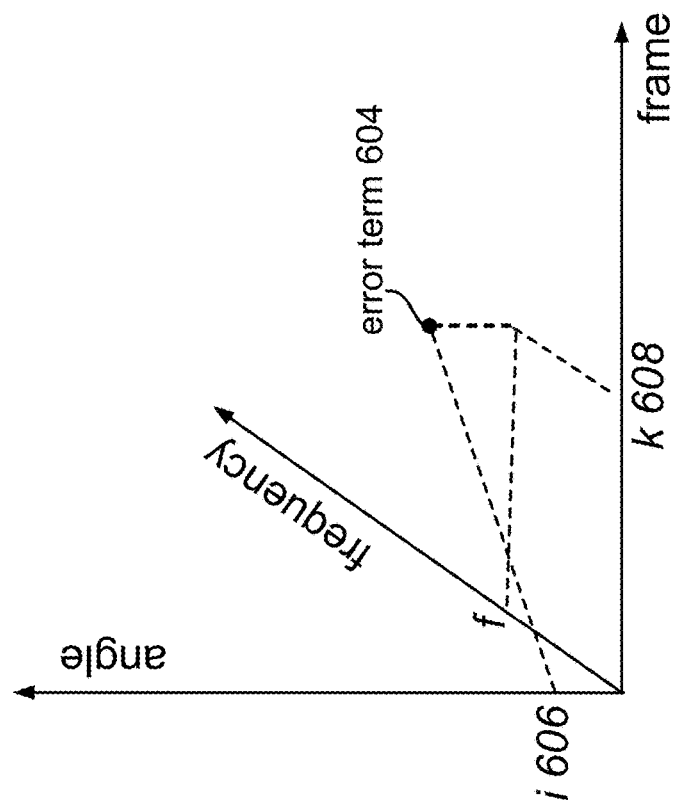
FIG. 6B shows an example of likelihood calculation.

As shown in FIG. 6B, an error term 604 may be calculated for each candidate angle 606, I, and each of a set F of frequencies for each frame 608, k. It may be desirable to indicate a likelihood of source activity in terms of a calculated DOA difference or error term 604. One example of such a likelihood L may be expressed, for a particular frame, frequency and angle, as $$L(i, f, k) = \frac{1}{|\theta_{ob} - \theta_i|^2_{f,k}}.$$

For this expression, an extremely good match at a particular frequency may cause a corresponding likelihood to dominate all others. To reduce this susceptibility, it may be desirable to include a regularization term $\lambda$, as in the following expression:

$$L(i, f, k) = \frac{1}{|\theta_{ob} - \theta_i|^2_{f,k} + \lambda}.$$

Speech tends to be sparse in both time and frequency, such that a sum over a set of frequencies F may include results from bins that are dominated by noise. It may be desirable to include a bias term $\beta$, as in the following expression:

$$L(i, f, k) = \frac{1}{|\theta_{ob} - \theta_i|^2_{f,k} + \lambda} - \beta.$$

Figure 7:
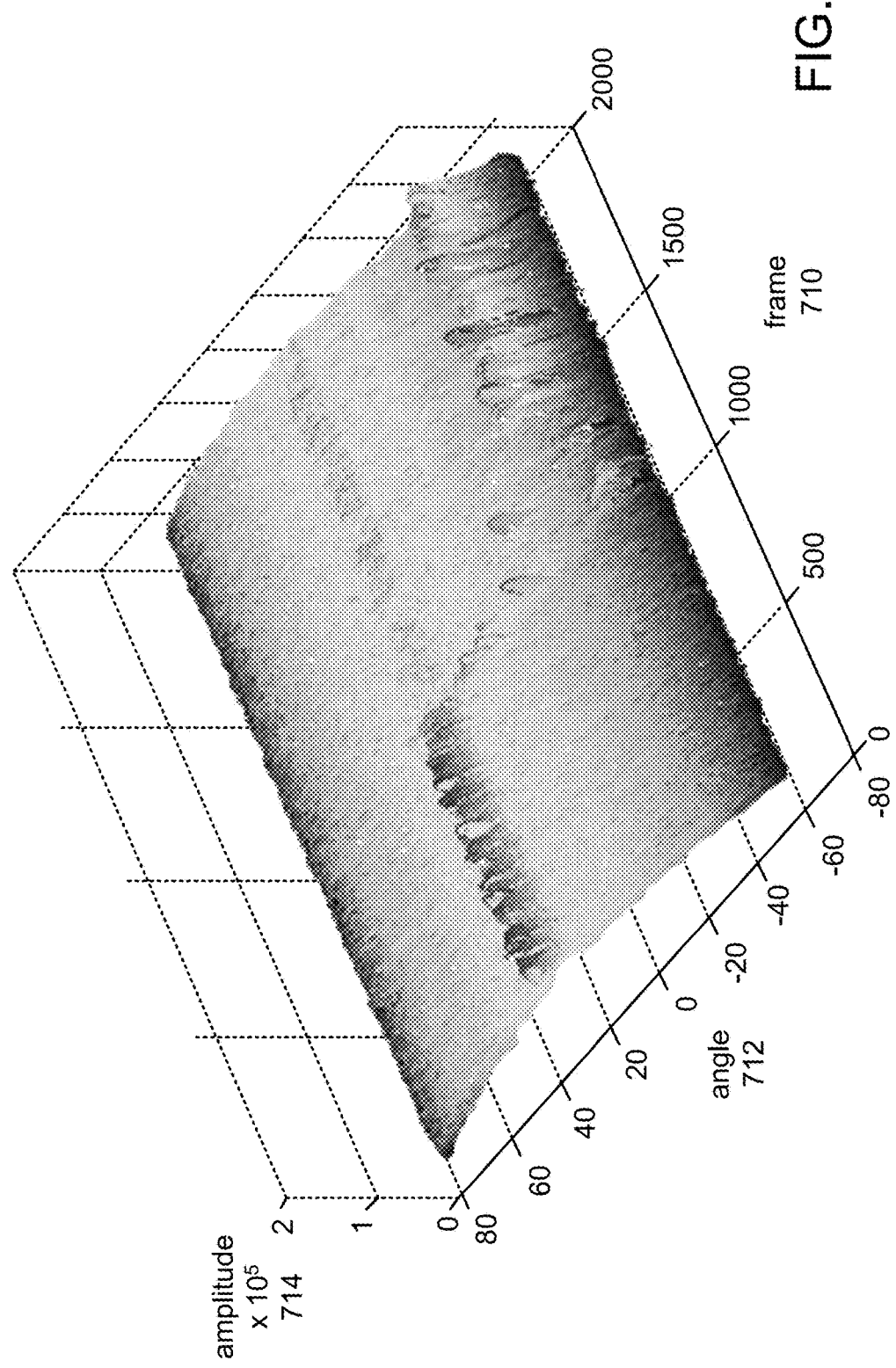
FIG. 7 shows an example of bias removal.
Figure 8:
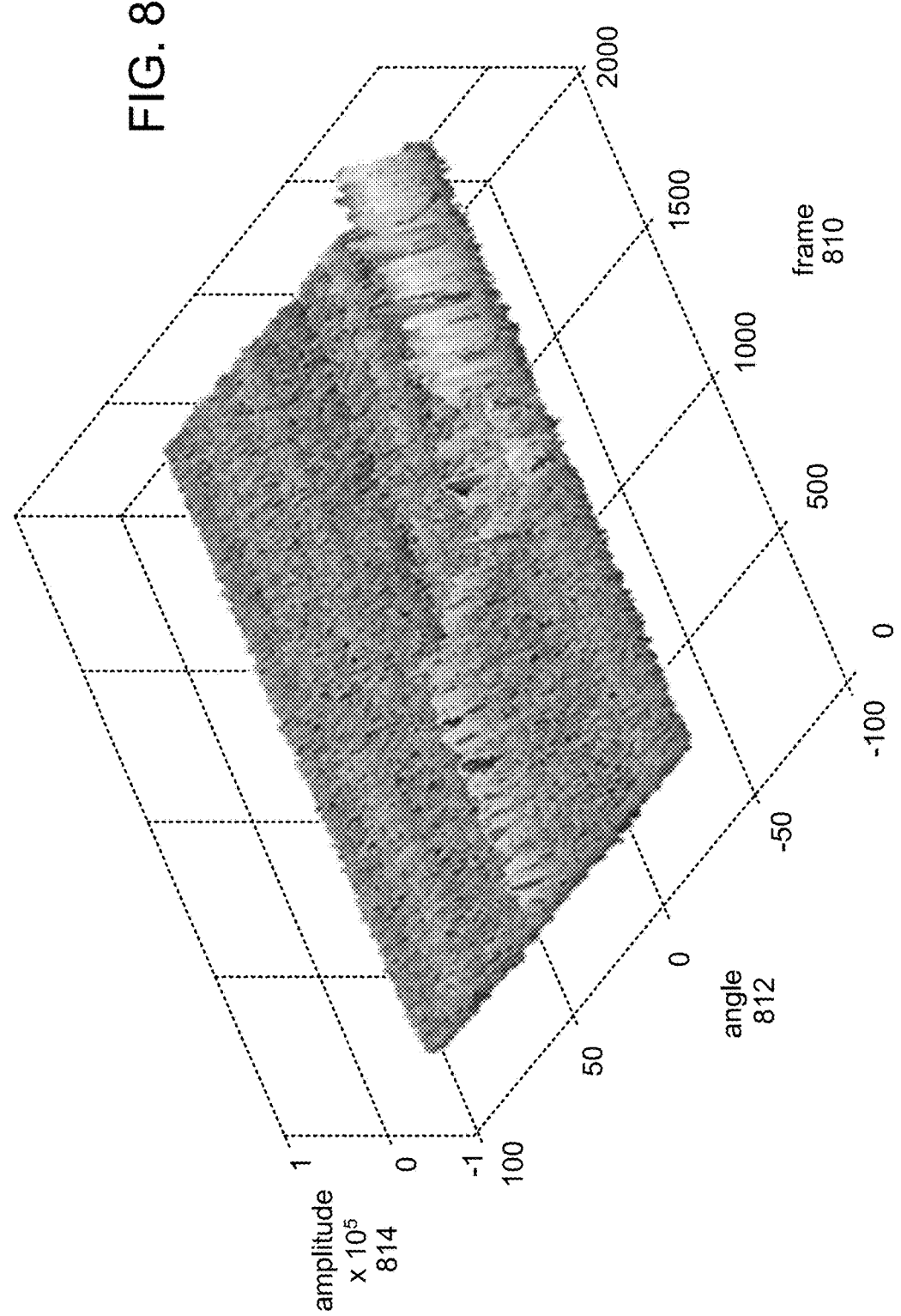
FIG. 8 shows another example of bias removal.

The bias term, which may vary over frequency and/or time, may be based on an assumed distribution of the noise (e.g., Gaussian). Additionally or alternatively, the bias term may be based on an initial estimate of the noise (e.g., from a noise-only initial frame). Additionally or alternatively, the bias term may be updated dynamically based on information from noise-only frames, as indicated, for example, by a voice activity detection module. FIGS. 7 and 8 show examples of plots of likelihood before and after bias removal, respectively. In FIG. 7, the frame number 710, an angle of arrival 712 and an amplitude 714 of a signal are illustrated. Similarly, in FIG. 8, the frame number 810, an angle of arrival 812 and an amplitude 814 of a signal are illustrated.

The frequency-specific likelihood results may be projected onto a (frame, angle) plane (e.g., as shown in FIG. 8) to obtain a DOA estimation per frame $$\theta_{est\_k} = \max_i \sum_{f \in F} L(i, f, k)$$

that is robust to noise and reverberation because only target-dominant frequency bins contribute to the estimate. In this summation, terms in which the error is large may have values that approach zero and thus become less significant to the estimate. If a directional source is dominant in some frequency bins, the error value at those frequency bins may be nearer to zero for that angle. Also, if another directional source is dominant in other frequency bins, the error value at the other frequency bins may be nearer to zero for the other angle.

Figure 9:
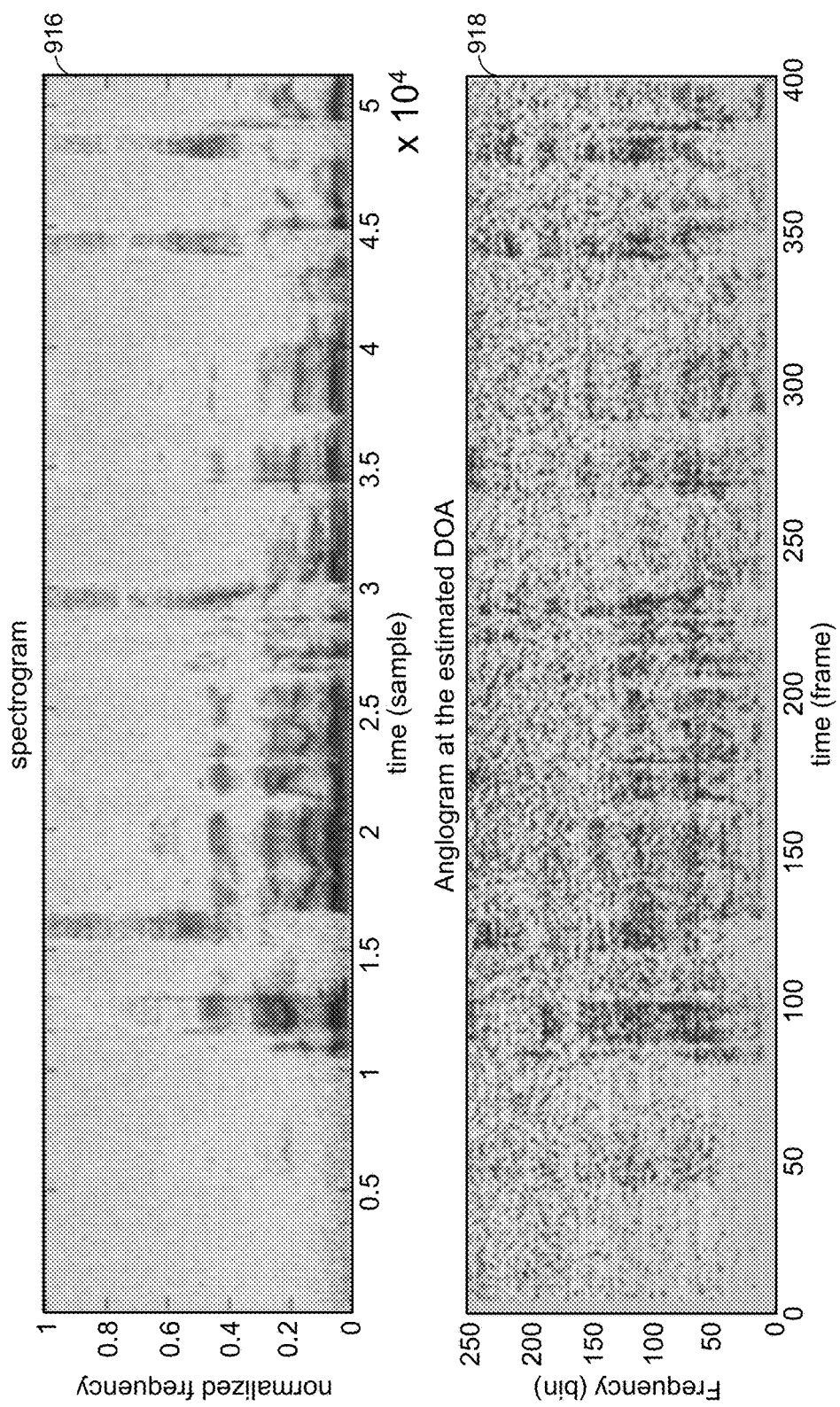
FIG. 9 shows an example of an anglogram that plots source activity likelihood at the estimated DOA over frame and frequency.

The likelihood results may also be projected onto a (frame, frequency) plane as shown in the bottom panel 918 of FIG. 9 to indicate likelihood information per frequency bin, based on directional membership (e.g., for voice activity detection). The bottom panel 918 shows, for each frequency and frame, the corresponding likelihood for the estimated DOA (e.g., $$\operatorname{argmax}_i \sum_{f \in F} L(i, f, k))$$

This likelihood may be used to indicate likelihood of speech activity. Additionally or alternatively, such information may be used, for example, to support time- and/or frequency-selective masking of the received signal by classifying frames and/or frequency components according to their directions of arrival.

An anglogram representation, as shown in the bottom panel 918 of FIG. 9, is similar to a spectrogram representation. As shown in the top panel 916 of FIG. 9, a spectrogram may be obtained by plotting, at each frame, the magnitude of each frequency component. An anglogram may be obtained by plotting, at each frame, a likelihood of the current DOA candidate at each frequency.

FIG. 33D shows a flowchart for an implementation M20 of method M10 that includes tasks T100, T200 and T300. Such a method may be used, for example, to select a candidate direction of arrival of a source signal, based on information from a pair of channels of a multichannel signal, for each of a plurality F of frequency components of the multichannel signal. For each among the plurality F of frequency components, task T100 calculates a difference between the pair of channels. Task T100 may be implemented, for example, to perform a corresponding instance of task T10 (e.g., task T12 or T14) for each among the plurality F of frequency components.

For each among the plurality F of frequency components, task T200 calculates a plurality of directional errors. Task T200 may be implemented to calculate K directional errors for each frequency component. For example, task T200 may be implemented to perform a corresponding instance of task T20 for each among the plurality F of frequency components. Alternatively, task T200 may be implemented to calculate K directional errors for each among one or more of the frequency components, and to calculate a different number (e.g., more or less than K) directional errors for each among a different one or more among the frequency components.

For each among the plurality F of frequency components, task T300 selects a candidate direction. Task T300 may be implemented to perform a corresponding instance of task T30 for each among the plurality F of frequency components.

The energy spectrum of voiced speech (e.g., vowel sounds) tends to have local peaks at harmonics of the pitch frequency. The energy spectrum of background noise, on the other hand, tends to be relatively unstructured. Consequently, components of the input channels at harmonics of the pitch frequency may be expected to have a higher signal-to-noise ratio (SNR) than other components. It may be desirable to configure method M20 to consider only frequency components that correspond to multiples of an estimated pitch frequency.

Typical pitch frequencies range from about 70 to 100 Hz for a male speaker to about 150 to 200 Hz for a female speaker. The current pitch frequency may be estimated by calculating the pitch period as the distance between adjacent pitch peaks (e.g., in a primary microphone channel). A sample of an input channel may be identified as a pitch peak based on a measure of its energy (e.g., based on a ratio between sample energy and frame average energy) and/or a measure of how well a neighborhood of the sample is correlated with a similar neighborhood of a known pitch peak. A pitch estimation procedure is described, for example, in section 4.6.3 (pp. 4-44 to 4-49) of EVRC (Enhanced Variable Rate Codec) document C.S0014-C, available online at www.3gpp.org. A current estimate of the pitch frequency (e.g., in the form of an estimate of the pitch period or "pitch lag") will typically already be available in applications that include speech encoding and/or decoding (e.g., voice communications using codecs that include pitch estimation, such as code-excited linear prediction (CELP) and prototype waveform interpolation (PWI)).

It may be desirable, for example, to configure task T100 such that at least twenty-five, fifty or seventy-five percent of the calculated channel differences (e.g., phase differences) correspond to multiples of an estimated pitch frequency. The same principle may be applied to other desired harmonic signals as well. In a related method, task T100 is implemented to calculate phase differences for each of the frequency components of at least a subband of the channel pair, and task T200 is implemented to calculate directional errors based on only those phase differences which correspond to multiples of an estimated pitch frequency.

FIG. 34A shows a flowchart for an implementation M25 of method M20 that includes task T400. Such a method may be used, for example, to indicate a direction of arrival of a source signal, based on information from a pair of channels of a multichannel signal. Based on the F candidate direction selections produced by task T300, task T400 indicates a direction of arrival. For example, task T400 may be implemented to indicate the most frequently selected among the F candidate directions as the direction of arrival. For a case in which the source signals are disjoint in frequency, task T400 may be implemented to indicate more than one direction of arrival (e.g., to indicate a direction for each among more than one source). Method M25 may be iterated over time to indicate one or more directions of arrival for each of a sequence of frames of the multichannel signal.

A microphone pair having a large spacing is typically not suitable for high frequencies, because spatial aliasing begins at a low frequency for such a pair. A DOA estimation approach as described herein, however, allows the use of phase delay measurements beyond the frequency at which phase wrapping begins, and even up to the Nyquist frequency (i.e., half of the sampling rate). By relaxing the spatial aliasing constraint, such an approach enables the use of microphone pairs having larger inter-microphone spacing. As an array with a large inter-microphone distance typically provides better directivity at low frequencies than an array with a small inter-microphone distance, use of a larger array typically extends the range of useful phase delay measurements into lower frequencies as well.

The DOA estimation principles described herein may be extended to multiple microphone pairs MC10a, MC10b, MC10c in a linear array (e.g., as shown in FIG. 2B). One example of such an application for a far-field scenario is a linear array of microphones MC10a-e arranged along the margin of a television TV10 or other large-format video display screen (e.g., as shown in FIG. 4B). It may be desirable to configure such an array to have a non-uniform (e.g., logarithmic) spacing between microphones, as in the examples of FIGS. 2B and 4B.

For a far-field source, the multiple microphone pairs of a linear array will have essentially the same DOA. Accordingly, one option is to estimate the DOA as an average of the DOA estimates from two or more pairs in the array. However, an averaging scheme may be affected by mismatch of even a single one of the pairs, which may reduce DOA estimation accuracy. Alternatively, it may be desirable to select, from among two or more pairs of microphones of the array, the best microphone pair for each frequency (e.g., the pair that gives the minimum error $e_i$ at that frequency), such that different microphone pairs may be selected for different frequency bands. At the spatial aliasing frequency of a microphone pair, the error will be large. Consequently, such an approach will tend to automatically avoid a microphone pair when the frequency is close to its wrapping frequency, thus avoiding the related uncertainty in the DOA estimate. For higher-frequency bins, a pair having a shorter distance between the microphones will typically provide a better estimate and may be automatically favored, while for lower-frequency bins, a pair having a larger distance between the microphones will typically provide a better estimate and may be automatically favored. In the four-microphone example shown in FIG. 2B, six different pairs of microphones are possible $$\left(\text{i.e., } \binom{4}{2} = 6\right).$$

Figure 6A:
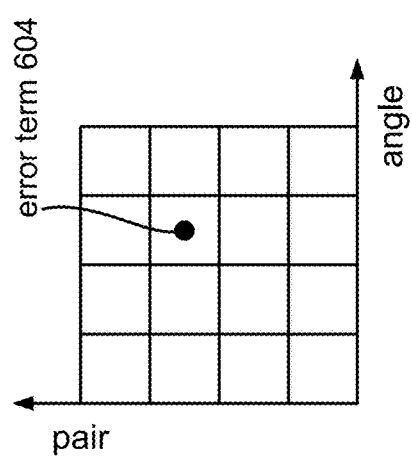
FIG. 6A shows an example of using calculated likelihoods to identify a best microphone pair and best DOA candidate for a given frequency.

In one example, the best pair for each axis is selected by calculating, for each frequency f, P×I values, where P is the number of pairs, I is the size of the inventory, and each value is the squared absolute difference between the observed angle $\theta_{pf}$ (for pair p and frequency f) and the candidate angle $\theta_{if}$. For each frequency f, the pair p that corresponds to the lowest error value $e_{pi}$ is selected. This error value also indicates the best DOA candidate $\theta_{if}$ at frequency f (as shown in FIG. 6A).

FIG. 34B shows a flowchart for an implementation M30 of method M10 that includes an implementation T150 of task T10 and an implementation T250 of task T20. Method M30 may be used, for example, to indicate a candidate direction for a frequency component of the multichannel signal (e.g., at a particular frame).

For each among a plurality P of pairs of channels of the multichannel signal, task T250 calculates a plurality of directional errors. Task T250 may be implemented to calculate K directional errors for each channel pair. For example, task T250 may be implemented to perform a corresponding instance of task T20 for each among the plurality P of channel pairs. Alternatively, task T250 may be implemented to calculate K directional errors for each among one or more of the channel pairs, and to calculate a different number (e.g., more or less than K) directional errors for each among a different one or more among the channel pairs.

Method M30 also includes a task T35 that selects a candidate direction, based on the pluralities of directional errors. For example, task T35 may be implemented to select the candidate direction that corresponds to the lowest among the directional errors.

FIG. 34C shows a flowchart for an implementation M100 of method M30 that includes an implementation T170 of tasks T100 and T150, an implementation T270 of tasks T200 and T250, and an implementation T350 of task T35. Method M100 may be used, for example, to select a candidate direction for each among a plurality F of frequency components of the multichannel signal (e.g., at a particular frame).

For each among the plurality F of frequency components, task T170 calculates a plurality P of differences, where each among the plurality P of differences corresponds to a different pair of channels of the multichannel signal and is a difference between the 21 channels (e.g., a gain-based or phase-based difference). For each among the plurality F of frequency components, task T270 calculates a plurality of directional errors for each among the plurality P of pairs. For example, task T270 may be implemented to calculate, for each of the frequency components, K directional errors for each of the P pairs, or a total of PxK directional errors for each frequency component. For each among the plurality F of frequency components, and based on the corresponding pluralities of directional errors, task T350 selects a corresponding candidate direction.

FIG. 35A shows a flowchart for an implementation M110 of method M100. The implementation M110 may include tasks T170, T270, T350 and T400 that may be examples of corresponding elements described in connection with at least one of FIG. 34A and FIG. 34C.

FIG. 35B shows a block diagram of an apparatus A5 according to a general configuration that includes an error calculator 200 and a selector 300. Error calculator 200 is configured to calculate, for a calculated difference between a pair of channels of a multichannel signal and for each among a plurality K of candidate directions, a corresponding directional error that is based on the calculated difference (e.g., as described herein with reference to implementations of task T20). Selector 300 is configured to select a candidate direction, based on the corresponding directional error (e.g., as described herein with reference to implementations of task T30).

FIG. 35C shows a block diagram of an implementation A10 of apparatus A5 that includes a difference calculator 100. Apparatus A10 may be implemented, for example, to perform an instance of method M10, M20, M30, and/or M100 as described herein. Calculator 100 is configured to calculate a difference (e.g., a gain-based or phase-based difference) between a pair of channels of a multichannel signal (e.g., as described herein with reference to implementations of task T10). Calculator 100 may be implemented, for example, to calculate such a difference for each among a plurality F of frequency components of the multichannel signal. In such case, calculator 100 may also be implemented to apply a subband filter bank to the signal and/or to calculate a frequency transform of each channel (e.g., a fast Fourier transform (FFT) or modified discrete cosine transform (MDCT)) before calculating the difference.

FIG. 35D shows a block diagram of an implementation A15 of apparatus A10 that includes an indicator 400. Indicator 400 is configured to indicate a direction of arrival, based on a plurality of candidate direction selections produced by selector 300 (e.g., as described herein with reference to implementations of task T400). Apparatus A15 may be implemented, for example, to perform an instance of method M25 and/or M110 as described herein.

Figure 36C:
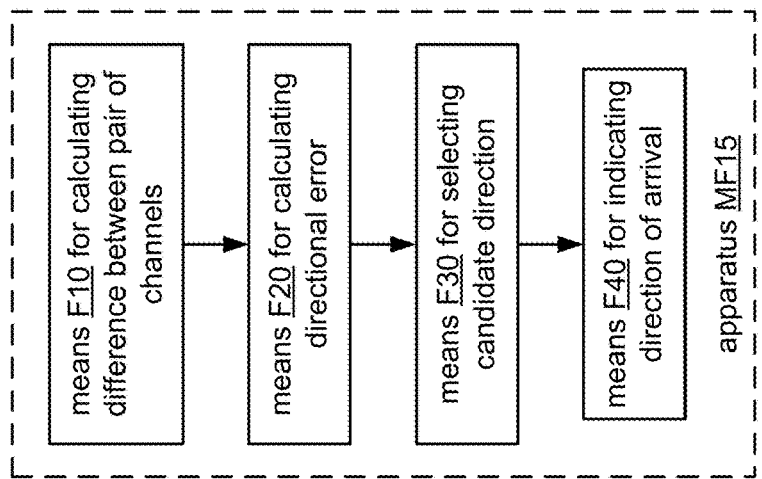
FIG. 36C shows a block diagram of an implementation MF15 of apparatus MF10.
Figure 36B:
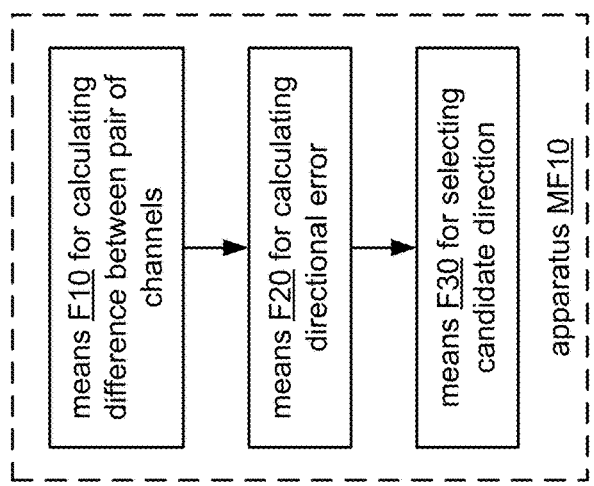
FIG. 36B shows a block diagram of an implementation MF10 of apparatus MF5.
Figure 36A:
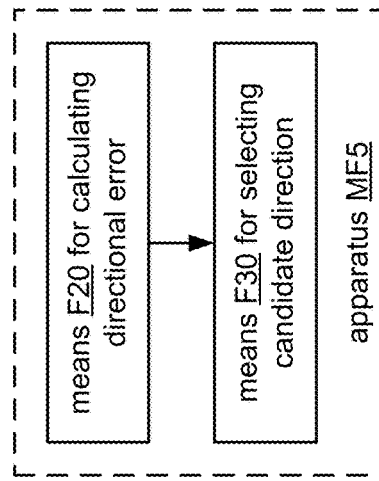
FIG. 36A shows a block diagram of an apparatus MF5 according to a general configuration.

FIG. 36A shows a block diagram of an apparatus MF5 according to a general configuration. Apparatus MF5 includes means F20 for calculating, for a calculated difference between a pair of channels of a multichannel signal and for each among a plurality K of candidate directions, a corresponding directional error or fitness measure that is based on the calculated difference (e.g., as described herein with reference to implementations of task T20). Apparatus MF5 also includes means F30 for selecting a candidate direction, based on the corresponding directional error (e.g., as described herein with reference to implementations of task T30).

FIG. 36B shows a block diagram of an implementation MF10 of apparatus MF5 that includes means F10 for calculating a difference (e.g., a gain-based or phase-based difference) between a pair of channels of a multichannel signal (e.g., as described herein with reference to implementations of task T10). Means F10 may be implemented, for example, to calculate such a difference for each among a plurality F of frequency components of the multichannel signal. In such case, means F10 may also be implemented to include means for performing a subband analysis and/or calculating a frequency transform of each channel (e.g., a fast Fourier transform (FFT) or modified discrete cosine transform (MDCT)) before calculating the difference. Apparatus MF10 may be implemented, for example, to perform an instance of method M10, M20, M30, and/or M100 as described herein.

FIG. 36C shows a block diagram of an implementation MF15 of apparatus MF10 that includes means F40 for indicating a direction of arrival, based on a plurality of candidate direction selections produced by means F30 (e.g., as described herein with reference to implementations of task T400). Apparatus MF15 may be implemented, for example, to perform an instance of method M25 and/or M110 as described herein.

The signals received by a microphone pair may be processed as described herein to provide an estimated DOA, over a range of up to 180 degrees, with respect to the axis of the microphone pair. The desired angular span and resolution may be arbitrary within that range (e.g. uniform (linear) or non-uniform (nonlinear), limited to selected sectors of interest, etc.). Additionally or alternatively, the desired frequency span and resolution may be arbitrary (e.g. linear, logarithmic, mel-scale, Bark-scale, etc.).

In the model as shown in FIG. 2B, each DOA estimate between 0 and +/−90 degrees from a microphone pair indicates an angle relative to a plane that is orthogonal to the axis of the pair. Such an estimate describes a cone around the axis of the pair, and the actual direction of the source along the surface of this cone is indeterminate. For example, a DOA estimate from a single microphone pair does not indicate whether the source is in front of or behind (or above or below) the microphone pair. Therefore, while more than two microphones may be used in a linear array to improve DOA estimation performance across a range of frequencies, the range of DOA estimation supported by a linear array is typically limited to 180 degrees.

The DOA estimation principles described herein may also be extended to a two-dimensional (2-D) array of microphones. For example, a 2-D array may be used to extend the range of source DOA estimation up to a full 360° (e.g., providing a similar range as in applications such as radar and biomedical scanning). Such an array may be used in a speakerphone application, for example, to support good performance even for arbitrary placement of the telephone relative to one or more sources.

The multiple microphone pairs of a 2-D array typically will not share the same DOA, even for a far-field point source. For example, source height relative to the plane of the array (e.g., in the z-axis) may play an important role in 2-D tracking. FIG. 10A shows an example of a speakerphone application in which the x-y plane as defined by the microphone axes is parallel to a surface (e.g., a tabletop) on which the telephone is placed. In this example, the source 1001 is a person speaking from a location that is along the x axis 1010 but is offset in the direction of the z axis 1014 (e.g., the speaker's mouth is above the tabletop). With respect to the x-y plane as defined by the microphone array, the direction of the source 1001 is along the x axis 1010, as shown in FIG. 10A. The microphone pair along the y axis 1012 estimates a DOA of the source as zero degrees from the x-z plane. Due to the height of the speaker above the x-y plane, however, the microphone pair along the x axis estimates a DOA of the source as 30° from the x axis 1010 (i.e., 60 degrees from the y-z plane), rather than along the x axis 1010. FIGS. 11A and 11B show two views of the cone of confusion CY10 associated with this DOA estimate, which causes an ambiguity in the estimated speaker direction with respect to the microphone axis. FIG. 37A shows another example of a point source 3720 (i.e., a speaker's mouth) that is elevated above a plane of the device H100 (e.g., a display plane and/or a plane defined by microphone array axes).

An expression such as $$\left[\tan^{-1}\left(\frac{\sin\theta_1}{\sin\theta_2}\right), \tan^{-1}\left(\frac{\sin\theta_2}{\sin\theta_1}\right)\right],$$

where $\theta_1$ and $\theta_2$ are the estimated DOA for pair 1 and 2, respectively, may be used to project all pairs of DOAs to a 360° range in the plane in which the three microphones are located. Such projection may be used to enable tracking directions of active speakers over a 360° range around the microphone array, regardless of height difference. Applying the expression above to project the DOA estimates (0°, 60°) of FIG. 10A into the x-y plane produces $$\left[\tan^{-1}\left(\frac{\sin 0°}{\sin 60°}\right), \tan^{-1}\left(\frac{\sin 60°}{\sin 0°}\right)\right] = (0°, 90°),$$

which may be mapped to a combined directional estimate 1022 (e.g., an azimuth) of 270° as shown in FIG. 10B.

Figure 12B:
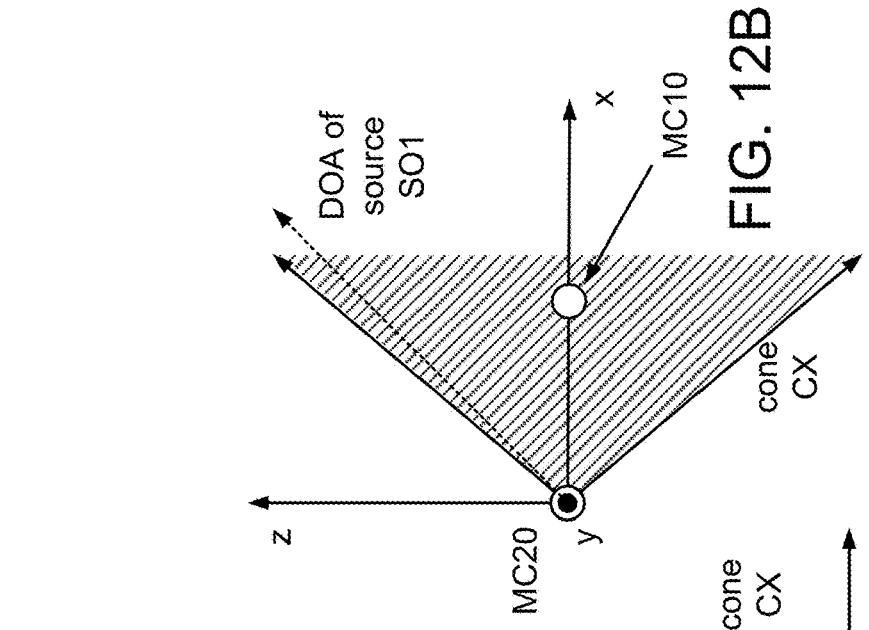
FIGS. 12A-12D show an example in which the source is located above the plane of the microphones.
Figure 12C:
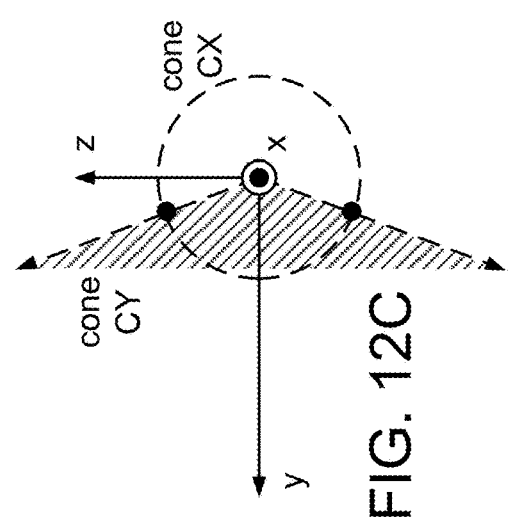
Figure 12D:
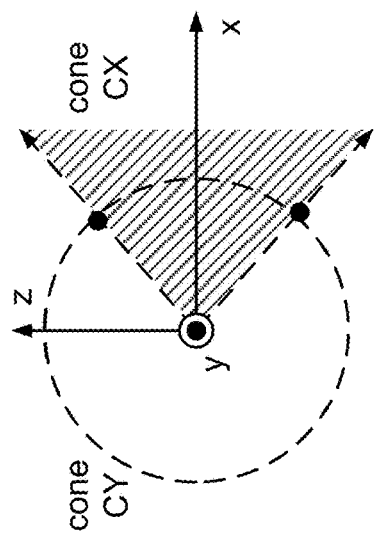
Figure 12A:
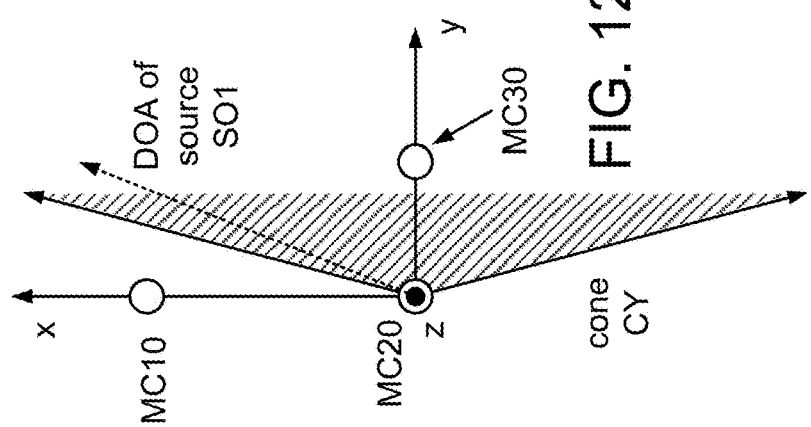

In a typical use case, the source will be located in a direction that is not projected onto a microphone axis. FIGS. 12A-12D show such an example in which the source S01 is located above the plane of the microphones MC10, MC20, MC30. In this example, the DOA of the source signal passes through the point (x, y, z)=(5, 2, 5), FIG. 12A shows the x-y plane as viewed from the +z direction. FIGS. 12B and 12D show the x-z plane as viewed from the direction of microphone MC30, and FIG. 12C shows the y-z plane as viewed from the direction of microphone MC10. The shaded area in FIG. 12A indicates the cone of confusion CY associated with the DOA $\theta_1$ as observed by the y-axis microphone pair MC20-MC30, and the shaded area in FIG. 12B indicates the cone of confusion CX associated with the DOA S01, $\theta_2$ as observed by the x-axis microphone pair MC10-MC20. In FIG. 12C, the shaded area indicates cone CY, and the dashed circle indicates the intersection of cone CX with a plane that passes through the source and is orthogonal to the x axis. The two dots on this circle that indicate its intersection with cone CY are the candidate locations of the source. Likewise, in FIG. 12D the shaded area indicates cone CX, the dashed circle indicates the intersection of cone CY with a plane that passes through the source and is orthogonal to the y axis, and the two dots on this circle that indicate its intersection with cone CX are the candidate locations of the source. It may be seen that in this 2-D case, an ambiguity remains with respect to whether the source is above or below the x-y plane.

For the example shown in FIGS. 12A-12D, the DOA observed by the x-axis microphone pair MC10-MC20 is $\theta_2 = \tan^{-1}(-5/\sqrt{25+4}) \approx -42.9°$, and the DOA observed by the y-axis microphone pair MC20-MC30 is $\theta_1 = \tan^{-1}(-2/\sqrt{25+25}) \approx -15.89°$. Using the expression $$\left[\tan^{-1}\left(\frac{\sin\theta_1}{\sin\theta_2}\right), \tan^{-1}\left(\frac{\sin\theta_2}{\sin\theta_1}\right)\right]$$

to project these directions into the x-y plane produces the magnitudes (21.8°, 68.2°) of the desired angles relative to the x and y axes, respectively, which corresponds to the given source location (x, y, z)=(5, 2, 5). The signs of the observed angles indicate the x-y quadrant in which the source (e.g., as indicated by the microphones MC10, MC20 and MC30) is located, as shown in FIG. 11C.

In fact, almost 3D information is given by a 2D microphone array, except for the up-down confusion. For example, the directions of arrival observed by microphone pairs MC10-MC20 and MC20-MC30 may also be used to estimate the magnitude of the angle of elevation of the source relative to the x-y plane. If d denotes the vector from microphone MC20 to the source, then the lengths of the projections of vector d onto the x-axis, the y-axis, and the x-y plane may be expressed as d $\sin(\theta_2)$, d $\sin(\theta_1)$ and d $\sqrt{\sin^2(\theta_1)+\sin^2(\theta_2)}$, respectively. The magnitude of the angle of elevation may then be estimated as $\hat{\theta}_h = \cos^{-1}\sqrt{\sin^2(\theta_1)+\sin^2(\theta_2)}$.

Although the microphone pairs in the particular examples of FIGS. 10A-10B and 12A-12D have orthogonal axes, it is noted that for microphone pairs having non-orthogonal axes, the expression $$\left[\tan^{-1}\left(\frac{\sin\theta_1}{\sin\theta_2}\right), \tan^{-1}\left(\frac{\sin\theta_2}{\sin\theta_1}\right)\right]$$

may be used to project the DOA estimates to those non-orthogonal axes, and from that point it is straightforward to obtain a representation of the combined directional estimate with respect to orthogonal axes. FIG. 37B shows an example of the intersecting cones of confusion C1, C2 associated with the responses of microphone arrays having non-orthogonal axes (as shown) to a common point source. FIG. 37C shows one of the lines of intersection L1 of these cones C1, C2, which defines one of two possible directions of the point source with respect to the array axes in three dimensions.

Figure 13C:
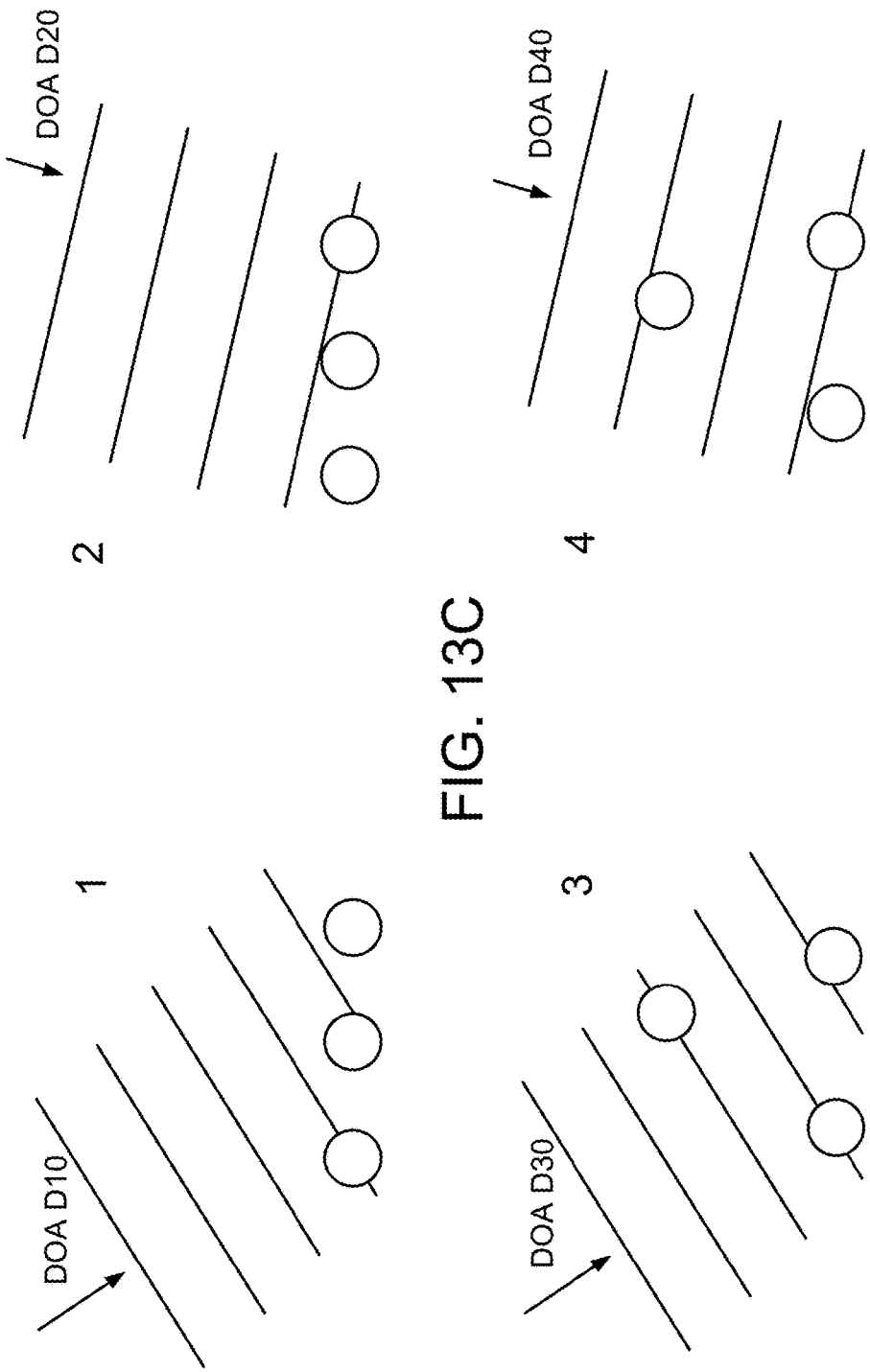
FIG. 13C illustrates a relation between arrival of parallel wavefronts at microphones of different arrays for examples of two different DOAs.

FIG. 13A shows an example of microphone array MC10, MC20, MC30 in which the axis 1 of pair MC20, MC30 lies in the x-y plane and is skewed relative to the y axis by a skew angle $\theta_0$. FIG. 13B shows an example of obtaining a combined directional estimate in the x-y plane with respect to orthogonal axes x and y with observations ($\theta_1$, $\theta_2$) from an array of microphones MC10, MC20, MC30 as shown in FIG. 13A. If d denotes the vector from microphone MC20 to the source, then the lengths of the projections of vector d onto the x-axis and axis 1 may be expressed as d sin($\theta_2$), d sin($\theta_1$), respectively. The vector (x, y) denotes the projection of vector d onto the x-y plane. The estimated value of x is known, and it remains to estimate the value of y.

The estimation of y may be performed using the projection $p_1$=(d sin $\theta_1$ sin $\theta_0$, d sin $\theta_1$ cos $\theta_0$) of vector (x, y) onto axis 1. Observing that the difference between vector (x, y) and vector $p_1$ is orthogonal to $p_1$, we calculate y as $$y = d\frac{\sin\theta_1 - \sin\theta_2\sin\theta_0}{\cos\theta_0}.$$

The desired angles of arrival in the x-y plane, relative to the orthogonal x and y axes, may then be expressed respectively as $$\left(\tan^{-1}\left(\frac{y}{x}\right), \tan^{-1}\left(\frac{x}{y}\right)\right) = \left(\tan^{-1}\left(\frac{\sin\theta_1 - \sin\theta_2\sin\theta_0}{\sin\theta_2\cos\theta_2}\right), \tan^{-1}\left(\frac{\sin\theta_2\cos\theta_0}{\sin\theta_1 - \sin\theta_2\sin\theta_0}\right)\right).$$

Extension of DOA estimation to a 2-D array is typically well-suited to and sufficient for a speakerphone application. However, further extension to an N-dimensional array is also possible and may be performed in a straightforward manner. For tracking applications in which one target is dominant, it may be desirable to select N pairs for representing N dimensions. Once a 2-D result is obtained with a particular microphone pair, another available pair can be utilized to increase degrees of freedom. For example, FIGS. 12A-12D and 13A, 13B illustrate use of observed DOA estimates from different microphone pairs in the x-y plane to obtain an estimate of the source direction as projected into the x-y plane. In the same manner, observed DOA estimates from an x-axis microphone pair and a z-axis microphone pair (or other pairs in the x-z plane) may be used to obtain an estimate of the source direction as projected into the x-z plane, and likewise for the y-z plane or any other plane that intersects three or more of the microphones.

Estimates of DOA error from different dimensions may be used to obtain a combined likelihood estimate, for example, using an expression such as $$\frac{1}{\max(|\theta - \theta_{0,1}|^2_{f,1'}, |\theta - \theta_{0,2}|^2_{f,2}) + \lambda} \text{ or}$$

$$\frac{1}{\mathrm{mean}(|\theta - \theta_{0,1}|^2_{f,1'}, |\theta - \theta_{0,2}|^2_{f,2}) + \lambda}1,$$

where $\theta_{0,i}$ denotes the DOA candidate selected for pair i. Use of the maximum among the different errors may be desirable to promote selection of an estimate that is close to the cones of confusion of both observations, in preference to an estimate that is close to only one of the cones of confusion and may thus indicate a false peak. Such a combined result may be used to obtain a (frame, angle) plane, as shown in FIG. 8 and described herein, and/or a (frame, frequency) plot, as shown at the bottom of FIG. 9 and described herein.

The DOA estimation principles described herein may be used to support selection among multiple speakers. For example, location of multiple sources may be combined with a manual selection of a particular speaker (e.g., push a particular button to select a particular corresponding user) or automatic selection of a particular speaker (e.g., by speaker recognition). In one such application, a telephone is configured to recognize the voice of its owner and to automatically select a direction corresponding to that voice in preference to the directions of other sources.

For a one-dimensional (1-D) array of microphones, a direction of arrival DOA10 for a source may be easily defined in a range of, for example, −90° to 90°. For example, it is easy to obtain a closed-form solution for the direction of arrival DOA10 across a range of angles (e.g., as shown in cases 1 and 2 of FIG. 13C) in terms of phase differences among the signals produced by the various microphones of the array.

For an array that includes more than two microphones at arbitrary relative locations (e.g., a non-coaxial array), it may be desirable to use a straightforward extension of one-dimensional principles as described above, e.g. ($\theta1$, $\theta2$) in a two-pair case in two dimensions, ($\theta1$, $\theta2$, $\theta3$) in a three-pair case in three dimensions, etc. A key problem is how to apply spatial filtering to such a combination of paired 1-D direction of arrival DOA10 estimates. For example, it may be difficult or impractical to obtain a closed-form solution for the direction of arrival DOA10 across a range of angles for a non-coaxial array (e.g., as shown in cases 3 and 4 of FIG. 13C) in terms of phase differences among the signals produced by the various microphones of the array.

FIG. 14A shows an example of a straightforward one-dimensional (1-D) pairwise beamforming-nullforming (BFNF) BF10 configuration for spatially selective filtering that is based on robust 1-D DOA estimation. In this example, the notation $d_{i,j}{}^k$ denotes microphone pair number i, microphone number j within the pair, and source number k, such that each pair $[d_{i,1}{}^k d_{i,2}{}^k]^T$ represents a steering vector for the respective source and microphone pair (the ellipse indicates the steering vector for source 1 and microphone pair 1), and λ denotes a regularization factor. The number of sources is not greater than the number of microphone pairs. Such a configuration avoids a need to use all of the microphones at once to define a DOA.

We may apply a beamformer/null beamformer (BFNF) BF10 as shown in FIG. 14A by augmenting the steering vector for each pair. In this figure, $A^H$ denotes the conjugate transpose of A, x denotes the microphone channels and y denotes the spatially filtered channels. Using a pseudo-inverse operation $A^+=(A^HA)^{-1}A^H$ as shown in FIG. 14A allows the use of a non-square matrix. For a three-microphone MC10, MC20, MC30 case (i.e., two microphone pairs) as illustrated in FIG. 15A, for example, the number of rows 2*2=4 instead of 3, such that the additional row makes the matrix non-square.

As the approach shown in FIG. 14A is based on robust 1-D DOA estimation, complete knowledge of the microphone geometry is not required, and DOA estimation using all microphones at the same time is also not required. Such an approach is well-suited for use with anglogram-based DOA estimation as described herein, although any other 1-D DOA estimation method can also be used. FIG. 14B shows an example of the BFNF BF10 as shown in FIG. 14A which also includes a normalization N10 (i.e., by the denominator) to prevent an ill-conditioned inversion at the spatial aliasing frequency (i.e., the wavelength that is twice the distance between the microphones).

Figures 15A, 15B:
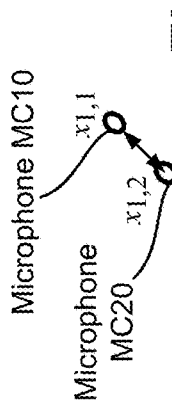
FIG. 15A shows a two-pair microphone array.
FIG. 15B shows an example of a pair-wise normalized minimum variance distortionless response (MVDR) BFNF.

FIG. 15B shows an example of a pair-wise (PW) normalized MVDR (minimum variance distortionless response) BFNF BF10, in which the manner in which the steering vector (array manifold vector) is obtained differs from the conventional approach. In this case, a common channel is eliminated due to sharing of a microphone between the two pairs (e.g., the microphone labeled as $x_{1,2}$ and $x_{2,1}$ in FIG. 15A). The noise coherence matrix $\Gamma$ may be obtained either by measurement or by theoretical calculation using a sinc function. It is noted that the examples of FIGS. 14A, 14B, and 15B may be generalized to an arbitrary number of sources N such that N<=M, where M is the number of microphones.

FIG. 16A shows another example of a BFNF BF10 that may be used if the matrix $A^H A$ is not ill-conditioned, which may be determined using a condition number or determinant of the matrix. In this example, the notation is as in FIG. 14A, and the number of sources N is not greater than the number of microphone pairs M. If the matrix is ill-conditioned, it may be desirable to bypass one microphone signal for that frequency bin for use as the source channel, while continuing to apply the method to spatially filter other frequency bins in which the matrix $A^H A$ is not ill-conditioned. This option saves computation for calculating a denominator for normalization. The methods in FIGS. 14A-16A demonstrate BFNF BF10 techniques that may be applied independently at each frequency bin. The steering vectors are constructed using the DOA estimates for each frequency and microphone pair as described herein. For example, each element of the steering vector for pair p and source n for DOA $\theta_i$, frequency f, and microphone number m (1 or 2) may be calculated as $$d_{p,m}^n = \exp\left(\frac{-j\omega f_s (m-1) l_p}{c} \cos\theta_i\right),$$

where $l_p$ indicates the distance between the microphones of pair p, $\omega$ indicates the frequency bin number, and $f_s$ indicates the sampling frequency. FIG. 16B shows examples of steering vectors SV10a-b for an array as shown in FIG. 15A.

A PWBFNF scheme may be used for suppressing direct path of interferers up to the available degrees of freedom (instantaneous suppression without smooth trajectory assumption, additional noise-suppression gain using directional masking, additional noise-suppression gain using bandwidth extension). Single-channel post-processing of quadrant framework may be used for stationary noise and noise-reference handling.

Figure 21B:
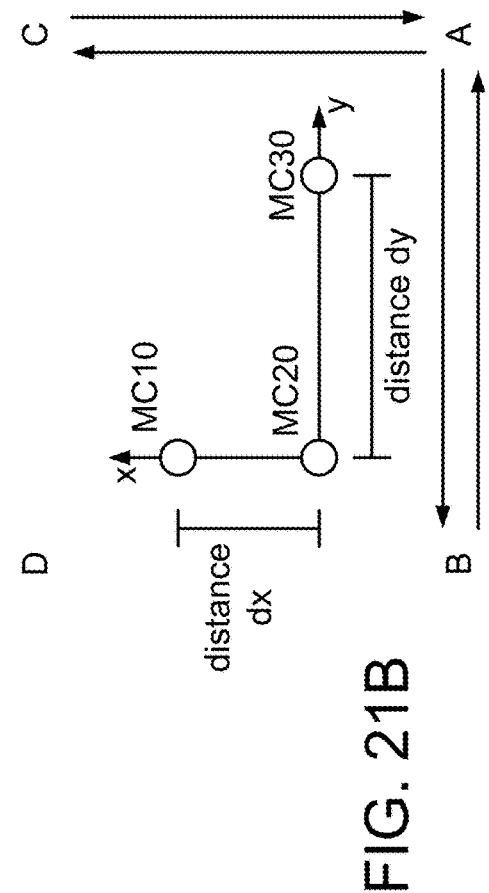
Figure 22:
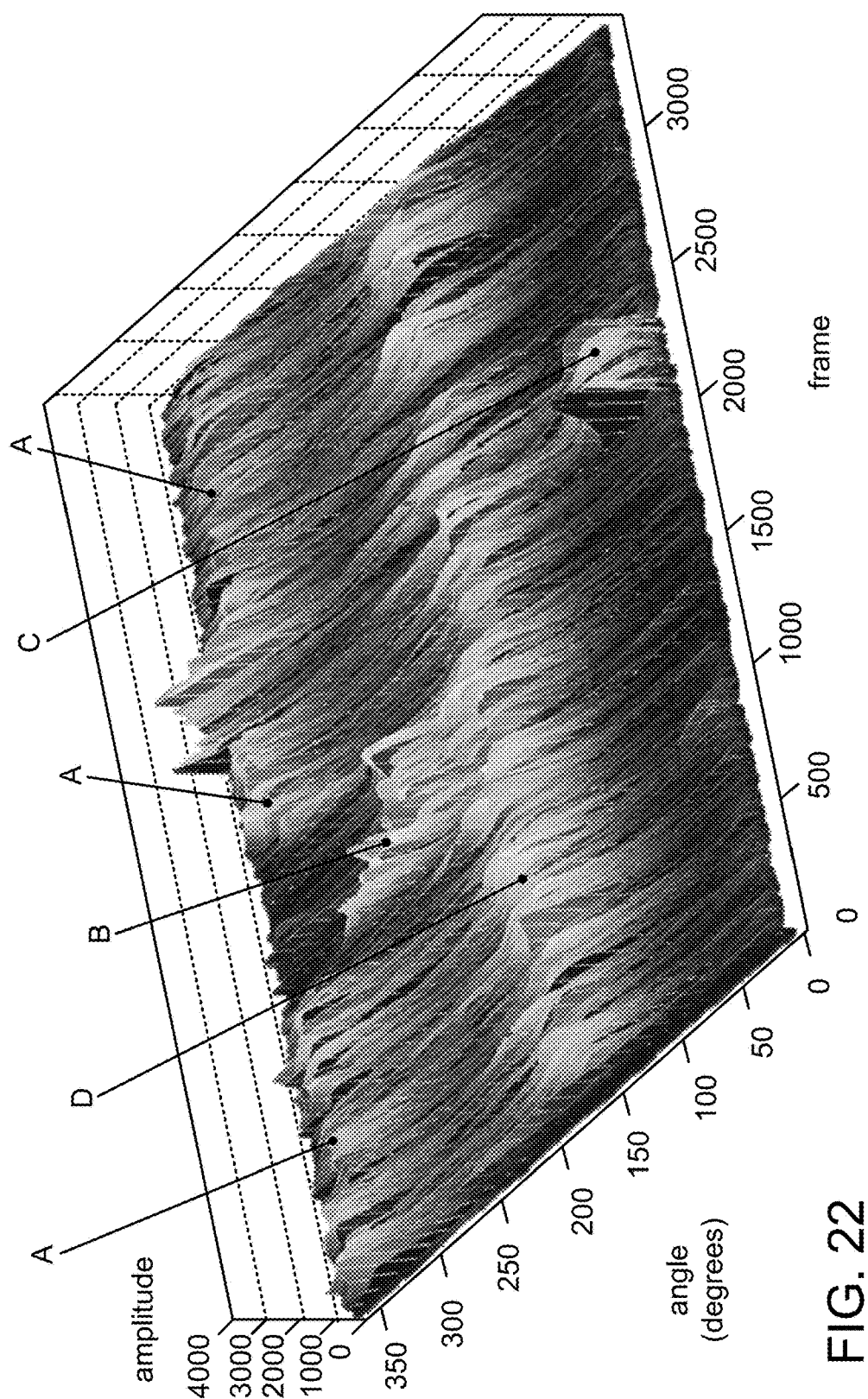
Figure 31:
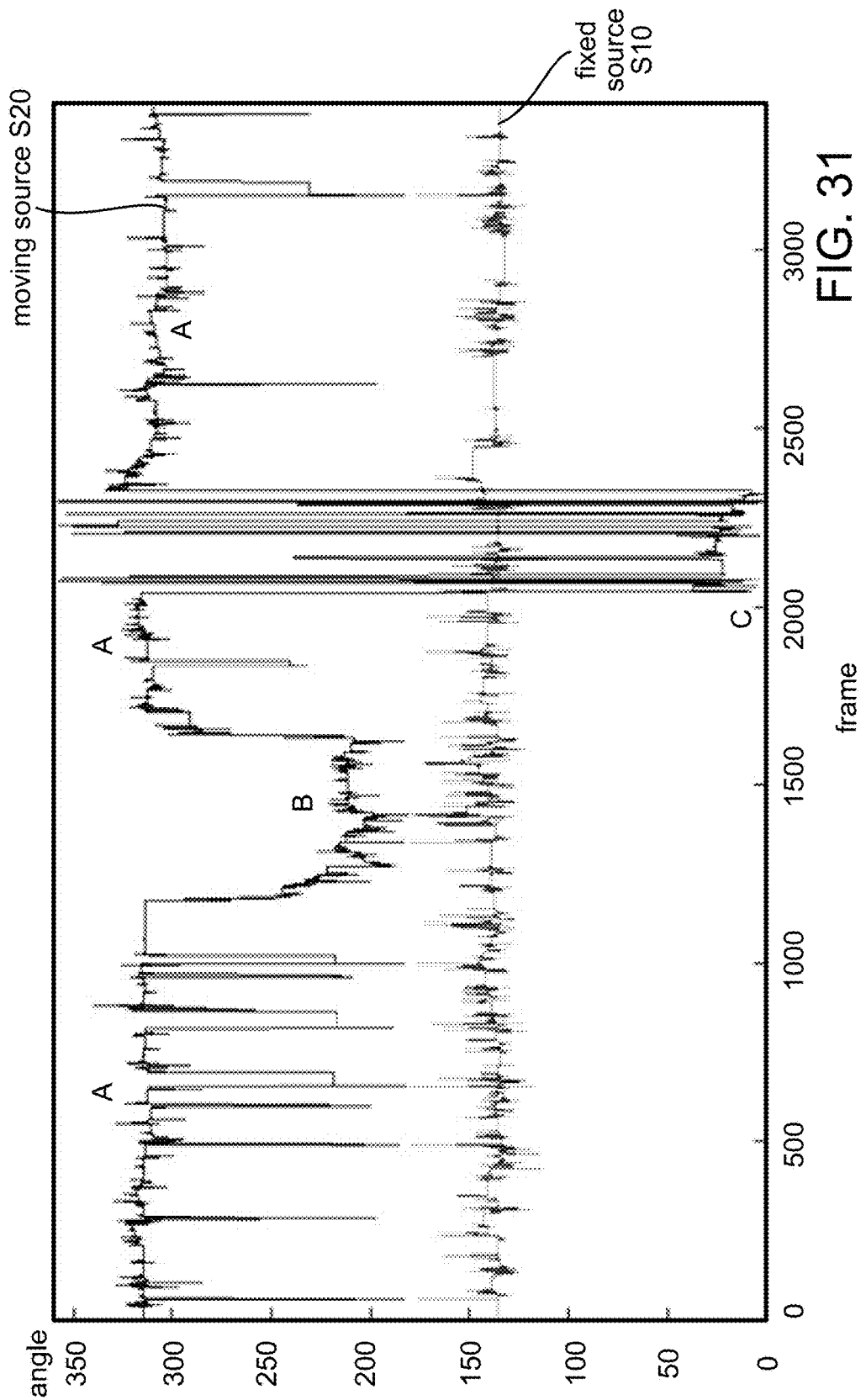

It may be desirable to obtain instantaneous suppression but also to provide minimization of artifacts such as musical noise. It may be desirable to maximally use the available degrees of freedom for BFNF. One DOA may be fixed across all frequencies, or a slightly mismatched alignment across frequencies may be permitted. Only the current frame may be used, or a feed-forward network may be implemented. The BFNF may be set for all frequencies in the range up to the Nyquist rate (e.g., except ill-conditioned frequencies). A natural masking approach may be used (e.g., to obtain a smooth natural seamless transition of aggressiveness). FIG. 31 shows an example of DOA tracking for a target and a moving interferer for a scenario as shown in FIGS. 21B and 22. In FIG. 31 a fixed source S10 at D is indicated, and a moving source S20 is also indicated.

Figure 17:
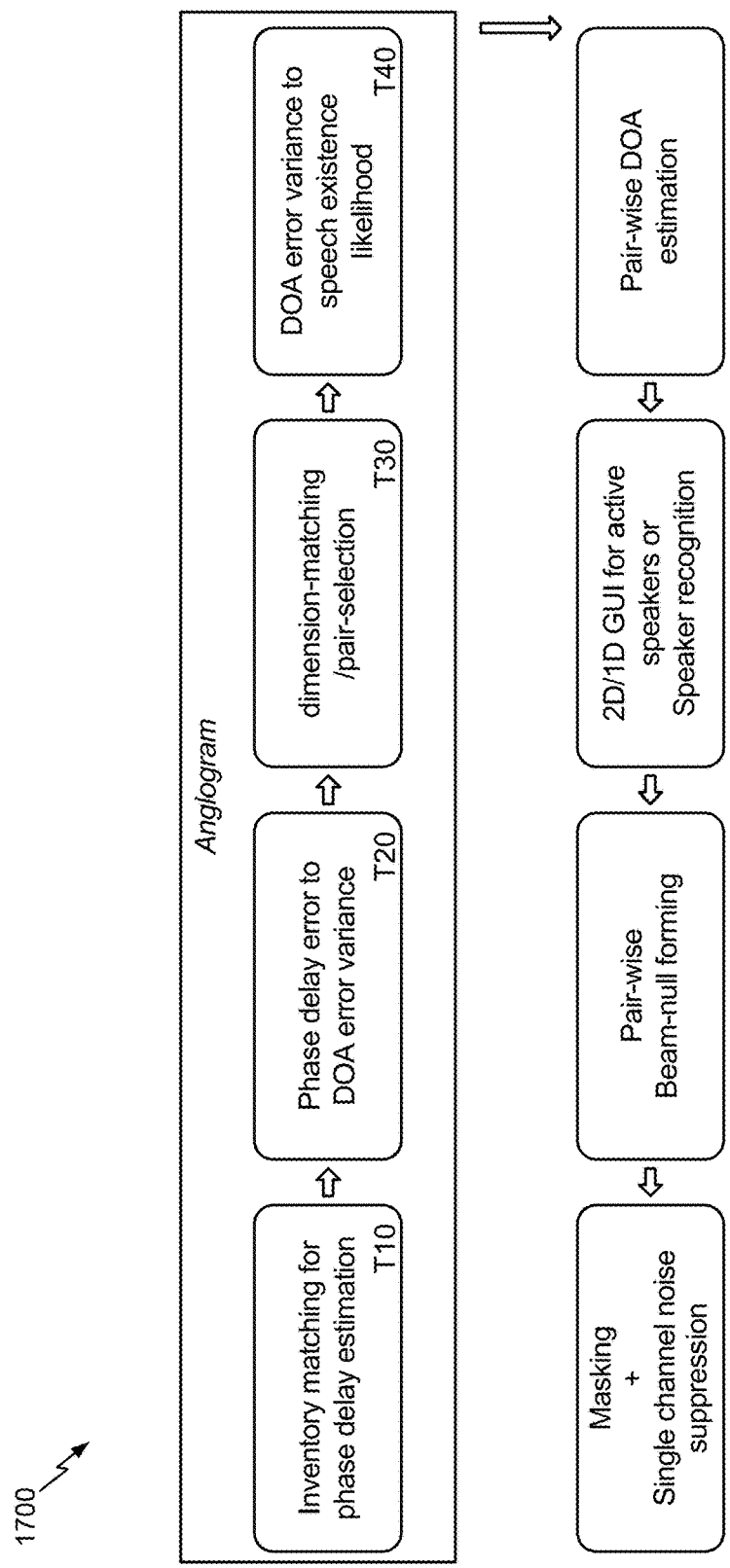
FIG. 17 shows a flowchart of one example of an integrated method of source direction estimation as described herein.
Figure 18:
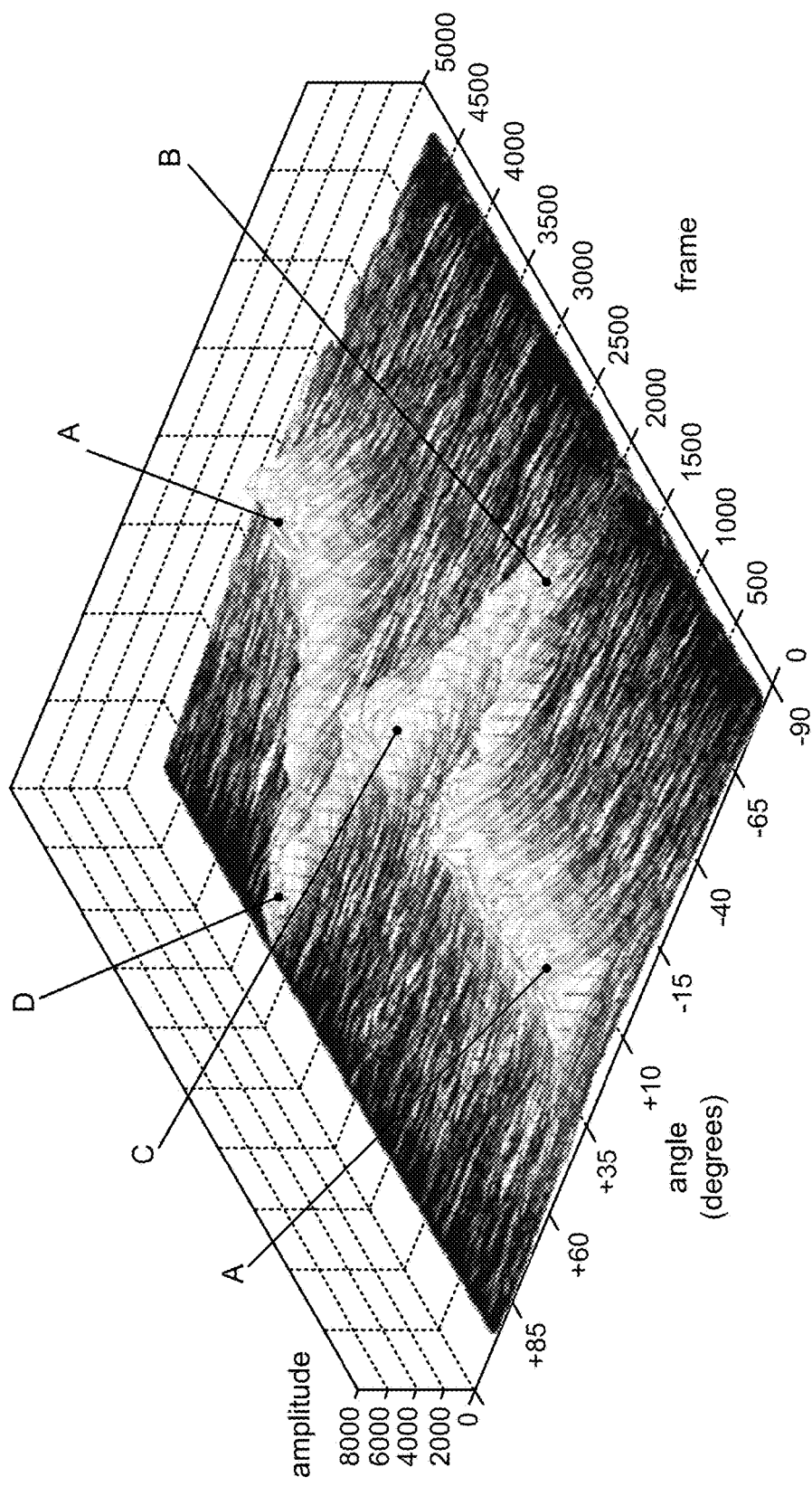
FIGS. 18-31 show examples of practical results of DOA estimation, source discrimination, and source tracking as described herein.
Figure 19:
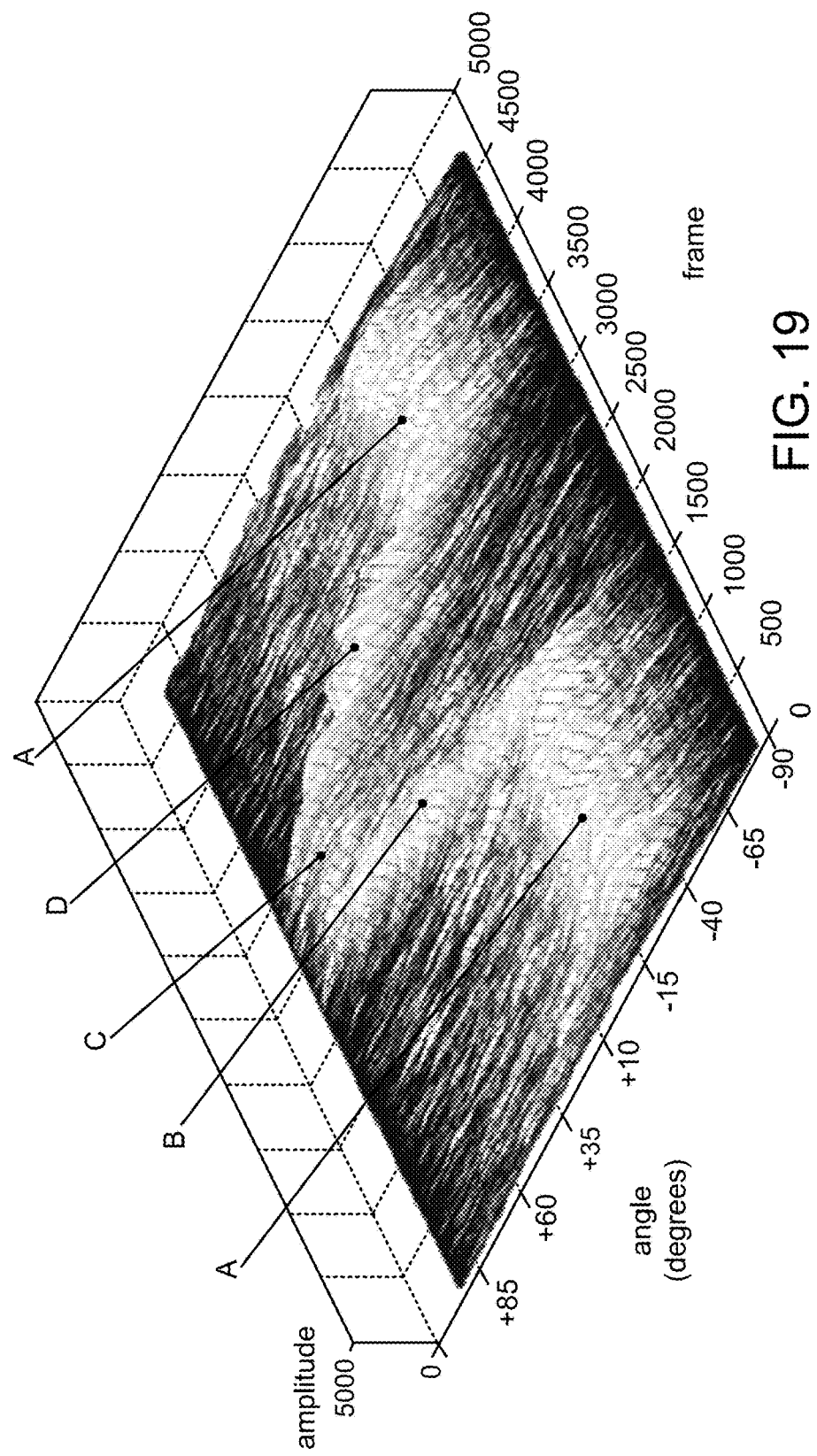
Figure 21A:
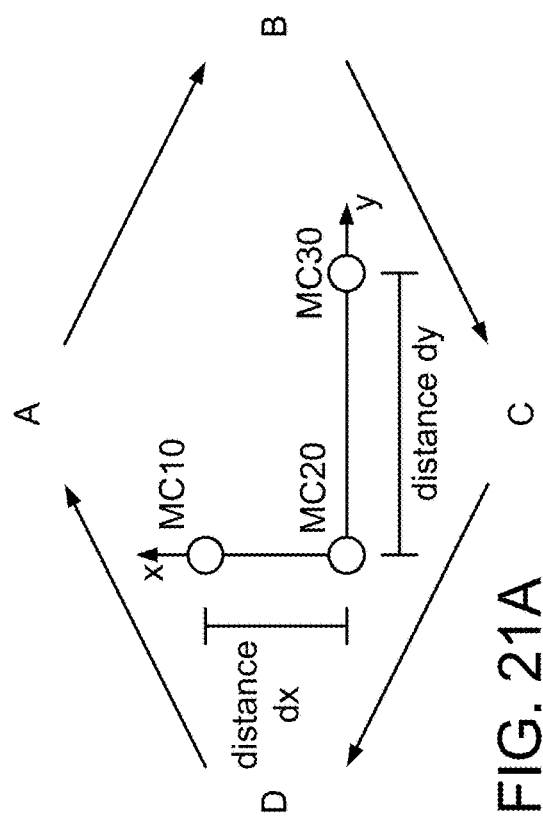

FIG. 17 shows a flowchart for one example of an integrated method 1700 as described herein. This method includes an inventory matching task T10 for phase delay estimation, an error calculation task T20 to obtain DOA error values, a dimension-matching and/or pair-selection task T30, and a task T40 to map DOA error for the selected DOA candidate to a source activity likelihood estimate. The pair-wise DOA estimation results may also be used to track one or more active speakers, to perform a pair-wise spatial filtering operation, and/or to perform time- and/or frequency-selective masking. The activity likelihood estimation and/or spatial filtering operation may also be used to obtain a noise estimate to support a single-channel noise suppression operation. FIGS. 18 and 19 show an example of observations obtained using a 2-D microphone arrangement to track movement of a source (e.g., a human speaker) among directions A-B-C-D as shown in FIG. 21A. As depicted in FIG. 21A three microphones MC10, MC20, MC30 may be used to record an audio signal. In this example, FIG. 18 shows observations A-D by the y-axis pair MC20-MC30, where distance dx is 3.6 centimeters; FIG. 19 shows observations A-D by the x-axis pair MC10-MC20, where distance dy is 7.3 centimeters; and the inventory of DOA estimates covers the range of −90 degrees to +90 degrees at a resolution of five degrees.

It may be understood that when the source is in an endfire direction of a microphone pair, elevation of a source above or below the plane of the microphones limits the observed angle. Consequently, when the source is outside the plane of the microphones, it is typical that no real endfire is observed. It may be seen in FIGS. 18 and 19 that due to elevation of the source with respect to the microphone plane, the observed directions do not reach −90 degrees even as the source passes through the corresponding endfire direction (i.e., direction A for the x-axis pair MC10-MC20, and direction B for the y-axis pair MC20-MC30).

Figure 20:
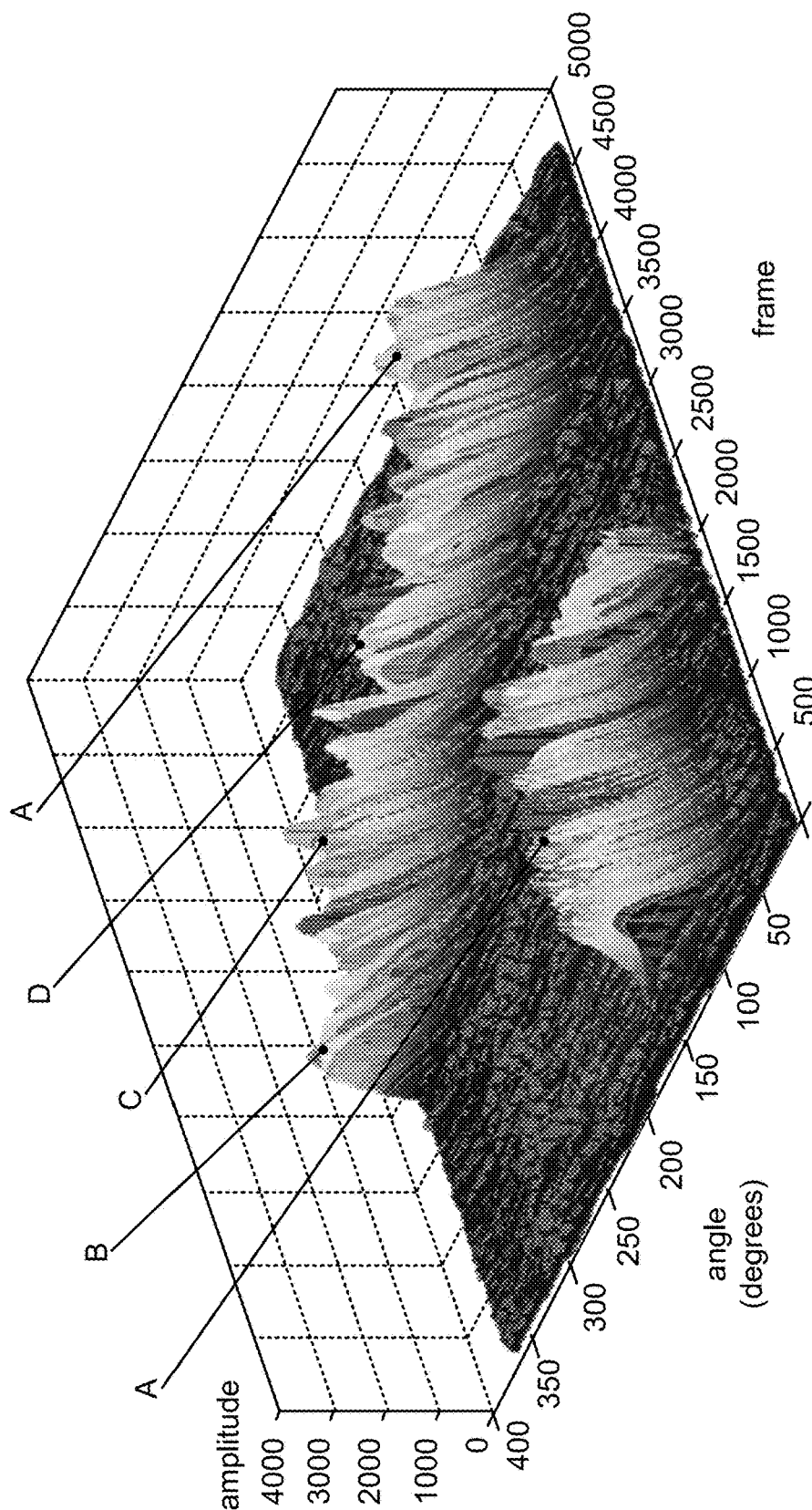

FIG. 20 shows an example in which +/−90-degree observations A-D from orthogonal axes, as shown in FIGS. 18 and 19 for a scenario as shown in FIG. 21A, are combined to produce DOA estimates in the microphone plane over a range of zero to 360 degrees. In this example, a one-degree resolution is used. FIG. 22 shows an example of combined observations A-D using a 2-D microphone arrangement, where distance dx is 3.6 centimeters and distance dy is 7.3 centimeters, to track movement, by microphones MC10, MC20, MC30 of a source (e.g., a human speaker) among directions A-B-C as shown in FIG. 21B in the presence of another source (e.g., a stationary human speaker) at direction D.

As described above, a DOA estimate may be calculated based on a sum of likelihoods. When combining observations from different microphone axes (e.g., as shown in FIG. 20), it may be desirable to perform the combination for each individual frequency bin before calculating a sum of likelihoods, especially if more than one directional source may be present (e.g., two speakers, or a speaker and an interferer). Assuming that no more than one of the sources is dominant at each frequency bin, calculating a combined observation for each frequency component preserves the distinction between dominance of different sources at different corresponding frequencies. If a summation over frequency bins dominated by different sources is performed on the observations before they are combined, then this distinction may be lost, and the combined observations may indicate spurious peaks at directions which do not correspond to the location of any actual source. For example, summing observations from orthogonal microphone pairs of a first source at 45 degrees and a second source at 225 degrees, and then combining the summed observations, may produce spurious peaks at 135 and 315 degrees in addition to the desired peaks at 45 and 225 degrees.

Figure 23:
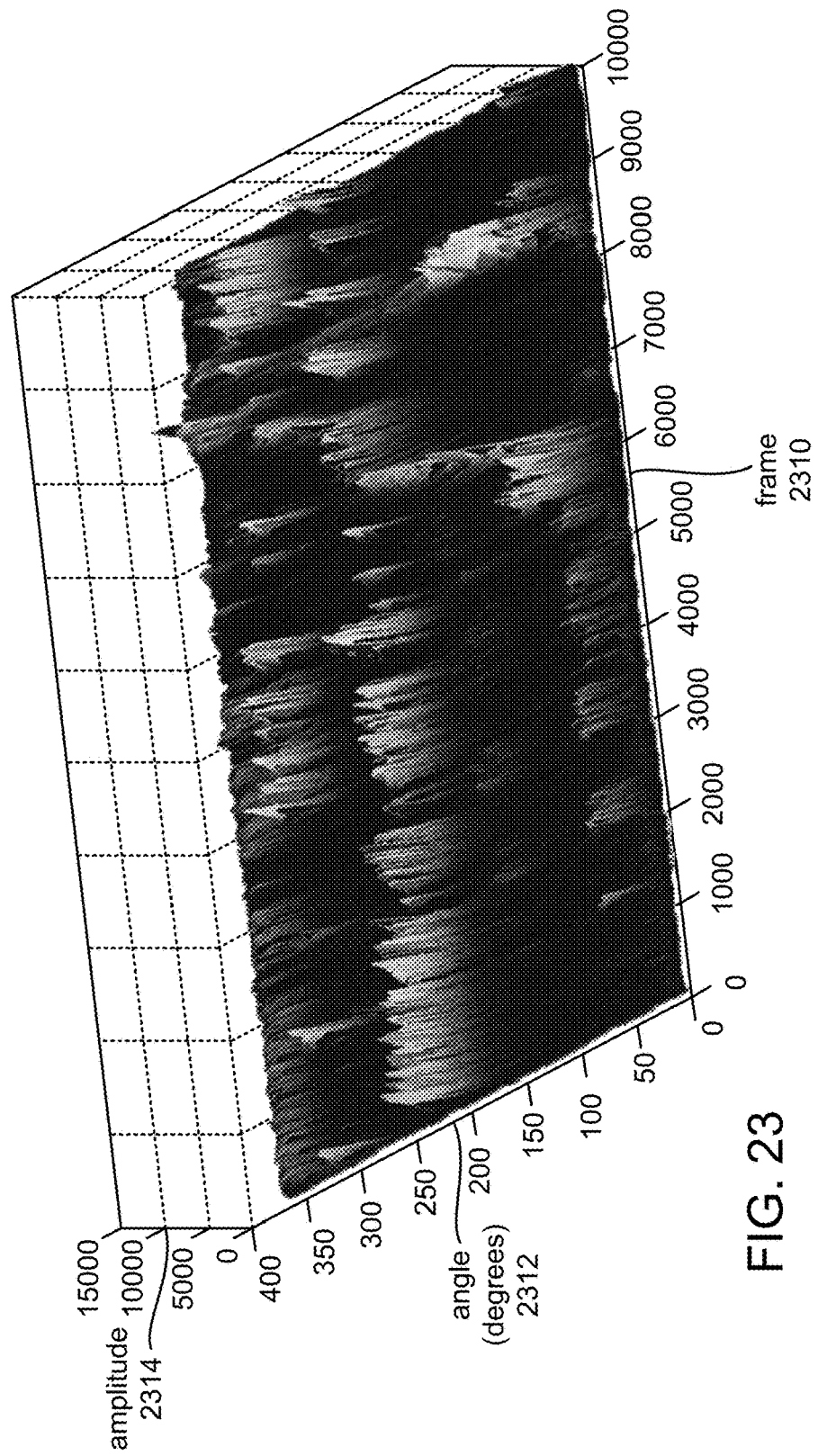
Figure 24:
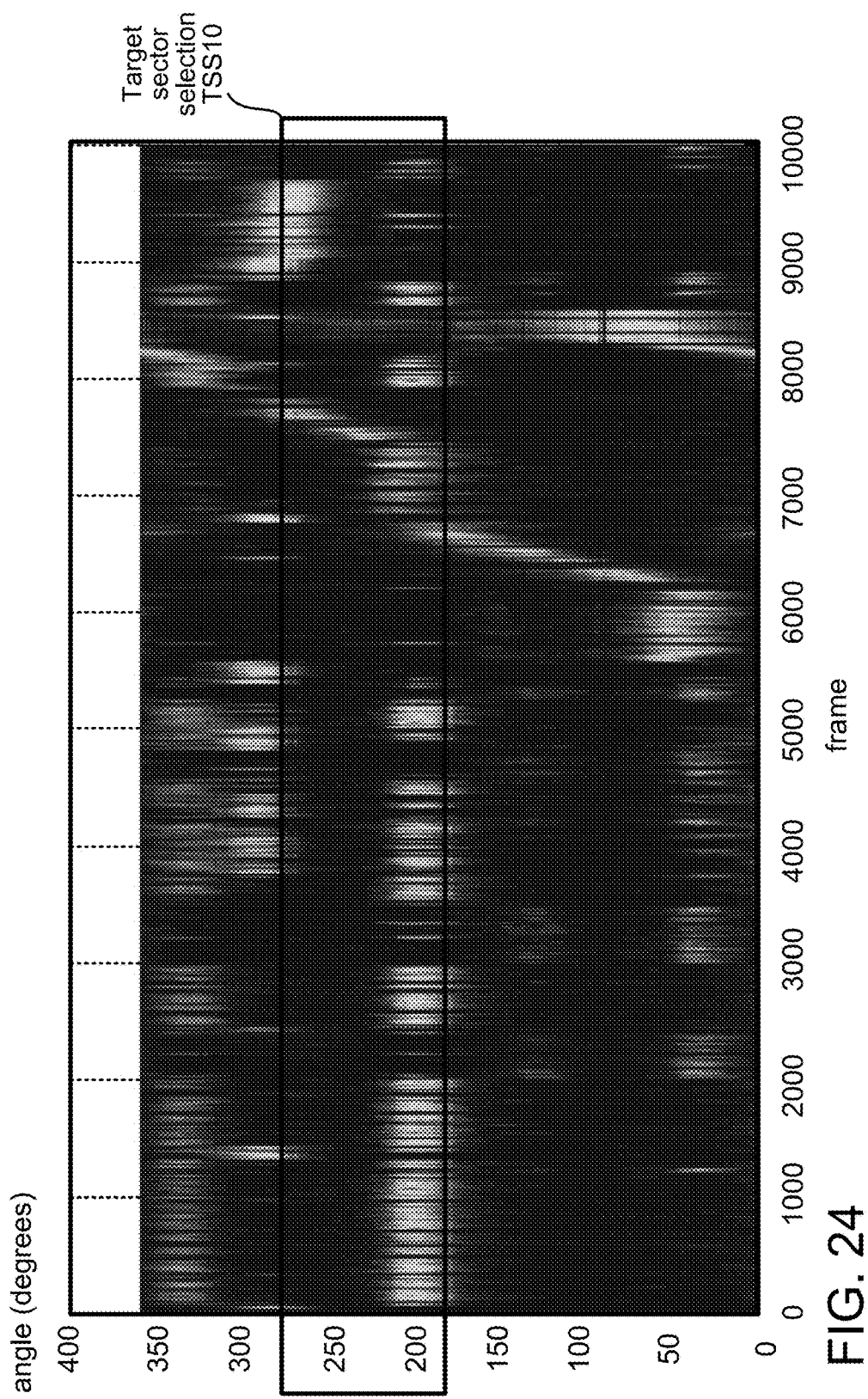
Figure 25:
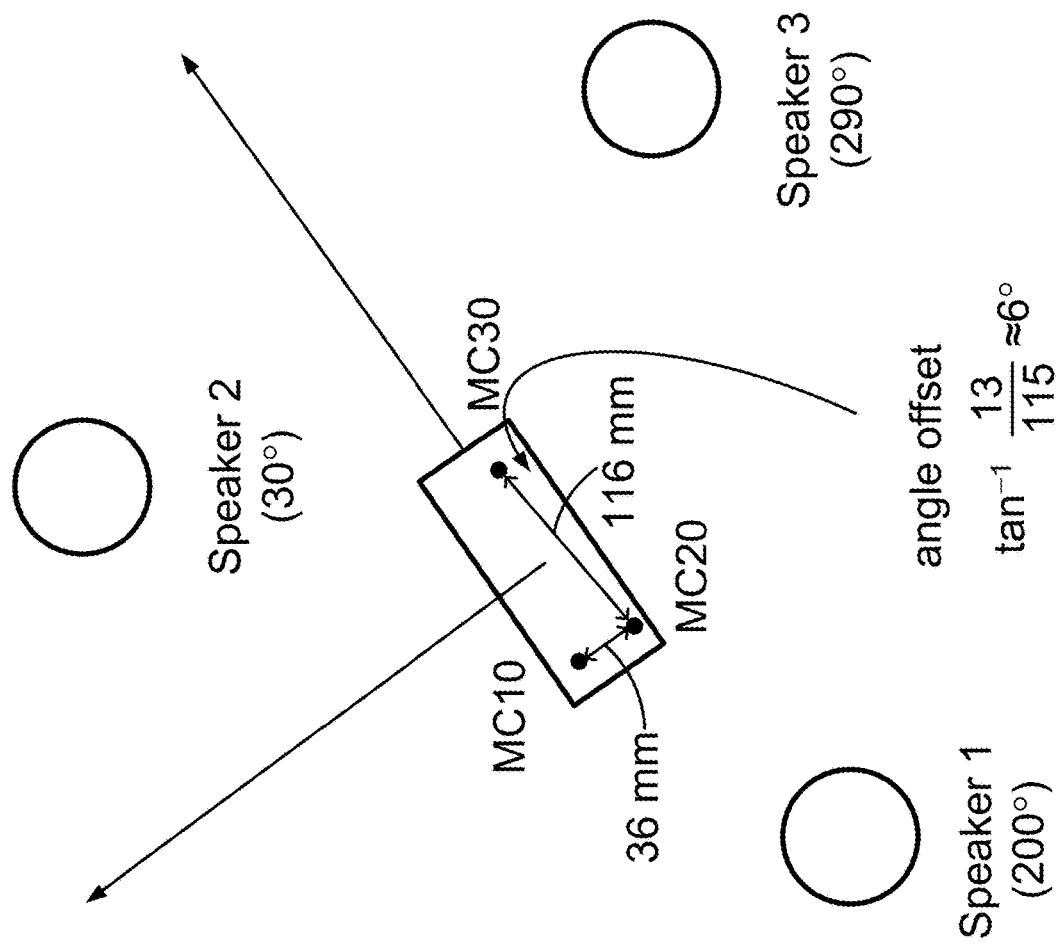

FIGS. 23 and 24 show an example of combined observations for a conference call scenario, as shown in FIG. 25, in which the phone is stationary on a table top. In FIG. 25 a device may include three microphones MC10, MC20, MC30. In FIG. 23, the frame number 2310, an angle of arrival 2312 and an amplitude 2314 of a signal are illustrated. At about frame 5500, speaker 1 stands up, and movement of speaker 1 is evident to about frame 9000. Movement of speaker 3 near frame 9500 is also visible. The rectangle in FIG. 24 indicates a target sector selection TSS10, such that frequency components arriving from directions outside this sector may be rejected or otherwise attenuated, or otherwise processed differently from frequency components arriving from directions within the selected sector. In this example, the target sector is the quadrant of 180-270 degrees and is selected by the user from among the four quadrants of the microphone plane. This example also includes acoustic interference from an air conditioning system.

Figure 26:
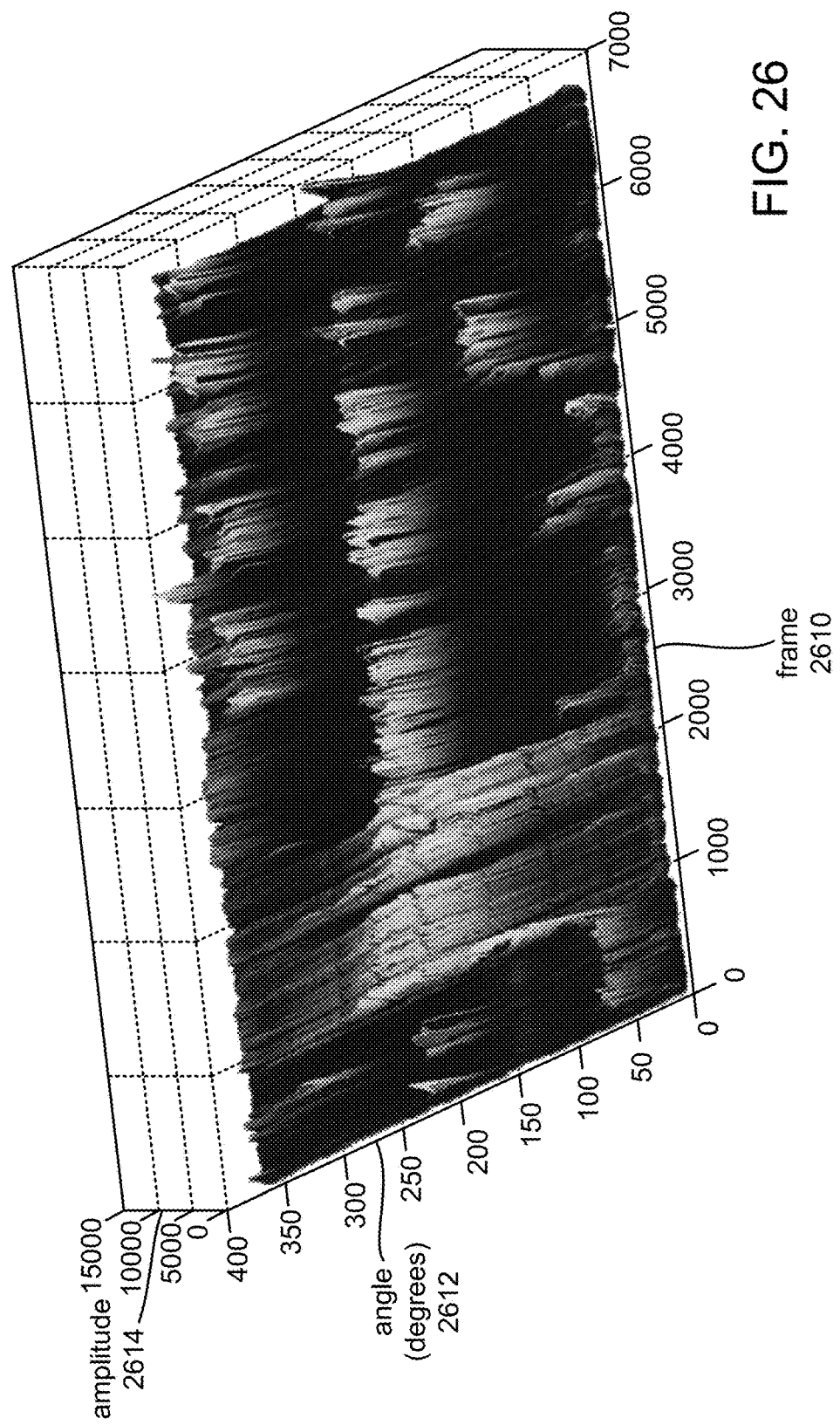
Figure 27:
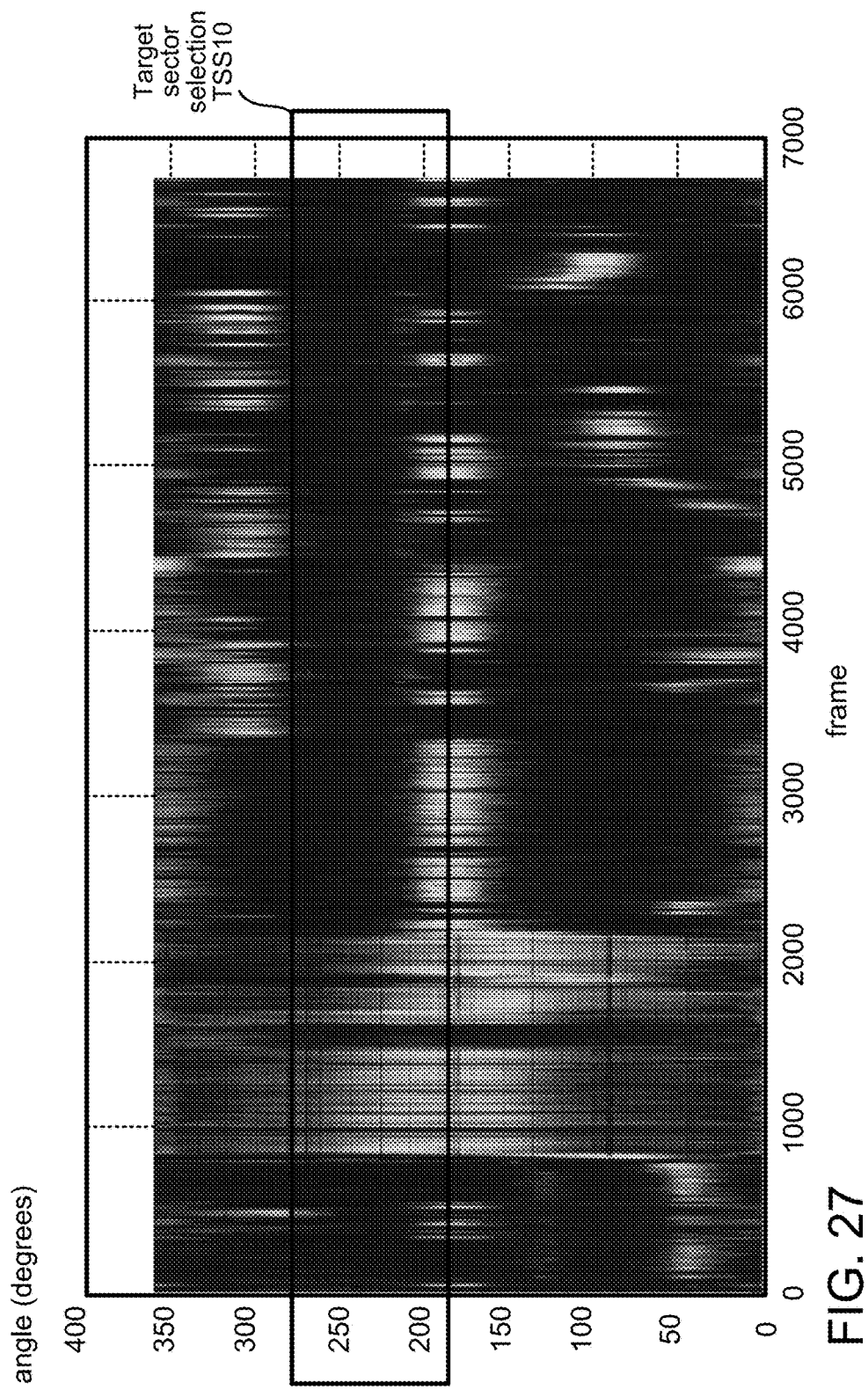
Figure 28:
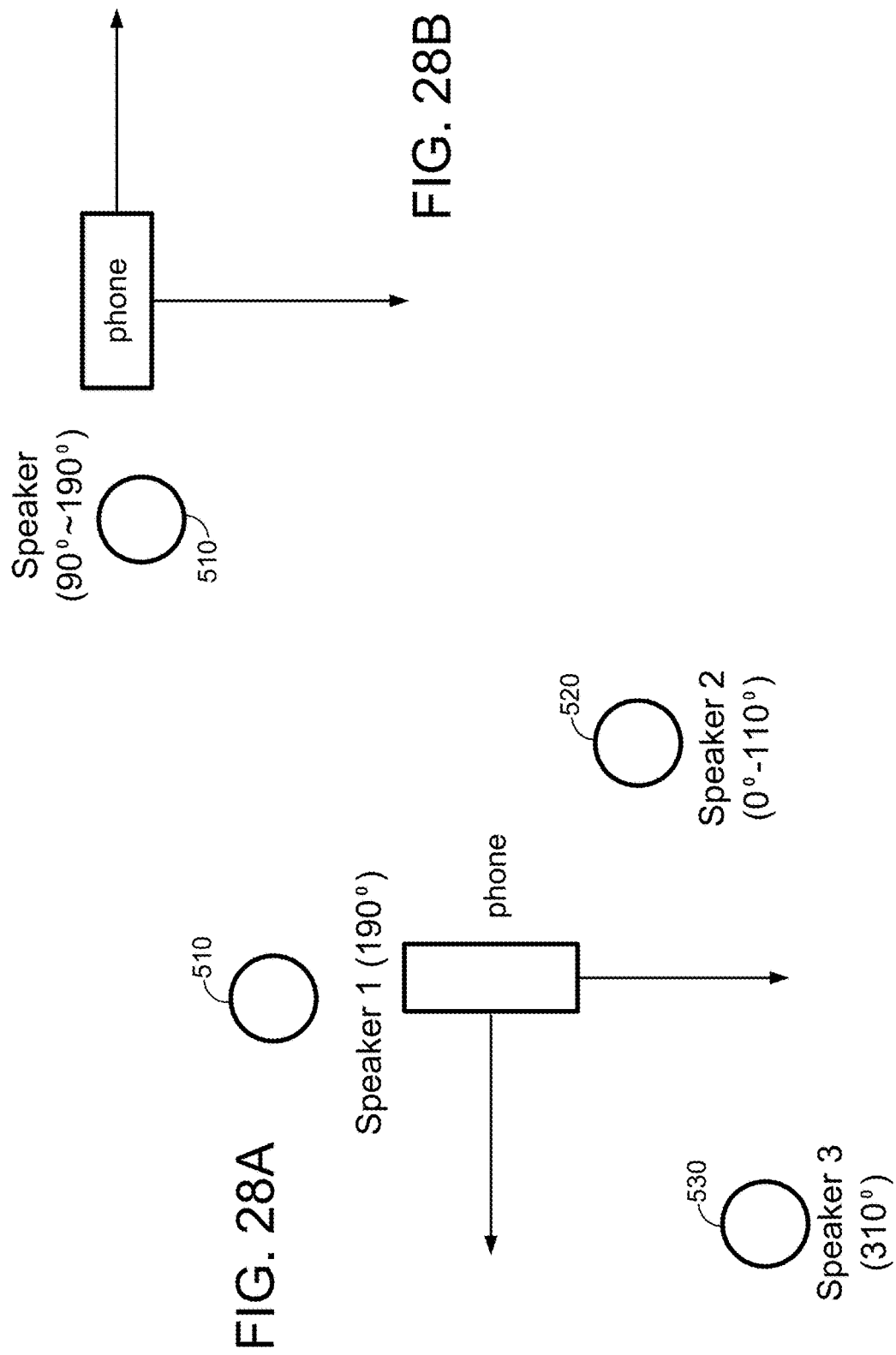
Figure 29:
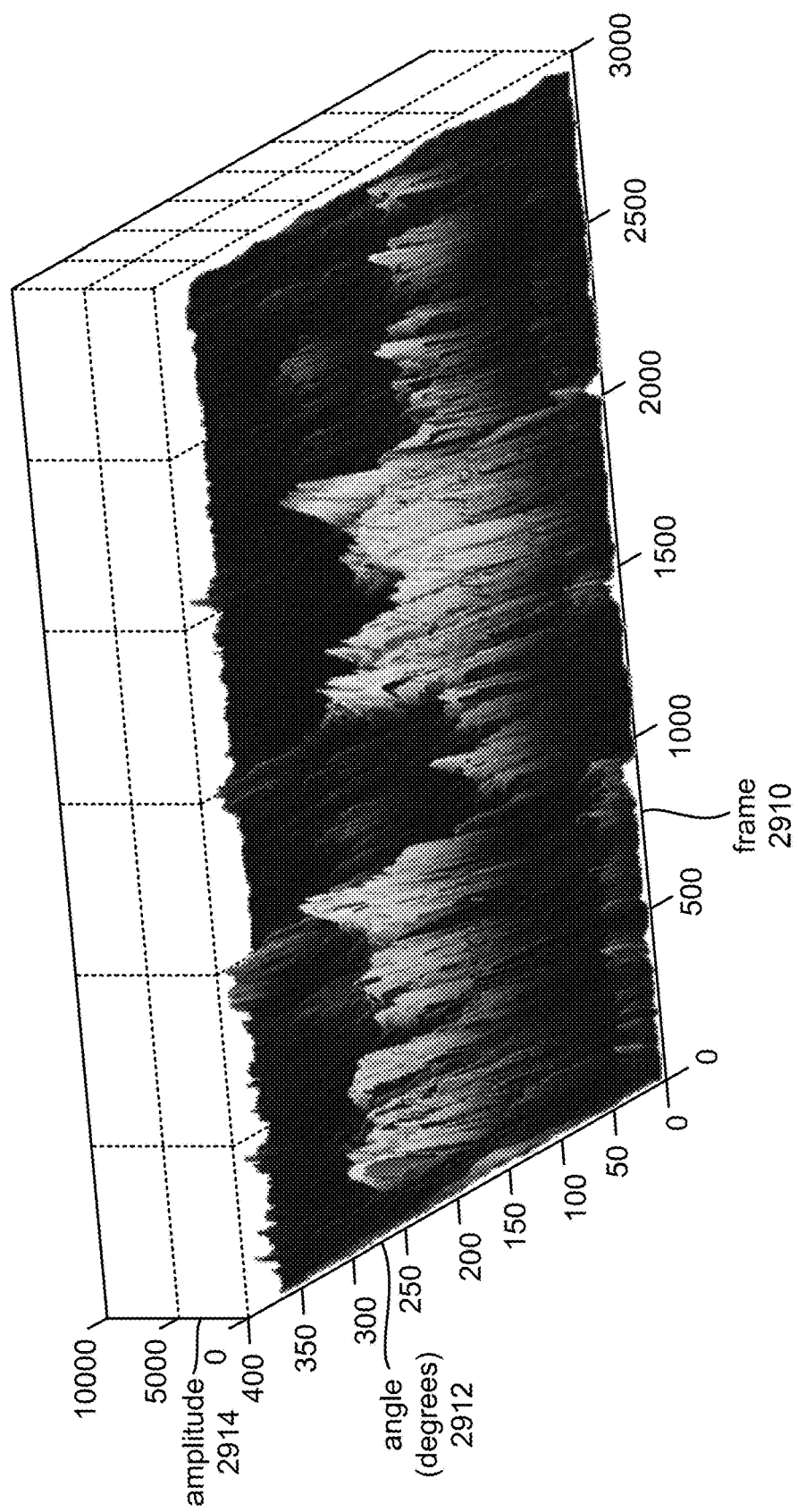
Figure 30:
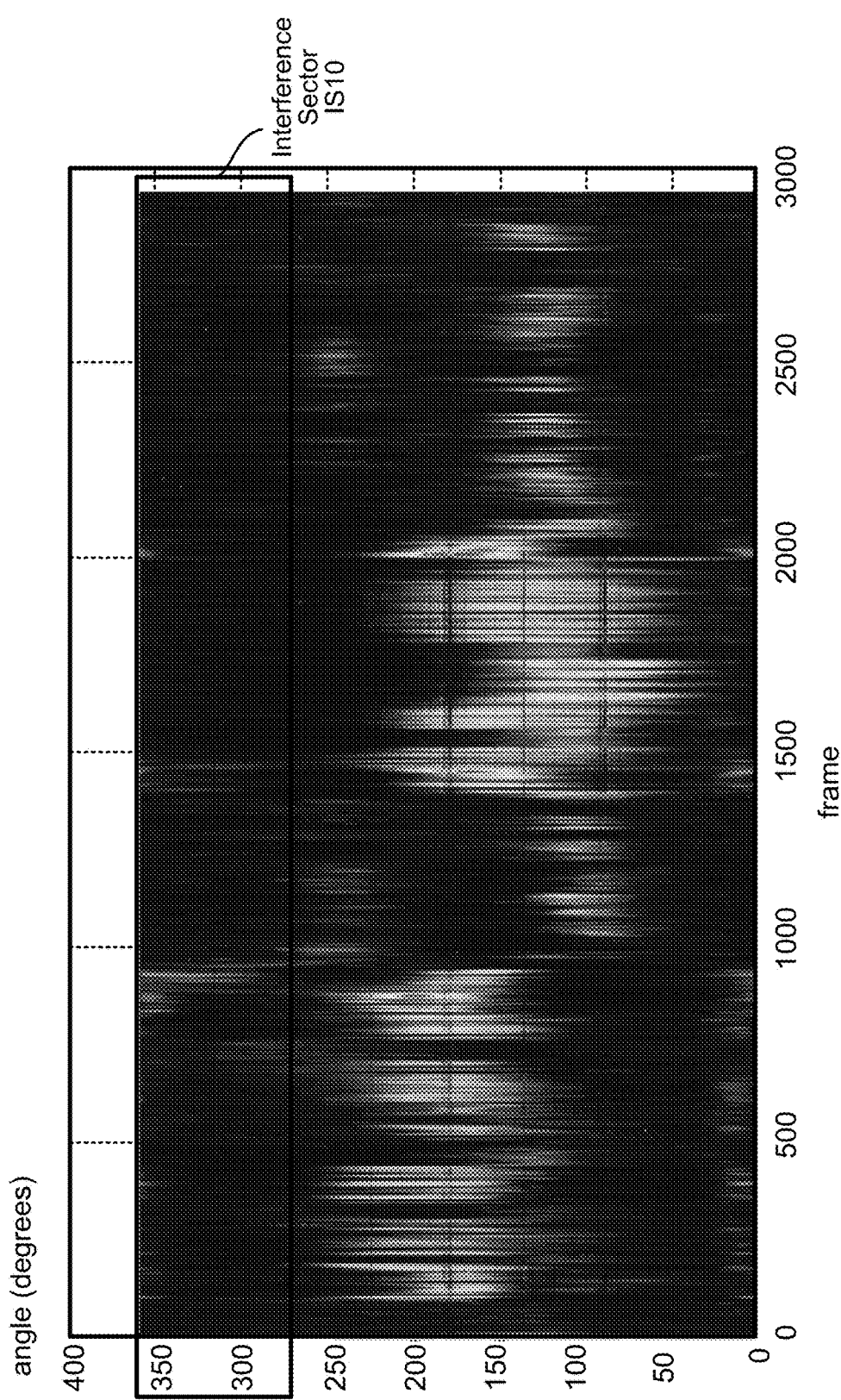

FIGS. 26 and 27 show an example of combined observations for a dynamic scenario, as shown in FIG. 28A. In FIG. 28A a device may be positioned between a first speaker S10, a second speaker S20 and a third speaker S30. In FIG. 26, the frame number 2610, an angle of arrival 2612 and an amplitude 2614 of a signal are illustrated. In this scenario, speaker 1 picks up the phone at about frame 800 and replaces it on the table top at about frame 2200. Although the angle span is broader when the phone is in this browse-talk position, it may be seen that the spatial response is still centered in a designated DOA. Movement of speaker 2 after about frame 400 is also evident. As in FIG. 24, the rectangle in FIG. 27 indicates user selection of the quadrant of 180-270 degrees as the target sector TSS10. FIGS. 29 and 30 show an example of combined observations for a dynamic scenario with road noise, as shown in FIG. 28B. In FIG. 28B a phone may receive an audio signal from a speaker S10. In FIG. 29, the frame number 2910, an angle of arrival 2912 and an amplitude 2914 of a signal are illustrated. In this scenario, the speaker picks up the phone between about frames 200 and 100 and again between about frames 1400 and 2100. In this example, the rectangle in FIG. 30 indicates user selection of the quadrant of 270-360 degrees as an interference sector IS10.

(VAD) An anglogram-based technique as described herein may be used to support voice activity detection (VAD), which may be applied for noise suppression in various use cases (e.g., a speakerphone). Such a technique, which may be implemented as a sector-based approach, may include a "vadall" statistic based on a maximum likelihood (likelihood_max) of all sectors. For example, if the maximum is significantly larger than a noise-only threshold, then the value of the vadall statistic is one (otherwise zero). It may be desirable to update the noise-only threshold only during a noise-only period. Such a period may be indicated, for example, by a single-channel VAD (e.g., from a primary microphone channel) and/or a VAD based on detection of speech onsets and/or offsets (e.g., based on a time-derivative of energy for each of a set of frequency components).

Additionally or alternatively, such a technique may include a per-sector "vad[sector]" statistic based on a maximum likelihood of each sector. Such a statistic may be implemented to have a value of one only when the single-channel VAD and the onset-offset VAD are one, vadall is one and the maximum for the sector is greater than some portion (e.g., 95%) of likelihood_max. This information can be used to select a sector with maximum likelihood. Applicable scenarios include a user-selected target sector with a moving interferer, and a user-selected interference sector with a moving target.

It may be desirable to select a tradeoff between instantaneous tracking (PWBFNF performance) and prevention of too-frequent switching of the interference sector. For example, it may be desirable to combine the vadall statistic with one or more other VAD statistics. The vad[sector] may be used to specify the interference sector and/or to trigger updating of a non-stationary noise reference. It may also be desirable to normalize the vadall statistic and/or a vad[sector] statistic using, for example, a minimum-statistics-based normalization technique (e.g., as described in U.S. Pat. Appl. Publ. No. 2012/0130713, published May 24, 2012).

An anglogram-based technique as described herein may be used to support directional masking, which may be applied for noise suppression in various use cases (e.g., a speakerphone). Such a technique may be used to obtain additional noise-suppression gain by using the DOA estimates to control a directional masking technique (e.g., to pass a target quadrant and/or to block an interference quadrant). Such a method may be useful for handling reverberation and may produce an additional 6-12 dB of gain. An interface from the anglogram may be provided for quadrant masking (e.g., by assigning an angle with maximum likelihood per each frequency bin). It may be desirable to control the masking aggressiveness based on target dominancy, as indicated by the anglogram. Such a technique may be designed to obtain a natural masking response (e.g., a smooth natural seamless transition of aggressiveness).

It may be desirable to provide a multi-view graphical user interface (GUI) for source tracking and/or for extension of PW BFNF with directional masking. Various examples are presented herein of three-microphone (two-pair) two-dimensional (e.g., 360°) source tracking and enhancement schemes which may be applied to a desktop hands-free speakerphone use case. However, it may be desirable to practice a universal method to provide seamless coverage of use cases ranging from the desktop hands-free to handheld hands-free or even to handset use cases. While a three-microphone scheme may be used for a handheld hands-free use case, it may be desirable to also use a fourth microphone (if already there) on the back of the device. For example, it may be desirable for at least four microphones (three microphone pairs) to be available to represent (x, y, z) dimension. A design as shown in FIG. 1 has this feature, as does the design shown in FIG. 32A, with three frontal microphones MC10, MC20, MC30 and a back microphone MC40 (shaded circle).

It may be desirable to provide a visualization of an active source on a display screen of such a device. The extension principles described herein may be applied to obtain a straightforward extension from 2D to 3D by using a front-back microphone pair. To support a multi-view GUI, we can determine the user's holding pattern by utilizing any of a variety of position detection methods, such as an accelerometer, gyrometer, proximity sensor and/or a variance of likelihood given by 2D anglogram per each holding pattern. Depending on the current holding pattern, we can switch to two non-coaxial microphone pairs as appropriate to such a holding pattern and can also provide a corresponding 360° 2D representation on the display, if the user wants to see it.

For example, such a method may be implemented to support switching among a range of modes that may include a desktop hands-free (e.g., speakerphone) mode, a portrait browse-talk mode, and a landscape browse-talk mode. FIG. 32B shows an example of a desktop hands-free mode with three frontal microphones MC10, MC20, MC30 and a corresponding visualization on a display screen of the device. FIG. 32D shows an example of a handheld hands-free (portrait) mode, with two frontal microphones MC10, MC20, and one back microphone MC40 (shaded circle) being activated, and a corresponding display. FIG. 32C shows an example of a handheld hands-free (landscape) mode, with a different pair of frontal microphones MC10, MC20 and one back microphone MC40 (shaded circle) being activated, and a corresponding display. In some configurations, the back microphone MC40 may be located on the back of the device, approximately behind one of the frontal microphones MC10.

It may be desirable to provide an enhancement of a target source. The extension principles described herein may be applied to obtain a straightforward extension from 2D to 3D by also using a front-back microphone pair. Instead of only two DOA estimates ($\theta 1$, $\theta 2$), we obtain an additional estimate from another dimension for a total of three DOA estimates ($\theta 1$, $\theta 2$, $\theta 3$). In this case, the PWBFNF coefficient matrix as shown in FIGS. 14A and 14B expands from 4 by 2 to 6 by 2 (with the added microphone pair), and the masking gain function expands from $f(\theta 1)f(\theta 2)$ to $f(\theta 1)f(\theta 2)f(\theta 3)$. Using a position-sensitive selection as described above, we can use all three microphone pairs optimally, regardless of the current holding pattern, to obtain a seamless transition among the modes in terms of the source enhancement performance. Of course, more than three pairs may be used at one time as well.

Each of the microphones for direction estimation as discussed herein (e.g., with reference to location and tracking of one or more users or other sources) may have a response that is omnidirectional, bidirectional, or unidirectional (e.g., cardioid). The various types of microphones that may be used include (without limitation) piezoelectric microphones, dynamic microphones, and electret microphones. It is expressly noted that the microphones may be implemented more generally as transducers sensitive to radiations or emissions other than sound. In one such example, the microphone array is implemented to include one or more ultrasonic transducers (e.g., transducers sensitive to acoustic frequencies greater than fifteen, twenty, twenty-five, thirty, forty or fifty kilohertz or more).

An apparatus as disclosed herein may be implemented as a combination of hardware (e.g., a processor) with software and/or with firmware. Such apparatus may also include an audio preprocessing stage AP10 as shown in FIG. 38A that performs one or more preprocessing operations on signals produced by each of the microphones MC10 and MC20 (e.g., of an implementation of one or more microphone arrays) to produce preprocessed microphone signals (e.g., a corresponding one of a left microphone signal and a right microphone signal) for input to task T10 or difference calculator 100. Such preprocessing operations may include (without limitation) impedance matching, analog-to-digital conversion, gain control, and/or filtering in the analog and/or digital domains.

FIG. 38B shows a block diagram of a three-channel implementation AP20 of audio preprocessing stage AP10 that includes analog preprocessing stages P10a, P10b and P10c. In one example, stages P10a, P10b, and P10c are each configured to perform a high-pass filtering operation (e.g., with a cutoff frequency of 50, 100, or 200 Hz) on the corresponding microphone signal. Typically, stages P10a, P10b and P10c will be configured to perform the same functions on each signal.

It may be desirable for audio preprocessing stage AP10 to produce each microphone signal as a digital signal, that is to say, as a sequence of samples. Audio preprocessing stage AP20, for example, includes analog-to-digital converters (ADCs) C10a, C10b and C10c that are each arranged to sample the corresponding analog signal. Typical sampling rates for acoustic applications include 8 kHz, 12 kHz, 16 kHz, and other frequencies in the range of from about 8 to about 16 kHz, although sampling rates as high as about 44.1, 48 or 192 kHz may also be used. Typically, converters C10a, C10b and C10c will be configured to sample each signal at the same rate.

In this example, audio preprocessing stage AP20 also includes digital preprocessing stages P20a, P20b, and P20c that are each configured to perform one or more preprocessing operations (e.g., spectral shaping) on the corresponding digitized channel to produce a corresponding one of a left microphone signal AL10, a center microphone signal AC10, and a right microphone signal AR10 for input to task T10 or difference calculator 100. Typically, stages P20a, P20b and P20c will be configured to perform the same functions on each signal. It is also noted that preprocessing stage AP10 may be configured to produce a different version of a signal from at least one of the microphones (e.g., at a different sampling rate and/or with different spectral shaping) for content use, such as to provide a near-end speech signal in a voice communication (e.g., a telephone call). Although FIGS. 38A and 38B show two channel and three-channel implementations, respectively, it will be understood that the same principles may be extended to an arbitrary number of microphones.

FIG. 39A shows a block diagram of an implementation MF15 of apparatus MF10 that includes means F40 for indicating a direction of arrival, based on a plurality of candidate direction selections produced by means F30 (e.g., as described herein with reference to implementations of task T400). Apparatus MF15 may be implemented, for example, to perform an instance of method M25 and/or M110 as described herein.

The signals received by a microphone pair or other linear array of microphones may be processed as described herein to provide an estimated DOA that indicates an angle with reference to the axis of the array. As described above (e.g., with reference to methods M20, M25, M100, and M110), more than two microphones may be used in a linear array to improve DOA estimation performance across a range of frequencies. Even in such cases, however, the range of DOA estimation supported by a linear (i.e., one-dimensional) array is typically limited to 180 degrees.

FIG. 2B shows a measurement model in which a one-dimensional DOA estimate indicates an angle (in the 180-degree range of +90 degrees to −90 degrees) relative to a plane that is orthogonal to the axis of the array. Although implementations of methods M200 and M300 and task TB200 are described below with reference to a context as shown in FIG. 2B, it will be recognized that such implementations are not limited to this context and that corresponding implementations with reference to other contexts (e.g., in which the DOA estimate indicates an angle of 0 to 180 degrees relative to the axis in the direction of microphone MC10 or, alternatively, in the direction away from microphone MC10) are expressly contemplated and hereby disclosed.

The desired angular span may be arbitrary within the 180-degree range. For example, the DOA estimates may be limited to selected sectors of interest within that range. The desired angular resolution may also be arbitrary (e.g. uniformly distributed over the range, or nonuniformly distributed). Additionally or alternatively, the desired frequency span may be arbitrary (e.g., limited to a voice range) and/or the desired frequency resolution may be arbitrary (e.g. linear, logarithmic, mel-scale, Bark-scale, etc.).

FIG. 39B shows an example of an ambiguity that results from the one-dimensionality of a DOA estimate from a linear array. In this example, a DOA estimate from microphone pair MC10, MC20 (e.g., as a candidate direction as produced by selector 300, or a DOA estimate as produced by indicator 400) indicates an angle θ with reference to the array axis. Even if this estimate is very accurate, however, it does not indicate whether the source is located along line d1 or along line d2.

As a consequence of its one-dimensionality, a DOA estimate from a linear microphone array actually describes a right circular conical surface around the array axis in space (assuming that the responses of the microphones are perfectly omnidirectional) rather than any particular direction in space. The actual location of the source on this conical surface (also called a "cone of confusion") is indeterminate. FIG. 39C shows one example of such a surface.

Figure 40:
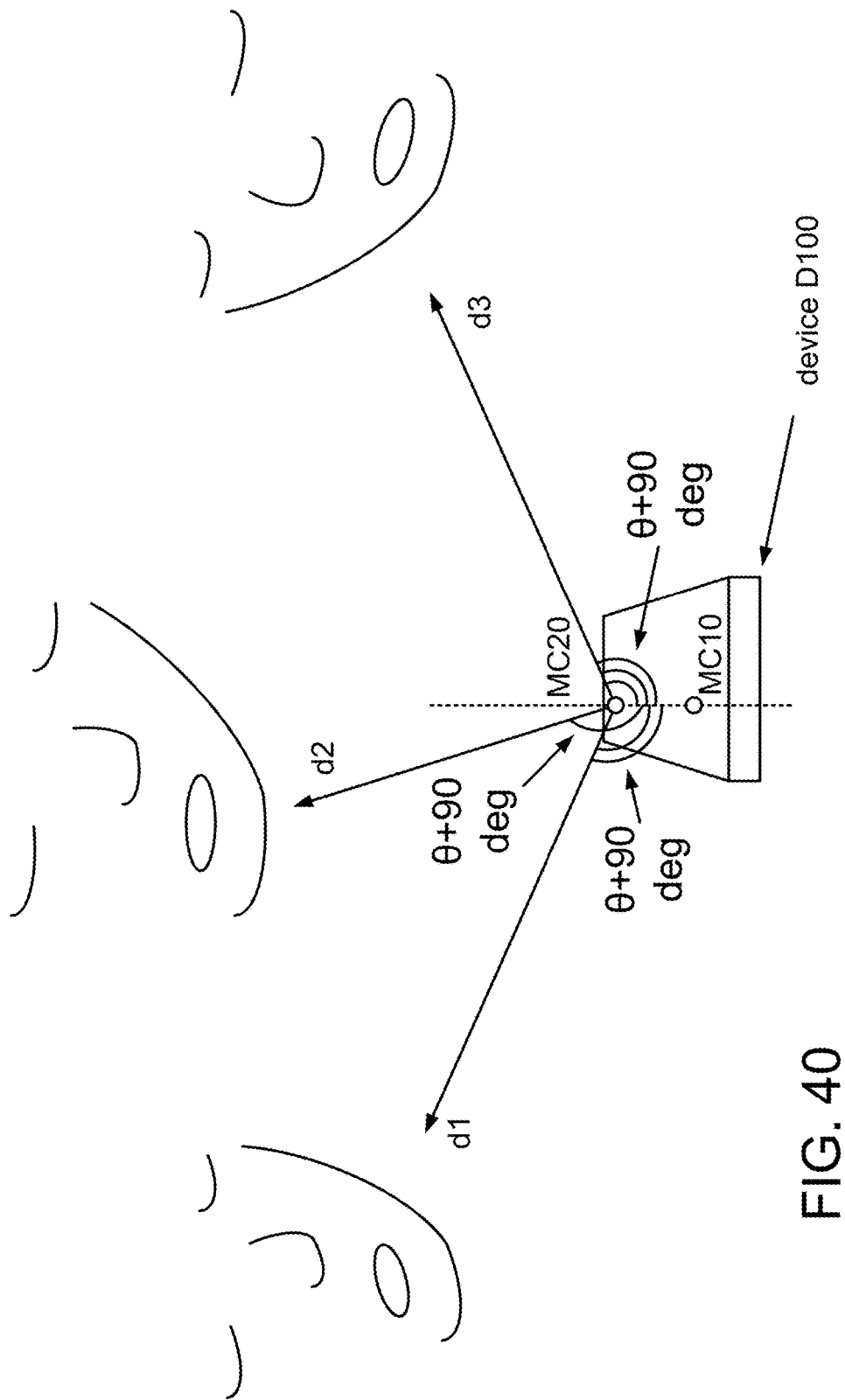
FIG. 40 shows an example of source confusion in a speakerphone application in which three sources are located in different respective directions relative to a device having a linear microphone array.

FIG. 40 shows an example of source confusion in a speakerphone application in which three sources (e.g., mouths of human speakers) are located in different respective directions relative to device D100 (e.g., a smartphone) having a linear microphone array. In this example, the source directions d1, d2, and d3 all happen to lie on a cone of confusion that is defined at microphone MC20 by an angle (θ+90 degrees) relative to the array axis in the direction of microphone MC10. Because all three source directions have the same angle relative to the array axis, the microphone pair produces the same DOA estimate for each source and fails to distinguish among them.

Figure 41A:
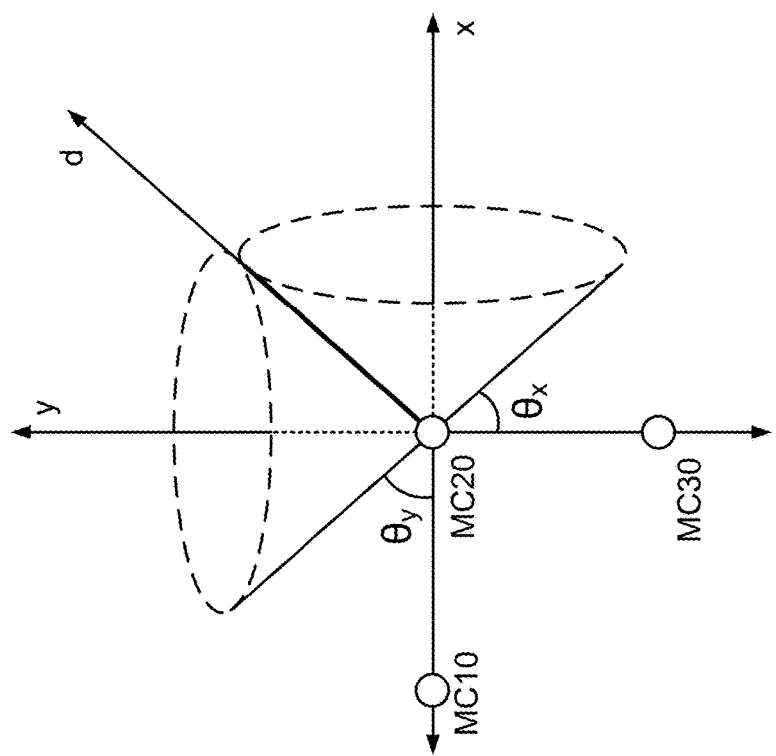
FIG. 41A shows a 2-D microphone array that includes two microphone pairs having orthogonal axes.

To provide for an estimate having a higher dimensionality, it may be desirable to extend the DOA estimation principles described herein to a two-dimensional (2-D) array of microphones. FIG. 41A shows a 2-D microphone array that includes two microphone pairs having orthogonal axes. In this example, the axis of the first pair MC10, MC20 is the x axis and the axis of the second pair MC20, MC30 is the y axis. An instance of an implementation of method M10 may be performed for the first pair to produce a corresponding 1-D DOA estimate $\theta_x$, and an instance of an implementation of method M10 may be performed for the second pair to produce a corresponding 1-D DOA estimate $\theta_y$. For a signal that arrives from a source located in the plane defined by the microphone axes, the cones of confusion described by $\theta_x$ and $\theta_y$ coincide at the direction of arrival d of the signal to indicate a unique direction in the plane.

Figure 41B:
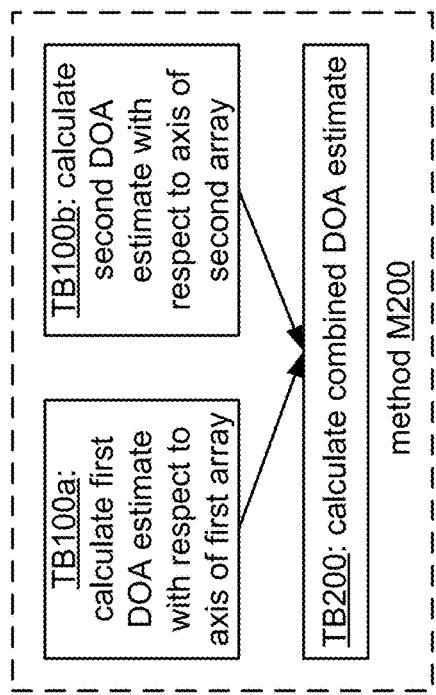
FIG. 41B shows a flowchart of a method according to a general configuration that includes tasks.

FIG. 41B shows a flowchart of a method M200 according to a general configuration that includes tasks TB100a, TB100b, and TB200. Task TB100a calculates a first DOA estimate for a multichannel signal with respect to an axis of a first linear array of microphones, and task TB100a calculates a second DOA estimate for the multichannel signal with respect to an axis of a second linear array of microphones. Each of tasks TB100a and TB100b may be implemented, for example, as an instance of an implementation of method M10 (e.g., method M20, M30, M100, or M110) as described herein. Based on the first and second DOA estimates, task TB200 calculates a combined DOA estimate.

The range of the combined DOA estimate may be greater than the range of either of the first and second DOA estimates. For example, task TB200 may be implemented to combine 1-D DOA estimates, produced by tasks TB100a and TB100b and having individual ranges of up to 180 degrees, to produce a combined DOA estimate that indicates the DOA as an angle in a range of up to 360 degrees. Task TB200 may be implemented to map 1-D DOA estimates $\theta_x$, $\theta_y$ to a direction in a larger angular range by applying a mapping, such as $$\theta_c = \begin{cases} \theta_y, & \theta_x > 0 \\ 180° - \theta_y, & \text{otherwise} \end{cases}, \quad (1)$$

to combine one angle with information (e.g., sign information) from the other angle. For the 1-D estimates ($\theta_x$, $\theta_y$)=(45°, 45°) as shown in FIG. 41A, for example, TB200 may be implemented to apply such a mapping to obtain a combined estimate $\theta_c$ of 45 degrees relative to the x-axis. For a case in which the range of the DOA estimates is 0 to 180 degrees rather than −90 to +90 degrees, it will be understood that the axial polarity (i.e., positive or negative) condition in expression (1) would be expressed in terms of whether the DOA estimate under test is less than or greater than 90 degrees.

Figure 41C:
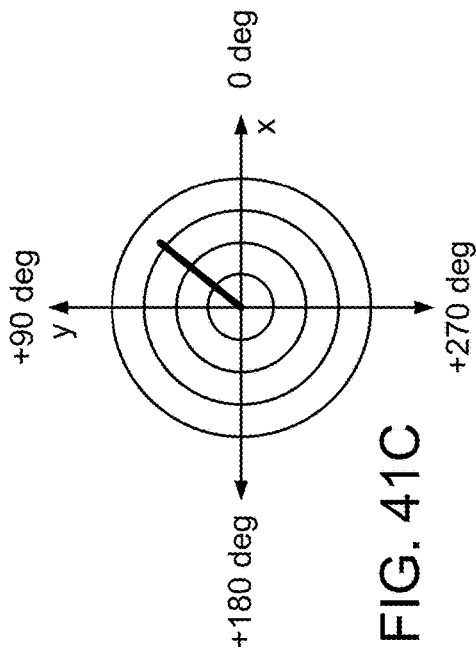
FIG. 41C shows an example of a DOA estimate shown on a display.

It may be desirable to show the combined DOA estimate $\theta_c$ on a 360-degree-range display. For example, it may be desirable to display the DOA estimate as an angle on a planar polar plot. Planar polar plot display is familiar in applications such as radar and biomedical scanning, for example. FIG. 41C shows an example of a DOA estimate shown on such a display. In this example, the direction of the line indicates the DOA estimate and the length of the line indicates the current strength of the component arriving from that direction. As shown in this example, the polar plot may also include one or more concentric circles to indicate intensity of the directional component on a linear or logarithmic (e.g., decibel) scale. For a case in which more than one DOA estimate is available at one time (e.g., for sources that are disjoint in frequency), a corresponding line for each DOA estimate may be displayed. Alternatively, the DOA estimate may be displayed on a rectangular coordinate system (e.g., Cartesian coordinates).

Figure 42A:
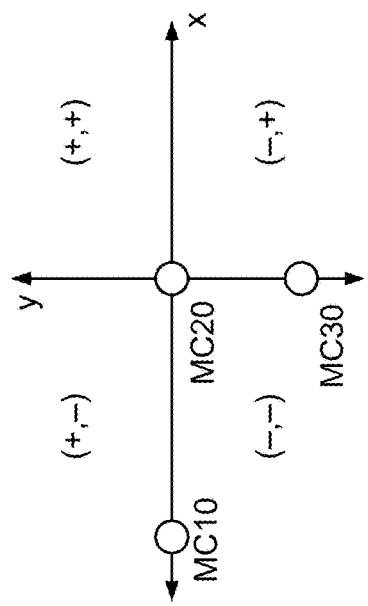
FIG. 42A shows one example of correspondences between the signs of 1-D estimates and corresponding quadrants of the plane defined by array axes.
Figure 42C:
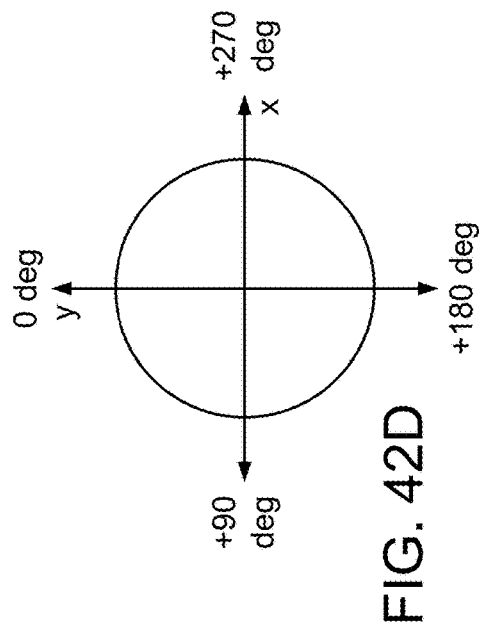
FIG. 42C shows a correspondence between the four values of the tuple (sign($\theta_x$), sign($\theta_y$)) and the quadrants of the plane.
Figure 42B:
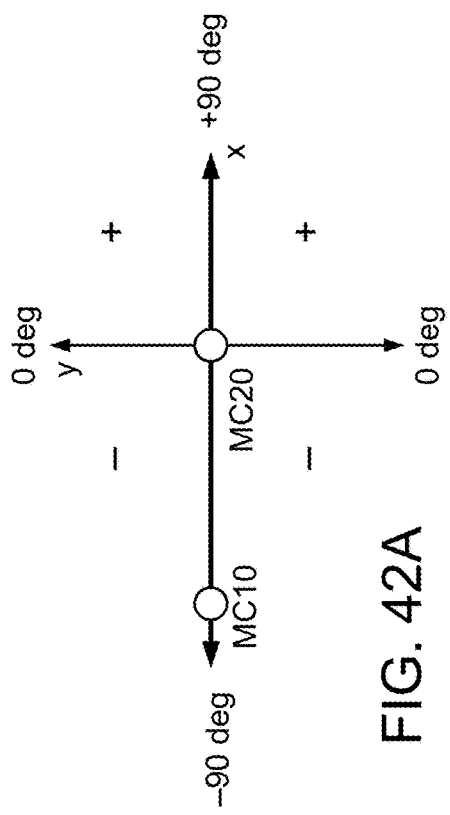
FIG. 42B shows another example of correspondences between the signs of 1-D estimates and corresponding quadrants of the plane defined by array axes.
Figure 42D:
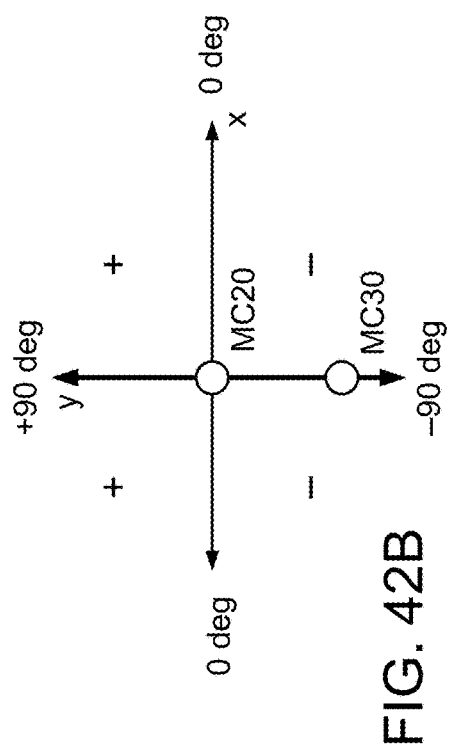
FIG. 42D shows a 360-degree display according to an alternate mapping.

FIGS. 42A and 42B show correspondences between the signs of the 1-D estimates $\theta_x$ and $\theta_y$, respectively, and corresponding quadrants of the plane defined by the array axes. FIG. 42C shows a correspondence between the four values of the tuple (sign($\theta_x$), sign($\theta_y$)) and the quadrants of the plane. FIG. 42D shows a 360-degree display according to an alternate mapping (e.g., relative to the y-axis)

$$\theta_c = \begin{cases} -\theta_x, & \theta_y > 0 \\ \theta_x + 180, & \text{otherwise} \end{cases}. \quad (2)$$

It is noted that FIG. 41A illustrates a special case in which the source is located in the plane defined by the microphone axes, such that the cones of confusion described by $\theta_x$ and $\theta_y$ indicate a unique direction in this plane. For most practical applications, it may be expected that the cones of confusion of nonlinear microphone pairs of a 2-D array typically will not coincide in a plane defined by the array, even for a far-field point source. For example, source height relative to the plane of the array (e.g., displacement of the source along the z-axis) may play an important role in 2-D tracking.

It may be desirable to produce an accurate 2-D representation of directions of arrival for signals that are received from sources at arbitrary locations in a three-dimensional space. For example, it may be desirable for the combined DOA estimate produced by task TB200 to indicate the DOA of a source signal in a plane that does not include the DOA (e.g., a plane defined by the microphone array or by a display surface of the device). Such indication may be used, for example, to support arbitrary placement of the audio sensing device relative to the source and/or arbitrary relative movement of the device and source (e.g., for speakerphone and/or source tracking applications).

FIG. 43A shows an example that is similar to FIG. 41A but depicts a more general case in which the source is located above the x-y plane. In such case, the intersection of the cones of confusion of the arrays indicates two possible directions of arrival: a direction d1 that extends above the x-y plane, and a direction d2 that extends below the x-y plane. In many applications, this ambiguity may be resolved by assuming that direction d1 is correct and ignoring the second direction d2. For a speakerphone application in which the device is placed on a tabletop, for example, it may be assumed that no sources are located below the device. In any case, the projections of directions d1 and d2 on the x-y plane are the same.

While a mapping of 1-D estimates $\theta_x$ and $\theta_y$ to a range of 360 degrees (e.g., as in expression (1) or (2)) may produce an appropriate DOA indication when the source is located in the microphone plane, it may produce an inaccurate result for the more general case of a source that is not located in that plane. For a case in which $\theta_x=\theta_y$ as shown in FIG. 41B, for example, it may be understood that the corresponding direction in the x-y plane is 45 degrees relative to the x axis. Applying the mapping of expression (1) to the values $(\theta_x, \theta_y)=(30°, 30°)$, however, produces a combined estimate $\theta_c$ of 30 degrees relative to the x axis, which does not correspond to the source direction as projected on the plane.

FIG. 43B shows another example of a 2-D microphone array whose axes define an x-y plane and a source that is located above the x-y plane (e.g., a speakerphone application in which the speaker's mouth is above the tabletop). With respect to the x-y plane, the source is located along the y axis (e.g., at an angle of 90 degrees relative to the x axis). The x-axis pair MC10, MC20 indicates a DOA of zero degrees relative to the y-z plane (i.e., broadside to the pair axis), which agrees with the source direction as projected onto the x-y plane. Although the source is located directly above the y axis, it is also offset in the direction of the z axis by an elevation angle of 30 degrees. This elevation of the source from the x-y plane causes the y-axis pair MC20, MC30 to indicate a DOA of sixty degrees (i.e., relative to the x-z plane) rather than ninety degrees. Applying the mapping of expression (1) to the values $(\theta_x, \theta_y)=(0°, 60°)$ produces a combined estimate $\theta_c$ of 60 degrees relative to the x axis, which does not correspond to the source direction as projected on the plane.

In a typical use case, the source will be located in a direction that is neither within a plane defined by the array axes nor directly above an array axis. FIG. 43C shows an example of such a general case in which a point source (i.e., a speaker's mouth) is elevated above the plane defined by the array axes. In order to obtain a correct indication in the array plane of a source direction that is outside that plane, it may be desirable to implement task TB200 to convert the 1-D DOA estimates into an angle in the array plane to obtain a corresponding DOA estimate in the plane.

Figure 44E:
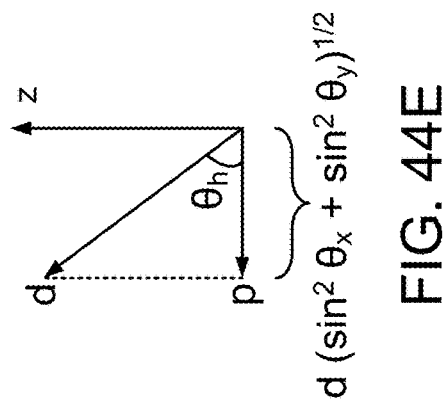
FIG. 44E illustrates one example of a projection p and an angle of elevation.
Figure 44C:
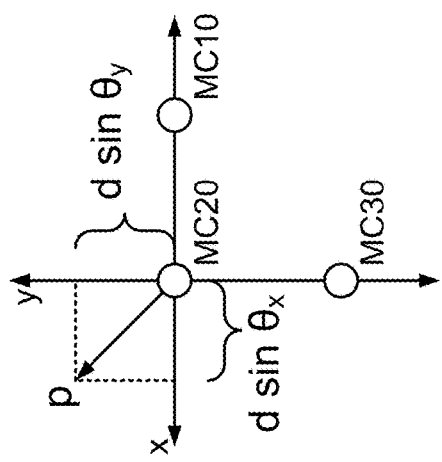
FIGS. 44A-44D show a derivation of a conversion of ($\theta_x$, $\theta_y$) into an angle in the array plane.
Figure 44D:
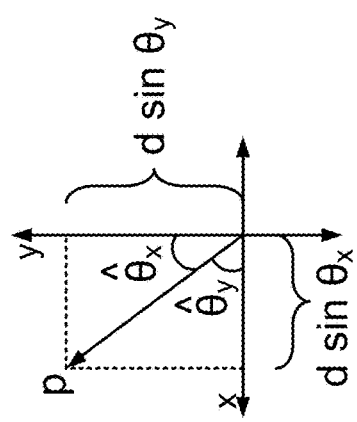
Figure 44A:
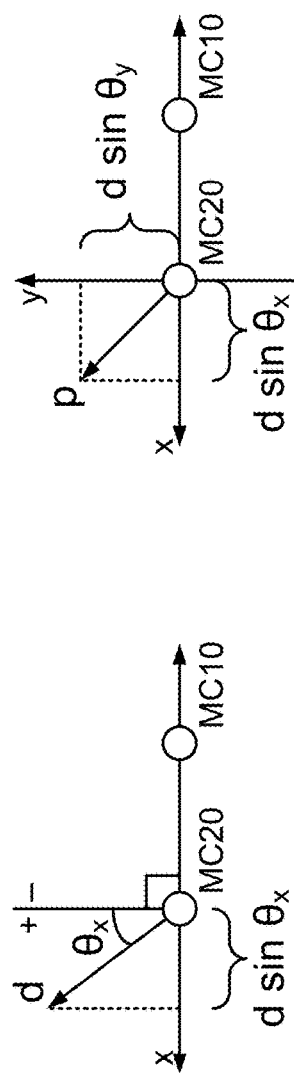
Figure 44B:
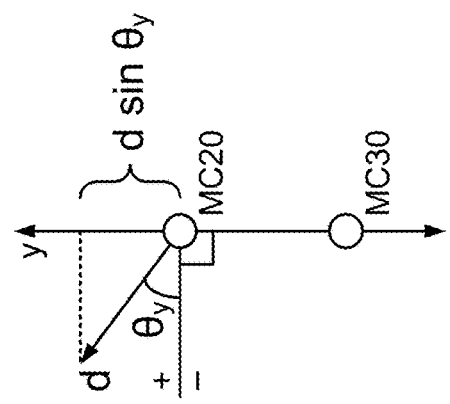

FIGS. 44A-44D show a derivation of such a conversion of $(\theta_x, \theta_y)$ into an angle in the array plane. In FIGS. 44A and 44B, the source vector d is projected onto the x axis and onto the y axis, respectively. The lengths of these projections (d sin $\theta_x$ and d sin $\theta_y$, respectively) are the dimensions of the projection p of source vector d onto the x-y plane, as shown in FIG. 44C. These dimensions are sufficient to determine conversions of DOA estimates $(\theta_x, \theta_y)$ into angles $(\hat{\theta}_x, \hat{\theta}_y)$ of p in the x-y plane relative to the y-axis and relative to the x-axis, respectively, as shown in FIG. 44D:

$$\hat{\theta}_x = \tan^{-1}\left(\frac{\sin\theta_x}{|\sin\theta_y|+\varepsilon}\right), \hat{\theta}_y = \tan^{-1}\left(\frac{\sin\theta_y}{|\sin\theta_x|+\varepsilon}\right) \quad (3)$$

where $\varepsilon$ is a small value as may be included to avoid a divide-by-zero error. (It is noted with reference to FIGS. 43B, 43C, 44A-E, and also 46A-E as discussed below, that the relative magnitude of d as shown is only for convenience of illustration, and that the magnitude of d should be large enough relative to the dimensions of the microphone array for the far-field assumption of planar wavefronts to remain valid.)

Task TB200 may be implemented to convert the DOA estimates according to such an expression into a corresponding angle in the array plane and to apply a mapping (e.g., as in expression (1) or (2)) to the converted angle to obtain a combined DOA estimate $\theta_c$ in that plane. It is noted that such an implementation of task TB200 may omit calculation of $\hat{\theta}_y$ (alternatively, of $\hat{\theta}_x$) as included in expression (3), as the value $\theta_c$ may be determined from $\hat{\theta}_x$ as combined with sign$(\hat{\theta}_y)$=sign$(\theta_y)$ (e.g., as shown in expressions (1) and (2)). For such a case in which the value of $|\hat{\theta}_y|$ is also desired, it may be calculated as $|\hat{\theta}_y|=90°-|\hat{\theta}_x|$ (and likewise for $|\hat{\theta}_x|$).

FIG. 43C shows an example in which the DOA of the source signal passes through the point (x,y,z)=(5,2,5). In this case, the DOA observed by the x-axis microphone pair MC10-MC20 is $\theta_x=\tan^{-1}(5/\sqrt{25+4})\approx 42.9°$, and the DOA observed by the y-axis microphone pair MC20-MC30 is $\theta_y=\tan^{-1}(2/\sqrt{25+25})\approx 15.8°$. Using expression (3) to convert these angles into corresponding angles in the x-y plane produces the converted DOA estimates $(\hat{\theta}_x, \hat{\theta}_y)=(21.8°, 68.2°)$, which correspond to the given source location (x,y)=(5,2).

Applying expression (3) to the values $(\theta_x, \theta_y)=(30°, 30°)$ as shown in FIG. 41B produces the converted estimates $(\hat{\theta}_x, \hat{\theta}_y)=(45°, 45°)$, which are mapped by expression (1) to the expected value of 45 degrees relative to the x axis. Applying expression (3) to the values $(\theta_x, \theta_y)=(0°, 60°)$ as shown in FIG. 43B produces the converted estimates $(\hat{\theta}_x, \hat{\theta}_y)=(0°, 90°)$, which are mapped by expression (1) to the expected value of 90 degrees relative to the x axis.

Task TB200 may be implemented to apply a conversion and mapping as described above to project a DOA, as indicated by any such pair of DOA estimates from a 2-D orthogonal array, onto the plane in which the array is located. Such projection may be used to enable tracking directions of active speakers over a 360° range around the microphone array, regardless of height difference. FIG. 45A shows a plot obtained by applying an alternate mapping $$\theta_c = \begin{cases} -\theta_y, & \theta_x < 0 \\ \theta_y + 180°, & \text{otherwise} \end{cases}$$

to the converted estimates $(\hat{\theta}_x, \hat{\theta}_y)=(0°, 90°)$ from FIG. 43B to obtain a combined directional estimate (e.g., an azimuth) of 270 degrees. In this figure, the labels on the concentric circles indicate relative magnitude in decibels.

Task TB200 may also be implemented to include a validity check on the observed DOA estimates prior to calculation of the combined DOA estimate. It may be desirable, for example, to verify that the value $(|\theta_x|+|\theta_y|)$ is at least equal to 90 degrees (e.g., to verify that the cones of confusion associated with the two observed estimates will intersect along at least one line).

In fact, the information provided by such DOA estimates from a 2D microphone array is nearly complete in three dimensions, except for the up-down confusion. For example, the directions of arrival observed by microphone pairs MC10-MC20 and MC20-MC30 may also be used to estimate the magnitude of the angle of elevation of the source relative to the x-y plane. If d denotes the vector from microphone MC20 to the source, then the lengths of the projections of vector d onto the x-axis, the y-axis, and the x-y plane may be expressed as $d \sin(\theta_x)$, $d \sin(\theta_y)$, and $d\sqrt{\sin^2(\theta_x)+\sin^2(\theta_y)}$, respectively (e.g., as shown in FIGS. 44A-44E). The magnitude of the angle of elevation may then be estimated as $\theta_h = \cos^{-1}\sqrt{\sin^2(\theta_x)+\sin^2(\theta_y)}$.

Although the linear microphone arrays in some particular examples have orthogonal axes, it may be desirable to implement method M200 for a more general case in which the axes of the microphone arrays are not orthogonal. FIG. 45B shows an example of the intersecting cones of confusion associated with the responses of linear microphone arrays having non-orthogonal axes x and r to a common point source. FIG. 45C shows the lines of intersection of these cones, which define the two possible directions d1 and d2 of the point source with respect to the array axes in three dimensions.

FIG. 46A shows an example of a microphone array MC10-MC20-MC30 in which the axis of pair MC10-MC20 is the x axis, and the axis r of pair MC20-MC30 lies in the x-y plane and is skewed relative to the y axis by a skew angle α. FIG. 46B shows an example of obtaining a combined directional estimate in the x-y plane with respect to orthogonal axes x and y with observations $(\theta_x, \theta_r)$ from an array as shown in FIG. 46A. If d denotes the vector from microphone MC20 to the source, then the lengths of the projections of vector d onto the x-axis $(d_x)$ and onto the axis r $(d_r)$ may be expressed as $d \sin(\theta_x)$ and $d \sin(\theta_r)$, respectively, as shown in FIGS. 46B and 46C. The vector $p=(p_x, p_y)$ denotes the projection of vector d onto the x-y plane. The estimated value of $p_x = d \sin \theta_x$ is known, and it remains to determine the value of $p_y$.

We assume that the value of α is in the range (−90°, +90°), as an array having any other value of α may easily be mapped to such a case. The value of $p_y$ may be determined from the dimensions of the projection vector $d_r=(d \sin \theta_r \sin α, d \sin \theta_r \cos α)$ as shown in FIGS. 46D and 46E. Observing that the difference between vector p and vector $d_r$ is orthogonal to $d_r$ (i.e., that the inner product $\langle (p-d_r), d_r \rangle$ is equal to zero), we calculate $p_y$ as $$p_y = d\frac{\sin\theta_r - \sin\theta_x \sin\alpha}{\cos\alpha}$$

(which reduces to $p_y = d \sin \theta_r$ for α=0). The desired angles of arrival in the x-y plane, relative to the orthogonal x and y axes, may then be expressed respectively as $$(\hat{\theta}x, \hat{\theta}_y) = \left(\tan^{-1}\left(\frac{\sin\theta_x \cos\alpha}{|\sin\theta_r - \sin\theta_x \sin\alpha| + \varepsilon}\right), \tan^{-1}\left(\frac{\sin\theta_r - \sin\theta_x \sin\alpha}{|\sin\theta_x|\cos\alpha + \varepsilon}\right)\right). \quad (4)$$

It is noted that expression (3) is a special case of expression (4) in which α=0. The dimensions $(p_x, p_y)$ of projection p may also be used to estimate the angle of elevation $\theta_h$ of the source relative to the x-y plane (e.g., in a similar manner as described above with reference to FIG. 44E).

FIG. 47A shows a flowchart of a method M300 according to a general configuration that includes instances of tasks TB100a and TB100b. Method M300 also includes an implementation TB300 of task TB200 that calculates a projection of the direction of arrival into a plane that does not include the direction of arrival (e.g., a plane defined by the array axes). In such manner, a 2-D array may be used to extend the range of source DOA estimation from a linear, 180-degree estimate to a planar, 360-degree estimate. FIG. 47C illustrates one example of an apparatus A300 with components (e.g., a first DOA estimator B100a, a second DOA estimator B100b and a projection calculator B300) for performing functions corresponding to FIG. 47A. FIG. 47D illustrates one example of an apparatus MF300 including means (e.g., means FB100a for calculating a first DOA estimate with respect to an axis of a first array, means FB100b for calculating a second DOA estimate with respect to an axis of a second array and means FB300 for calculating a projection of a DOA onto a plane that does not include the DOA) for performing functions corresponding to FIG. 47A.

FIG. 47B shows a flowchart of an implementation TB302 of task TB300 that includes subtasks TB310 and TB320. Task TB310 converts the first DOA estimate (e.g., $\theta_x$) to an angle in the projection plane (e.g., $\hat{\theta}_x$). For example, task TB310 may perform a conversion as shown in, e.g., expression (3) or (4). Task TB320 combines the converted angle with information (e.g., sign information) from the second DOA estimate to obtain the projection of the direction of arrival. For example, task TB320 may perform a mapping according to, e.g., expression (1) or (2).

Figure 48A:
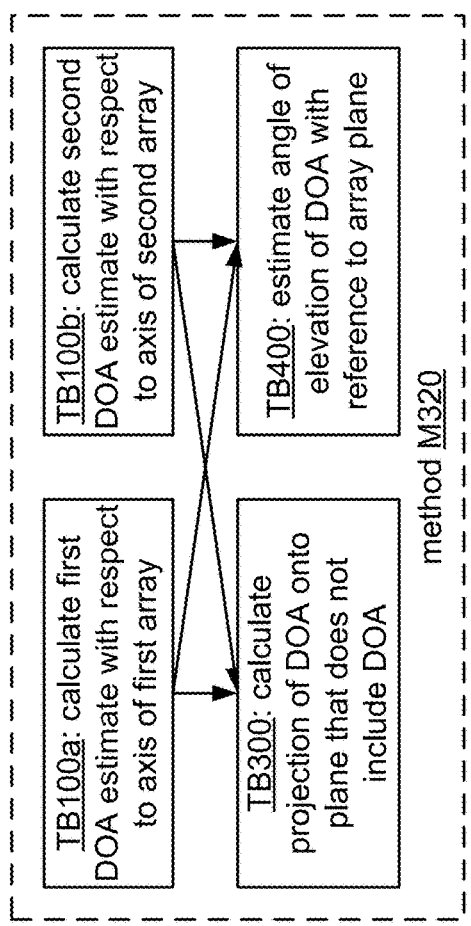
FIG. 48A shows a flowchart of one implementation of a method that includes a task.

As described above, extension of source DOA estimation to two dimensions may also include estimation of the angle of elevation of the DOA over a range of 90 degrees (e.g., to provide a measurement range that describes a hemisphere over the array plane). FIG. 48A shows a flowchart of such an implementation M320 of method M300 that includes a task TB400. Task TB400 calculates an estimate of the angle of elevation of the DOA with reference to a plane that includes the array axes (e.g., as described herein with reference to FIG. 44E). Method M320 may also be implemented to combine the projected DOA estimate with the estimated angle of elevation to produce a three-dimensional vector.

It may be desirable to perform an implementation of method M300 within an audio sensing device that has a 2-D array including two or more linear microphone arrays. Examples of a portable audio sensing device that may be implemented to include such a 2-D array and may be used to perform such a method for audio recording and/or voice communications applications include a telephone handset (e.g., a cellular telephone handset); a wired or wireless headset (e.g., a Bluetooth headset); a handheld audio and/or video recorder; a personal media player configured to record audio and/or video content; a personal digital assistant (PDA) or other handheld computing device; and a notebook computer, laptop computer, netbook computer, tablet computer, or other portable computing device. The class of portable computing devices currently includes devices having names such as laptop computers, notebook computers, netbook computers, ultra-portable computers, tablet computers, mobile Internet devices, smartbooks, and smartphones. Such a device may have a top panel that includes a display screen and a bottom panel that may include a keyboard, wherein the two panels may be connected in a clamshell or other hinged relationship. Such a device may be similarly implemented as a tablet computer that includes a touchscreen display on a top surface.

Extension of DOA estimation to a 2-D array (e.g., as described herein with reference to implementations of method M200 and implementations of method M300) is typically well-suited to and sufficient for a speakerphone application. However, further extension of such principles to an N-dimensional array (wherein N>=2) is also possible and may be performed in a straightforward manner. For example, FIGS. 41A-46E illustrate use of observed DOA estimates from different microphone pairs in an x-y plane to obtain an estimate of a source direction as projected into the x-y plane. In the same manner, an instance of method M200 or M300 may be implemented to combine observed DOA estimates from an x-axis microphone pair and a z-axis microphone pair (or other pairs in the x-z plane) to obtain an estimate of the source direction as projected into the x-z plane, and likewise for the y-z plane or any other plane that intersects three or more of the microphones. The 2-D projected estimates may then be combined to obtain the estimated DOA in three dimensions. For example, a DOA estimate for a source as projected onto the x-y plane may be combined with a DOA estimate for the source as projected onto the x-z plane to obtain a combined DOA estimate as a vector in (x, y, z) space.

For tracking applications in which one target is dominant, it may be desirable to select N linear microphone arrays (e.g., pairs) for representing N respective dimensions. Method M200 or M300 may be implemented to combine a 2-D result, obtained with a particular pair of such linear arrays, with a DOA estimate from each of one or more linear arrays in other planes to provide additional degrees of freedom.

Estimates of DOA error from different dimensions may be used to obtain a combined likelihood estimate, for example, using an expression such as $$\frac{1}{\max(|\theta - \theta_{0,1}|^2_{f,1'} |\theta - \theta_{0,2}|^2_{f,2}) + \lambda} \text{ or}$$

$$\frac{1}{\text{mean}(|\theta - \theta_{0,1}|^2_{f,1'} |\theta - \theta_{0,2}|^2_{f,2}) + \lambda},$$

where $\theta_{0,i}$ denotes the DOA candidate selected for pair i. Use of the maximum among the different errors may be desirable to promote selection of an estimate that is close to the cones of confusion of both observations, in preference to an estimate that is close to only one of the cones of confusion and may thus indicate a false peak. Such a combined result may be used to obtain a (frame, angle) plane, as shown in FIG. 8 and described herein, and/or a (frame, frequency) plot, as shown at the bottom of FIG. 9 and described herein.

Figure 48B:
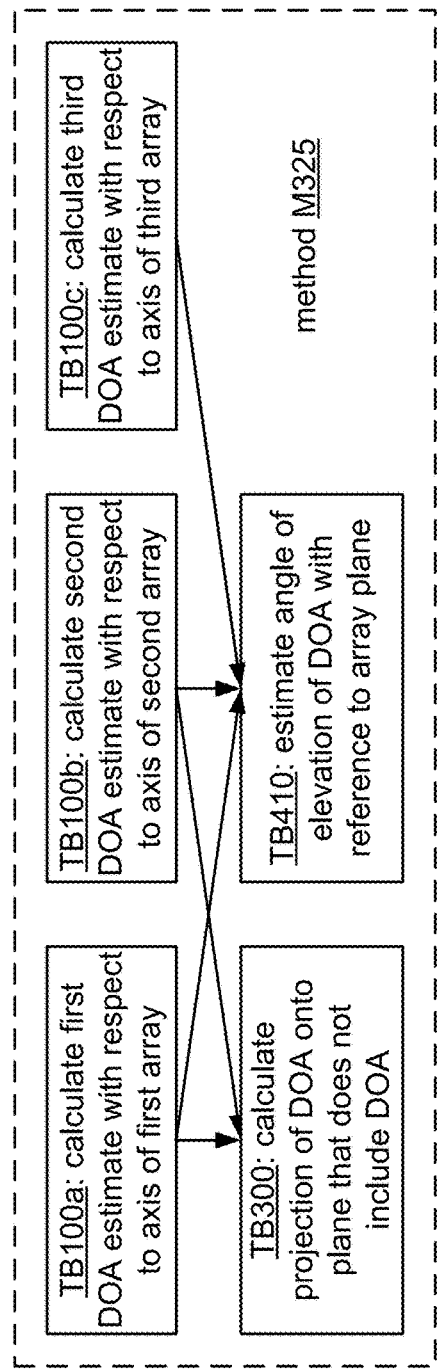
FIG. 48B shows a flowchart for an implementation of another method.

FIG. 48B shows a flowchart for an implementation M325 of method M320 that includes tasks TB100c and an implementation TB410 of task T400. Task TB100c calculates a third estimate of the direction of arrival with respect to an axis of a third microphone array. Task TB410 estimates the angle of elevation based on information from the DOA estimates from tasks TB100a, TB100b, and TB100c.

It is expressly noted that methods M200 and M300 may be implemented such that task TB100a calculates its DOA estimate based on one type of difference between the corresponding microphone channels (e.g., a phase-based difference), and task TB100b (or TB100c) calculates its DOA estimate based on another type of difference between the corresponding microphone channels (e.g., a gain-based difference). In one application of such an example of method M325, an array that defines an x-y plane is expanded to include a front-back pair (e.g., a fourth microphone located at an offset along the z axis with respect to microphone MC10, MC20, or MC30). The DOA estimate produced by task TB100c for this pair is used in task TB400 to resolve the front-back ambiguity in the angle of elevation, such that the method provides a full spherical measurement range (e.g., 360 degrees in any plane). In this case, method M325 may be implemented such that the DOA estimates produced by tasks TB100a and TB100b are based on phase differences, and the DOA estimate produced by task TB100c is based on gain differences. In a particular example (e.g., for tracking of only one source), the DOA estimate produced by task TB100c has two states: a first state indicating that the source is above the plane, and a second state indicating that the source is below the plane.

FIG. 49A shows a flowchart of an implementation M330 of method M300. Method M330 includes a task TB500 that displays the calculated projection to a user of the audio sensing device. Task TB500 may be configured, for example, to display the calculated projection on a display screen of the device in the form of a polar plot (e.g., as shown in FIGS. 41C, 42D, and 45A). Examples of such a display screen, which may be a touchscreen as shown in FIG. 1, include a liquid crystal display (LCD), an organic light-emitting diode (OLED) display, an electrowetting display, an electrophoretic display, and an interferometric modulator display. Such display may also include an indication of the estimated angle of elevation (e.g., as shown in FIG. 49B).

Figure 50B:
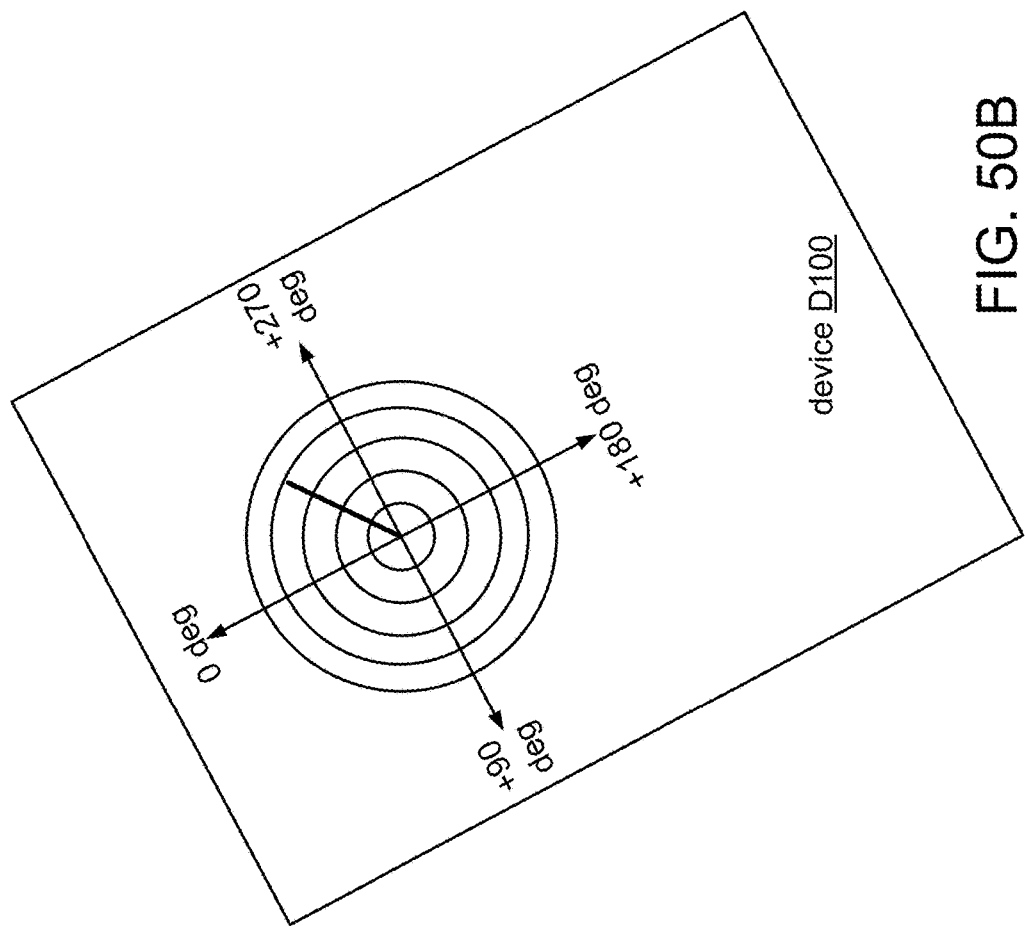
FIGS. 50A and 50B show examples of a display before and after a rotation.
Figure 50A:
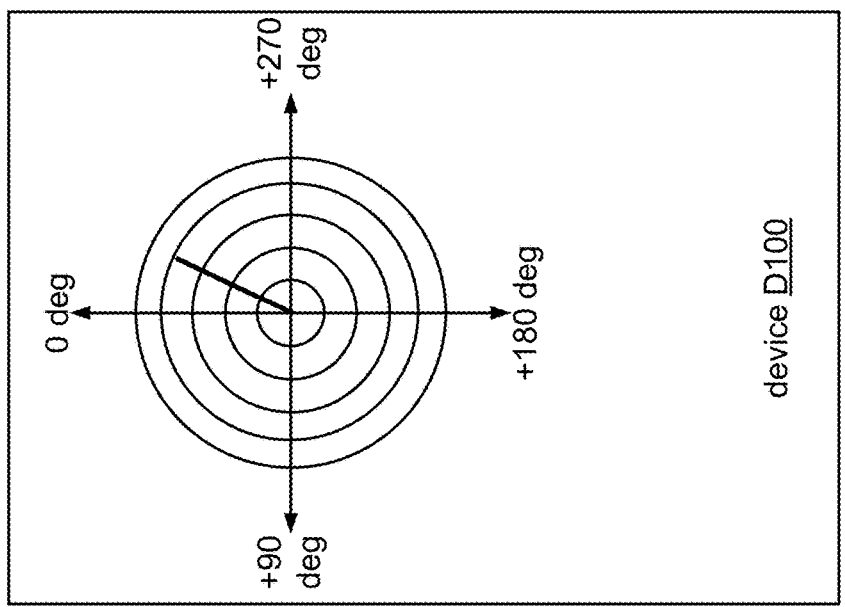

Task TB500 may be implemented to display the projected DOA with respect to a reference direction of the device (e.g., a principal axis of the device). In such case, the direction as indicated will change as the device is rotated relative to a stationary source, even if the position of the source does not change. FIGS. 50A and 50B show examples of such a display before and after such rotation, respectively.

Figure 51B:
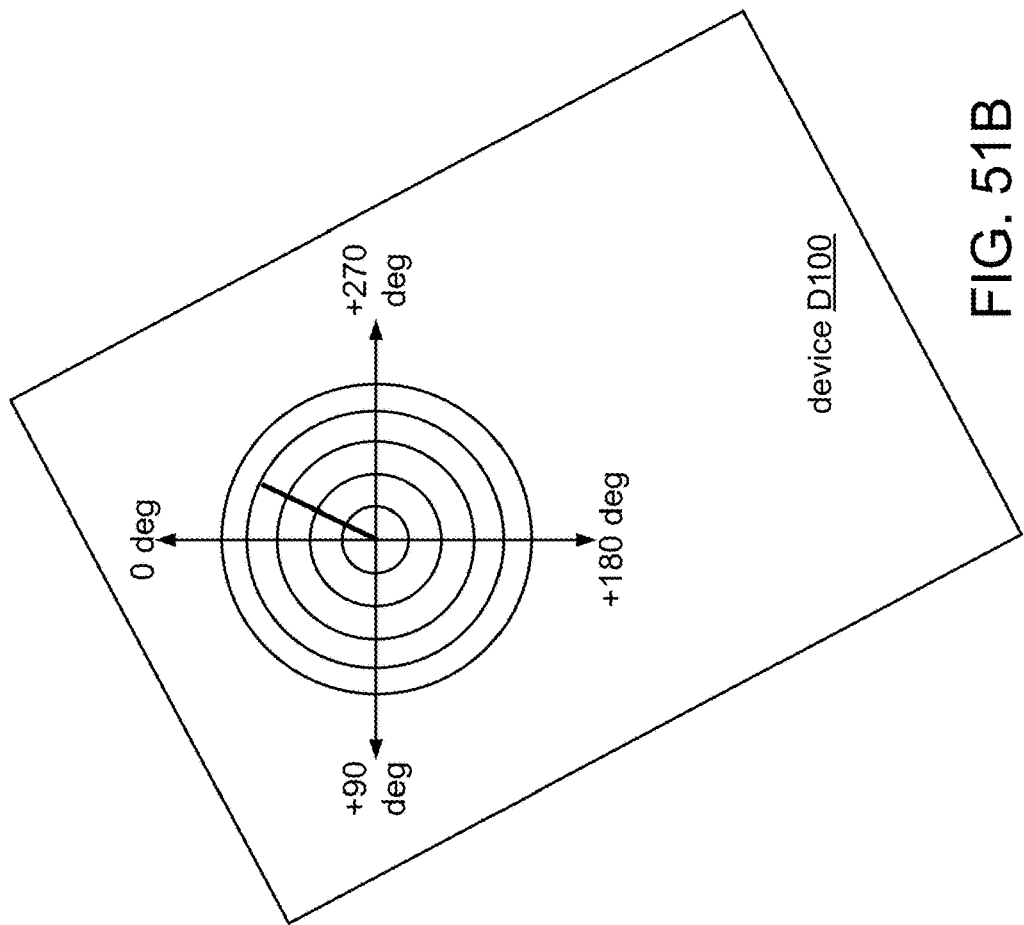
FIGS. 51A and 51B show other examples of a display before and after a rotation.
Figure 51A:
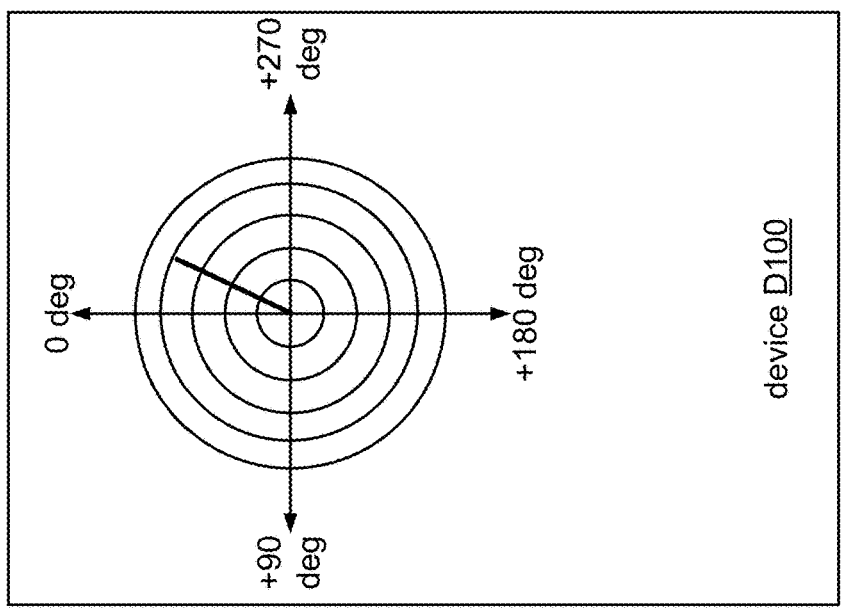

Alternatively, it may be desirable to implement task TB500 to display the projected DOA relative to an external reference direction, such that the direction as indicated remains constant as the device is rotated relative to a stationary source. FIGS. 51A and 51B show examples of such a display before and after such rotation, respectively.

To support such an implementation of task TB500, device D100 may be configured to include an orientation sensor (not shown) that indicates a current spatial orientation of the device with reference to an external reference direction, such as a gravitational axis (e.g., an axis that is normal to the earth's surface) or a magnetic axis (e.g., the earth's magnetic axis). The orientation sensor may include one or more inertial sensors, such as gyroscopes and/or accelerometers. A gyroscope uses principles of angular momentum to detect changes in orientation about an axis or about each of two or three (typically orthogonal) axes (e.g., changes in pitch, roll and/or twist). Examples of gyroscopes, which may be fabricated as micro-electromechanical systems (MEMS) devices, include vibratory gyroscopes. An accelerometer detects acceleration along an axis or along each of two or three (typically orthogonal) axes. An accelerometer may also be fabricated as a MEMS device. It is also possible to combine a gyroscope and an accelerometer into a single sensor. Additionally or alternatively, the orientation sensor may include one or more magnetic field sensors (e.g., magnetometers), which measure magnetic field strength along an axis or along each of two or three (typically orthogonal) axes. In one example, device D100 includes a magnetic field sensor that indicates a current orientation of the device relative to a magnetic axis (e.g., of the earth). In such case, task TB500 may be implemented to display the projected DOA on a grid that is rotated into alignment with that axis (e.g., as a compass).

FIG. 49C shows a flowchart of such an implementation M340 of method M330 that includes a task TB600 and an implementation TB510 of task TB500. Task TB600 determines an orientation of the audio sensing device with reference to an external reference axis (e.g., a gravitational or magnetic axis). Task TB510 displays the calculated projection based on the determined orientation.

Task TB500 may be implemented to display the DOA as the angle projected onto the array plane. For many portable audio sensing devices, the microphones used for DOA estimation will be located at the same surface of the device as the display (e.g., microphones ME10, MV10-1, and MV10-3 in FIG. 1) or much closer to that surface than to each other (e.g., microphones ME10, MR10, and MV10-3 in FIG. 1). The thickness of a tablet computer or smartphone, for example, is typically small relative to the dimensions of the display surface. In such cases, any error between the DOA as projected onto the array plane and the DOA as projected onto the display plane may be expected to be negligible, and it may be acceptable to configure task TB500 to display the DOA as projected onto the array plane.

For a case in which the display plane differs noticeably from the array plane, task TB500 may be implemented to project the estimated DOA from a plane defined by the axes of the microphone arrays into a plane of a display surface. For example, such an implementation of task TB500 may display a result of applying a projection matrix to the estimated DOA, where the projection matrix describes a projection from the array plane onto a surface plane of the display. Alternatively, task TB300 may be implemented to include such a projection.

As described above, the audio sensing device may include an orientation sensor that indicates a current spatial orientation of the device with reference to an external reference direction. It may be desirable to combine a DOA estimate as described herein with such orientation information to indicate the DOA estimate with reference to the external reference direction. FIG. 53B shows a flowchart of such an implementation M350 of method M300 that includes an instance of task TB600 and an implementation TB310 of task TB300. Method M350 may also be implemented to include an instance of display task TB500 as described herein.

Figure 52A:
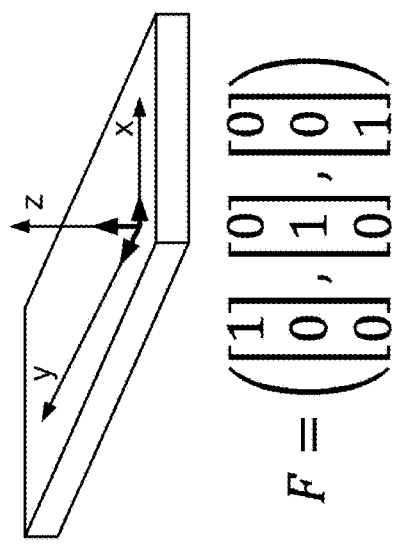
FIG. 52A shows an example in which a device coordinate system E is aligned with the world coordinate system.

FIG. 52A shows an example in which the device coordinate system E is aligned with the world coordinate system.

Figure 52B:
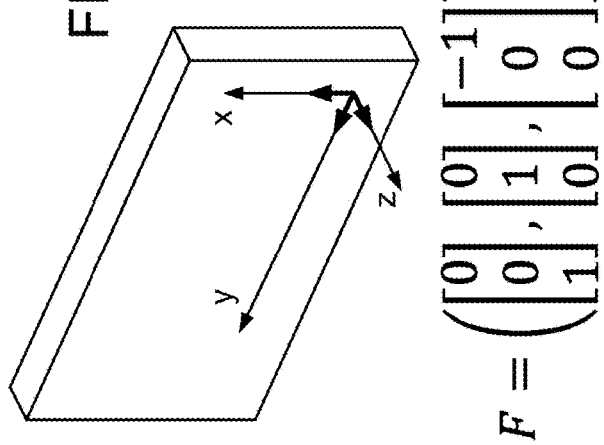
FIG. 52B shows an example in which a device is rotated and the matrix F that corresponds to an orientation.

FIG. 52A also shows a device orientation matrix F that corresponds to this orientation (e.g., as indicated by the orientation sensor). FIG. 52B shows an example in which the device is rotated (e.g., for use in browse-talk mode) and the matrix F (e.g., as indicated by the orientation sensor) that corresponds to this new orientation.

Task TB310 may be implemented to use the device orientation matrix F to project the DOA estimate into any plane that is defined with reference to the world coordinate system. In one such example, the DOA estimate is a vector g in the device coordinate system. In a first operation, vector g is converted into a vector h in the world coordinate system by an inner product with device orientation matrix F. Such a conversion may be performed, for example, according to an expression such as $\vec{h} = (\vec{g}^T E)^T F$. In a second operation, the vector h is projected into a plane P that is defined with reference to the world coordinate system by the projection $A(A^T A)^{-1} A^T \vec{h}$, where A is a basis matrix of the plane P in the world coordinate system.

Figure 52C:
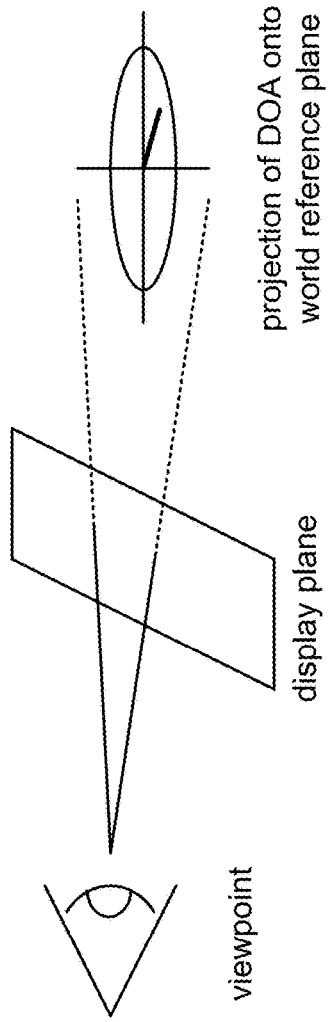
FIG. 52C shows a perspective mapping, onto a display plane of a device, of a projection of a DOA onto the world reference plane.

In a typical example, the plane P is parallel to the x-y plane of the world coordinate system (i.e., the "world reference plane"). FIG. 52C shows a perspective mapping, onto a display plane of the device, of a projection of a DOA onto the world reference plane as may be performed by task TB500, where the orientation of the display plane relative to the world reference plane is indicated by the device orientation matrix F. FIG. 53A shows an example of such a mapped display of the DOA as projected onto the world reference plane.

In another example, task TB310 is configured to project DOA estimate vector g into plane P using a less complex interpolation among component vectors of g that are projected into plane P. In this case, the projected DOA estimate vector $P_g$ may be calculated according to an expression such as $$P_g = \alpha g_{x-y(p)} + \beta g_{x-z(p)} + \gamma g_{y-z(p)},$$

where $[\vec{e}_x \ \vec{e}_y \ \vec{e}_z]$ denote the basis vectors of the device coordinate system; $g = g_x \vec{e}_x + g_y \vec{e}_y + g_z \vec{e}_z$; $\theta_\alpha$, $\theta_\beta$, $\theta_\gamma$ denote the angles between plane P and the planes spanned by $[\vec{e}_x \ \vec{e}_y]$, $[\vec{e}_x \ \vec{e}_z]$, $[\vec{e}_y \ \vec{e}_z]$, respectively, and $\alpha$, $\beta$, $\gamma$ denote their respective cosines ($\alpha^2 + \beta^2 + \gamma^2 = 1$); and $g_{x-y(p)}$, $g_{x-z(p)}$, $g_{y-z(p)}$ denote the projections into plane P of the component vectors $g_{x-y}$, $g_{x-z}$, $g_{y-z} = [g_x \vec{e}_x \ g_y \vec{e}_y \ 0]^T$, $[g_x \vec{e}_x \ 0 \ g_z \vec{e}_z]^T$, $[0 \ g_y \vec{e}_y \ g_z \vec{e}_z]^T$, respectively. The plane corresponding to the minimum among $\alpha$, $\beta$, and $\gamma$ is the plane that is closest to P, and an alternative implementation of task TB310 identifies this minimum and produces the corresponding one of the projected component vectors as an approximation of $P_g$.

It may be desirable to configure an audio sensing device to discriminate among source signals having different DOAs. For example, it may be desirable to configure the audio sensing device to perform a directionally selective filtering operation on the multichannel signal to pass directional components that arrive from directions within an angular pass range and/or to block or otherwise attenuate directional components that arrive from directions within an angular stop range.

Figure 54B:
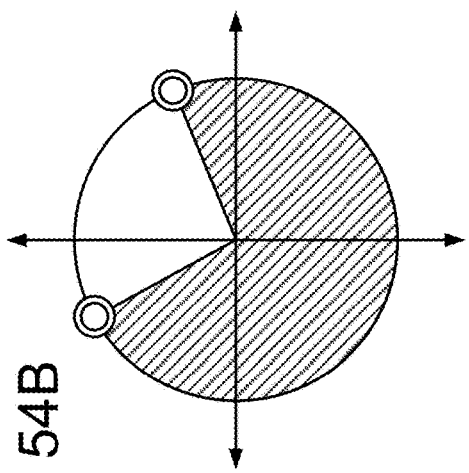
FIG. 54B illustrates another example of a user interface.

It may be desirable to use a display as described herein to support a graphical user interface to enable a user of an audio sensing device to configure a directionally selective processing operation (e.g., a beamforming operation as described herein). FIG. 54A shows an example of such a user interface, in which the unshaded portion of the circle indicates a range of directions to be passed and the shaded portion indicates a range of directions to be blocked. The circles indicate points on a touch screen that the user may slide around the periphery of the circle to change the selected range. The touch points may be linked such that moving one causes the other to move by an equal angle in the same angular direction or, alternatively, in the opposite angular direction. Alternatively, the touch points may be independently selectable (e.g., as shown in FIG. 54B). It is also possible to provide one or more additional pairs of touch points to support selection of more than one angular range (e.g., as shown in FIG. 54C).

Figure 54C:
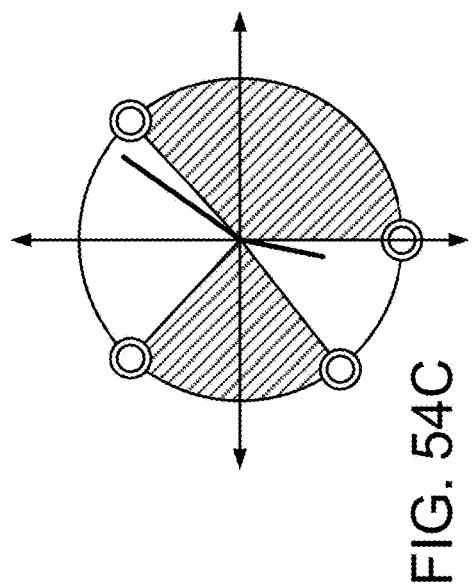
FIG. 54C illustrates another example of a user interface.
Figure 54A:
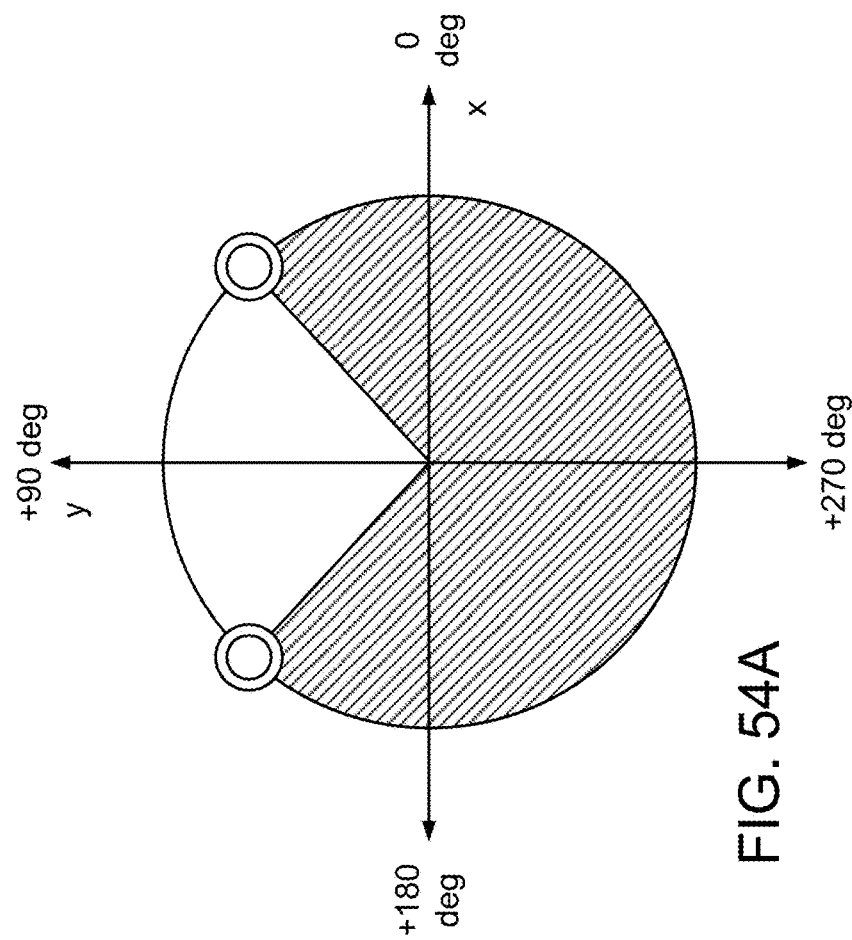
FIG. 54A illustrates one example of a user interface.

As alternatives to touch points as shown in FIGS. 54A-C, the user interface may include other physical or virtual selection interfaces (e.g., clickable or touchable icons on a screen) to obtain user input for selection of pass/stop band location and/or width. Examples of such interfaces include a linear slider potentiometer, a rocker switch (for binary input to indicate, e.g., up-down, left-right, clockwise/counter-clockwise), and a wheel or knob as shown in FIG. 53C.

Figure 55B:
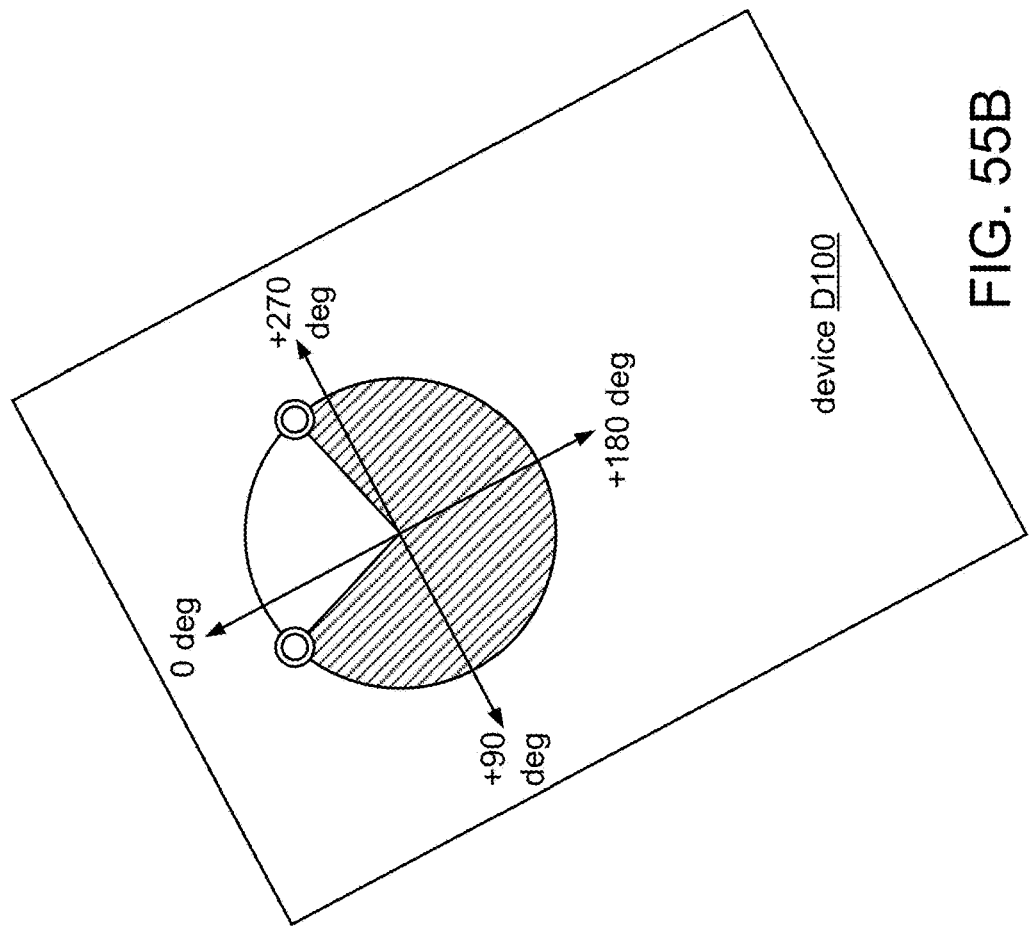
FIGS. 55A and 55B show a further example in which an orientation sensor is used to track an orientation of a device.
Figure 55A:
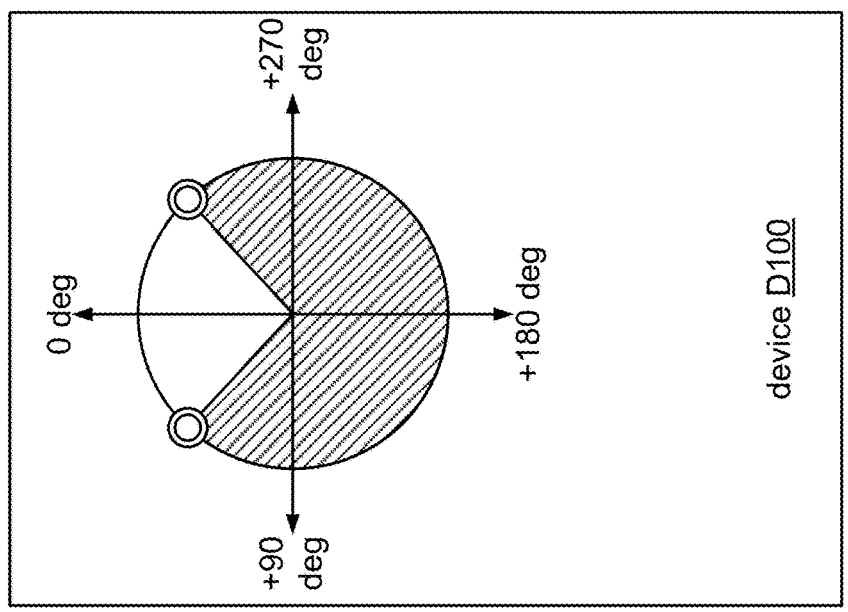

For use cases in which the audio sensing device is expected to remain stationary during use (e.g., the device is placed on a flat surface for speakerphone use), it may be sufficient to indicate a range of selected directions that is fixed relative to the device. If the orientation of the device relative to a desired source changes during use, however, components arriving from the direction of that source may no longer be admitted. FIGS. 55A and 55B show a further example in which an orientation sensor is used to track an orientation of the device. In this case, a directional displacement of the device (e.g., as indicated by the orientation sensor) is used to update the directional filtering configuration as selected by the user (and to update the corresponding display) such that the desired directional response may be maintained despite a change in orientation of the device.

It may be desirable for the array to include a number of microphones that is at least equal to the number of different source directions to be distinguished (e.g., the number of beams to be formed) at any one time. The microphones may be omnidirectional (e.g., as may be typical for a cellular telephone or a dedicated conferencing device) or directional (e.g., as may be typical for a device such as a set-top box).

The DOA estimation principles described herein may be used to support selection among multiple speakers. For example, location of multiple sources may be combined with a manual selection of a particular speaker (e.g., push a particular button, or touch a particular screen area, to select a particular corresponding speaker or active source direction) or automatic selection of a particular speaker (e.g., by speaker recognition). In one such application, an audio sensing device (e.g., a telephone) is configured to recognize the voice of its owner and to automatically select a direction corresponding to that voice in preference to the directions of other sources.

B. Systems and Methods for Mapping a Source Location

It should be noted that one or more of the functions, apparatuses, methods and/or algorithms described above may be implemented in accordance with the systems and methods disclosed herein. Some configurations of the systems and methods disclosed herein describe multi-modal sensor fusion for seamless audio processing. For instance, the systems and methods described herein enable projecting multiple DOA information from 3D sound sources captured by microphones into a physical 2D plane using sensor data and a set of microphones located on a 3D device, where the microphone signals may be selected based on the DOA information retrieved from the microphones that maximize the spatial resolution of sound sources in a 2D physical plane and where the sensor data provides a reference of the orientation of 3D device with respect to the physical 2D plane. There are many use cases that may benefit from the fusion of sensors such as an accelerometer, proximity sensor, etc., with multi-microphones. One example (e.g., "use case 1") may include a robust handset intelligent switch (IS). Another example (e.g., "use case 2") may include robust support for various speakerphone holding patterns. Another example (e.g., "use case 3") may include seamless speakerphone-handset holding pattern support. Yet another example (e.g., "use case 4") may include a multi-view visualization of active source and coordination passing.

Some configurations of the systems and methods disclosed herein may include at least one statistical model for discriminating desired use cases with pre-obtainable sensor data, if necessary. Available sensor data may be tracked along with multi-microphone data, and may be utilized for at least one of the use cases. Some configurations of the systems and methods disclosed herein may additionally or alternatively track sensor data along with other sensor data (e.g., camera data) for at least one use case.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. Features and/or elements depicted in a Figure may be combined with at least one features and/or elements depicted in at least one other Figures.

Figure 56:
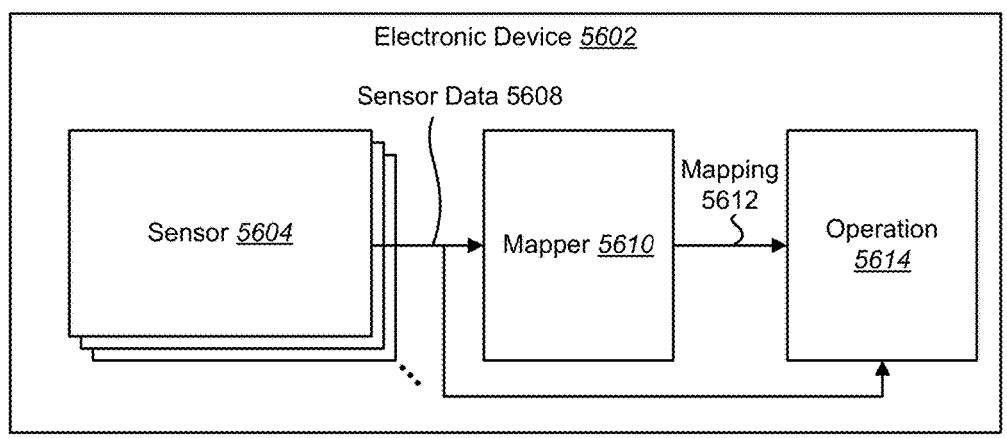
FIG. 56 is a block diagram illustrating one configuration of an electronic device in which systems and methods for mapping a source location may be implemented.

FIG. 56 is a block diagram illustrating one configuration of an electronic device 5602 in which systems and methods for mapping a source location may be implemented. The systems and methods disclosed herein may be applied to a variety of electronic devices 5602. Examples of electronic devices 5602 include cellular phones, smartphones, voice recorders, video cameras, audio players (e.g., Moving Picture Experts Group-1 (MPEG-1) or MPEG-2 Audio Layer 3 (MP3) players), video players, audio recorders, desktop computers, laptop computers, personal digital assistants (PDAs), gaming systems, etc. One kind of electronic device 5602 is a communication device, which may communicate with another device. Examples of communication devices include telephones, laptop computers, desktop computers, cellular phones, smartphones, wireless or wired modems, e-readers, tablet devices, gaming systems, cellular telephone base stations or nodes, access points, wireless gateways and wireless routers, etc.

An electronic device 5602 (e.g., communication device) may operate in accordance with certain industry standards, such as International Telecommunication Union (ITU) standards and/or Institute of Electrical and Electronics Engineers (IEEE) standards (e.g., 802.11 Wireless Fidelity or "Wi-Fi" standards such as 802.11a, 802.11b, 802.11g, 802.11n, 802.11ac, etc.). Other examples of standards that a communication device may comply with include IEEE 802.16 (e.g., Worldwide Interoperability for Microwave Access or "WiMAX"), 3GPP, 3GPP LTE, 3rd Generation Partnership Project 2 (3GPP2), GSM and others (where a communication device may be referred to as a User Equipment (UE), NodeB, evolved NodeB (eNB), mobile device, mobile station, subscriber station, remote station, access terminal, mobile terminal, terminal, user terminal and/or subscriber unit, etc., for example). While some of the systems and methods disclosed herein may be described in terms of at least one standard, this should not limit the scope of the disclosure, as the systems and methods may be applicable to many systems and/or standards.

The electronic device 5602 may include at least one sensor 5604, a mapper 5610 and/or an operation block/module 5614. As used herein, the phrase "block/module" indicates that a particular component may be implemented in hardware (e.g., circuitry), software or a combination of both. For example, the operation block/module 5614 may be implemented with hardware components such as circuitry and/or software components such as instructions or code, etc. Additionally, one or more of the components or elements of the electronic device 5602 may be implemented in hardware (e.g., circuitry), software, firmware or any combination thereof. For example, the mapper 5610 may be implemented in circuitry (e.g., in an Application-Specific Integrated Circuit (ASIC), a Field-Programmable Gate Array (FPGA) and/or one or more processors, etc.).

The at least one sensor 5604 may collect data relating to the electronic device 5602. The at least one sensor 5604 may be included in and/or coupled to the electronic device 5602. Examples of sensors 5604 include microphones, accelerometers, gyroscopes, compasses, infrared sensors, tilt sensors, global positioning system (GPS) receivers, proximity sensors, cameras, ultrasound sensors, etc. In some implementations, the at least one sensor 5604 may provide sensor data 5608 to the mapper 5610. Examples of sensor data 5608 include audio signals, accelerometer readings, gyroscope readings, position information, orientation information, location information, proximity information (e.g., whether an object is detected close to the electronic device 5602), images, etc.

In some configurations (described in greater detail below), the mapper 5610 may use the sensor data 5608 to improve audio processing. For example, a user may hold the electronic device 5602 (e.g., a phone) in different orientations for speakerphone usage (e.g., portrait, landscape or even desktop hands-free). Depending on the holding pattern (e.g., the electronic device 5602 orientation), the electronic device 5602 may select appropriate microphone configurations (including a single microphone configuration) to improve spatial audio processing. By adding accelerometer/proximity sensor data 5608, the electronic device 5602 may make the switch seamlessly.

The sensors 5604 (e.g., a multiple microphones) may receive one or more audio signals (e.g., a multi-channel audio signal). In some implementations, microphones may be located at various locations of the electronic device 5602, depending on the configuration. For example, microphones may be positioned on the front, sides and/or back of the electronic device 5602 as illustrated above in FIG. 1. Additionally or alternatively, microphones may be positioned near the top and/or bottom of the electronic device 5602. In some cases, the microphones may be configured to be disabled (e.g., not receive an audio signal). For example, the electronic device 5602 may include circuitry that disables at least one microphone in some cases. In some implementations, one or more microphones may be disabled based on the electronic device 5602 orientation. For example, if the electronic device 5602 is in a horizontal face-up orientation on a surface (e.g., a tabletop mode), the electronic device 5602 may disable at least one microphone located on the back of the electronic device 5602. Similarly, if the electronic device 5602 orientation changes (by a large amount for example), the electronic device 5602 may disable at least one microphone.

A few examples of various microphone configurations are given as follows. In one example, the electronic device 5602 may be designed to use a dual-microphone configuration when possible. Unless the user holds the electronic device 5602 (e.g., phone) in such a way that a normal vector to the display is parallel, or nearly parallel with the ground (e.g., the electronic device 5602 appears to be vertically oriented (which can be determined based on sensor data 5608)), the electronic device 5602 may use a dual-microphone configuration in a category A configuration. In some implementations, in the category A configuration, the electronic device 5602 may include a dual microphone configuration where one microphone may be located near the back-top of the electronic device 5602, and the other microphone may be located near the front-bottom of the electronic device 5602. In this configuration, the electronic device 5602 may be capable of discriminating audio signal sources (e.g., determining the direction of arrival of the audio signals) in a plane that contains a line formed by the locations of the microphones. Based on this configuration, the electronic device 5602 may be capable of discriminating audio signal sources in 180 degrees. Accordingly, the direction of arrival of the audio signals that arrive within the 180 degree span may be discriminated based on the two microphones in the category A configuration. For example, an audio signal received from the left, and an audio signal received from the right of the display of the electronic device 5602 may be discerned. The directionality of one or more audio signals may be determined as described in section A above in some configurations.

In another example, unless the user holds the electronic device 5602 (e.g., phone) in such a way that a normal vector to the display is perpendicular, or nearly perpendicular with the ground (e.g., the electronic device 5602 appears to be horizontally oriented (which can be informed by sensor data 5608)), the electronic device 5602 may use a dual-microphone configuration, with a category B configuration. In this configuration, the electronic device 5602 may include a dual microphone configuration where one microphone may be located near the back-bottom of the electronic device 5602, and the other microphone may be located near the front-bottom of the electronic device 5602. In some implementations, in the category B configuration, one microphone may be located near the back-top of the electronic device 5602, and the other microphone may be located near the front top of the electronic device 5602.

In the category B configuration, audio signals may be discriminated (e.g., the direction of arrival of the audio signals may be determined) in a plane that contains a line formed by the locations of the microphones. Based on this configuration, there may be 180 degree audio source discrimination. Accordingly, the direction of arrival of the audio signals that arrive within the 180 degree span may be discriminated based on the two microphones in the category B configuration. For example, an audio signal received from the top, and an audio signal received from the bottom of the display of the electronic device 5602 may be discerned. However, two audio signals that are on the left or right of the display of the electronic device 5602 may not be discerned. It should be noted that if the electronic device orientation 102 were changed, such that the electronic device 5602 were vertically oriented, instead of horizontally oriented, the audio signals from the left and right of the display of the electronic device may be discerned. For a three-microphone configuration, category C, the electronic device 5602 may use a front-back pair of microphones for the vertical orientations and may use a top-bottom pair of microphones for horizontal orientations. Using a configuration as in category C, the electronic device 5602 may be capable of discriminating audio signal sources (e.g., discriminating the direction of arrival from different audio signals) in 360 degrees.

The mapper 5610 may determine a mapping 5612 of a source location to electronic device 5602 coordinates and from the electronic device 5602 coordinates to physical coordinates (e.g., a two-dimensional plane corresponding to real-world or earth coordinates) based on the sensor data 5608. The mapping 5612 may include data that indicates mappings (e.g., projections) of a source location to electronic device coordinates and/or to physical coordinates. For example, the mapper 5610 may implement at least one algorithm to map the source location to physical coordinates. In some implementations, the physical coordinates may be two-dimensional physical coordinates. For example, the mapper 5610 may use sensor data 5608 from the at least one sensor 5604 (e.g., integrated accelerometer, proximity and microphone data) to determine an electronic device 5602 orientation (e.g., holding pattern) and to direct the electronic device 5602 to perform an operation (e.g., display a source location, switch microphone configurations and/or configure noise suppression settings).

The mapper 5610 may detect change in electronic device 5602 orientation. In some implementations, electronic device 5602 (e.g., phone) movements may be detected through the sensor 5604 (e.g., an accelerometer and/or a proximity sensor). The mapper 5610 may utilize these movements, and the electronic device 5602 may adjust microphone configurations and/or noise suppression settings based on the extent of rotation. For example, the mapper 5610 may receive sensor data 5608 from the at least one sensor 5604 that indicates that the electronic device 5602 has changed from a horizontal orientation, (e.g., a tabletop mode) to a vertical orientation (e.g., a browse-talk mode). In some implementations, the mapper 5610 may indicate that an electronic device 5602 (e.g., a wireless communication device) has changed orientation from a handset mode (e.g., the side of a user's head) to a browse-talk mode (e.g., in front of a user at eye-level).

The electronic device may also include an operation block/module 5614 that performs at least one operation based on the mapping 5612. For example, the operation block/module 5614 may be coupled to the at least one microphone and may switch the microphone configuration based on the mapping 5612. For example, if the mapping 5612 indicates that the electronic device 5602 has changed from a vertical orientation (e.g., a browse-talk mode) to a horizontal face-up orientation on a flat surface (e.g., a tabletop mode), the operation block/module 5614 may disable at least one microphone located on the back of the electronic device. Similarly, as will be described below, the operation block/module 5614 may switch from a multi-microphone configuration to a single microphone configuration. Other examples of operations include tracking a source in two or three dimensions, projecting a source into a three-dimensional display space and performing non-stationary noise suppression.

Figure 57:
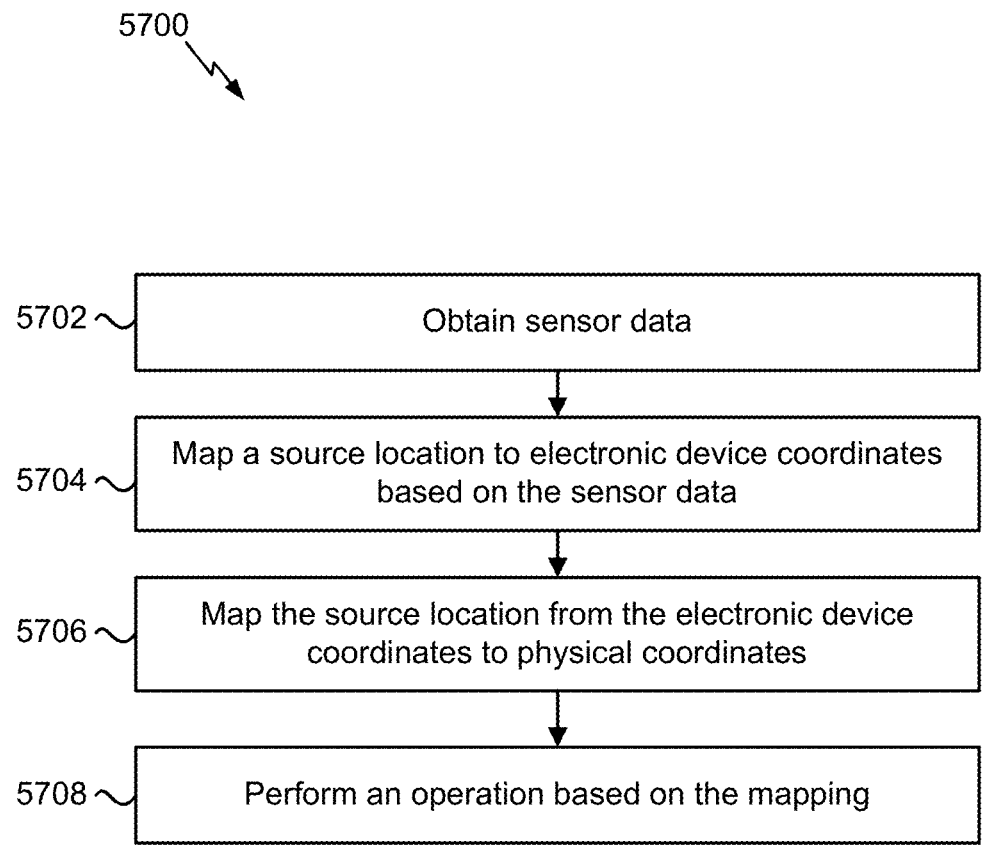
FIG. 57 is a flow diagram illustrating one configuration of a method for mapping a source location.

FIG. 57 is a flow diagram illustrating one configuration of a method 5700 for mapping electronic device 5602 coordinates. The method 5700 may be performed by the electronic device 5602. The electronic device 5602 may obtain 5702 sensor data 5608. At least one sensor 5604 coupled to the electronic device 5602 may provide sensor data 5608 to the electronic device 5602. Examples of sensor data 5608 include audio signal(s) (from one or more microphones, for example), accelerometer readings, position information, orientation information, location information, proximity information (e.g., whether an object is detected close to the electronic device 5602), images, etc. In some implementations, the electronic device 5602 may obtain 5702 the sensor data 5608 (e.g., the accelerometer x-y-z coordinate) using pre-acquired data for each designated electronic device 5602 orientation (e.g., holding pattern) and corresponding microphone identification.

The electronic device 5602 may map 5704 a source location to electronic device coordinates based on the sensor data. This may be accomplished as described above in connection with one or more of FIGS. 41-48. For example, the electronic device 5602 may estimate a direction of arrival (DOA) of a source relative to electronic device coordinates based on a multichannel signal (e.g., multiple audio signals from two or more microphones). In some approaches, mapping 5704 the source location to electronic device coordinates may include projecting the direction of arrival onto a plane (e.g., projection plane and/or array plane, etc.) as described above. In some configurations, the electronic device coordinates may be a microphone array plane corresponding to the device. In other configurations, the electronic device coordinates may be another coordinate system corresponding to the electronic device 5602 that a source location (e.g., DOA) may be mapped to (e.g., translated and/or rotated) by the electronic device 5602.

The electronic device 5602 may map 5706 the source location from the electronic device coordinates to physical coordinates (e.g., two-dimensional physical coordinates). This may be accomplished as described above in connection with one or more of FIGS. 49-53. For example, the electronic device may utilize an orientation matrix to project the DOA estimate into a plane that is defined with reference to the world (or earth) coordinate system.

In some configurations, the mapper 5610 included in the electronic device 5602 may implement at least one algorithm to map 5704 the source location to electronic device coordinates and to map 5706 the source location from the electronic device coordinates the electronic device 5602 coordinates to physical coordinates. In some configurations, the mapping 5612 may be applied to a "3D audio map." For example, in some configurations, a compass (e.g., a sensor 5604) may provide compass data (e.g., sensor data 5608) to the mapper 5610. In this example, the electronic device 5602 may obtain a sound distribution map in a four pi direction (e.g., a sphere) translated into physical (e.g., real world or earth) coordinates. This may allow the electronic device 5602 to describe a three-dimensional audio space. This kind of elevation information may be utilized to reproduce elevated sound via a loudspeaker located in an elevated position (as in a 22.2 surround system, for example).

In some implementations, mapping 5706 the source location from the electronic device coordinates to physical coordinates may include detecting an electronic device 5602 orientation and/or detecting any change in an electronic device 5602 orientation. For example, the mapper 5610 may use sensor data 5608 from the at least one sensor 5604 (e.g., integrated accelerometer, proximity and microphone data) to determine an electronic device 5602 orientation (e.g., holding pattern). Similarly, the mapper 5610 may receive sensor data 5608 from the at least one sensor 5604 that indicates that the electronic device 5602 has changed from a horizontal orientation (e.g., a tabletop mode) to a vertical orientation (e.g., a browse-talk mode).

The electronic device 5602 may perform 5708 an operation based on the mapping 5612. For example, the electronic device 5602 may perform 5708 at least one operation based on the electronic device 5602 orientation (e.g., as indicated by the mapping 5612). Similarly, the electronic device 5602 may perform 5708 an operation based on a detected change in the electronic device 5602 orientation (e.g., as indicated by the mapping 5612). Specific examples of operations include switching the electronic device 5602 microphone configuration, tracking an audio source (in two or three dimensions, for instance), mapping a source location from physical coordinates into a three-dimensional display space, non-stationary noise suppression, filtering, displaying images based on audio signals, etc.

An example of mapping 5706 the source location from the electronic device coordinates to physical coordinates is given as follows. According to this example, the electronic device 5602 (e.g., the mapper 5610) may monitor the sensor data 5608 (e.g., accelerometer coordinate data), smooth the sensor data 5608 (simple recursive weighting or Kalman smoothing), and the operation block/module 5614 may perform an operation based on the mapping 5612 (e.g., mapping or projecting the audio signal source).

The electronic device 5602 may obtain a three-dimensional (3D) space defined by x-y-z basis vectors E=($\vec{e}_x$, $\vec{e}_y$, $\vec{e}_z$) in a coordinate system given by a form factor (e.g. FLUID) (by using a gyro sensor for example). The electronic device 5602 may also specify the basis vector E'=($\vec{e}_{x'}$, $\vec{e}_{y'}$, $\vec{e}_{z'}$) in the physical (e.g., real word) coordinate system based on the x-y-z position sensor data 5608. The electronic device 5602 may then obtain A=($\vec{e}_{x''}$, $\vec{e}_{y''}$), which is a basis vector space to obtain any two-dimensional plane in the coordinate system. Given the search grid $\vec{g}$=(x, y, z), the electronic device 5602 may project the basis vector space down to the plane (x", y") by taking the first two elements of the projection operation defined by taking the first two elements (x", y"), where (x", y")=$A(A^T A)^{-1} A^T(\vec{g} \cdot E')$.

For example, assuming that a device (e.g., phone) is held in browse-talk mode, then E=($[1\ 0\ 0]^T$, $[0\ 1\ 0]^T$, $[0\ 0\ 1]^T$) and E'=($[0\ 0\ 1]^T$, $[0\ 1\ 0]^T$, $[1\ 0\ 0]^T$). Then, $\vec{g}=[0\ 0\ 1]^T$ in a device (e.g., phone) coordinate system and $(\vec{g}^T E)^T E'=[1\ 0\ 0]^T$. In order to project it down to A=($[1\ 0\ 0]^T$, $[0\ 1\ 0]^T$), which is the real x-y plane (e.g., physical coordinates), $(A(A^T A)^{-1} A^T ((\vec{g}^T E)^T E')=[1\ 0\ 0]^T$. It should be noted that the first two elements $[1\ 0]^T$ may be taken after the projection operation. Accordingly, $\vec{g}$ in E may now be projected onto A as $[1\ 0]^T$. Thus, $[0\ 0\ 1]^T$ with a browse-talk mode in device (e.g., phone) x-y-z geometry corresponds to $[1\ 0]^T$ for the real world x-y plane.

For a less complex approximation for projection, the electronic device 5602 may apply a simple interpolation scheme among three set representations defined as P(x', y')=$\alpha P_{x-y}$(x', y')+$\beta P_{x-z}$(x', y')+$\gamma P_{y-z}$(x', y'), where $\alpha+\beta+\gamma=1$ and that is a function of the angle between the real x-y plane and each set plane. Alternatively, the electronic device 5602 may use the representation given by P(x', y')=min($P_{x-y(x',y')}$, $P_{x-z(z',y')}$, $P_{y-z(x',y')}$). In the example of mapping, a coordinate change portion is illustrated before the projection operation.

Additionally or alternatively, performing 5708 an operation may include mapping the source location from physical coordinates into a three-dimensional display space. This may be accomplished as described in connection with one or more of FIGS. 52-53. Additional examples are provided below. For instance, the electronic device 5602 may render a sound source representation corresponding to the source location in a three-dimensional display space. In some configurations, the electronic device 5602 may render a plot (e.g., polar plot, rectangular plot) that includes the sound source representation on a two-dimensional plane corresponding to physical coordinates in the three-dimensional display space, where the plane is rendered based on the device orientation. In this way, performing 5708 the operation may include maintaining a source orientation in the three-dimensional display space regardless of the device orientation (e.g., rotation, tilt, pitch, yaw, roll, etc.). For instance, the plot will be aligned with physical coordinates regardless of how the device is oriented. In other words, the electronic device 5602 may compensate for device orientation changes in order to maintain the orientation of the plot in relation to physical coordinates. In some configurations, displaying the three-dimensional display space may include projecting the three-dimensional display space onto a two-dimensional display (for display on a two-dimensional pixel grid, for example).

Figure 58:
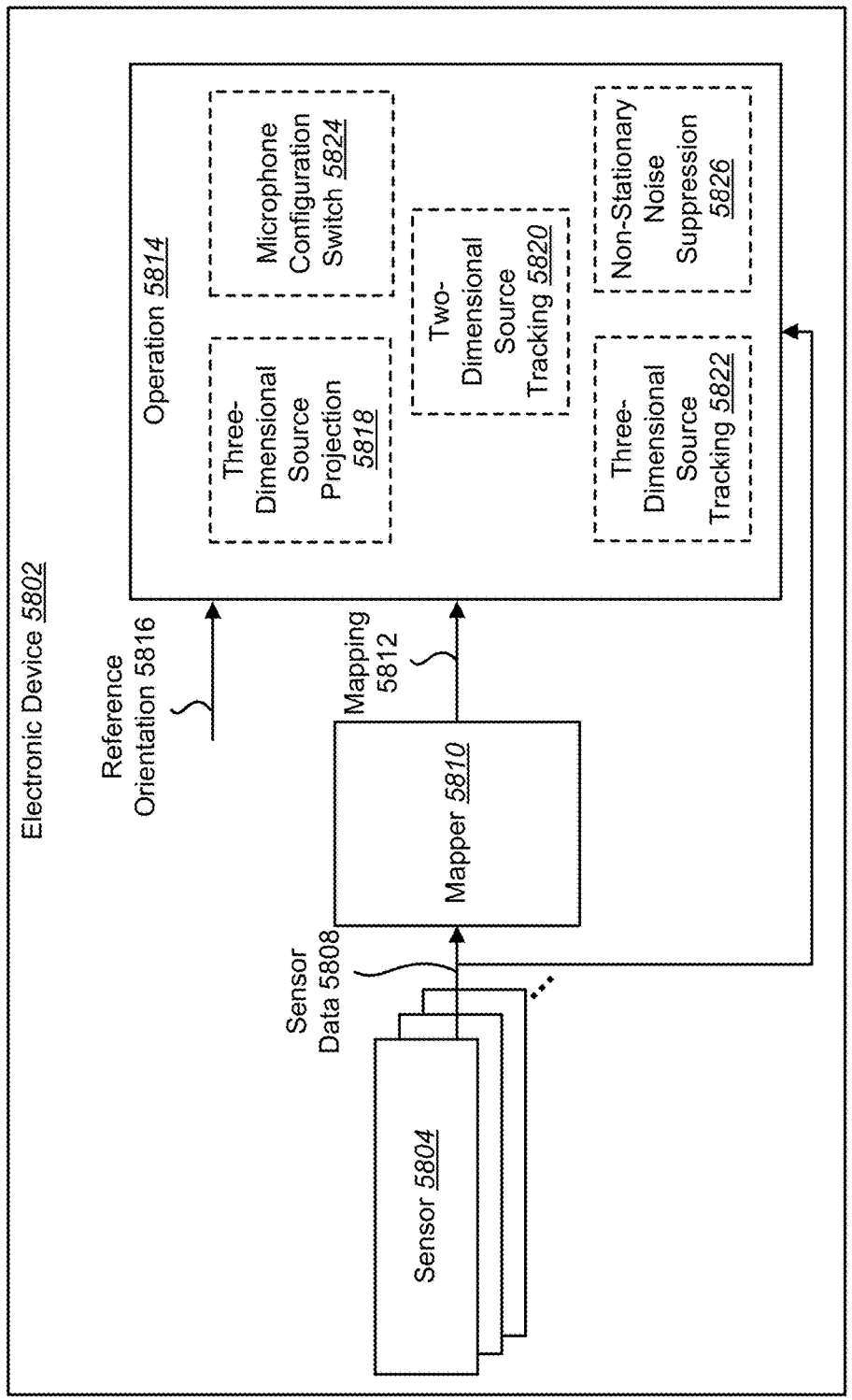
FIG. 58 is a block diagram illustrating a more specific configuration of an electronic device in which systems and methods for mapping a source location may be implemented.

FIG. 58 is a block diagram illustrating a more specific configuration of an electronic device 5802 in which systems and methods for mapping electronic device 5802 coordinates may be implemented. The electronic device 5802 may be an example of the electronic device 5602 described in connection with FIG. 56. The electronic device 5802 may include at least one sensor 5804, at least one microphone, a mapper 5810 and an operation block/module 5814 that may be examples of corresponding elements described in connection with FIG. 56. In some implementations, the at least one sensor 5804 may provide sensor data 5808, that may be an example of the sensor data 5608 described in connection with FIG. 56, to the mapper 5810.

The operation block/module 5814 may receive a reference orientation 5816. In some implementations, the reference orientation 5816 may be stored in memory that is included in and/or coupled to the electronic device 5802. The reference orientation 5816 may indicate a reference electronic device 5602 orientation. For example, the reference orientation 5816 may indicate an optimal electronic device 5602 orientation (e.g., an optimal holding pattern). The optimal electronic device 5602 orientation may correspond to an orientation where a dual microphone configuration may be implemented. For example, the reference orientation 5816 may be the orientation where the electronic device 5602 is positioned between a vertical orientation and a horizontal orientation. In some implementations, electronic device 5602 (e.g., phone) orientations that are horizontal and vertical are non-typical holding patterns (e.g., not optimal electronic device 5602 orientations). These positions (e.g., vertical and/or horizontal) may be identified using sensors 5804 (e.g., accelerometers). In some implementations, the intermediate positions (which may include the reference orientation 5816) may be positions for endfire dual microphone noise suppression. By comparison, the horizontal and/or vertical orientations may be handled by broadside/single microphone noise suppression.

In some implementations, the operation block/module 5814 may include a three-dimensional source projection block/module 5818, a two-dimensional source tracking block/module 5820, a three-dimensional source tracking block/module 5822, a microphone configuration switch 5824 and/or a non-stationary noise suppression block/module 5826.

The three-dimensional source tracking block/module 5822 may track an audio signal source in three dimensions.

For example, as the audio signal source moves relative to the electronic device 5602, or as the electronic device 5602 moves relative to the audio signal source, the three-dimensional source tracking block/module 5822 may track the location of the audio signal source relative to the electronic device 5802 in three dimensions. In some implementations, the three-dimensional source tracking block/module 5822 may track an audio signal source based on the mapping 5812. In other words, the three-dimensional source tracking block/module 5822 may determine the location of the audio signal source relative to the electronic device based on the electronic device 5802 orientation as indicated in the mapping 5812. In some implementations, the three-dimensional source projection block/module 5818 may project the source (e.g., the source tracked in three dimensions) into two-dimensional space. For example, the three-dimensional source projection block/module 5818 may use at least one algorithm to project a source tracked in three dimensions to a display in two dimensions.

In this implementation, the two-dimensional source tracking block/module 5820 may track the source in two dimensions. For example, as the audio signal source moves relative to the electronic device 5602, or as the electronic device 5602 moves relative to the audio signal source, the two-dimensional source tracking block/module 5820 may track the location of the audio signal source relative to the electronic device 5802 in two dimensions. In some implementations, the two-dimensional source tracking block/module 5820 may track an audio signal source based on the mapping 5812. In other words, the two-dimensional source tracking block/module 5820 may determine the location of the audio signal source relative to the electronic device based on the electronic device 5802 orientation as indicated in the mapping 5812.

The microphone configuration switch 5824 may switch the electronic device 5802 microphone configuration. For example, the microphone configuration switch 5824 may enable/disable at least one of the microphones. In some implementations, the microphone configuration switch 5824 may switch the microphone configuration 306 based on the mapping 5812 and/or the reference orientation 5816. For example, when the mapping 5812 indicates that the electronic device 5802 is horizontal face-up on a flat surface (e.g., a tabletop mode), the microphone configuration switch 5824 may disable at least one microphone located on the back of the electronic device 5802. Similarly, when the mapping 5812 indicates that the electronic device 5802 orientation is different (by a certain amount for example) from the reference orientation 5816, the microphone configuration switch 5824 may switch from a multi-microphone configuration (e.g., a dual-microphone configuration) to a single microphone configuration.

Additionally or alternatively, the non-stationary noise-suppression block/module 326 may perform non-stationary noise suppression based on the mapping 5812. In some implementations, the non-stationary noise suppression block/module 5826 may perform the non-stationary noise suppression independent of the electronic device 5802 orientation. For example, non-stationary noise suppression may include spatial processing such as beam-null forming and/or directional masking, which are discussed above.

Figure 59:
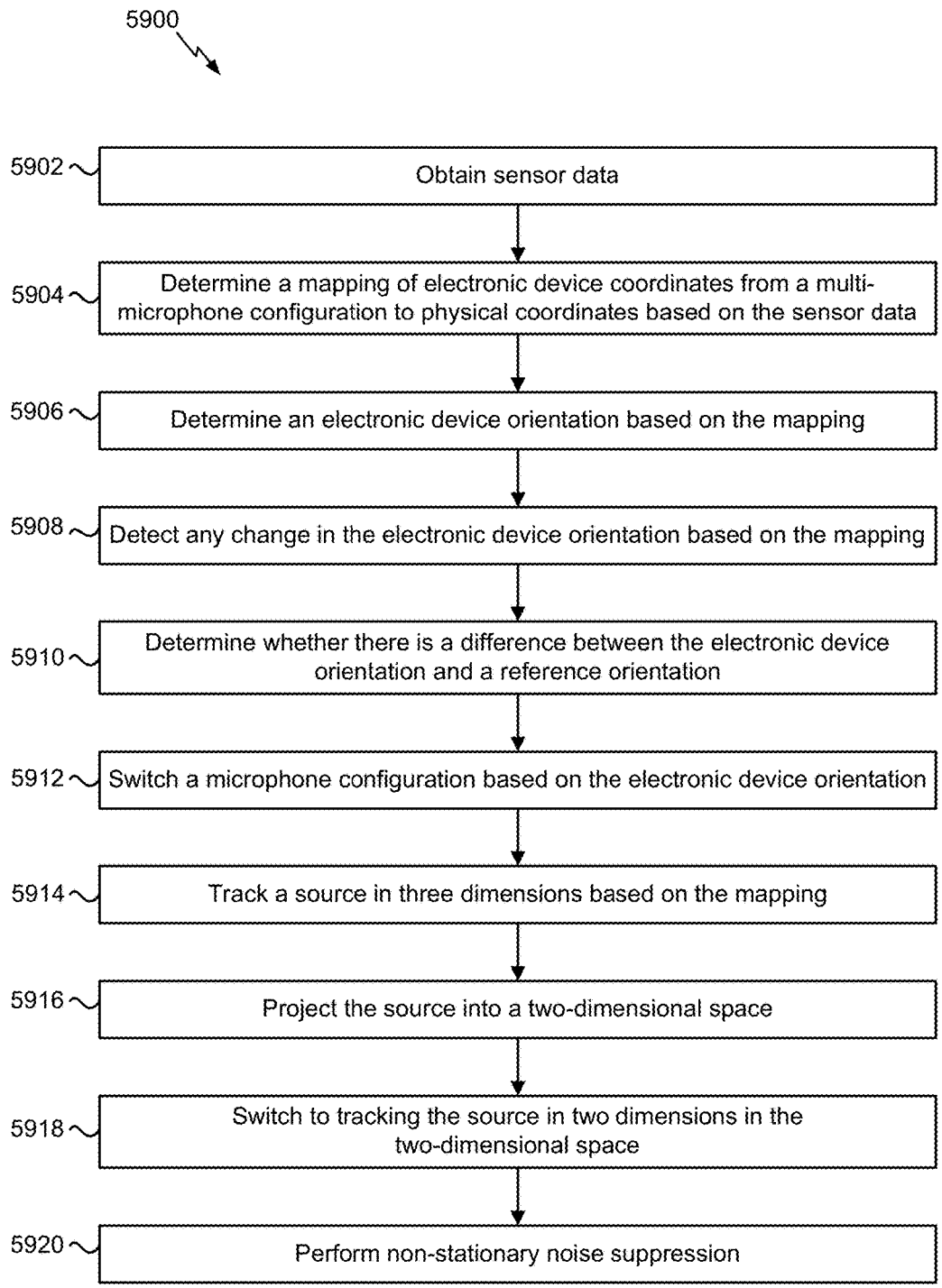
FIG. 59 is a flow diagram illustrating a more specific configuration of a method for mapping a source location.

FIG. 59 is a flow diagram illustrating a more specific configuration of a method 5900 for mapping electronic device 5802 coordinates. The method 5900 may be performed by the electronic device 5802. The electronic device 5802 may obtain 5902 sensor data 5808. In some implementations, this may be done as described in connection with FIG. 57.

The electronic device 5802 may determine 5904 a mapping 5812 of electronic device 5802 coordinates from a multi-microphone configuration to physical coordinates based on the sensor data 5808. In some implementations, this may be done as described in connection with FIG. 57.

The electronic device 5802 may determine 5906 an electronic device orientation based on the mapping 5812. For example, the mapper 5810 may receive sensor data 5808 from a sensor 5804 (e.g., an accelerometer). In this example, the mapper 5810 may use the sensor data 5808 to determine the electronic device 5802 orientation. In some implementations, the electronic device 5802 orientation may be based on a reference plane. For example, the electronic device 5802 may use polar coordinates to define an electronic device 5802 orientation. As will be described below, the electronic device 5802 may perform at least one operation based on the electronic device 5802 orientation.

In some implementations, the electronic device 5802 may provide a real-time source activity map to the user. In this example, the electronic device 5802 may determine 5906 an electronic device 5802 orientation (e.g., a user's holding pattern) by utilizing a sensor 5804 (e.g., an accelerometer and/or gyroscope). A variance of likelihood (directionality) may be given by a two-dimensional (2D) anglogram (or polar plot) per each electronic device 5802 orientation (e.g., holding pattern). In some cases, the variance may become significantly large (omni-directional) if the electronic device 5802 faces the plane made by two pairs orthogonally.

In some implementations, the electronic device 5802 may detect 5908 any change in the electronic device 5802 orientation based on the mapping 5812. For example, the mapper 5810 may monitor the electronic device 5802 orientation over time. In this example, the electronic device 5802 may detect 5908 any change in the electronic device 5802 orientation. For example, the mapper 5810 may indicate that an electronic device 5802 (e.g., a wireless communication device) has changed orientation from a handset mode (e.g., the side of a user's head) to a browse-talk mode (e.g., in front of a user at eye-level). As will be described below, the electronic device 5802 may perform at least one operation based on any change to the electronic device 5802 orientation.

Optionally, the electronic device 5802 (e.g., operation block/module 5814) may determine 5910 whether there is a difference between the electronic device 5802 orientation and the reference orientation 5816. For example, the electronic device 5802 may receive a mapping 5812 that indicates the electronic device 5802 orientation. The electronic device 5802 may also receive a reference orientation 5816. If the electronic device 5802 orientation and the reference orientation 5816 are not the same the electronic device 5802 may determine that there is a difference between the electronic device 5802 orientation and the reference orientation 5816. As will be described below, the electronic device 5802 may perform at least one operation based on the difference between the electronic device 5802 orientation and the reference orientation 5816. In some implementations, determining 5910 whether there is a difference between the electronic device 5802 orientation and the reference orientation 5816 may include determining whether any difference is greater than a threshold amount. In this example, the electronic device 5802 may perform an operation based on the difference when the difference is greater than the threshold amount.

In some implementations, the electronic device 5802 may switch 5912 a microphone configuration based on the electronic device 5802 orientation. For example, the electronic device 5802 may select microphone signals based on DOA information that maximize the spatial resolution of one or more sound sources in physical coordinates (e.g., a 2D physical plane). Switching 5912 a microphone configuration may include enabling/disabling microphones that are located at various locations on the electronic device 5802.

Switching 5912 a microphone configuration may be based on the mapping 5812 and/or reference orientation 5816. In some configurations, switching 5912 between different microphone configurations may be performed, but often, as in the case of switching 5912 from a dual microphone configuration to a single microphone configuration, may include a certain systematic delay. For example, the systematic delay may be around three seconds when there is an abrupt change of the electronic device 5802 orientation. By basing the switch 5912 on the mapping 5812 (e.g., and the sensor data 5808), switching 5912 from a dual microphone configuration to a single microphone configuration may be made seamlessly. In some implementations, switching 5912 a microphone configuration based on the mapping 5812 and/or the reference orientation 5816 may include switching 5912 a microphone configuration based on at least one of the electronic device 5802 orientation, any change in the electronic device 5802 orientation and any difference between the electronic device 5802 orientation and the reference orientation 5816.

A few examples of switching 5912 a microphone configuration are given as follows. In one example, the electronic device 5802 may be in the reference orientation 5816 (e.g., an optimal holding pattern). In this example, the electronic device 5802 may learn the sensor data 5808 (e.g., the accelerometer x-y-z coordinates). This may be based on a simple weighted average (e.g., alpha*history+ (1−alpha)*current) or more sophisticated Kalman smoothing, for example. If the electronic device 5802 determines 5910 there is a significantly large difference from the tracked accelerometer statistic and the reference orientation 5816, the electronic device 5802 may switch 5912 from a multiple microphone configuration to a single microphone configuration.

In another example, suppose that a user changes posture (e.g., from sitting on a chair to lying down on a bed). If the user holds the electronic device 5802 (e.g., phone) in an acceptable holding pattern (e.g., the electronic device 5802 is in the reference orientation 5816), the electronic device 5802 may continue to be in a multiple microphone configuration, (e.g., a dual microphone configuration), and learn the accelerometer coordinate (e.g., obtain 5902 the sensor data 5808). Furthermore, the electronic device 5802 may detect a user's posture while they are in a phone conversation, for example, by detecting the electronic device 5802 orientation. Suppose that a user does not speak while he/she moves the electronic device 5802 (e.g., phone) away from the mouth. In this case, the electronic device 5802 may switch 5912 from a multiple microphone configuration to a single microphone configuration and the electronic device 5802 may remain in the single microphone configuration. However, as soon as the user speaks while holding the electronic device 5802 in an optimal holding pattern (e.g., in the reference orientation 5816), the electronic device 5802 will switch back to the multiple microphone configuration (e.g., a dual-microphone configuration).

In another example, the electronic device 5802 may be in a horizontal face-down orientation (e.g., a user lies down on a bed holding the electronic device while the display of the electronic device 5802 is facing downward towards the top of the bed). This electronic device 5802 orientation may be easily detected because the z coordinate is negative, as sensed by the sensor 5804 (e.g., the accelerometer). Additionally or alternatively, for the user's pose change from sitting to lying on a bed, the electronic device 5802 may also learn the user's pose using frames using phase and level differences. As soon as the user uses the electronic device 5802 in the reference orientation 5816 (e.g., holds the electronic device 5802 in the optimal holding pattern), the electronic device 5802 may perform optimal noise suppression. Sensors 5804 (e.g., integrated accelerometer and microphone data) may then be used in the mapper 5810 to determine the electronic device 5802 orientation (e.g., holding pattern of the electronic device 5802) and the electronic device 5802 may perform an operation (e.g., select the appropriate microphone configuration). More specifically, front and back microphones may be enabled, or front microphones may be enabled while back microphones may be disabled. Either of these configurations may be in effect while the electronic device 5802 is in a horizontal orientation (e.g., speakerphone or tabletop mode).

In another example, a user may change the electronic device 5802 (e.g., phone) holding pattern (e.g., electronic device 5802 orientation) from handset usage to speakerphone or vice versa. By adding accelerometer/proximity sensor data 5808, the electronic device 5802 may make a microphone configuration switch seamlessly and adjust microphone gain and speaker volume (or earpiece to larger loudspeaker switch). For example, suppose that a user puts the electronic device 5802 (e.g., phone) face down. In some implementations, the electronic device 5802 may also track the sensor 5804 so that the electronic device 5802 may track if the electronic device 5802 (e.g., phone) is facing down or up. If the electronic device 5802 (e.g., phone) is facing down, the electronic device 5802 may provide speaker phone functionality. In some implementations, the electronic device may prioritize the proximity sensor result. In other words, if the sensor data 5808 indicates that an object (e.g., a hand or a desk) is near to the ear, the electronic device may not switch 5912 to speakerphone.

Optionally, the electronic device 5802 may track 5914 a source in three dimensions based on the mapping 5812. For example, the electronic device 5802 may track an audio signal source in three dimensions as it moves relative to the electronic device 5802. In this example, the electronic device 5802 may project 5916 the source (e.g., source location) into a two-dimensional space. For example, the electronic device 5802 may project 5916 the source that was tracked in three dimensions onto a two-dimensional display in the electronic device 5802. Additionally, the electronic device 5802 may switch 5918 to tracking the source in two dimensions. For example, the electronic device 5802 may track in two dimensions an audio signal source as it moves relative to the electronic device 5802. Depending on an electronic device 5802 orientation, the electronic device 5802 may select corresponding nonlinear pairs of microphones and provide a 360-degree two-dimensional representation with proper two-dimensional projection. For example, the electronic device 5802 may provide a visualization of two-dimensional, 360-degree source activity regardless of electronic device 5802 orientation (e.g., holding patterns (speakerphone mode, portrait browse-talk mode, and landscape browse-talk mode, or in between any combination thereof). The electronic device 5802 may interpolate the visualization to a two-dimensional representation for in-between each holding pattern. In fact, the electronic device 5802 may even render a three-dimensional visualization using three sets of two-dimensional representations.

In some implementations, the electronic device 5802 may perform 5920 non-stationary noise suppression. Performing 5920 non-stationary noise suppression may suppress a noise audio signal from a target audio signal to improve spatial audio processing. In some implementations, the electronic device 5802 may be moving during the noise suppression. In these implementations, the electronic device 5802 may perform 5920 non-stationary noise suppression independent of the electronic device 5802 orientation. For example, if a user mistakenly rotates a phone but still wants to focus on some target direction, then it may be beneficial to maintain that target direction regardless of the device orientation.

Figure 60:
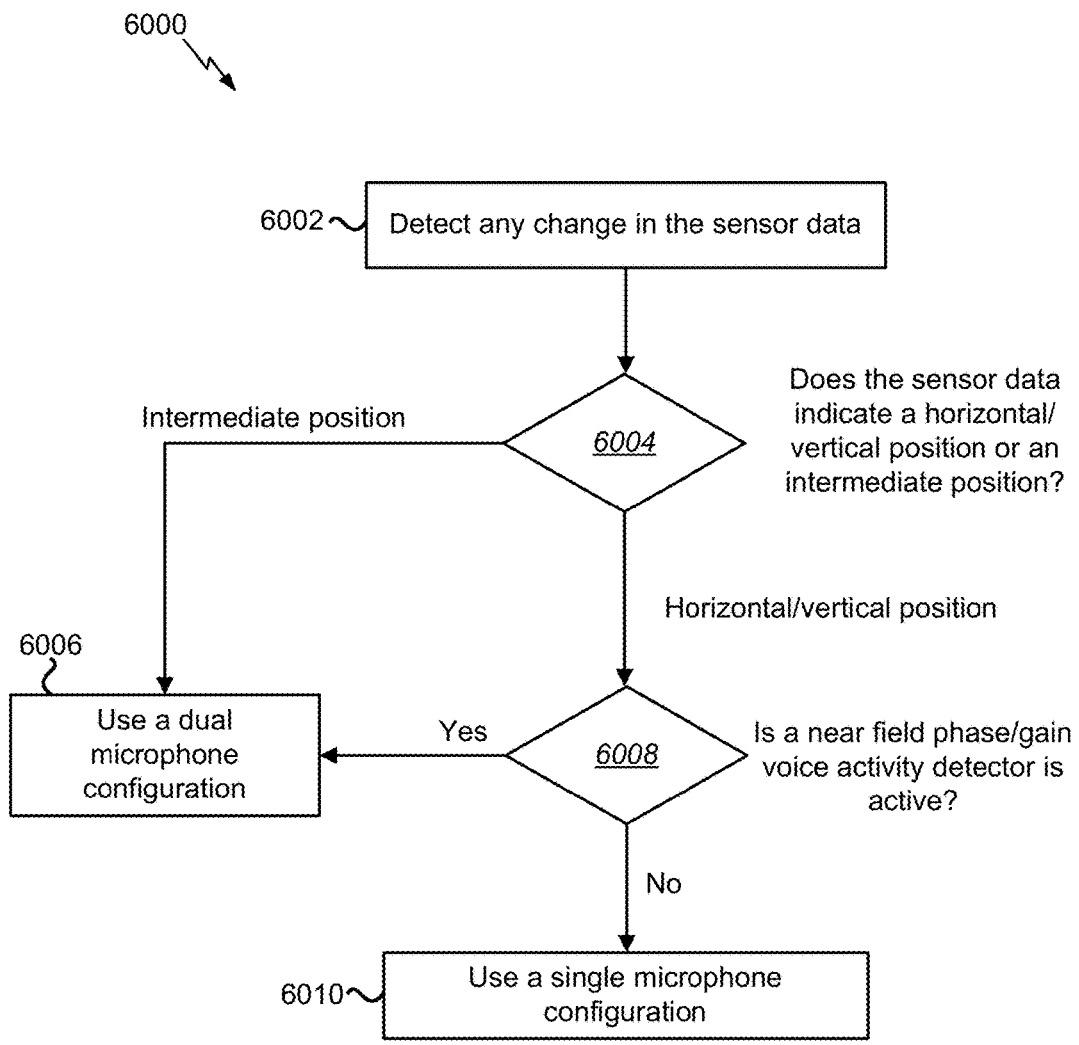
FIG. 60 is a flow diagram illustrating one configuration of a method for performing an operation based on the mapping.

FIG. 60 is a flow diagram illustrating one configuration of a method 6000 for performing 5708 an operation based on the mapping 5812. The method 6000 may be performed by the electronic device 5802. The electronic device 5802 may detect 6002 any change in the sensor data 5808. In some implementations, detecting 6002 any change in the sensor data 5808 may include detecting whether a change in the sensor data 5808 is greater than a certain amount. For example, the electronic device 5802 may detect 6002 whether there is a change in accelerometer data that is greater than a determined threshold amount.

The electronic device 5802 may determine 6004 if the sensor data 5808 indicates that the electronic device 5802 is in one of a horizontal or vertical position or that the electronic device 5802 is in an intermediate position. For example, the electronic device 5802 may determine whether the sensor data 5808 indicates that the electronic device 5802 is in a tabletop mode (e.g., horizontal face-up on a surface) or a browse-talk mode (e.g., vertical at eye level) or whether the electronic device 5802 is in a position other than vertical or horizontal (e.g., which may include the reference orientation 5816).

If the electronic device 5802 determines 6004 that the sensor data 5808 indicates that the electronic device 5802 is in an intermediate position, the electronic device 5802 may use 6006 a dual microphone configuration. If the electronic device 5802 was not previously using a dual microphone configuration, using 6006 a dual microphone configuration may include switching to a dual microphone configuration. By comparison, if the electronic device 5802 was previously using a dual microphone configuration, using 6006 a dual microphone configuration may include maintaining a dual microphone configuration.

If the electronic device 5802 determines 6004 that the sensor data 5808 indicates that the electronic device 5802 is in a horizontal or vertical position, the electronic device 5802 may determine 6008 if a near field phase/gain voice activity detector (VAD) is active. In other words, the electronic device 5802 may determine if the electronic device 5802 is located close to the audio signal source (e.g., a user's mouth). If the electronic device 5802 determines 6008 that a near field phase/gain voice activity detector is active (e.g., the electronic device 5802 is near the user's mouth), the electronic device 5802 may use 6006 a dual microphone configuration.

If the electronic device 5802 determines 6008 that a near field phase/gain voice activity detector is not active (e.g., the electronic device 5802 is not located close to the audio signal source), the electronic device 5802 may use 6010 a single microphone configuration. If the electronic device 5802 was not previously using a single microphone configuration, using 6010 a single microphone configuration may include switching to a single microphone configuration. By comparison, if the electronic device 5802 was previously using a single microphone configuration, using 6010 a single microphone configuration may include maintaining a single microphone configuration. In some implementations, using 6010 a single microphone configuration may include using broadside/single microphone noise suppression.

Figure 61:
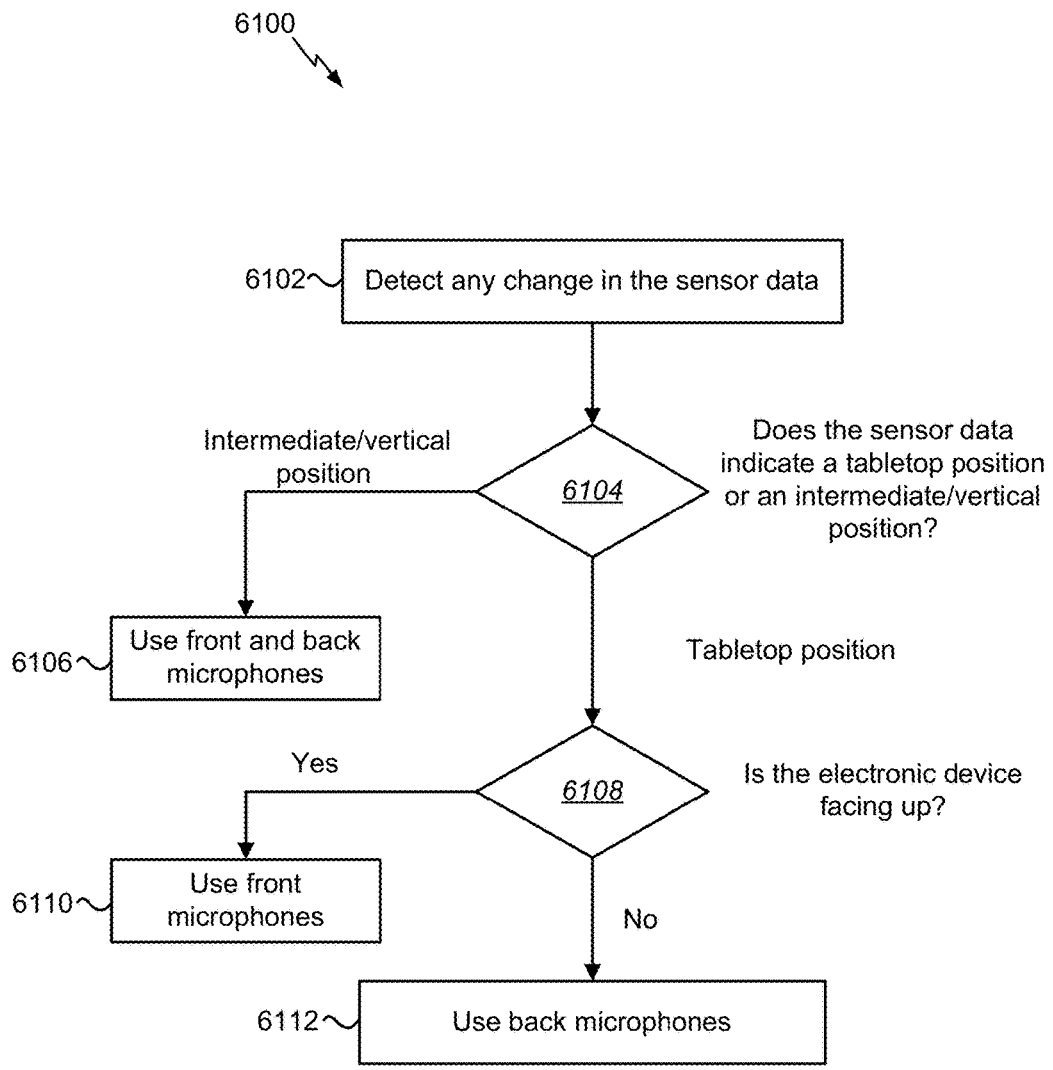
FIG. 61 is a flow diagram illustrating another configuration of a method for performing an operation based on the mapping.

FIG. 61 is a flow diagram illustrating another configuration of a method 6100 for performing 5708 an operation based on the mapping 5812. The method 6100 may be performed by the electronic device 5802. The electronic device 5802 may detect 6102 any change in the sensor data 5808. In some implementations, this may be done as described in connection with FIG. 60.

The electronic device 5802 may determine 6104 if the sensor data 5808 indicates that the electronic device 5802 is in a tabletop position or in an intermediate or vertical position. For example, the electronic device 5802 may determine 6104 if the sensor data 5808 indicates that the electronic device 5802 is horizontal face-up on a surface (e.g., a tabletop position) or whether the electronic device 5802 is vertical (e.g., a browse-talk position) or in a position other than vertical or horizontal (e.g., which may include the reference orientation 5816).

If the electronic device 5802 determines 6104 that the sensor data 5808 indicates that the electronic device 5802 is in an intermediate position, the electronic device 5802 may use 6106 front and back microphones. In some implementations, using 6106 front and back microphones may include enabling/disabling at least one microphone.

If the electronic device 5802 determines 6104 that the sensor data 5808 indicates that the electronic device 5802 is in a tabletop position, the electronic device 5802 may determine 6108 if the electronic device 5802 is facing up. In some implementations, the electronic device 5802 may determine 6108 if the electronic device 5802 is facing up based on the sensor data 5808. If the electronic device 5802 determines 6108 that the electronic device 5802 is facing up, the electronic device 5802 may use 6110 front microphones. For example, the electronic device may use 6110 at least one microphone locate on the front of the electronic device 5802. In some implementations, using 6110 front microphones may include enabling/disabling at least one microphone. For example, using 6110 front microphones may include disabling at least one microphone located on the back of the electronic device 5802.

If the electronic device 5802 determines 6108 that the electronic device 5802 is not facing up (e.g., the electronic device 5802 is facing down), the electronic device 5802 may use 6112 back microphones. For example, the electronic device may use 6112 at least one microphone locate on the back of the electronic device 5802. In some implementations, using 6112 back microphones may include enabling/disabling at least one microphone. For example, using 6112 back microphones may include disabling at least one microphone located on the front of the electronic device 5802.

Figure 62:
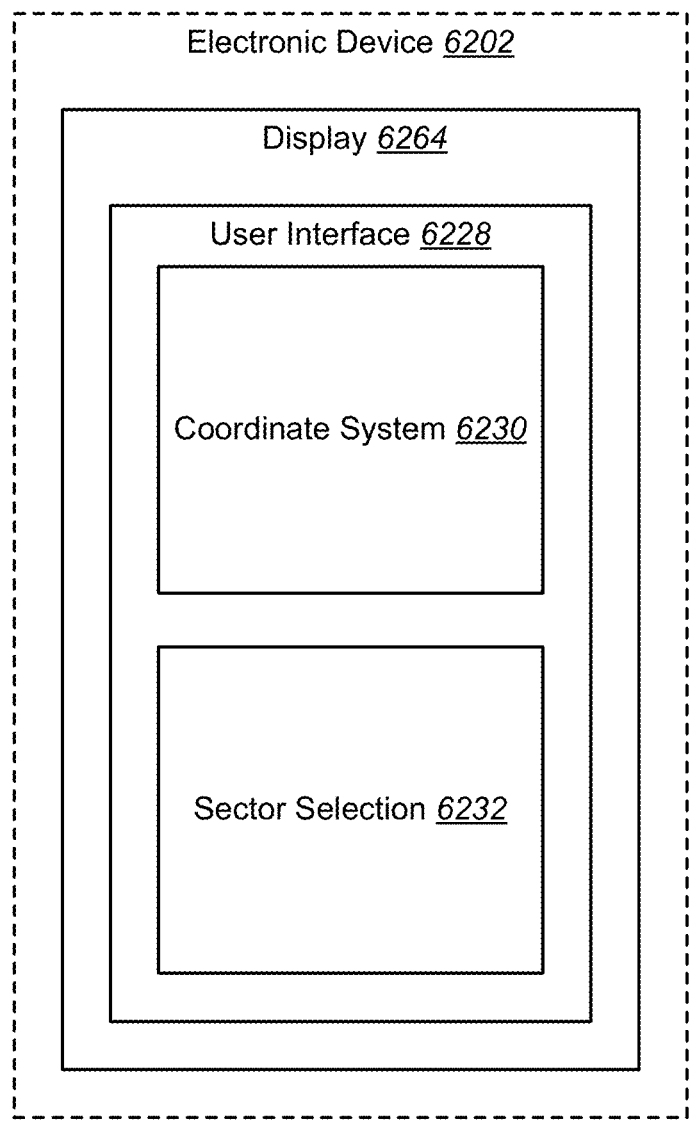
FIG. 62 is a block diagram illustrating one configuration of a user interface in which systems and methods for displaying a user interface on an electronic device may be implemented.

FIG. 62 is a block diagram illustrating one configuration of a user interface 6228 in which systems and methods for displaying a user interface 6228 on an electronic device 6202 may be implemented. In some implementations, the user interface 6228 may be displayed on an electronic device 6202 that may be an example of the electronic device 5602 described in connection with FIG. 56. The user interface 6228 may be used in conjunction with and/or independently from the multi-microphone configurations described herein. The user interface 6228 may be presented on a display 6264 (e.g., a screen) of the electronic device 6202. The display 6264 may also present a sector selection feature 6232. In some implementations, the user interface 6228 may provide an editable mode and a fixed mode. In an editable mode, the user interface 6228 may respond to input to manipulate at least one feature (e.g., sector selection feature) of the user interface 6228. In a fixed mode, the user interface 6228 may not respond to input to manipulate at least one feature of the user interface 6228.

The user interface 6228 may include information. For example, the user interface 6228 may include a coordinate system 6230. In some implementations, the coordinate system 6230 may be a reference for audio signal source location. The coordinate system 6230 may correspond to physical coordinates. For example, sensor data 5608 (e.g., accelerometer data, gyro data, compass data, etc.) may be used to map electronic device 6202 coordinates to physical coordinates as described in FIG. 57. In some implementations, the coordinate system 6230 may correspond to a physical space independent of earth coordinates.

The user interface 6228 may display a directionality of audio signals. For example, the user interface 6228 may include audio signal indicators that indicate the direction of the audio signal source. The angle of the audio signal source may also be indicated in the user interface 6228. The audio signal(s) may be a voice signal. In some implementations, the audio signals may be captured by the at least one microphone. In this implementation, the user interface 6228 may be coupled to the at least one microphone. The user interface 6228 may display a 2D anglogram of captured audio signals. In some implementations, the user interface 6228 may display a 2D plot in 3D perspective to convey an alignment of the plot with a plane that is based on physical coordinates in the real world, such as the horizontal plane. In this implementation, the user interface 6228 may display the information independent of the electronic device 6202 orientation.

In some implementations, the user interface 6228 may display audio signal indicators for different types of audio signals. For example, the user interface 6228 may include an anglogram of a voice signal and a noise signal. In some implementations, the user interface 6228 may include icons corresponding to the audio signals. For example, as will be described below, the display 6264 may include icons corresponding to the type of audio signal that is displayed. Similarly, as will be described below, the user interface 6228 may include icons corresponding to the source of the audio signal. The position of these icons in the polar plot may be smoothed in time. As will be described below, the user interface 6228 may include one or more elements to carry out the functions described herein. For example, the user interface 6228 may include an indicator of a selected sector and/or may display icons for editing a selected sector.

The sector selection feature 6232 may allow selection of at least one sector of the physical coordinate system 6230. The sector selection feature 6232 may be implemented by at least one element included in the user interface 6228. For example, the user interface 6228 may include a selected sector indicator that indicates a selected sector. In some implementations, the sector selection feature 6232 may operate based on touch input. For example, the sector selection feature 6232 may allow selection of a sector based on a single touch input (e.g., touching, swiping and/or circling an area of the user interface 6228 corresponding to a sector). In some implementations, the sector selection feature 6232 may allow selection of multiple sectors at the same time. In this example, the sector selection feature 6232 may allow selection of the multiple sectors based on multiple touch inputs. It should be understood that the electronic device 6202 may include circuitry, a processor and/or instructions for producing the user interface 6228.

Figure 63:
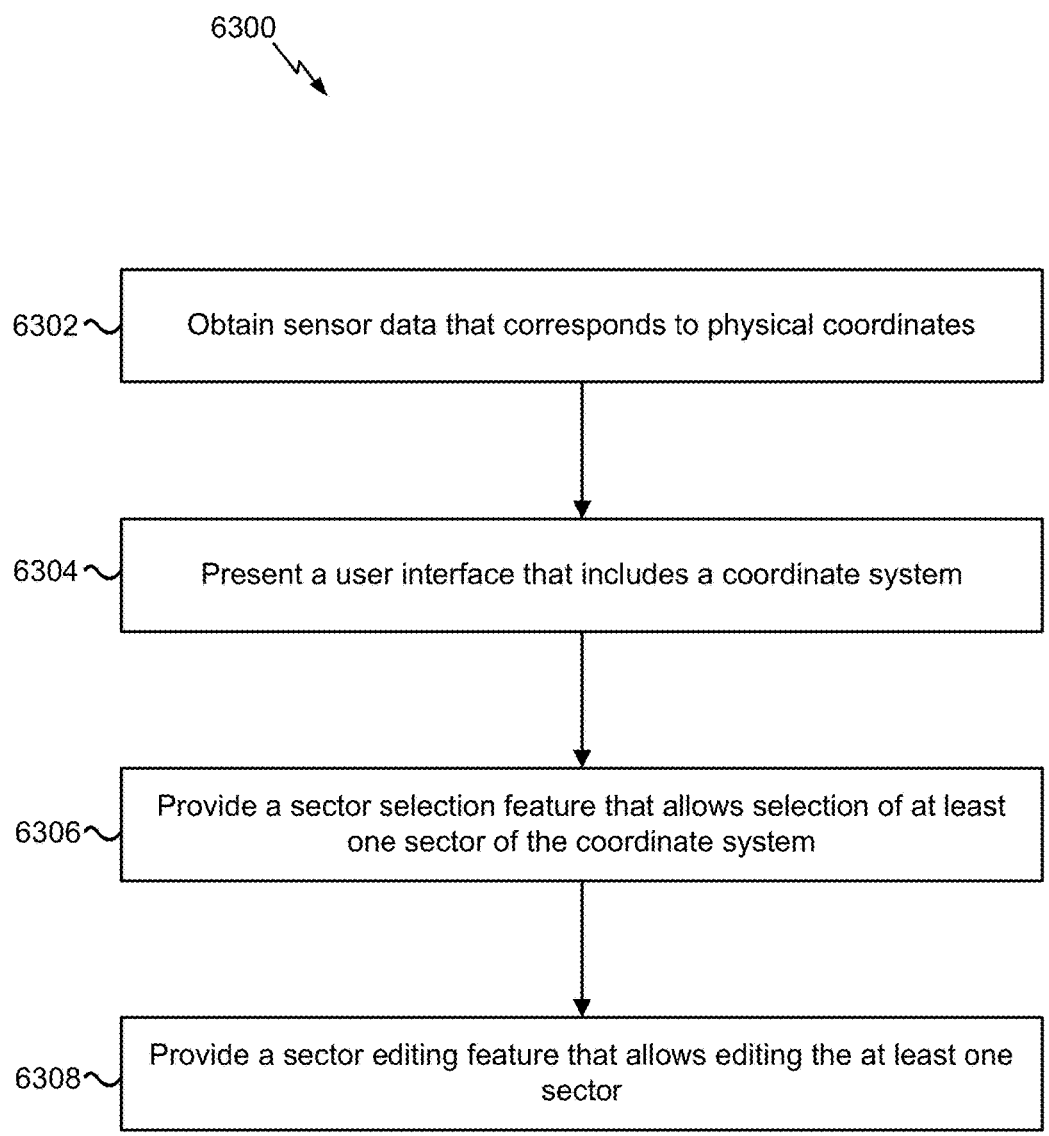
FIG. 63 is a flow diagram illustrating one configuration of a method for displaying a user interface on an electronic device.

FIG. 63 is a flow diagram illustrating one configuration of a method 6300 for displaying a user interface 6228 on an electronic device 6202. The method 6300 may be performed by the electronic device 6202. The electronic device 6202 may obtain 6302 sensor data (e.g., accelerometer data, tilt sensor data, orientation data, etc.) that corresponds to physical coordinates.

The electronic device 6202 may present 6304 the user interface 6228, for example on a display 6264 of the electronic device 6202. In some implementations, the user interface 6228 may include the coordinate system 6230. As described above, the coordinate system 6230 may be a reference for audio signal source location. The coordinate system 6230 may correspond to physical coordinates. For example, sensor data 5608 (e.g., accelerometer data, gyro data, compass data, etc.) may be used to map electronic device 6202 coordinates to physical coordinates as described above.

In some implementations, presenting 6304 the user interface 6228 that may include the coordinate system 6230 may include presenting 6304 the user interface 6228 and the coordinate system 6230 in an orientation that is independent of the electronic device 6202 orientation. In other words, as the electronic device 6202 orientation changes (e.g., the electronic device 6202 rotates), the coordinate system 6230 may maintain orientation. In some implementations, the coordinate system 6230 may correspond to a physical space independent of earth coordinates.

The electronic device 6202 may provide 6306 a sector selection feature 6232 that allows selection of at least one sector of the coordinate system 6230. As described above, the electronic device 6202 may provide 6306 a sector selection feature via the user interface 6228. For example, the user interface 6228 may include at least one element that allows selection of at least one sector of the coordinate system 6230. For example, the user interface 6228 may include an indicator that indicates a selected sector.

The electronic device 6202 may also include a touch sensor that allows touch input selection of the at least one sector. For example, the electronic device 6202 may select (and/or edit) one or more sectors and/or one or more audio signal indicators based on one or more touch inputs. Some examples of touch inputs include one or more taps, swipes, patterns (e.g., symbols, shapes, etc.), pinches, spreads, multi-touch rotations, etc. In some configurations, the electronic device 6202 (e.g., user interface 6228) may select a displayed audio signal indicator (and/or sector) when one or more taps, a swipe, a pattern, etc., intersects with the displayed audio signal indicator (and/or sector). Additionally or alternatively, the electronic device 6202 (e.g., user interface 6228) may select a displayed audio signal indicator (and/or sector) when a pattern (e.g., a circular area, rectangular area or area within a pattern), etc., fully or partially surrounds or includes the displayed audio signal indicator (and/or sector). It should be noted that one or more audio signal indicators and/or sectors may be selected at a time.

In some configurations, the electronic device 6202 (e.g., user interface 6228) may edit one or more sectors and/or audio signal indicators based on one or more touch inputs. For example, the user interface 6228 may present one or more options (e.g., one or more buttons, a drop-down menu, etc.) that provide options for editing the audio signal indicator or selected audio signal indicator (e.g., selecting an icon or image for labeling the audio signal indicator, selecting or changing a color, pattern and/or image for the audio signal indicator, setting whether a corresponding audio signal should be filtered (e.g., blocked or passed), zooming in or out on the displayed audio signal indicator, etc.). Additionally or alternatively, the user interface 6228 may present one or more options (e.g., one or more buttons, a drop-down menu, etc.) that provide options for editing the sector (e.g., selecting or changing a color, pattern and/or image for the sector, setting whether audio signals in the sector should be filtered (e.g., blocked or passed), zooming in or out on the sector, adjusting sector size (by expanding or contracting the sector, for example), etc.). For instance, a pinch touch input may correspond to reducing or narrowing sector size, while a spread may correspond to enlarging or expanding sector size.

The electronic device 6202 may provide 6308 a sector editing feature that allows editing the at least one sector. For example, the sector editing feature may enable adjusting (e.g., enlarging, reducing, shifting, etc.) the sector as describe herein.

In some configurations, the electronic device 6202 (e.g., display 6264) may additionally or alternatively display a target audio signal and an interfering audio signal on the user interface. The electronic device 6202 (e.g., display 6264) may display a directionality of the target audio signal and/or the interfering audio signal captured by one or more microphones. The target audio signal may include a voice signal.

Figure 64:
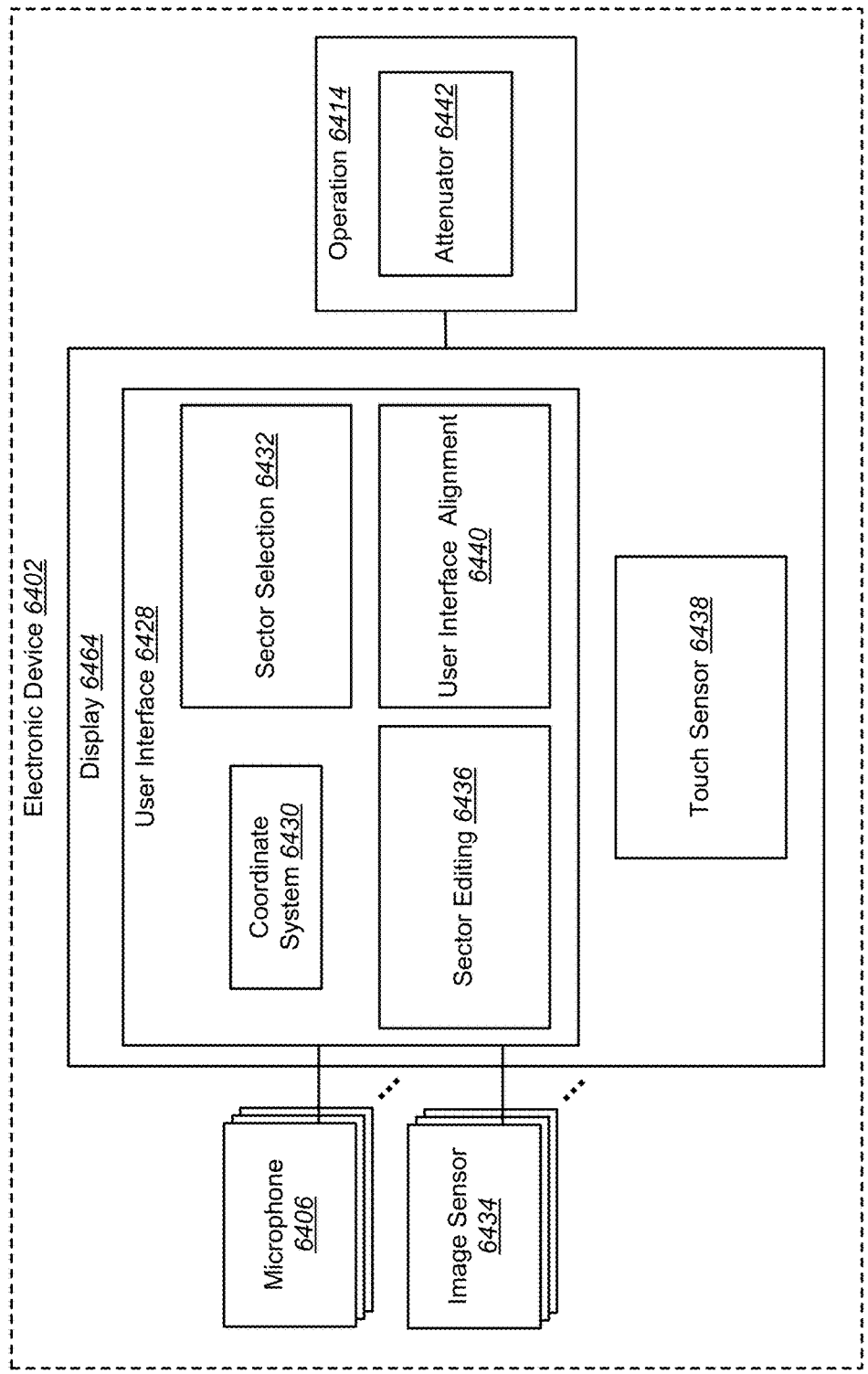
FIG. 64 is a block diagram illustrating one configuration of a user interface in which systems and methods for displaying a user interface on an electronic device may be implemented.

FIG. 64 is a block diagram illustrating one configuration of a user interface 6428 in which systems and methods for displaying a user interface 6428 on an electronic device 6402 may be implemented. In some implementations, the user interface 6428 may be included on a display 6464 of an electronic device 6402 that may be examples of corresponding elements described in connection with FIG. 62. The electronic device 6402 may include a user interface 6428, at least one microphone 6406, an operation block/module 6414, a display 6464 and/or a sector selection feature 6432 that may be examples of corresponding elements described in one or more of FIGS. 56 and 62.

In some implementations, the user interface 6428 may present a sector editing feature 6436, and/or a user interface alignment block/module 6440. The sector editing feature 6436 may allow for editing of at least one sector. For example, the sector editing feature 6436 may allow editing of at least one selected sector of the physical coordinate system 6430. The sector editing feature 6436 may be implemented by at least one element included in the display 6464. For example, the user interface 6428 may include at least one touch point that allows a user to adjust the size of a selected sector. In some implementations, the sector editing feature 6436 may operate based on touch input. For example, the sector editing feature 6436 may allow editing of a selected sector based on a single touch input. In some implementations, the sector editing feature 6436 may allow for at least one of adjusting the size of a sector, adjusting the shape of a sector, adjusting the boundaries of a sector and/or zooming in on the sector. In some implementations, the sector editing feature 6436 may allow editing of multiple sectors at the same time. In this example, the sector editing feature 6436 may allow editing of the multiple sectors based on multiple touch inputs.

As described above, in certain implementations, at least one of the sector selection feature 6432 and the sector editing feature 6436 may operate based on a single touch input or multiple touch inputs. For example, the sector selection feature 6432 may be based on one or more swipe inputs. For instance, the one or more swipe inputs may indicate a circular region. In some configurations, the one or more swipe inputs may be a single swipe. The sector selection feature 6432 may be based on single or multi-touch input. Additionally or alternatively, the electronic device 6402 may adjust a sector based on a single or multi-touch input.

In these examples, the display 6464 may include a touch sensor 6438 that may receive touch input (e.g., a tap, a swipe or circular motion) that selects a sector. The touch sensor 6438 may also receive touch input that edits a sector, for example, by moving touch points displayed on the display 6464. In some configurations, the touch sensor 6438 may be integrated with the display 6464. In other configurations, the touch sensor 6438 may be implemented separately in the electronic device 6402 or may be coupled to the electronic device 6402.

The user interface alignment block/module 6440 may align all or part of the user interface 6428 with a reference plane. In some implementations, the reference plane may be horizontal (e.g., parallel to ground or a floor). For example, the user interface alignment block/module 6440 may align part of the user interface 6428 that displays the coordinate system 6430. In some implementations, the user interface alignment block/module 6440 may align all or part of the user interface 6428 in real time.

In some configurations, the electronic device 6402 may include at least one image sensor 6434. For example, several image sensors 6434 may be included within an electronic device 6402 (in addition to or alternatively from multiple microphones 6406). The at least one image sensor 6434 may collect data relating to the electronic device 6402 (e.g., image data). For example, a camera (e.g., an image sensor) may generate an image. In some implementations, the at least one image sensor 6434 may provide image data 5608 to the display 6464.

The electronic device 6402 may pass audio signals (e.g., a target audio signal) included within at least one sector. For example, the electronic device 6402 may pass audio signals an operation block/module 6414. The operation block/module may pass audio one or more signals indicated within the at least one sector. In some implementations, the operation block/module 6414 may include an attenuator 6442 that attenuates an audio signal. For example, the operation block/module 6414 (e.g., attenuator 6442) may attenuate (e.g., block, reduce and/or reject) audio signals not included within the at least one selected sector (e.g., interfering audio signal(s)). In some cases, the audio signals may include a voice signal. For instance, the sector selection feature may allow attenuation of undesirable audio signals aside from a user voice signal.

In some configurations, the electronic device (e.g., the display 6464 and/or operation block/module 6414) may indicate image data from the image sensor(s) 6434. In one configuration, the electronic device 6402 (e.g., operation block/module 6414) may pass image data (and filter other image data, for instance) from the at least one image sensor 6434 based on the at least one sector. In other words, at least one of the techniques described herein regarding the user interface 6428 may be applied to image data alternatively from or in addition to audio signals.

Figure 65:
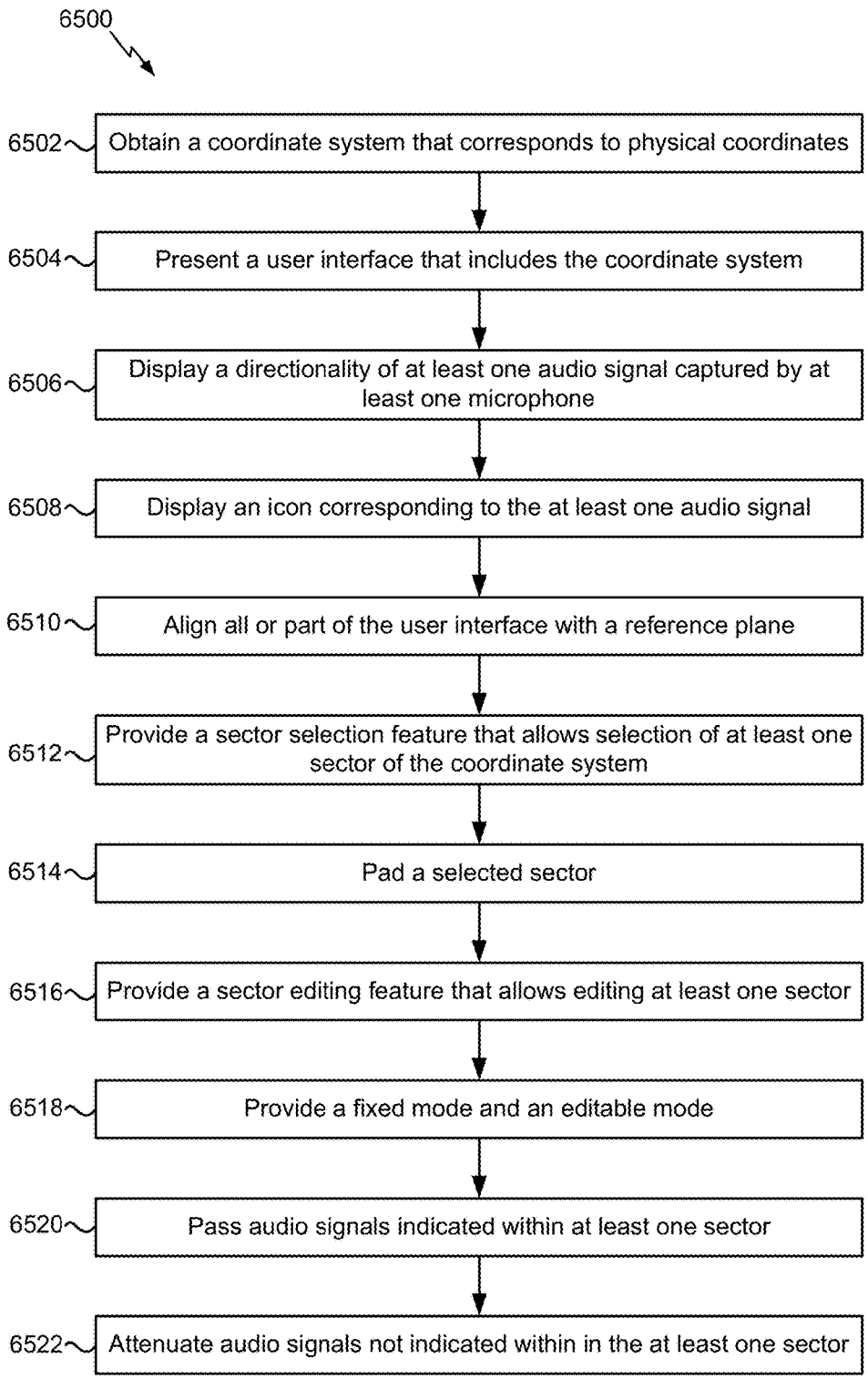
FIG. 65 is a flow diagram illustrating a more specific configuration of a method for displaying a user interface on an electronic device.

FIG. 65 is a flow diagram illustrating a more specific configuration of a method 6500 for displaying a user interface 6428 on an electronic device 6402. The method may be performed by the electronic device 6402. The electronic device 6402 may obtain 6502 a coordinate system 6430 that corresponds to a physical coordinate. In some implementations, this may be done as described in connection with FIG. 63.

The electronic device 6402 may present 6504 a user interface 6428 that includes the coordinate system 6430. In some implementations, this may be done as described in connection with FIG. 63.

The electronic device 6402 may display 6506 a directionality of at least one audio signal captured by at least one microphone. In other words, the electronic device 6402 may display the location of an audio signal source relative to the electronic device. The electronic device 6402 may also display the angle of the audio signal source in the display 6464. As described above, the electronic device 6402 may display a 2D anglogram of captured audio signals. In some implementations, the display 6464 may display a 2D plot in 3D perspective to convey an alignment of the plot with a plane that is based on physical coordinates in the real world, such as the horizontal plane.

The electronic device 6402 may display 6508 an icon corresponding to the at least one audio signal (e.g., corresponding to a wave pattern displayed on the user interface 6428). According to some configurations, the electronic device 6402 (e.g., display 6464) may display 6508 an icon that identifies an audio signal as being a target audio signal (e.g., voice signal). Additionally or alternatively, the electronic device 6402 (e.g., display 6464) may display 6508 an icon (e.g., a different icon) that identifies an audio signal as being noise and/or interference (e.g., an interfering or interference audio signal).

In some implementations, the electronic device 6402 may display 6508 an icon that corresponds to the source of an audio signal. For example, the electronic device 6402 may display 6508 an image icon indicating the source of a voice signal, for example, an image of an individual. The electronic device 6402 may display 6508 multiple icons corresponding to the at least one audio signal. For example, the electronic device may display at least one image icon and/or icons that identify the audio signal as a noise/interference signal or a voice signal.

The electronic device 6402 (e.g., user interface 6428) may align 6510 all of part of the user interface 6428 with a reference plane. For example, the electronic device 6402 may align 6510 the coordinate system 6430 with a reference plane. In some configurations, aligning 6510 all or part of the user interface 6428 may include mapping (e.g., projecting) a two-dimensional plot (e.g., polar plot) into a three-dimensional display space. Additionally or alternatively, the electronic device 6402 may align one or more of the sector selection feature 6432 and the sector editing feature 6436 with a reference plane. The reference plane may be horizontal (e.g., correspond to earth coordinates). In some implementations, the part of the user interface 6428 that is aligned with the reference plane may be aligned with the reference plane independent of the electronic device 6402 orientation. In other words, as the electronic device 6402 translates and/or rotates, all or part of the user interface 6428 that is aligned with the reference plane may remain aligned with the reference plane. In some implementations, the electronic device 6402 may align 6510 all or part of the user interface 6428 in real-time.

The electronic device 6402 may provide 6512 a sector selection feature 6432 that allows selection of at least one sector of the coordinate system 6430. In some implementations, this may be done as described in connection with FIG. 63.

In some implementations, the electronic device 6402 (e.g., user interface 6428 and/or sector selection feature 6432) may pad 6514 a selected sector. For example, the electronic device 6402 may include additional information with the audio signal to improve spatial audio processing. For example, padding may refer to providing visual feedback provided as highlighted (e.g., bright color) padding for the selected sector. For example, the selected sector 7150 (e.g., the outline of the sector) illustrated in FIG. 71 may be highlighted to enable easy identification of the selected sector.

The electronic device 6402 (e.g., the display 6464, the user interface 6428, etc.) may provide 6516 a sector editing feature 6436 that allows editing at least one sector. As described above, the electronic device 6402 may provide 6516 a sector editing feature 6436 via the user interface 6428. In some implementations, the sector editing feature 6436 may operate based on touch input. For example, the sector editing feature 6436 may allow editing of a selected sector based on a single or multiple touch inputs. For instance, the user interface 6428 may include at least one touch point that allows a user to adjust the size of a selected sector. In this implementation, the electronic device 6402 may provide a touch sensor 6438 that receives touch input that allows editing of the at least one sector.

The electronic device 6402 may provide 6518 a fixed mode and an editable mode. In an editable mode, the user interface 6428 may respond to input to manipulate at least one feature (e.g., sector selection feature 6432) of the user interface 6428. In a fixed mode, the user interface 6428 may not respond to input to manipulate at least one feature of the user interface 6428. In some implementations, the electronic device 6402 may allow selection between a fixed mode and an editable mode. For example, a radio button of the user interface 6428 may allow for selection between an editable mode and a fixed mode.

The electronic device 6402 may pass 6520 audio signals indicated within at least one sector. For example, the electronic device 6402 may pass 6520 audio signals indicated in a selected sector. In some implementations, the electronic device 6402 may attenuate 6522 an audio signal. For example, the electronic device 6402 may attenuate 6522 (e.g., reduce and/or reject) audio signals not included within the at least one selected sectors. For example, the audio signals may include a voice signal. In this example, the electronic device 6402 may attenuate 6522 undesirable audio signals aside from a user voice signal.

Figure 66:
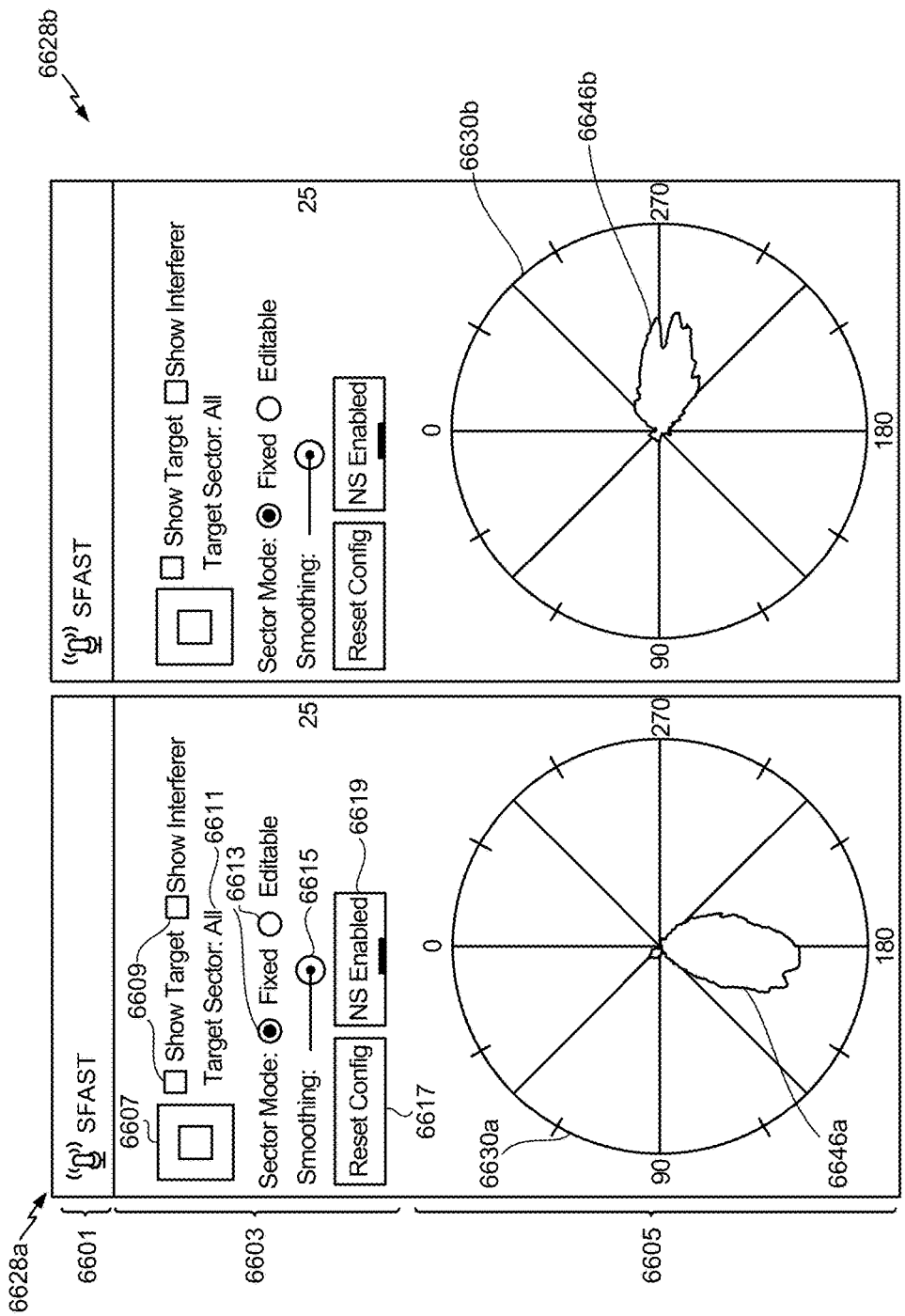
FIG. 66 illustrates examples of the user interface for displaying a directionality of at least one audio signal.

FIG. 66 illustrates examples of the user interface 6628a-b for displaying a directionality of at least one audio signal. In some implementations, the user interfaces 6628a-b may be examples of the user interface 6228 described in connection with FIG. 62. The user interfaces 6628a-b may include coordinate systems 6630a-b that may be examples of the coordinate system 6230 described in connection with FIG. 62.

In FIG. 66, an electronic device 6202 (e.g., phone) may be lying flat. This may occur, for example, in a tabletop mode. In FIG. 66, the coordinate systems 6630a-b may include at least one audio signal indicator 6646a-b that may indicate the directionality of at least one audio signal (according to an angle or range of angles, for instance). The at least one audio signal may originate from a person, a speaker, or anything that can create an audio signal. In a first user interface 6628a, a first audio signal indicator 6646a may indicate that a first audio signal is at roughly 180 degrees. By comparison, in a second user interface 6628b, a second audio signal indicator 6646b may indicate that a second audio signal is at roughly 270 degrees. In some implementations, the audio signal indicators 6646*a-b* may indicate the strength of the audio signal. For example, the audio signal indicators 6646*a-b* may include a gradient of at least one color that indicates the strength of an audio signal.

The first user interface 6628*a* provides examples of one or more characteristics that may be included in one or more of the user interfaces described herein. For example, the first user interface 6628*a* includes a title portion 6601. The title portion 6601 may include a title of the user interface or application that provides the user interface. In the example illustrated in FIG. 66, the title is "SFAST." Other titles may be utilized. In general, the title portion 6601 is optional: some configurations of the user interface may not include a title portion. Furthermore, it should be noted that the title portion may be located anywhere on the user interface (e.g., top, bottom, center, left, right and/or overlaid, etc.).

In the example illustrated in FIG. 66, the first user interface 6628*a* includes a control portion 6603. The control portion 6603 includes examples of interactive controls. In some configurations, one or more of these interactive controls may be included in a user interface described herein. In general, the control portion 6603 may be optional: some configurations of the user interface may not include a control portion 6603. Furthermore, the control portion may or may not be grouped as illustrated in FIG. 66. For example, one or more of the interactive controls may be located in different sections of the user interface (e.g., top, bottom, center, left, right and/or overlaid, etc.).

In the example illustrated in FIG. 66, the first user interface 6628*a* includes an activation/deactivation button 6607, check boxes 6609, a target sector indicator 6611, radio buttons 6613, a smoothing slider 6615, a reset button 6617 and a noise suppression (NS) enable button 6619. It should be noted, however, that the interactive controls may be implemented in a wide variety of configurations. For example, one or more of slider(s), radio button(s), button(s), toggle button(s), check box(es), list(s), dial(s), tab(s), text box(es), drop-down list(s), link(s), image(s), grid(s), table(s), label(s), etc., and/or combinations thereof may be implemented in the user interface to control various functions.

The activation/deactivation button 6607 may generally activate or deactivate functionality related to the first user interface 6628*a*. For example, when an event (e.g., touch event) corresponding to the activation/deactivation button 6607 occurs, the user interface 6628*a* may enable user interface interactivity and display an audio signal indicator 6646*a* in the case of activation or may disable user interface interactivity and pause or discontinue displaying the audio signal indicator 6646*a* in the case of deactivation.

The check boxes 6609 may enable or disable display of a target audio signal and/or an interferer audio signal. For example, the show interferer and show target check boxes enable visual feedback on the detected angle of the detected/computed interferer and target audio signal(s), respectively. For example, the "show interferer" element may be a pair with the "show target" element, which enable visualizing points for target and interference locations in the user interface 6628*a*. In some configurations, the "show interferer" and "show target" elements may enable/disable display of some actual picture of a target source or interferer source (e.g., their actual face, an icon, etc.) on the angle location detected by the device.

The target sector indicator 6611 may provide an indication of a selected or target sector. In this example, all sectors are indicated as the target sector. Another example is provided in connection with FIG. 71 below.

The radio buttons 6613 may enable selection of a fixed or editable sector mode. In the fixed mode, one or more sectors (e.g., selected sectors) may not be adjusted. In the editable mode, one or more sectors (e.g., selected sectors) may be adjusted.

The smoothing slider 6615 may provide selection of a value used to filter the input. For example, a value of 0 indicates that there is no filter, whereas a value of 25 may indicate aggressive filtering. In some configurations, the smoothing slider 6615 stands for an amount of smoothing for displaying the source activity polar plot. For instance, the amount of smoothing may be based on the value indicated by the smoothing slider 6615, where recursive smoothing is performed (e.g., polar=(1−alpha)*polar+(alpha)*polar_current_frame, so less alpha means more smoothing).

The reset button 6617 may enable clearing of one or more current user interface 6628*a* settings. For example, when a touch event corresponding to the reset button 6617 occurs, the user interface 6628*a* may clear any sector selections, may clear whether the target and/or interferer audio signals are displayed and/or may reset the smoothing slider to a default value. The noise suppression (NS) enable button 6619 may enable or disable noise suppression processing on the input audio signal(s). For example, an electronic device may enable or disable filtering interfering audio signal(s) based on the noise suppression (NS) enable button 6619.

The user interface 6628*a* may include a coordinate system portion 6605 (e.g., a plot portion). In some configurations, the coordinate system portion 6605 may occupy the entire user interface 6628*a* (and/or an entire device display). In other configurations, the coordinate system may occupy a subsection of the user interface 6628*a*. Although polar coordinate systems as given as examples herein, it should be noted that alternative coordinate systems, such as rectangular coordinate systems, may be included in the user interface 6628*a*.

FIG. 94 illustrates another example of a user interface 9428. In this example, the user interface 9428 includes a rectangular (e.g., Cartesian) coordinate system 9430. One example of an audio signal indicator 9446 is also shown. As described above, the coordinate system 9430 may occupy the entire user interface 9428 (and/or an entire display 9464 included in an electronic device 6202) as illustrated in FIG. 94. In other configurations, the coordinate system 9430 may occupy a subsection of the user interface 9428 (and/or display 9464). It should be noted that a rectangular coordinate system may be implemented alternatively from any of the polar coordinate systems described herein.

Figure 67:
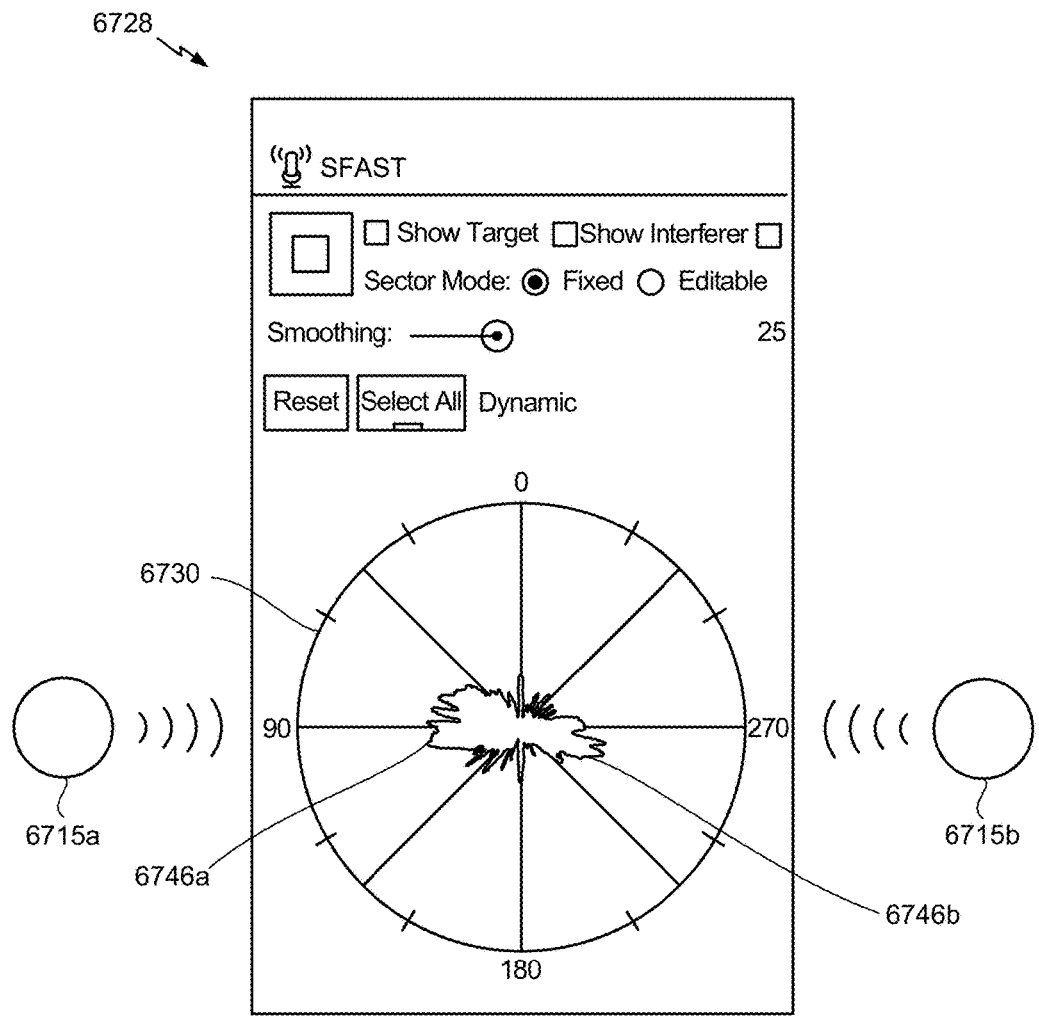
FIG. 67 illustrates another example of the user interface for displaying a directionality of at least one audio signal.

FIG. 67 illustrates another example of the user interface 6728 for displaying a directionality of at least one audio signal. In some implementations, the user interface 6728 may be an example of the user interface 6228 described in connection with FIG. 62. The user interface may include a coordinate system 6730 and at least one audio signal indicator 6746*a-b* that may be examples of corresponding elements described in connection with one or more of FIGS. 62 and 66. In FIG. 67, the user interface 6728 may include multiple audio signal indicators 6746*a-b*. For example, a first audio signal indicator 6746*a* may indicate that a first audio signal source 6715*a* is at approximately 90 degrees and a second audio signal source 6715*b* is at approximately 270 degrees. For example, FIG. 67 illustrates one example of voice detection to the left and right of an electronic device that includes the user interface 6728. More specifically, the user interface 6728 may indicate voices detected from the left and right of an electronic device. For instance, the user interface 6728 may display multiple (e.g., two) different sources at the same time in different locations. In some configurations, the procedures described in connection with FIG. 78 below may enable selecting two sectors corresponding to the audio signal indicators 6746*a*-*b* (and to the audio signal sources 6715*a*-*b*, for example).

Figure 68:
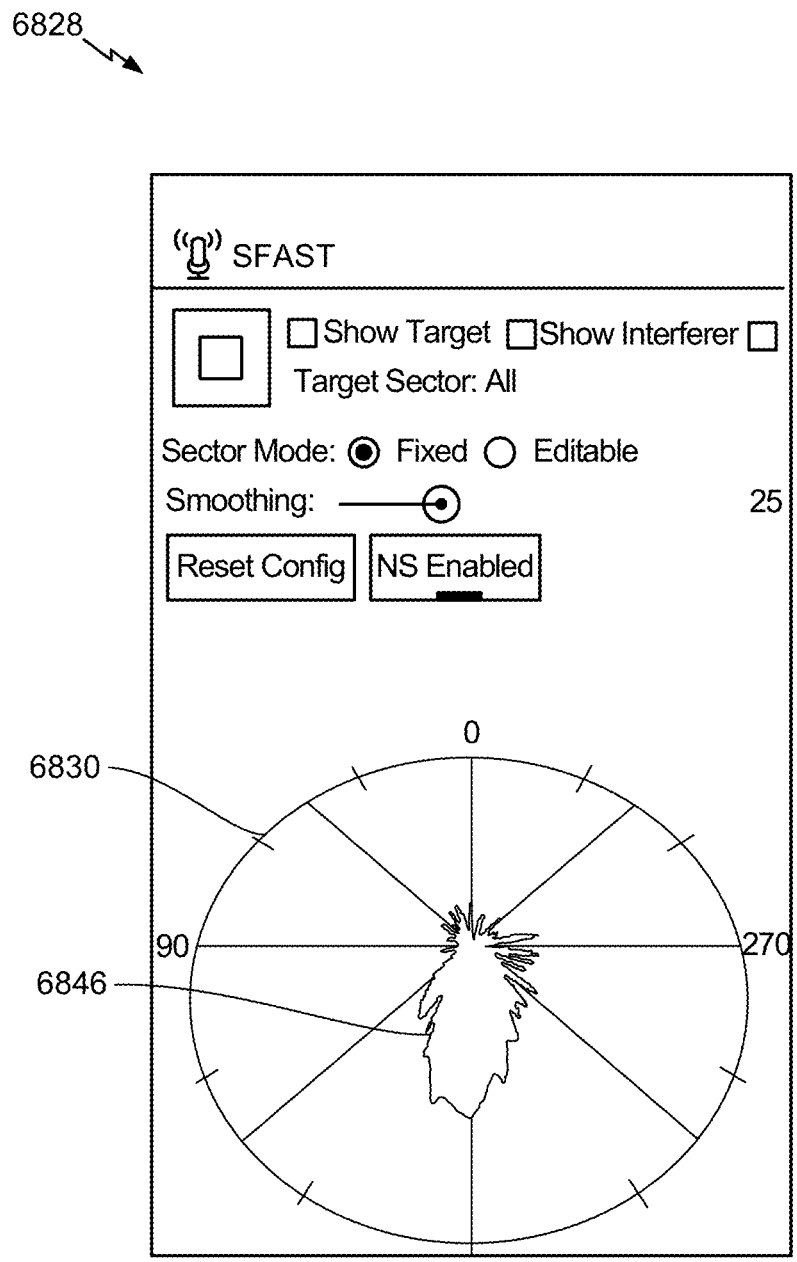
FIG. 68 illustrates another example of the user interface for displaying a directionality of at least one audio signal.

FIG. 68 illustrates another example of the user interface 6828 for displaying a directionality of at least one audio signal. In some implementations, the user interface 6828 may be an example of the user interface 6228 described in connection with FIG. 62. The user interface may include a coordinate system 6830, and an audio signal indicator 6846 that may be examples of corresponding elements described in connection with one or more of FIGS. 62 and 66. FIG. 68 illustrates one example of a two-dimensional coordinate system 6830 being projected into three-dimensional display space, where the coordinate system 6830 appears to extend inward into the user interface 6828. For instance, an electronic device 6202 (e.g., phone) may be in the palm of a user's hand. In particular, the electronic device 6202 may be in a horizontal face-up orientation. In this example, a part of the user interface 6828 may be aligned with a horizontal reference plane as described earlier. The audio signal in FIG. 68 may originate from a user that is holding the electronic device 6202 in their hands and speaking in front of it (at roughly 180 degrees, for instance).

Figure 69:
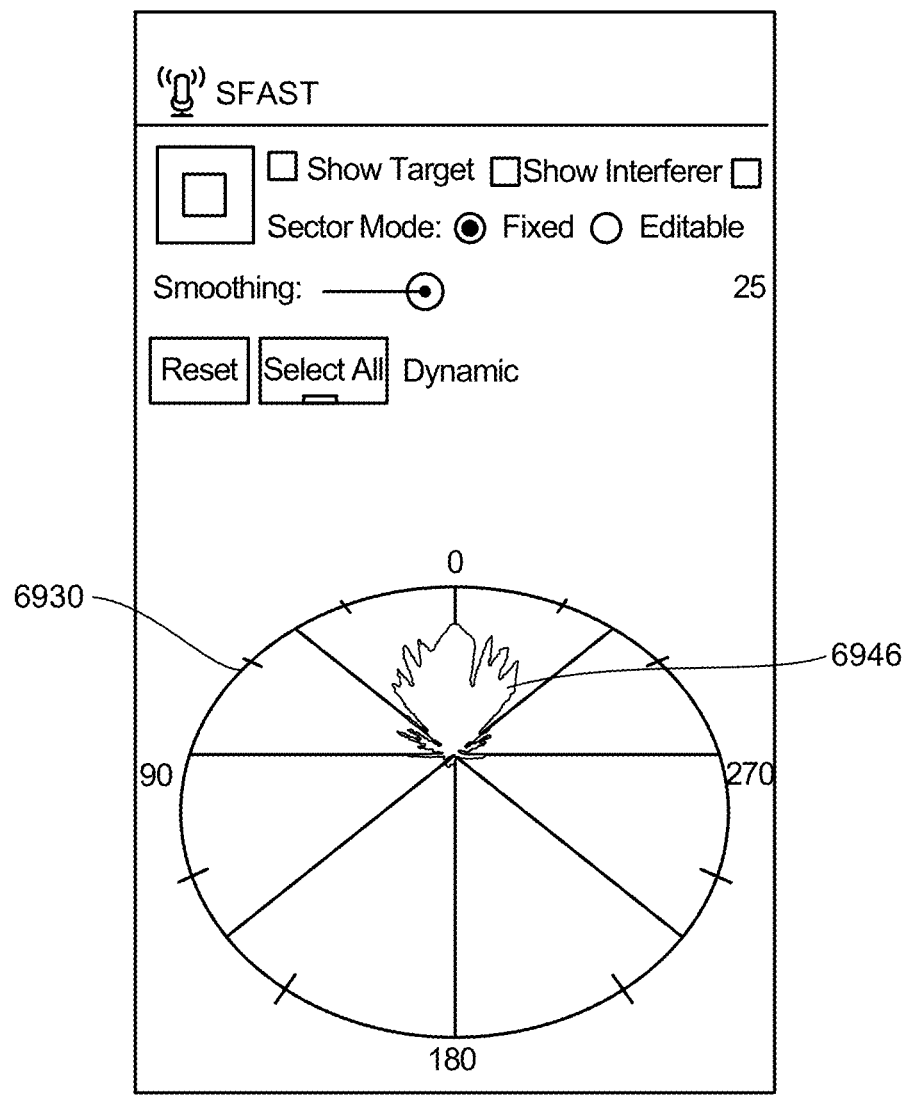
FIG. 69 illustrates another example of the user interface for displaying a directionality of at least one audio signal.

FIG. 69 illustrates another example of the user interface 6928 for displaying a directionality of at least one audio signal. In some implementations, the user interface 6928 may be an example of the user interface 6228 described in connection with FIG. 62. The user interface may include a coordinate system 6930 and an audio signal indicator 6946 that may be examples of corresponding elements described in connection with one or more of FIGS. 62 and 66. In FIG. 69, the electronic device 6202 (e.g., phone) may be in the palm of a user's hand. For example, the electronic device 6202 may be in a horizontal face-up orientation. In this example, a part of the user interface 6928 may be aligned with a horizontal reference plane as described earlier. The audio signal in FIG. 69 may originate from behind the electronic device 6202 (at roughly 0 degrees, for instance).

Figure 70:
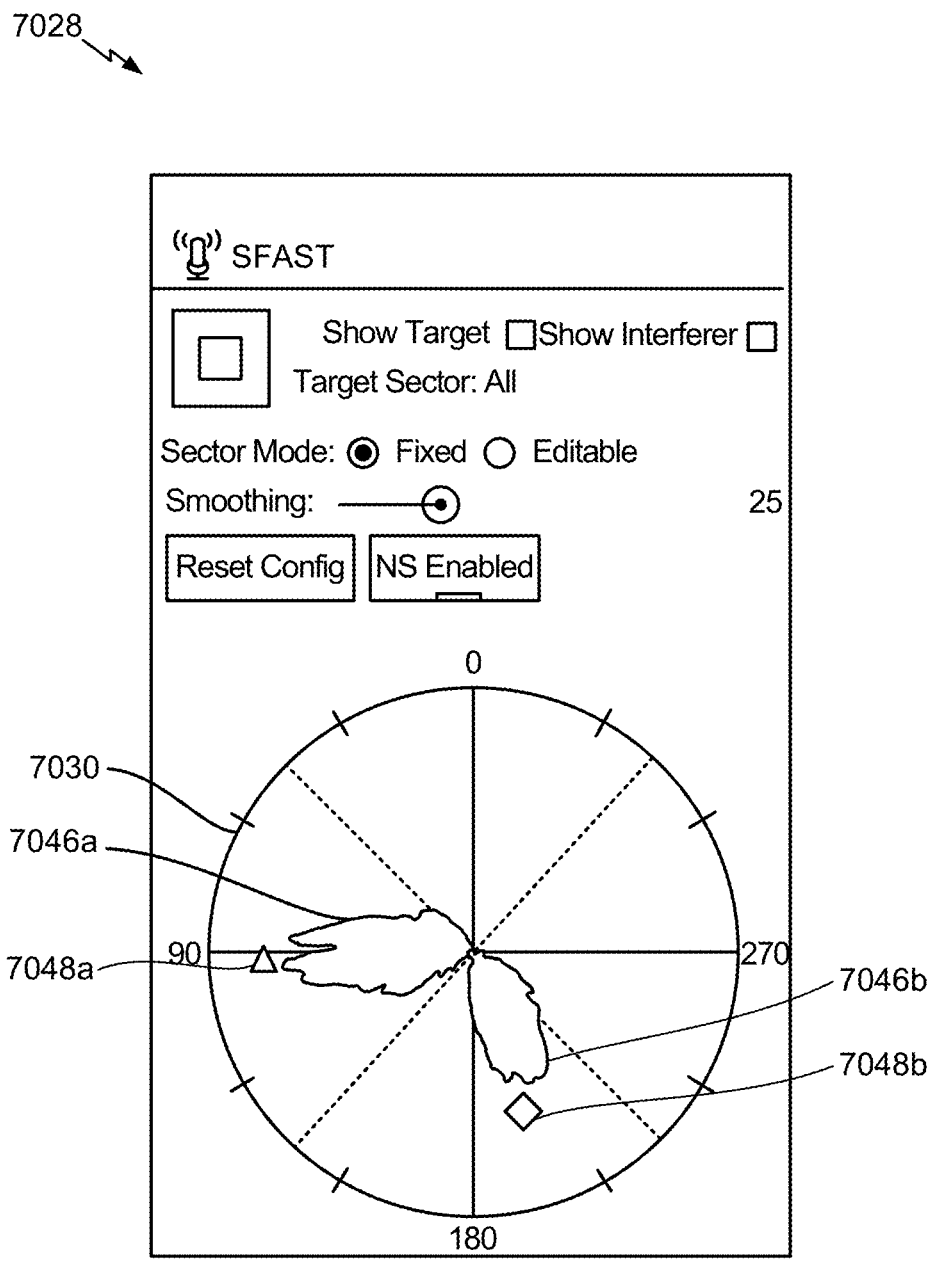
FIG. 70 illustrates another example of the user interface for displaying a directionality of at least one audio signal.

FIG. 70 illustrates another example of the user interface 7028 for displaying a directionality of at least one audio signal. In some implementations, the user interface 7028 may be an example of the user interface 6228 described in connection with FIG. 62. The user interface may include a coordinate system 7030 and at least one audio signal indicator 7046*a*-*b* that may be examples of corresponding elements described in connection with one or more of FIG. 62 and FIG. 66. In some configurations, the user interface 7028 may include at least one icon 7048*a*-*b* corresponding to the type of audio signal indicator 7046*a*-*b* that is displayed. For example, the user interface 7028 may display a triangle icon 7048*a* next to a first audio signal indicator 7046*a* that corresponds to a target audio signal (e.g., a speaker's or user's voice). Similarly, the user interface 7028 may display a diamond icon 7048*b* next to a second audio signal indicator 7046*b* that corresponds to interference (e.g., an interfering audio signal or noise).

Figure 71:
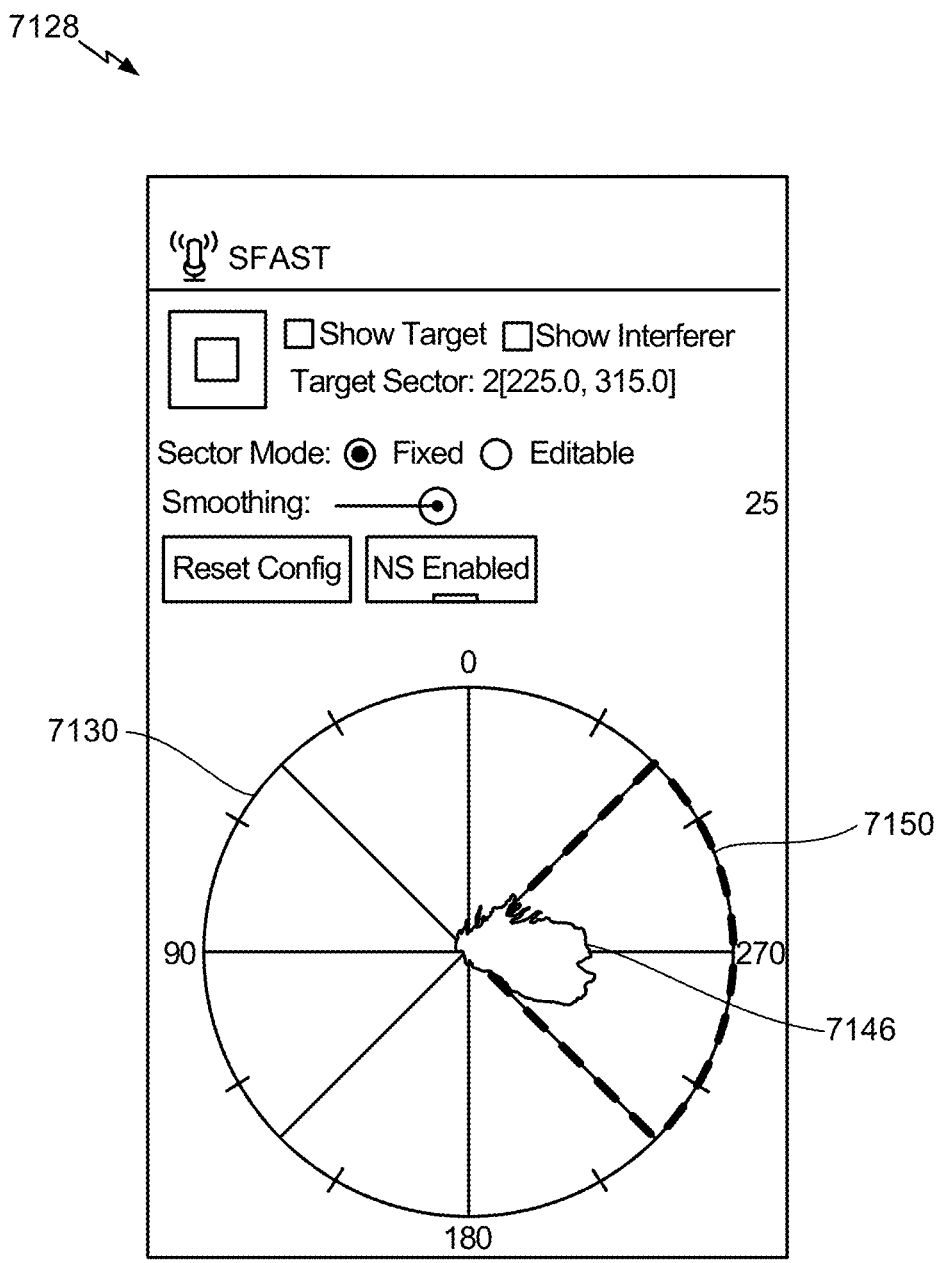
FIG. 71 illustrates an example of a sector selection feature of the user interface.

FIG. 71 illustrates an example of the sector selection feature 6232 of the user interface 7128. In some implementations, the user interface 7128 may be an example of the user interface 6228 described in connection with FIG. 62. The user interface 7128 may include a coordinate system 7130 and/or an audio signal indicator 7146 that may be examples of corresponding elements described in connection with one or more of FIGS. 62 and 66. As described above, the user interface 7128 may include a sector selection feature 6232 that allows selection of at least one sector, by touch input for example. In FIG. 71, a selected sector 7150 is indicated by the dashed line. In some implementations, the angle range of a selected sector 7150 may also be displayed (e.g., approximately 225 degrees to approximately 315 degrees as shown in FIG. 71). As described earlier, in some implementations, the electronic device 6202 may pass the audio signal (e.g., represented by the audio signal indicator 7146) indicated within the selected sector 7150. In this example, the audio signal source is to the side of the phone (at approximately 270 degrees). In some configurations, the other sector(s) outside of the selected sector 7150 may be noise suppressed and/or attenuated.

In the example illustrated in FIG. 71, the user interface 7128 includes a target sector indicator. The target sector indicator indicates a selected sector between 225 and 315 degrees in this case. It should be noted that sectors may be indicated with other parameters in other configurations. For instance, the target sector indicator may indicate a selected sector in radians, according to a sector number, etc.

Figure 72:
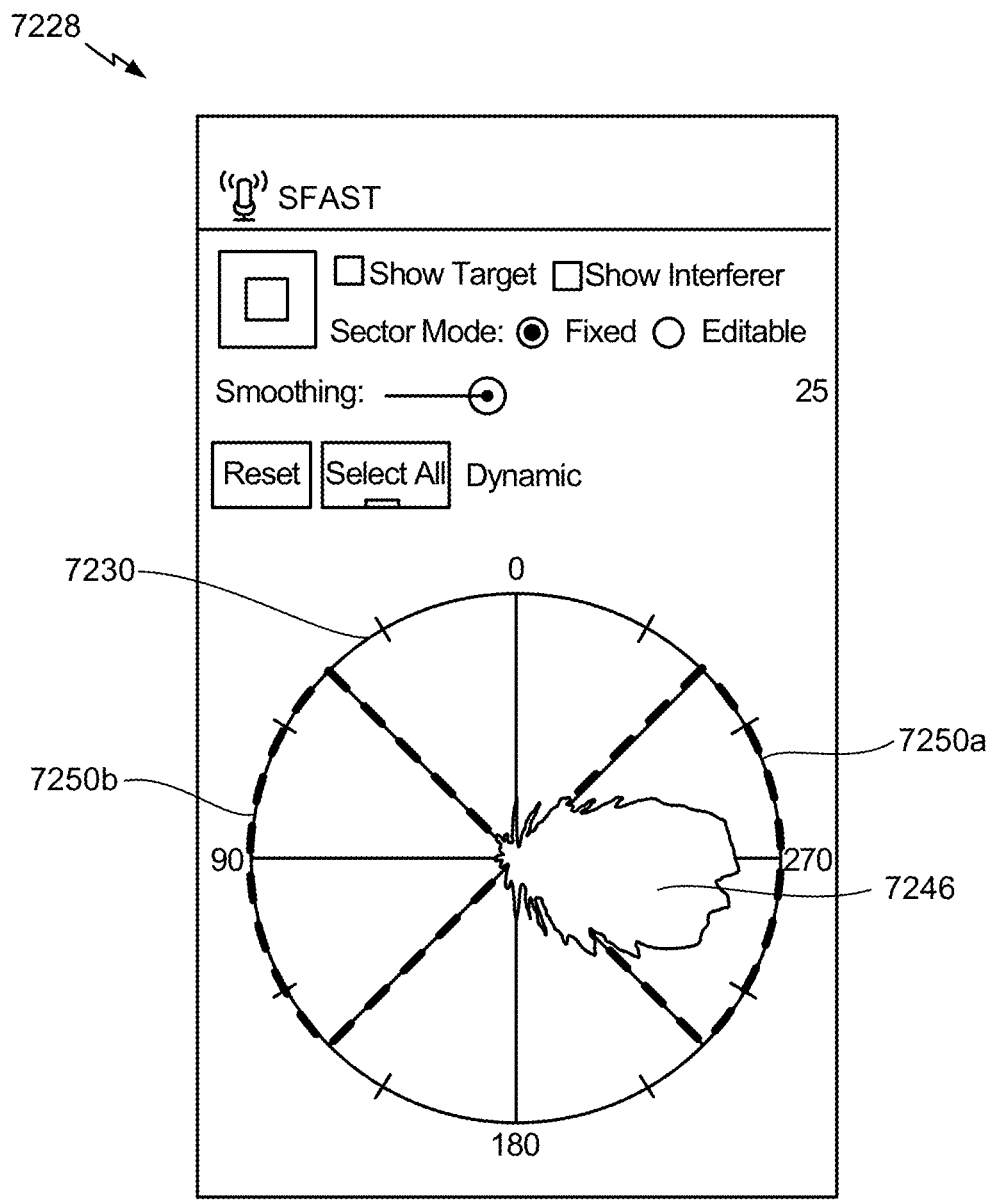
FIG. 72 illustrates another example of the sector selection feature of the user interface.

FIG. 72 illustrates another example of the sector selection feature 6232 of the user interface 7228. In some implementations, the user interface 7228 may be an example of the user interface 6228 described in connection with FIG. 62. The user interface 7228 may include a coordinate system 7230, an audio signal indicator 7246 and at least one selected sector 7250*a*-*b* that may be examples of corresponding elements described in connection with at least one of FIGS. 62, 66 and 71. As described above, the sector selection feature 6232 may allow selection of multiple sectors at the same time. In FIG. 72, two sectors 7250*a*-*b* have been selected (as indicated by the dashed lines, for instance). In this example, the audio signal is at roughly 270 degrees. The other sectors(s) outside of the selected sectors 7250*a*-*b* may be noise suppressed and/or attenuated. Thus, the systems and methods disclosed herein may enable the selection of two or more sectors 7250 at once.

Figure 73:
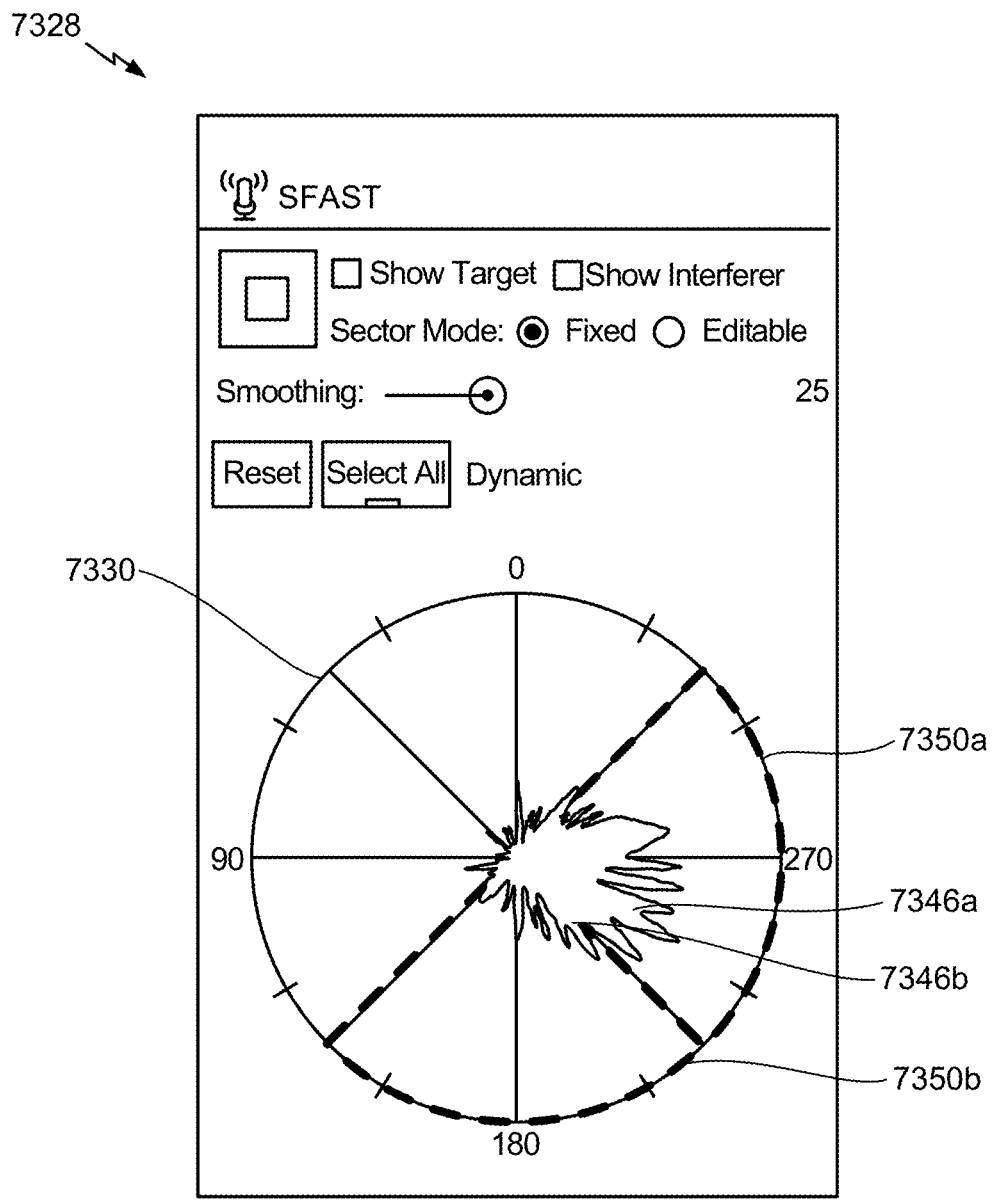
FIG. 73 illustrates another example of the sector selection feature of the user interface.

FIG. 73 illustrates another example of the sector selection feature 6232 of the user interface 7328. In some implementations, the user interface 7328 may be an example of the user interface 6228 described in connection with FIG. 62. The user interface 7328 may include a coordinate system 7330, at least one audio signal indicator 7346*a*-*b* and at least one selected sector 7350*a*-*b* that may be examples of corresponding elements described in connection with at least one of FIGS. 62, 66 and 71. In FIG. 73, two sectors 7350*a*-*b* have been selected (as indicated by the dashed lines, for instance). In this example, the speaker is to the side of the electronic device 6202. The other sectors(s) outside of the selected sectors 7250*a*-*b* may be noise suppressed and/or attenuated.

Figure 74:
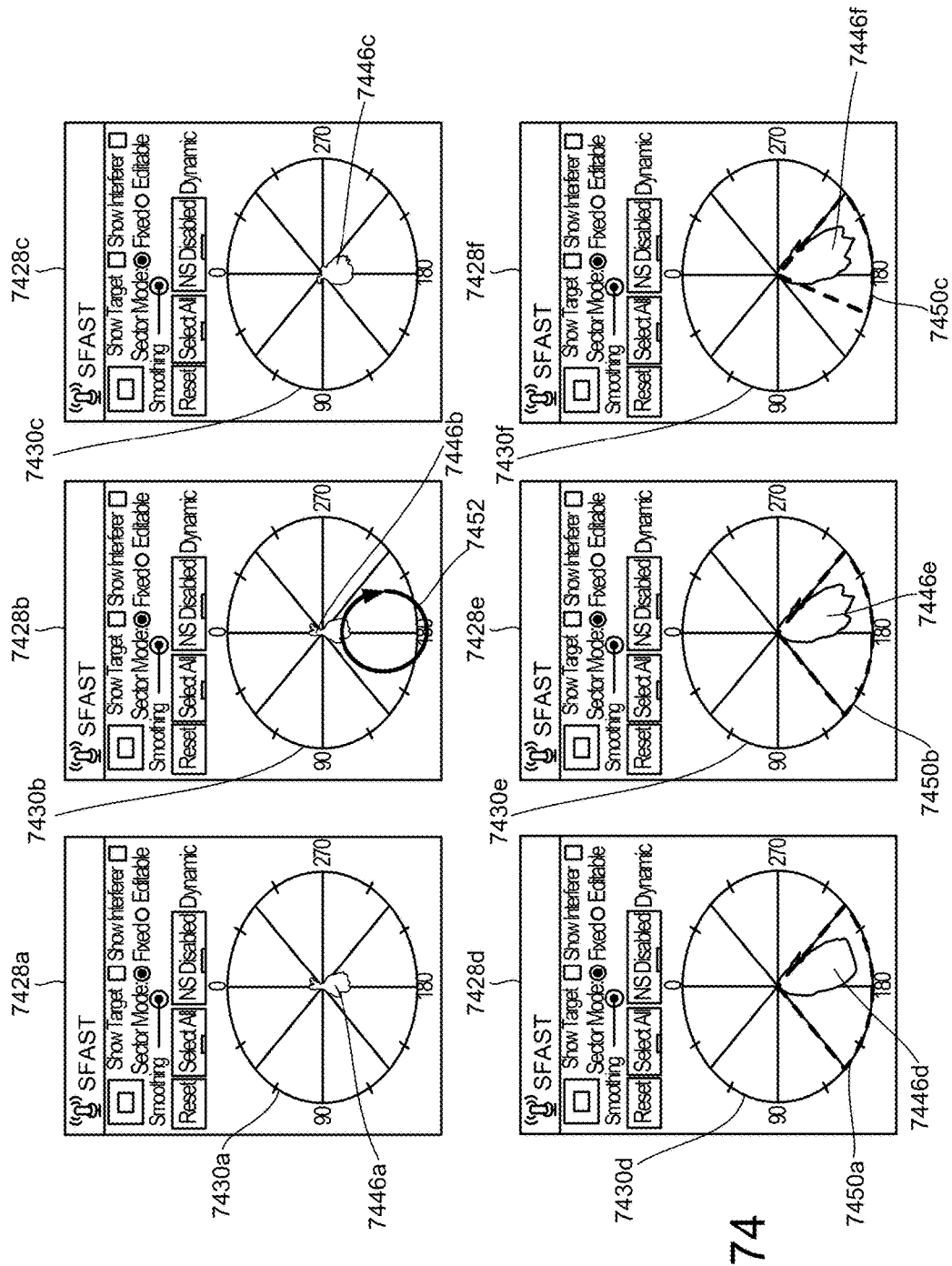
FIG. 74 illustrates more examples of the sector selection feature of the user interface.

FIG. 74 illustrates more examples of the sector selection feature 6232 of the user interfaces 7428*a*-*f*. In some implementations, the user interfaces 7428*a*-*f* may be examples of the user interface 6228 described in connection with FIG. 62. The user interfaces 7428*a*-*f* may include coordinate systems 7430*a*-*f*, at least one audio signal indicator 7446*a*-*f* and at least one selected sector 7450*a*-*c* that may be examples of corresponding elements described in connection with at least one of FIGS. 62, 66 and 71. In this example, the selected sector(s) 7450*a*-*c* may be determined based on the touch input 7452. For instance, the sectors and/or sector angles may be selected based upon finger swipes. For example, a user may input a circular touch input 7452. A selected sector 7150*b* may then be determined based on the circle touch input 7452. In other words, a user may narrow a sector by drawing the region of interest instead of manually adjusting (based on touch points or "handles," for instance). In some implementations, if multiple sectors are selected based on the touch input 7452, then the "best" sector 7450*c* may be selected and readjusted to match the region of interest. In some implementations, the term "best" may indicate a sector with the strongest at least one audio signal. This may be one user-friendly way to select and narrow sector(s). It should be noted that for magnifying or shrinking a sector, multiple fingers (e.g., two or more) can be used at the same time on or above the screen. Other examples of touch input 7452 may include a tap input from a user. In this example, a user may tap a portion of the coordinate system and a sector may be selected that is centered on the tap location (or aligned to a pre-set degree range). In this example, a user may then edit the sector by switching to editable mode and adjusting the touch points, as will be described below.

Figure 75:
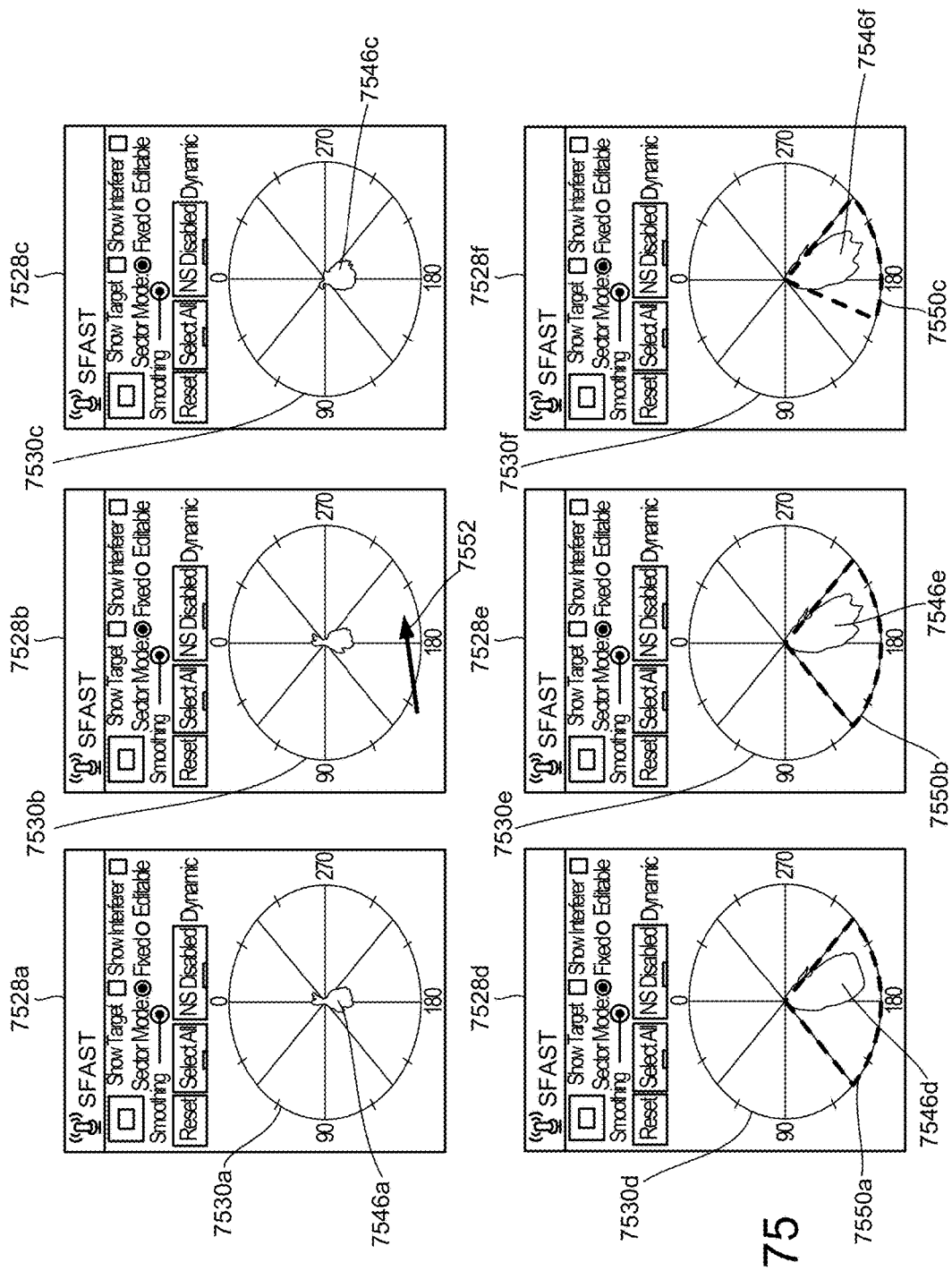
FIG. 75 illustrates more examples of the sector selection feature of the user interface.

FIG. 75 illustrates more examples of the sector selection feature 6232 of the user interfaces 7528*a-f*. In some implementations, the user interfaces 7528*a-f* may be examples of the user interface 6228 described in connection with FIG. 62. The user interfaces 7528*a-f* may include coordinate systems 7530*a-f*, at least one audio signal indicator 7546*a-f* and at least one selected sector 7550*a-c* that may be examples of corresponding elements described in connection with at least one of FIGS. 62, 66 and 71. In this example, the selected sector(s) 7550*a-c* may be determined based on the touch input 7552. For instance, the sectors and/or sector angles may be selected based upon finger swipes. For example, a user may input a swipe touch input 7552. In other words, a user may narrow a sector by drawing the region of interest instead of manually adjusting (based on touch points or "handles," for instance). In this example, sector(s) may be selected and/or adjusted based on just a swipe touch input 7552 (instead of a circular drawing, for instance). A selected sector 7150*b* may then be determined based on the swipe touch input 7552. In some implementations, if multiple sectors are selected based on the touch input 7552, then the "best" sector 7550*c* may be selected and readjusted to match the region of interest. In some implementations, the term "best" may indicate a sector with the strongest at least one audio signal. This may be one user-friendly way to select and narrow sector(s). It should be noted that for magnifying or shrinking a sector, multiple fingers (e.g., two or more) can be used at the same time on or above the screen. It should be noted that a single finger or multiple fingers may be sensed in accordance with any of the sector selection and/or adjustment techniques described herein.

Figure 76:
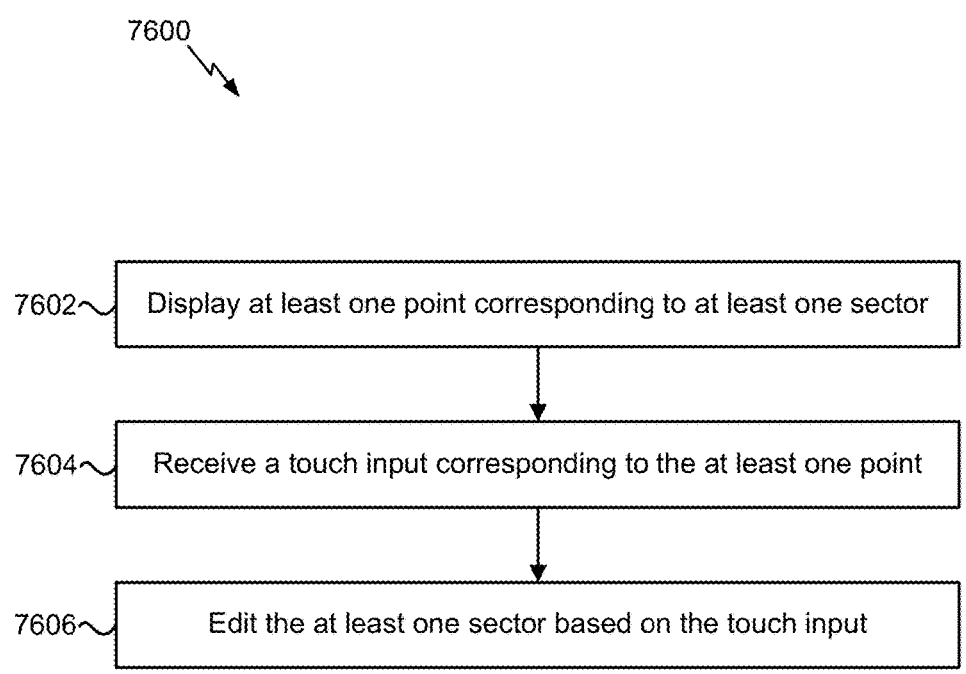
FIG. 76 is a flow diagram illustrating one configuration of a method for editing a sector.

FIG. 76 is a flow diagram illustrating one configuration of a method 7600 for editing a sector. The method 7600 may be performed by the electronic device 6202. The electronic device 6202 (e.g., display 6264) may display 7602 at least one point (e.g., touch point) corresponding to at least one sector. In some implementations, the at least one touch point may be implemented by the sector editing feature 6436 to allow editing of at least one sector. For example, the user interface 6228 may include at least one touch point that allows a user to adjust the size (e.g., expand or narrow) of a selected sector. The touch points may be displayed around the borders of the sectors.

The electronic device 6202 (e.g., a touch sensor) may receive 7604 a touch input corresponding to the at least one point (e.g., touch point). For example, the electronic device 6202 may receive a touch input that edits a sector (e.g., adjusts its size and/or shape). For instance, a user may select at least one touch point by touching them. In this example, a user may move touch points displayed on the user interface 6228. In this implementation, receiving 7604 a touch input may include adjusting the touch points based on the touch input. For example, as a user moves the touch points via the touch sensor 6438, the electronic device 6202 may move the touch points accordingly.

The electronic device 6202 (e.g., user interface 6228) may edit 7606 the at least one sector based on the touch input. For example, the electronic device 6202 may adjust the size and/or shape of the sector based on the single or multi-touch input. Similarly, the electronic device 6202 may change the position of the sector relative to the coordinate system 6230 based on the touch input.

Figure 77:
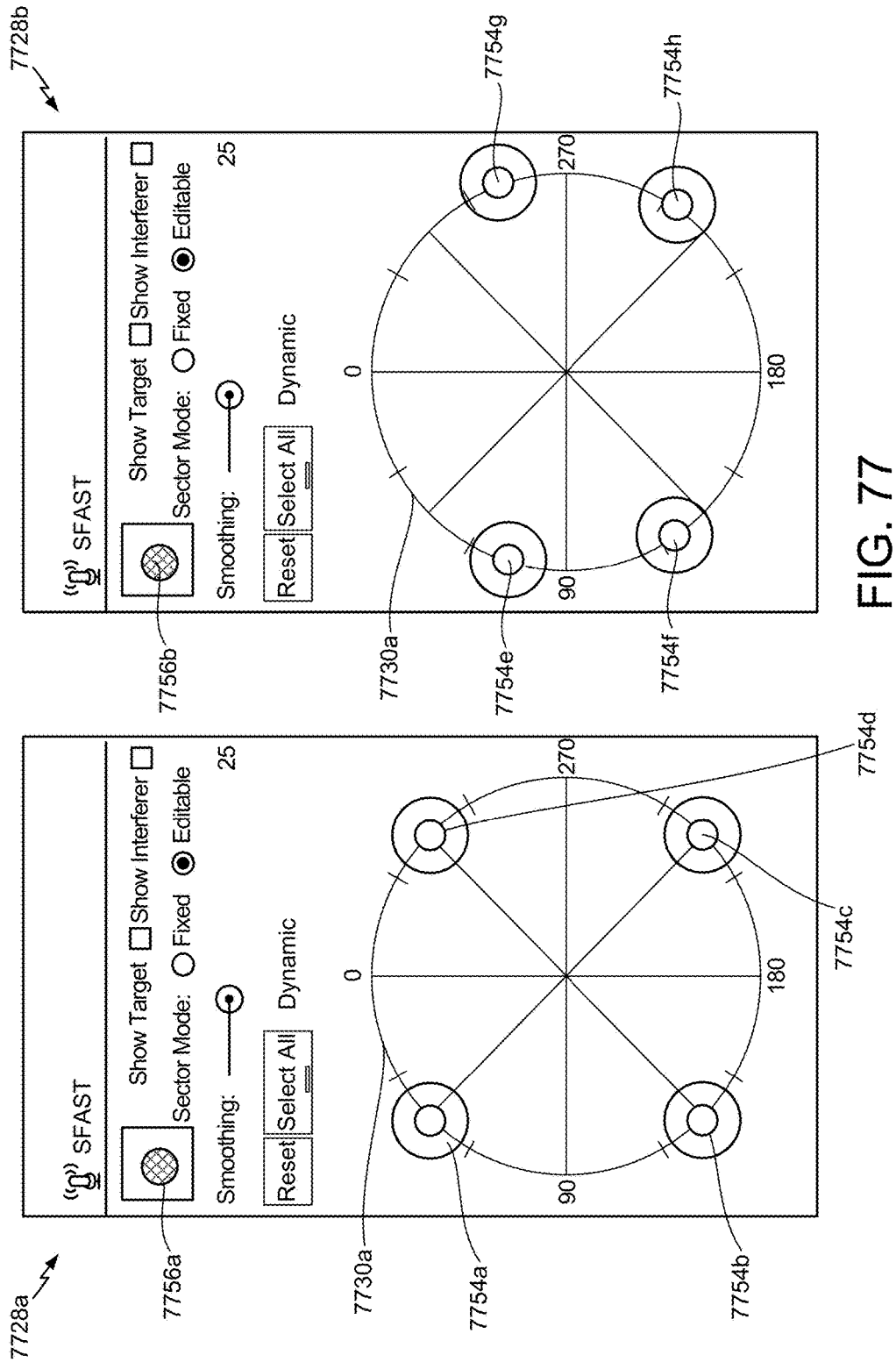
FIG. 77 illustrates examples of a sector editing feature of the user interface.

FIG. 77 illustrates examples of a sector editing feature 6436 of the user interfaces 7728*a-b*. In some implementations, the user interfaces 7728*a-b* may be examples of the user interface 6228 described in connection with FIG. 62. The user interfaces 7728*a-b* may include coordinate systems 7730*a-b* that may be examples of corresponding elements described in connection with FIG. 62. The user interfaces 7728*a-b* may include at least one touch point 7754*a-h*. As described above, the touch points 7754*a-h* may be handles that allow editing of at least one sector. The touch points 7754*a-h* may be positioned at the apexes of the sectors. In some implementations, sector editing may be done independent of sector selection. Accordingly, a sector that is not selected may be adjusted in some configurations.

In some implementations, the user interfaces 7728*a-b* may provide an interactive control that enables a fixing mode and an editing mode of the user interfaces 7728*a-b*. For example, the user interfaces 7728*a-b* may each include an activation/deactivation button 7756*a-b* that controls whether the user interface 7728*a-b* is operable. The activation/deactivation buttons 7756*a-b* may toggle activated/deactivated states for the user interfaces 7728*a-b*. While in an editable mode, the user interfaces 7728*a-b* may display at least one touch point 7754*a-f* (e.g., handles) corresponding to at least one sector (e.g., the circles at the edges of the sectors).

Figure 78:
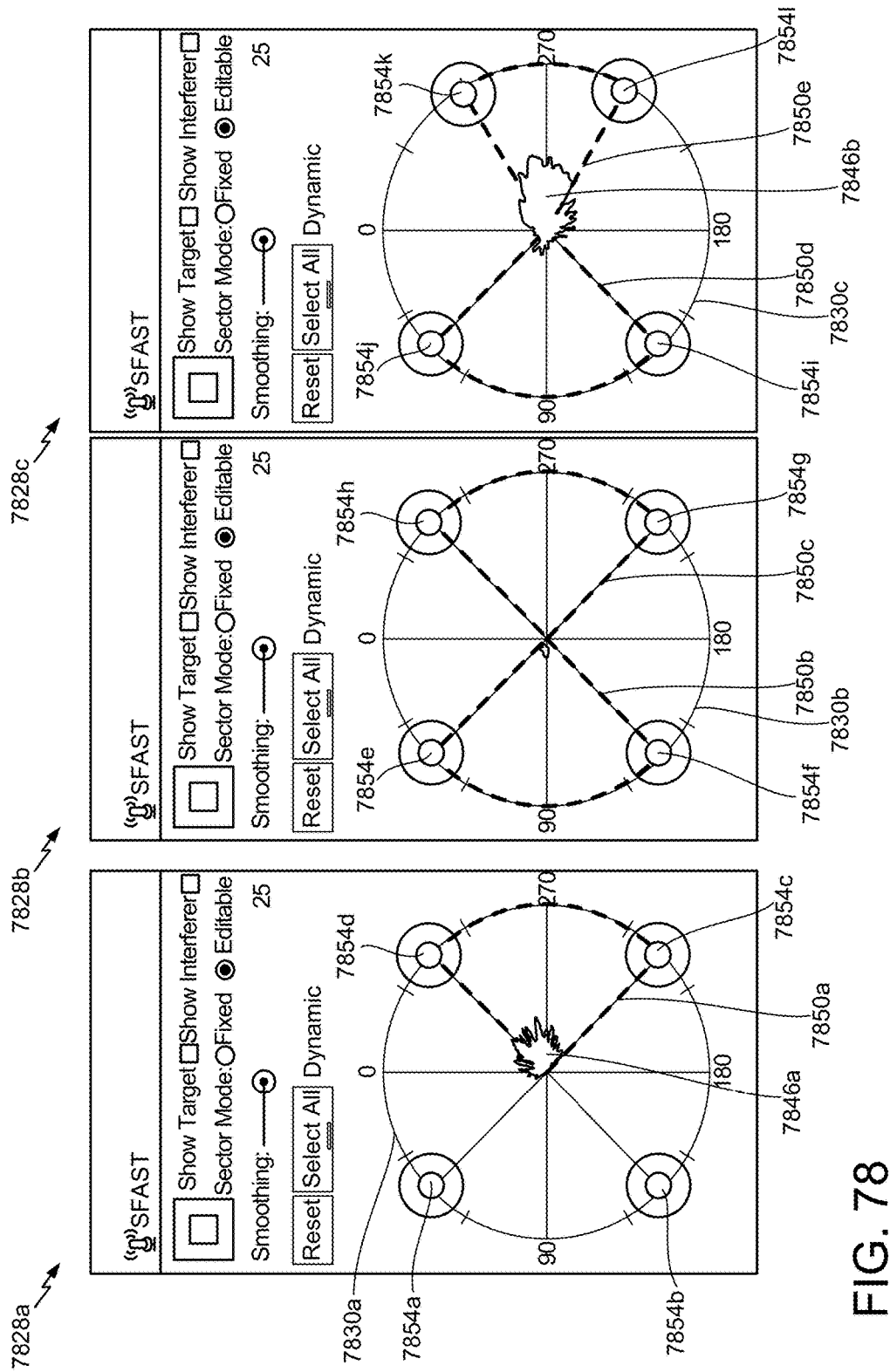
FIG. 78 illustrates more examples of the sector editing feature of the user interface.

FIG. 78 illustrates more examples of the sector editing feature 6436 of the user interface 7828*a-c*. In some implementations, the user interfaces 7828*a-c* may be examples of the user interface 6228 described in connection with FIG. 62. The user interfaces 7828*a-c* may include coordinate systems 7830*a-c*, at least one audio signal indicator 7846*a-b*, at least one selected sector 7850*a-e* and at least one touch point 7854*a-l* that may be examples of corresponding elements described in connection with at least one of FIGS. 62, 66 and 71. In FIG. 78, at least one sector has been selected (as illustrated by the dashed lines, for instance). As depicted in FIG. 78, the selected sectors 7850*a-e* may be narrowed for more precision. For example, a user may use the touch points 7854*a-l* to adjust (e.g., expand and narrow) the selected sector 7850*a-e*. The other sectors(s) outside of the selected sectors 7850*a-e* may be noise suppressed and/or attenuated.

Figure 79:
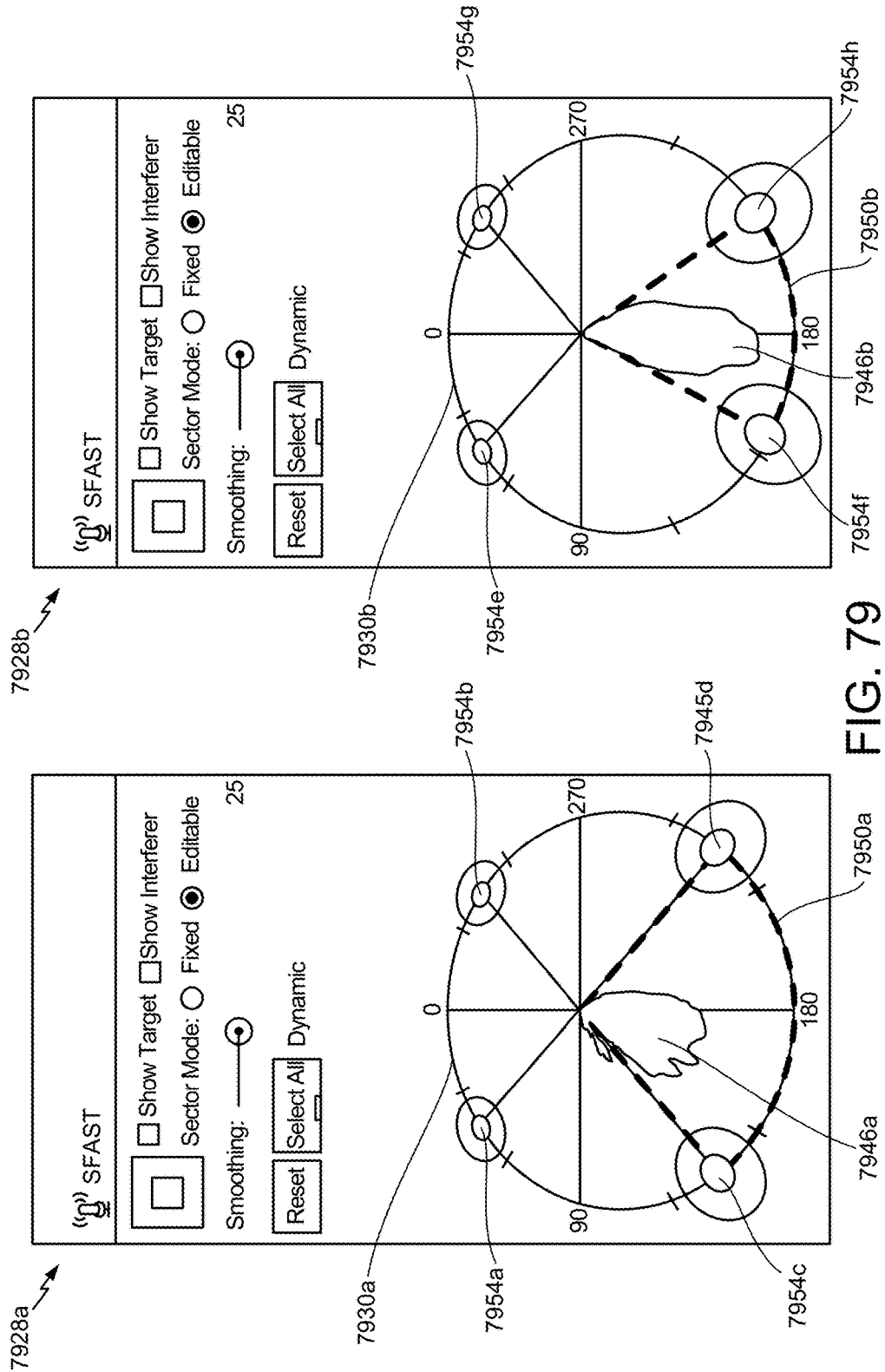
FIG. 79 illustrates more examples of the sector editing feature of the user interface.

FIG. 79 illustrates more examples of the sector editing feature 6436 of the user interfaces 7928*a-b*. In some implementations, the user interfaces 7928*a-b* may be examples of the user interface 6228 described in connection with FIG. 62. The user interfaces 7928*a-b* may include coordinate systems 7930*a-b*, at least one audio signal indicator 7946*a-b*, at least one selected sector 7950*a-b* and at least one touch point 7954*a-h* that may be examples of corresponding elements described in connection with at least one of FIGS. 62, 66 and 71. In FIG. 79, the electronic device 6202 (e.g., phone) may be in the palm of a user's hand. For example, the electronic device 6202 may be tilted upward. In this example, a part of the user interfaces 7928a-b (e.g., the coordinate systems 7930a-b) may be aligned with a horizontal reference plane as described earlier. Accordingly, the coordinate systems 7930a-b appear in a three-dimensional perspective extending into the user interfaces 7928a-b. The audio signal in FIG. 79 may originate from a user that is holding the electronic device 6202 in their hands and speaking in front of it (at roughly 180 degrees, for instance). FIG. 79 also illustrates that at least one sector can be narrowed or widened in real-time. For instance, a selected sector 7950a-b may be adjusted during an ongoing conversation or phone call.

Figure 80:
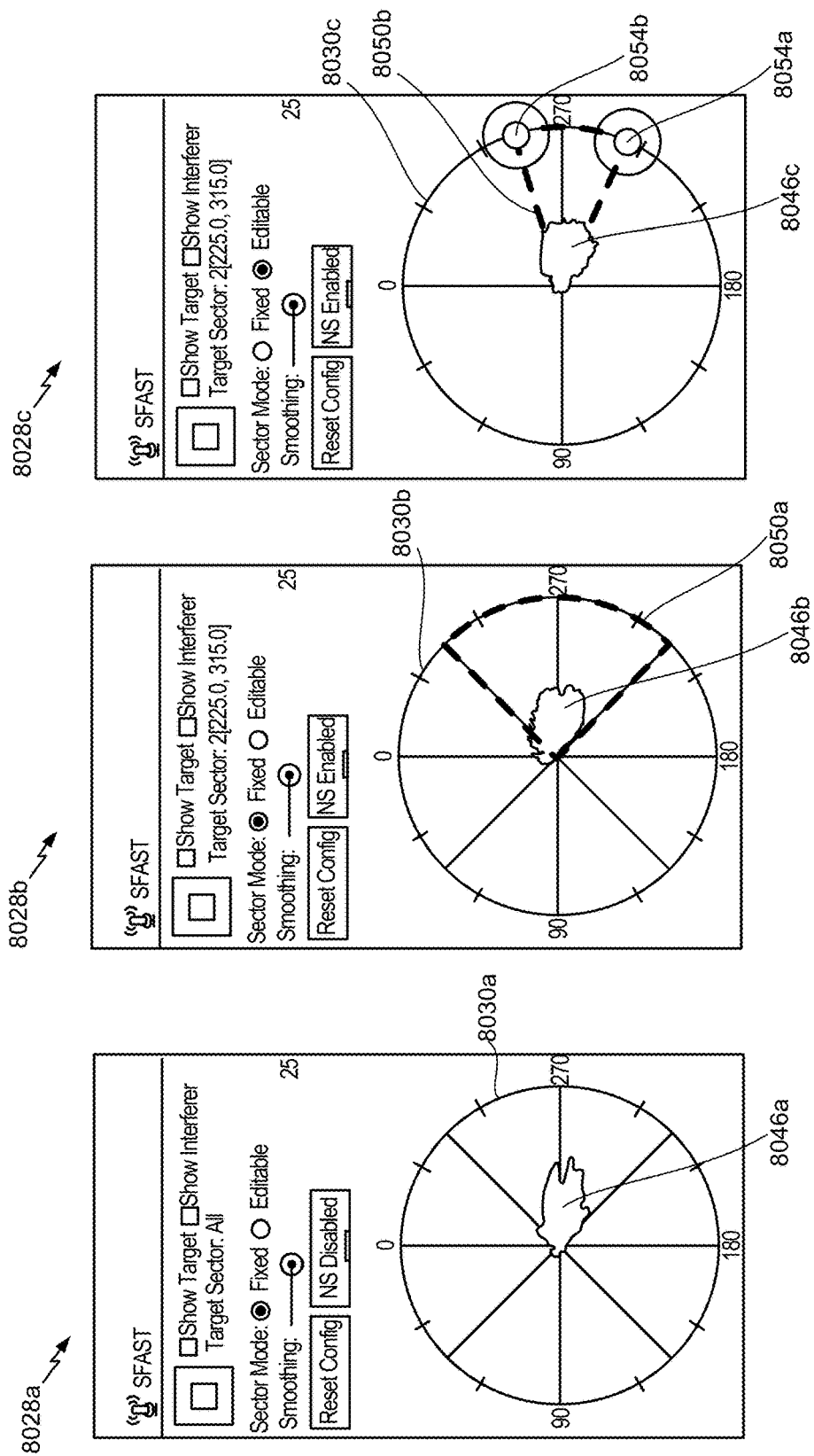

FIG. 80 illustrates more examples of the sector editing feature 6436 of the user interfaces 8028a-c. In some implementations, the user interfaces 8028a-c may be examples of the user interface 6228 described in connection with FIG. 62. The user interfaces 8028a-c may include coordinate systems 8030a-c, at least one audio signal indicator 8046a-c, at least one selected sector 8050a-b and at least one touch point 8054a-b that may be examples of corresponding elements described in connection with at least one of FIGS. 62, 66 and 71. The first illustration depicts an audio signal indicator 8046a indicating the presence of an audio signal at approximately 270 degrees. The middle illustration shows a user interface 8028b with a selected sector 8050a. The right illustration depicts one example of editing the selected sector 8050b. In this case, the selected sector 8050b is narrowed. In this example, an electronic device 6202 may pass the audio signals that have a direction of arrival associated with the selected sector 8050b and attenuate other audio signals that have a direction of arrival associated with the outside of the selected sector 8050b.

Figure 81:
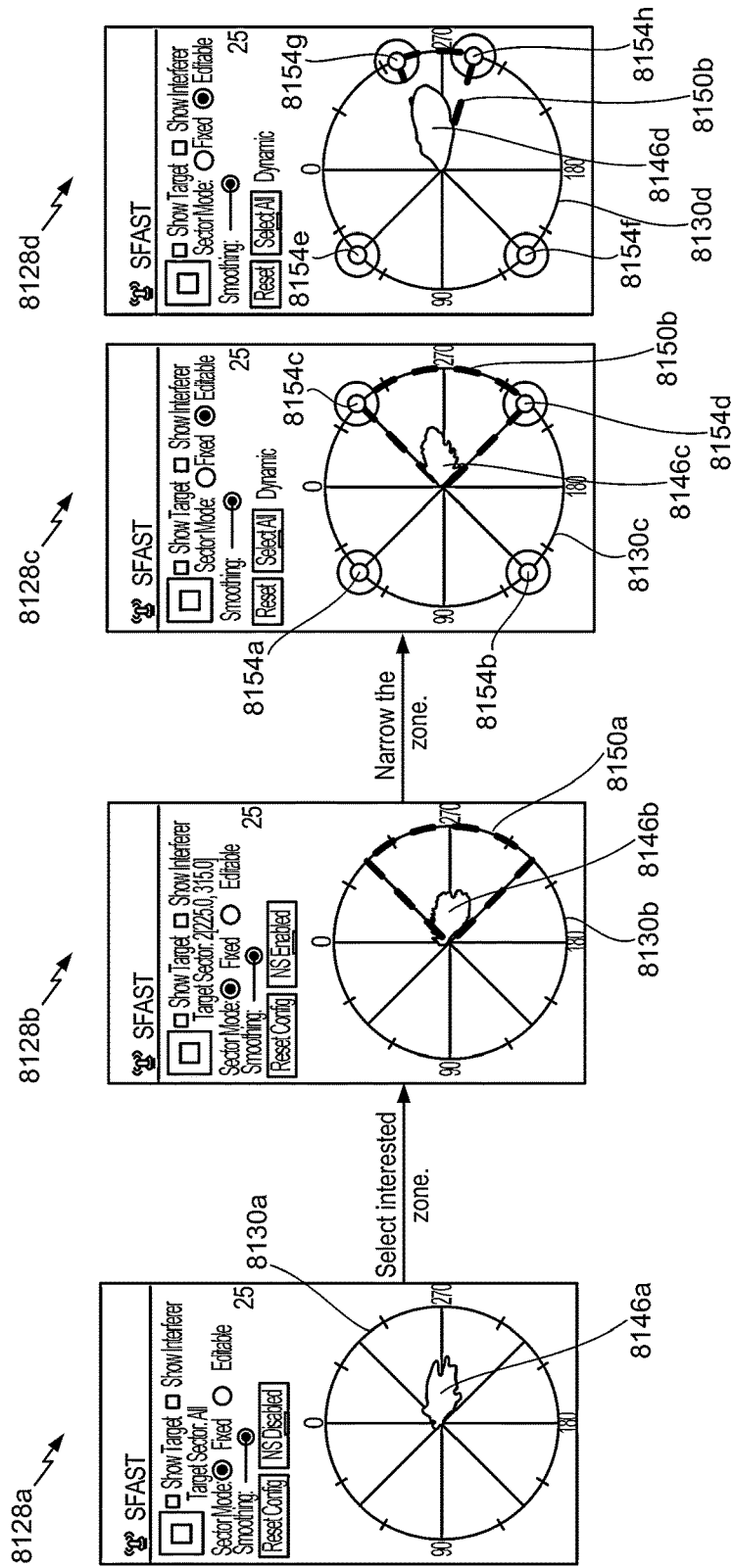

FIG. 81 illustrates more examples of the sector editing feature 6436 of the user interfaces 8128a-d. In some implementations, the user interfaces 8128a-d may be examples of the user interface 6228 described in connection with FIG. 62. The user interfaces 8128a-d may include coordinate systems 8130a-d, at least one audio signal indicator 8146a-d, at least one selected sector 8150a-c and at least one touch point 8154a-h that may be examples of corresponding elements described in connection with at least one of FIGS. 62, 66 and 71. The first illustration depicts an audio signal indicator 8146a indicating the presence of an audio signal at approximately 270 degrees. The second illustration shows a user interface 8128b with a selected sector 8150a. The third illustration shows at least one touch point 8154a-d used for editing a sector. The fourth illustration depicts one example of editing the selected sector 8150d. In this case, the selected sector 8150d is narrowed. In this example, an electronic device 6202 may pass the audio signals that have a direction of arrival associated with the selected sector 8150d (e.g., that may be based on user input) and attenuate other audio signals that have a direction of arrival associated with the outside of the selected sector 8150d.

Figure 82:
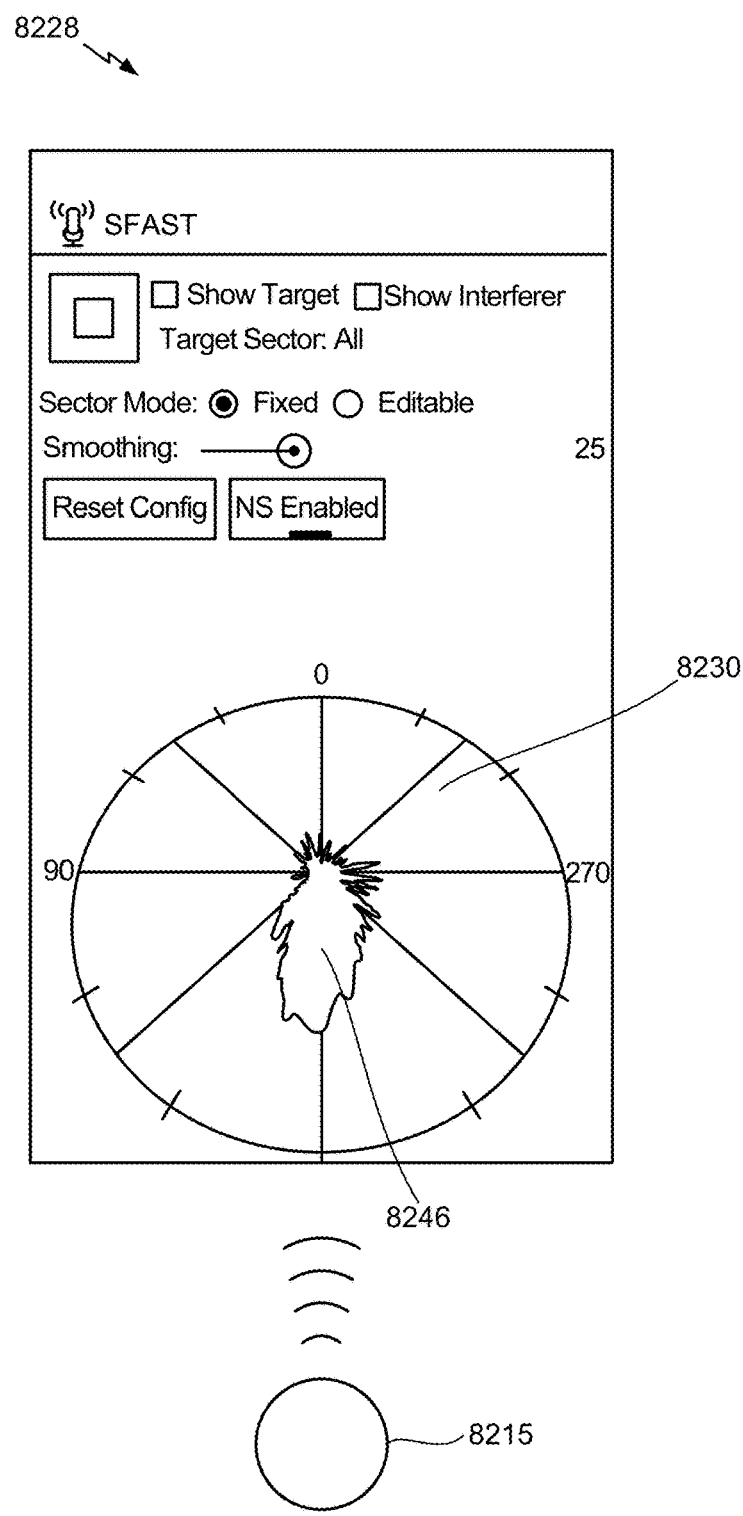

FIG. 82 illustrates an example of the user interface 8228 with a coordinate system 8230 oriented independent of electronic device 6202 orientation. In some implementations, the user interface 8228 may be an example of the user interface 6228 described in connection with FIG. 62. The user interface includes a coordinate system 8230, and an audio signal indicator 8246 that may be examples of corresponding elements described in connection with at least one of FIGS. 62 and 66. In FIG. 82, the electronic device 6202 (e.g., phone) is tilted upward (in the palm of a user's hand, for example). The coordinate system 8230 (e.g., the polar graph) of the user interface 8228 shows or displays the audio signal source location. In this example, a part of the user interface 8228 is aligned with a horizontal reference plane as described earlier. The audio signal in FIG. 82 originates from a source 8215 at roughly 180 degrees. As described above, a source 8215 may include a user (that is holding the electronic device 6202 in their hand and speaking in front of it, for example), a speaker, or anything that is capable of generating an audio signal.

Figure 83:
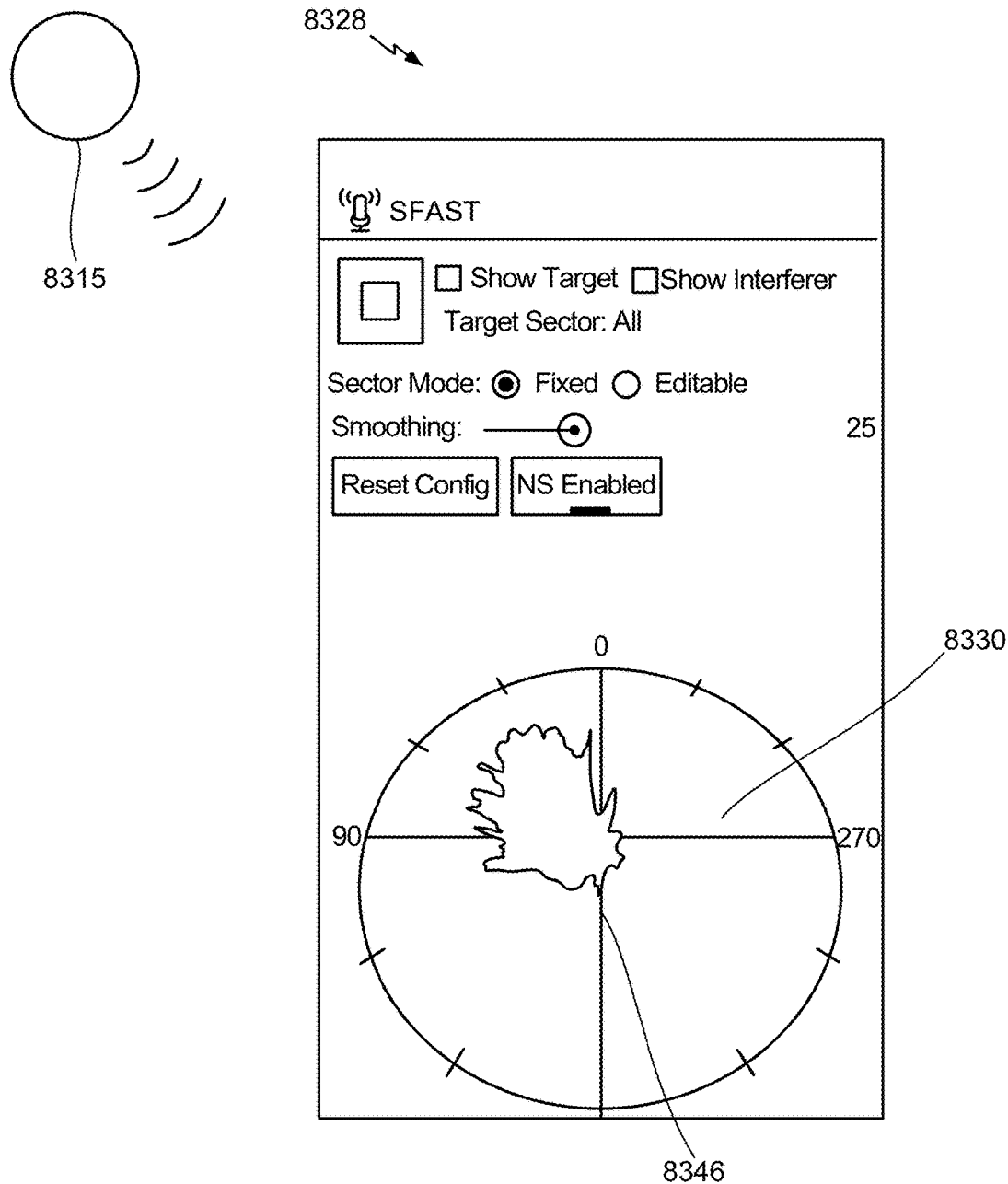

FIG. 83 illustrates another example of the user interface 8328 with a coordinate system 8330 oriented independent of electronic device 6202 orientation. In some implementations, the user interface 8328 may be an example of the user interface 6228 described in connection with FIG. 62. The user interface 8328 includes a coordinate system 8330 and an audio signal indicator 8346 that may be examples of corresponding elements described in connection with at least one of FIGS. 62 and 66. In FIG. 83, the electronic device 6202 (e.g., phone) is in a slanted or tilted orientation (in the palm of a user's hand, for example) increasing in elevation from the bottom of the electronic device 6202 to the top of the electronic device 6202 (towards the sound source 8315). The coordinate system 8330 (e.g., the polar graph) of the user interface 8328 displays the audio signal source location. In this example, a part of the user interface 8328 is aligned with a horizontal reference plane as described earlier. The audio signal in FIG. 83 originates from a source 8315 that is toward the back of (or behind) the electronic device 6202 (e.g., the phone). FIG. 83 illustrates that the reference plane of the user interface 8328 is aligned with the physical plane (e.g., horizontal) of the 3D world. Note that in FIG. 83, the user interface 8328 plane goes into the screen, even though the electronic device 6202 is being held semi-vertically. Thus, even though the electronic device 6202 is at approximately 45 degrees relative to the physical plane of the floor, the user interface 8328 coordinate system 8330 plane is at 0 degrees relative to the physical plane of the floor. For example, the reference plane on the user interface 8328 corresponds to the reference plane in the physical coordinate system.

Figure 84:
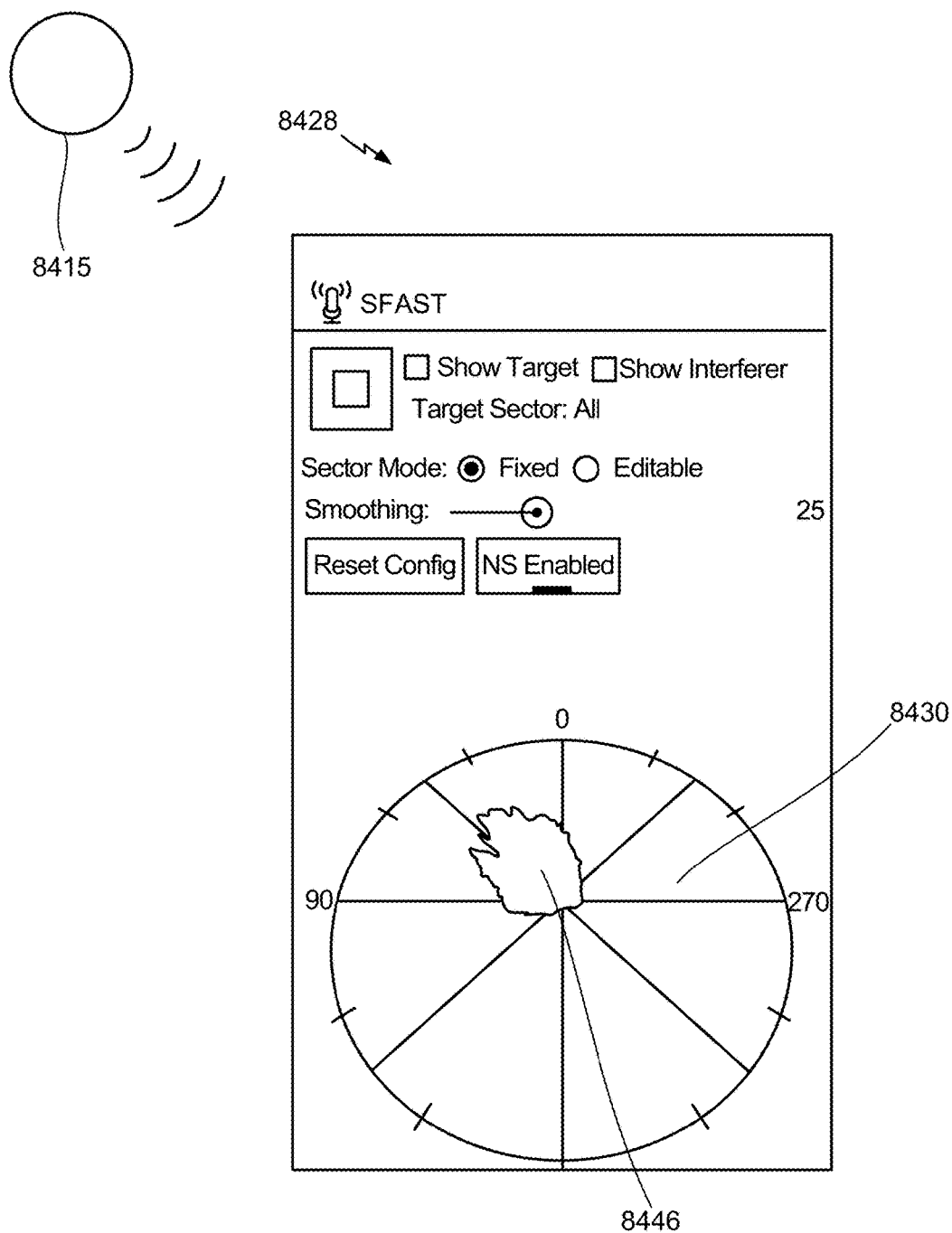

FIG. 84 illustrates another example of the user interface 8428 with a coordinate system 8430 oriented independent of electronic device 6202 orientation. In some implementations, the user interface 8428 may be an example of the user interface 6228 described in connection with FIG. 62. The user interface 8428 includes a coordinate system 8430 and an audio signal indicator 8446 that may be examples of corresponding elements described in connection with at least one of FIGS. 62 and 66. In FIG. 84, the electronic device 6202 (e.g., phone) is in a vertical orientation (in the palm of a user's hand, for example). The coordinate system 8430 (e.g., the polar graph) of the user interface 8428 displays the audio signal source location. In this example, a part of the user interface 8428 is aligned with a horizontal reference plane as described earlier. The audio signal in FIG. 84 originates from a source 8415 that is toward the back left of (e.g., behind) the electronic device 6202 (e.g., the phone).

Figure 85:
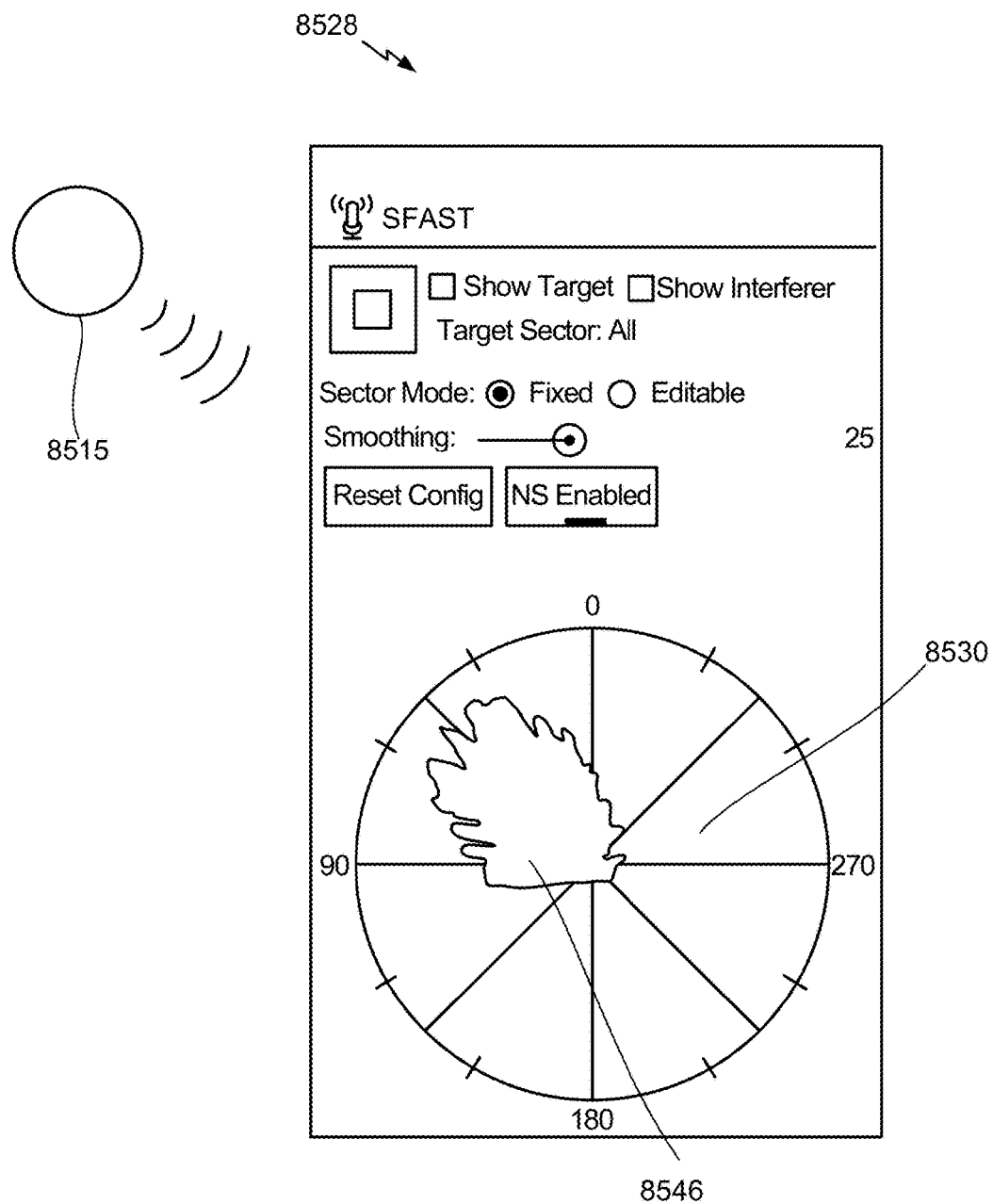

FIG. 85 illustrates another example of the user interface 8528 with a coordinate system 8530 oriented independent of electronic device 6202 orientation. In some implementations, the user interface 8528 may be an example of the user interface 6228 described in connection with FIG. 62. The user interface 8528 includes a coordinate system 8530 and an audio signal indicator 8546 that may be examples of corresponding elements described in connection with at least one of FIGS. 62 and 66. In FIG. 85, the electronic device 6202 (e.g., phone) is in a horizontal face-up orientation (e.g., a tabletop mode). The coordinate system 8530 (e.g., the polar graph) of the user interface 8528 displays the audio signal source location. The audio signal in FIG. 85 may originate from a source 8515 that is toward the top left of the electronic device 6202 (e.g., the phone). In some examples, the audio signal source is tracked. For example, when noise suppression is enabled, the electronic device 6202 may track the loudest speaker or sound source. For instance, the electronic device 6202 (e.g., phone) may track the movements of a loudest speaker while suppressing other sounds (e.g., noise) from other areas (e.g., zones or sectors).

Figure 86:
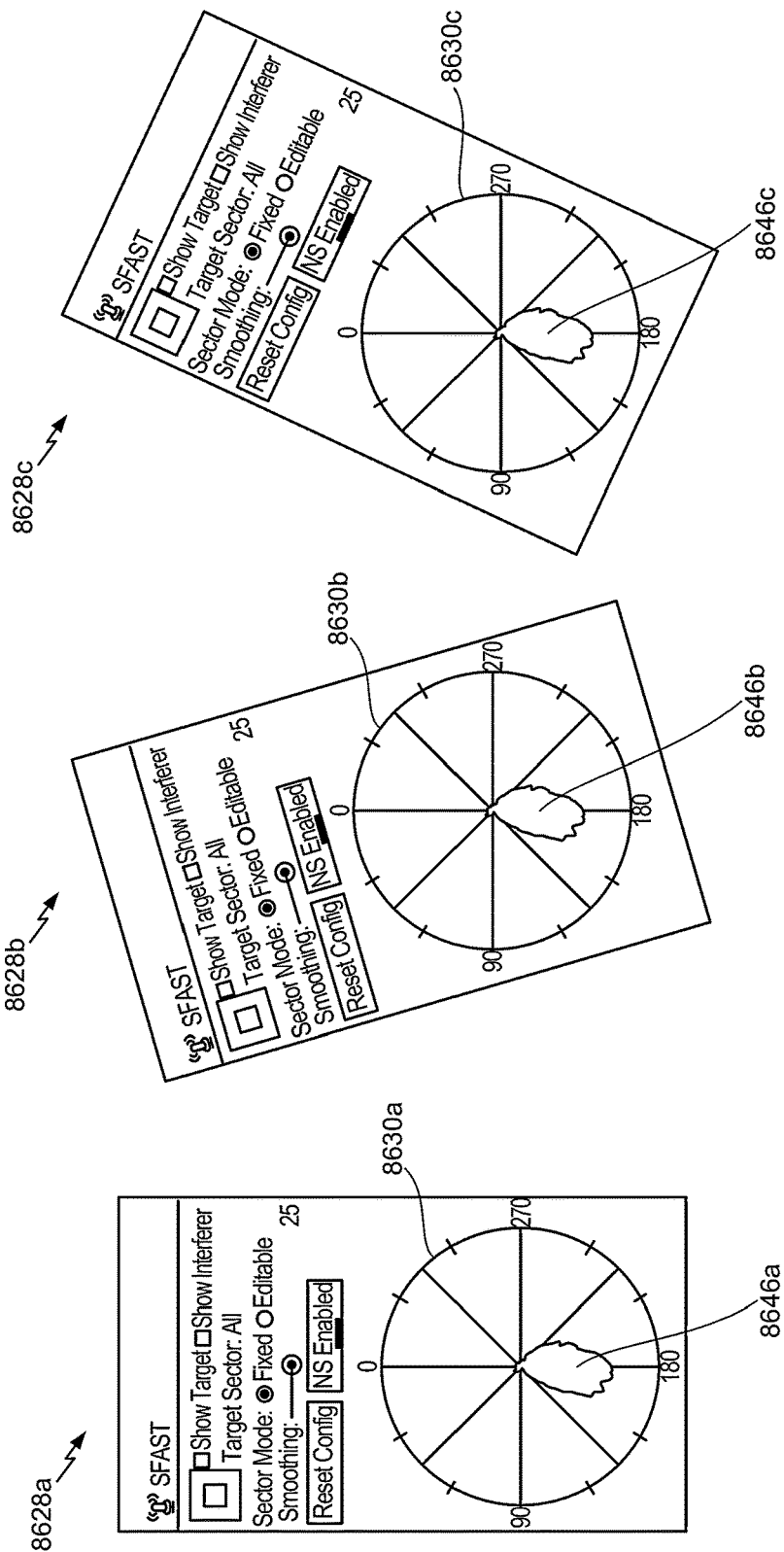

FIG. 86 illustrates more examples of the user interfaces 8628*a-c* with a coordinate systems 8630*a-c* oriented independent of electronic device 6202 orientation. In other words, the coordinate systems 8630*a-c* and/or the audio signal indicators 8646*a-c* remain at the same orientation relative to physical space, independent of how the electronic device 6202 is rotated. In some implementations, the user interfaces 8628*a-c* may be examples of the user interface 6228 described in connection with FIG. 62. The user interfaces 8628*a-c* may include coordinate systems 8630*a-c* and audio signal indictors 8646*a-c* that may be examples of corresponding elements described in connection with at least one of FIGS. 62 and 66. Without a compass, the sector selection feature 6232 may not have an association with the physical coordinate system of the real world (e.g., north, south, east, west, etc.). Accordingly, if the electronic device 6202 (e.g., phone) is in a vertical orientation facing the user (e.g., a browse-talk mode), the top of the electronic device 6202 may be designated as "0 degrees" and runs along a vertical axis. When the electronic device 6202 is rotated, for example by 90 degrees in a clockwise direction, "0 degrees" is now located on a horizontal axis. Thus, when a sector is selected, rotation of the electronic device 6202 affects the selected sector. By adding another component that can detect direction, for example, a compass, the sector selection feature 6232 of the user interface 8628*a-c* can be relative to physical space, and not the phone. In other words, by adding a compass, when the phone is selected from a vertically upright position to a horizontal position, "0 degrees" still remains on the top side of the phone that is facing the user. For example, in the first image of FIG. 86, the user interface 8628*a* is illustrated without tilt (or with 0 degrees tilt, for instance). For example, the coordinate system 8630*a* is aligned with the user interface 8628*a* and/or the electronic device 6202. By comparison, in the second image of FIG. 86, the user interface 8628*b* and/or electronic device 6202 are tilted to the left. However, the coordinate system 8630*b* (and mapping between the real world and electronic device 6202) may be maintained. This may be done based on tilt sensor data 5608, for example. In the third image of FIG. 86, the user interface 8628*c* and/or electronic device 6202 are tilted to the right. However, the coordinate system 8630*c* (and mapping between the real world and electronic device 6202) may be maintained.

It should be noted that as used herein, the term "physical coordinates" may or may not denote geographic coordinates. In some configurations, for example, where the electronic device 6202 does not include a compass, the electronic device 6202 may still map coordinates from a multi-microphone configuration to physical coordinates based on sensor data 5608. In this case, the mapping 5612 may be relative to the electronic device 6202 and may not directly correspond to earth coordinates (e.g., north, south, east, west). Regardless, the electronic device 6202 may be able to discriminate the direction of sounds in physical space relative to the electronic device 6202. In some configurations, however, the electronic device 6202 may include a compass (or other navigational instrument). In this case, the electronic device 6202 may map coordinates from a multi-microphone configuration to physical coordinates that correspond to earth coordinates (e.g., north, south, east, west). Different types of coordinate systems 6230 may be utilized in accordance with the systems and methods disclosed herein.

Figure 87:
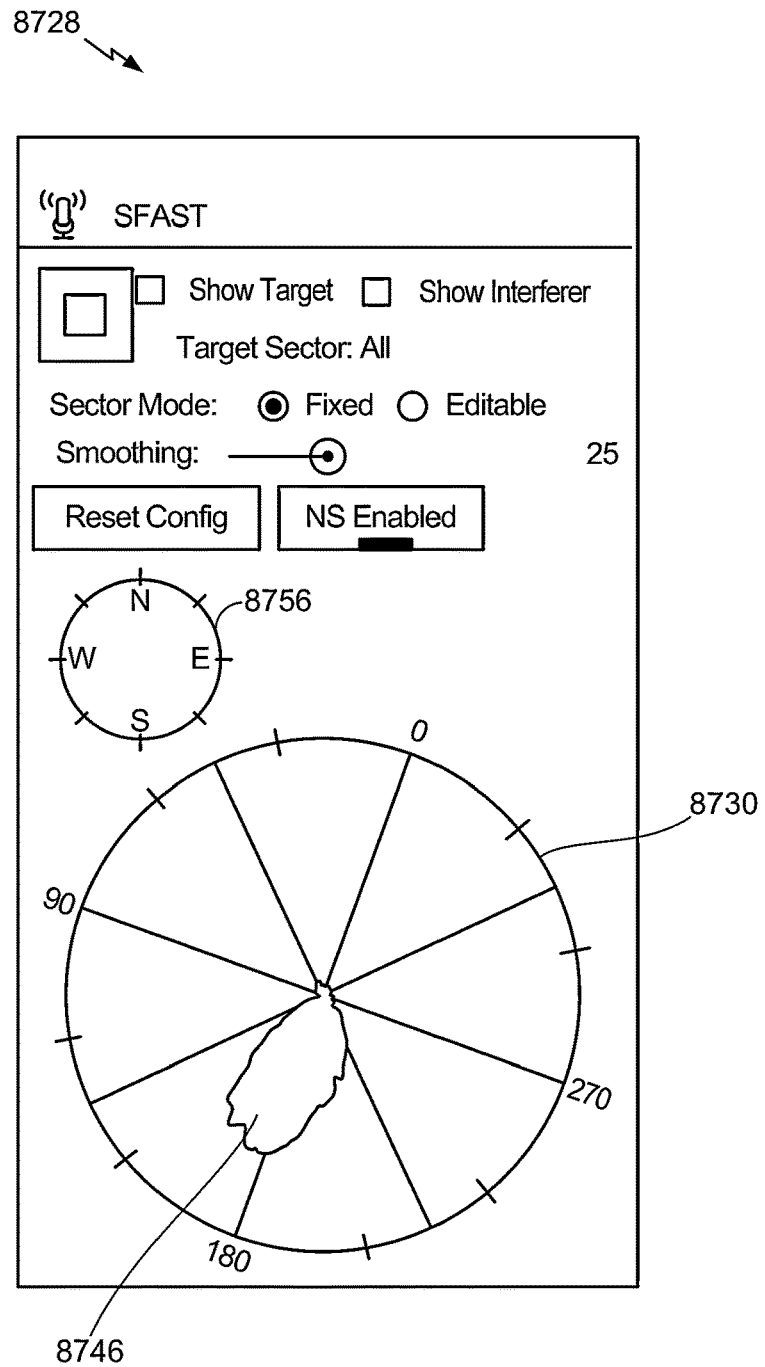

FIG. 87 illustrates another example of the user interface 8728 with a coordinate system 8730 oriented independent of electronic device 6202 orientation. In some implementations, the user interface 8728 may be an example of the user interface 6228 described in connection with FIG. 62. The user interface 8728 may include a coordinate system 8730 and an audio signal indicator 8746 that may be examples of corresponding elements described in connection with at least one of FIGS. 62 and 66. In some implementations, the user interface 8728 also includes a compass 8756 in conjunction with a coordinate system 8730 (as described above). In this implementation, the compass 8756 may detect direction. The compass 8756 portion may display an electronic device 6202 orientation relative to real world coordinates. Via the compass 8756, the sector selection feature 6232 on the user interface 8728 may be relative to physical space, and not the electronic device 6202. In other words, by adding a compass 8756, when the electronic device 6202 is selected from a vertical position to a horizontal position, "0 degrees" still remains near the top side of the electronic device 6202 that is facing the user. It should be noted that determining physical electronic device 6202 orientation can be done with a compass 8756. However, if a compass 8756 is not present, it also may be alternatively determined based on GPS and/or gyro sensors. Accordingly, any sensor 5604 or system that may be used to determine physical orientation of an electronic device 6202 may be used alternatively from or in addition to a compass 8756. Thus, a compass 8756 may be substituted with another sensor 5604 or system in any of the configurations described herein. So, there are multiple sensors 5604 that can provide screenshots where the orientation remains fixed relative to the user.

In the case where a GPS receiver is included in the electronic device 6202, GPS data may be utilized to provide additional functionality (in addition to just being a sensor). In some configurations, for example, the electronic device 6202 (e.g., mobile device) may include GPS functionality with map software. In one approach, the coordinate system 8730 may be aligned such that zero degrees always points down a street, for example. With the compass 8756, for instance, the electronic device 6202 (e.g., the coordinate system 8730) may be oriented according to a physical north and/or south, whereas GPS functionality may be utilized to provide more options.

Figure 88:
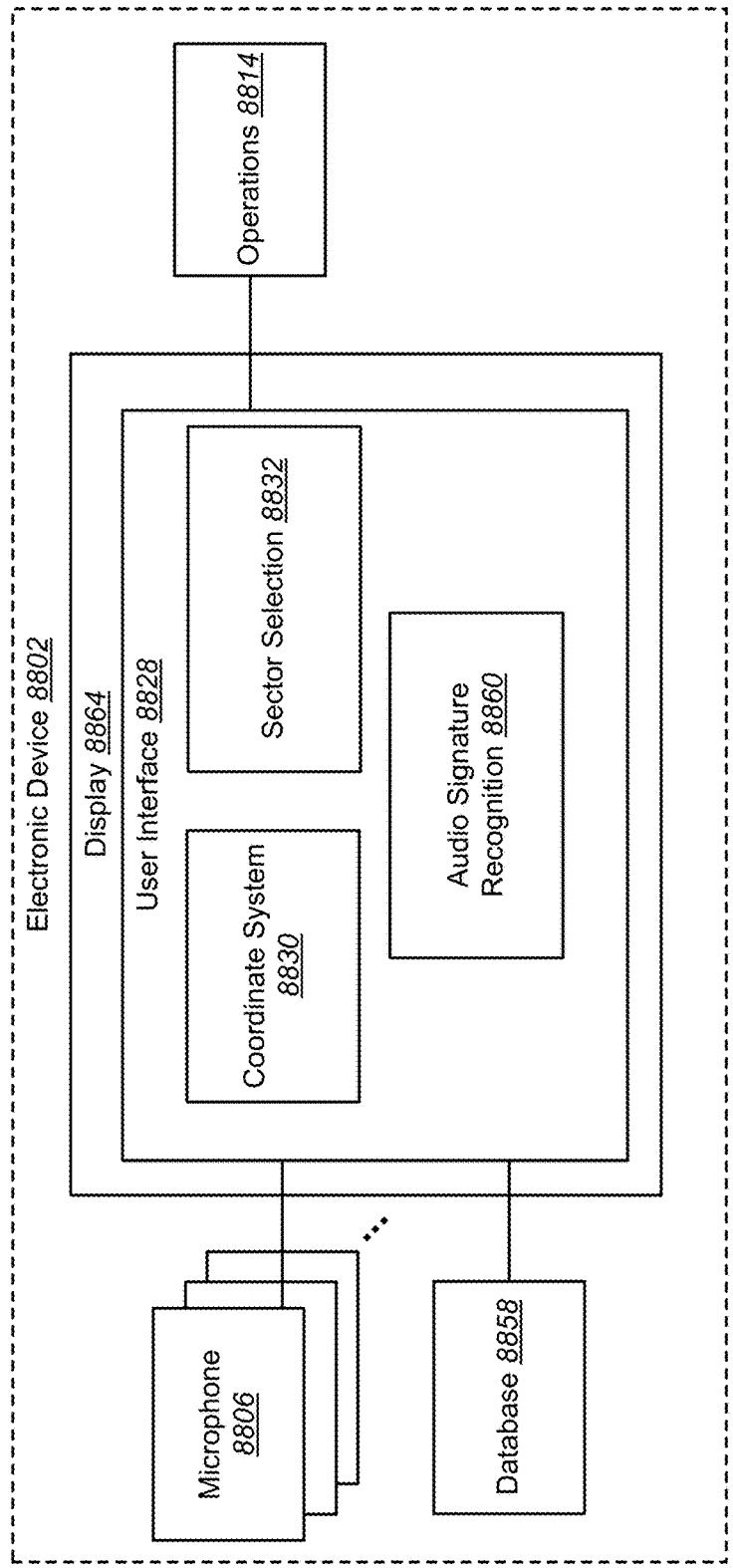

FIG. 88 is a block diagram illustrating another configuration of a user interface 8828 in which systems and methods for displaying a user interface 8828 on an electronic device 8802 may be implemented. The user interface 8828 may be an example of the user interface 6228 described in connection with FIG. 62. In some implementations, the user interface 8828 may be presented on a display 8864 of the electronic device 8802 that may be examples of corresponding elements described in connection with FIG. 62. The user interface 8828 may include a coordinate system 8830 and/or a sector selection feature 8832 that may be examples of corresponding elements described in connection with at least one of FIGS. 62 and 66. The user interface 8828 may be coupled to at least one microphone 8806 and/or an operation block/module 8814 that may be examples of corresponding elements described in connection with at least one of FIGS. 56 and 66.

In some implementations, the user interface 8828 may be coupled to a database 8858 that may be included and/or coupled to the electronic device 8802. For example, the database 8858 may be stored in memory located on the electronic device 8802. The database 8858 may include one or more audio signatures. For example, the database 8858 may include one or more audio signatures pertaining to one or more audio signal sources (e.g., individual users). The database 8858 may also include information based on the audio signatures. For example, the database 8858 may include identification information for the users that correspond to the audio signatures. Identification information may include images of the audio signal source (e.g., an image of a person corresponding to an audio signature) and/or contact information, such as name, email address, phone number, etc.

In some implementations, the user interface 8828 may include an audio signature recognition block/module 8860. The audio signature recognition block/module 8860 may recognize audio signatures received by the at least one microphone 8806. For example, the microphones 8806 may receive an audio signal. The audio signature recognition block/module 8860 may obtain the audio signal and compare it to the audio signatures included in the database 8858. In this example, the audio signature recognition block/module 8860 may obtain the audio signature and/or identification information pertaining to the audio signature from the database 8858 and pass the identification information to the display 8864.

Figure 89:
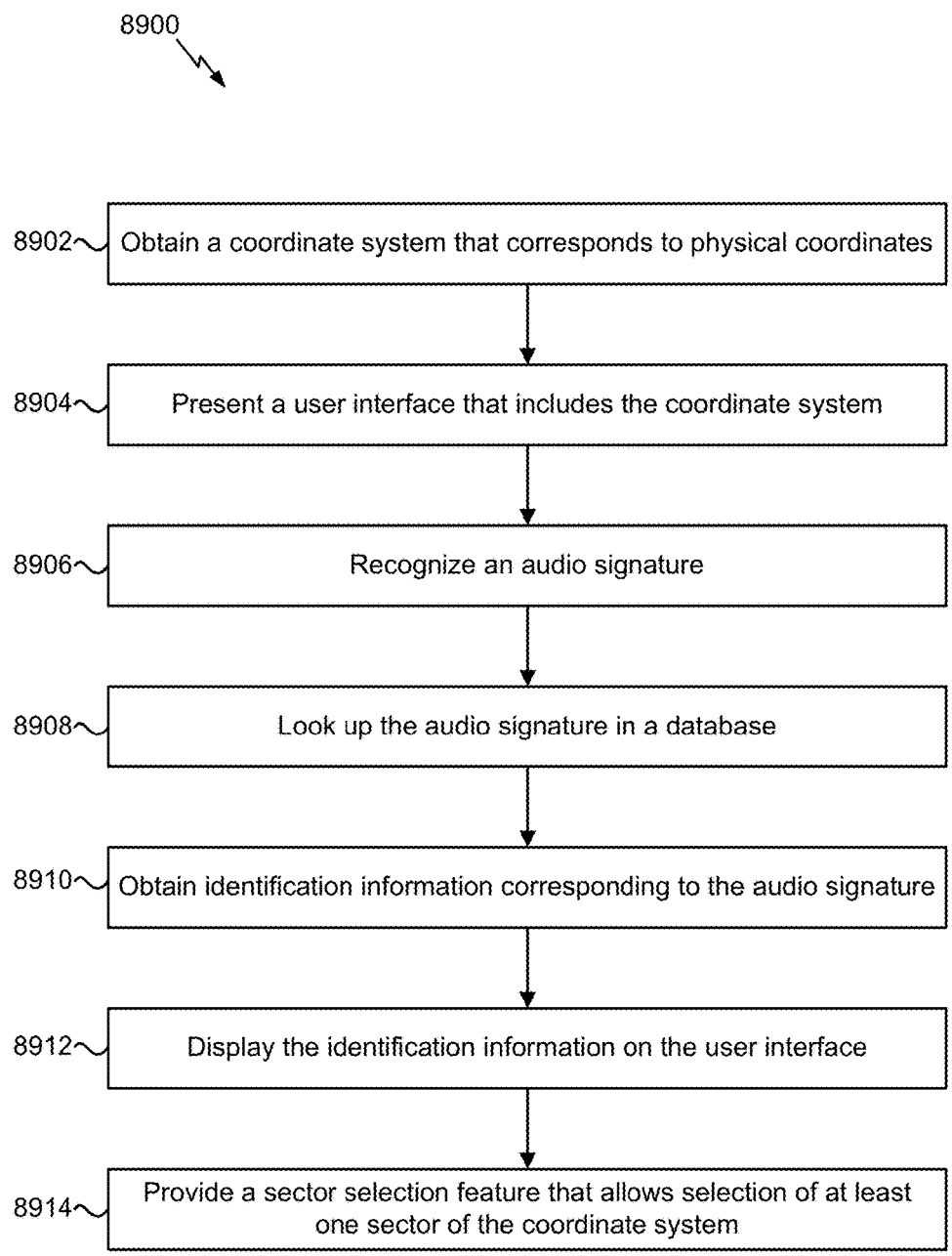

FIG. 89 is a flow diagram illustrating another configuration of a method 8900 for displaying a user interface 8828 on an electronic device 8802. The method 8900 may be performed by the electronic device 8802. The electronic device 8802 may obtain 8902 a coordinate system 8830 that corresponds to physical coordinates. In some implementations, this may be done as described in connection with FIG. 63.

The electronic device 8802 may present 8904 the user interface 8828 that may include the coordinate system 8830. In some implementations, this may be done as described in connection with FIG. 63.

The electronic device 8802 may recognize 8906 an audio signature. An audio signature may be a characterization that corresponds to a particular audio signal source. For example, an individual user may have an audio signature that corresponds to that individual's voice. Examples of audio signatures include voice recognition parameters, audio signal components, audio signal samples and/or other information for characterizing an audio signal. In some implementations, the electronic device 8802 may receive an audio signal from at least one microphone 8806. The electronic device 8802 may then recognize 8906 the audio signature, for example, by determining whether the audio signal is from an audio signal source such as an individual user, as compared to a noise signal. This may be done by measuring at least one characteristic of the audio signal, (e.g., harmonicity, pitch, etc.). In some implementations, recognizing 8906 an audio signature may include identifying an audio signal as coming from a particular audio source.

The electronic device 8802 may then look up 8908 the audio signature in the database 8858. For example, the electronic device 8802 may look for the audio signature in the database 8858 of audio signatures. The electronic device 8802 may obtain 8910 identification information corresponding to the audio signature. As described above, the database 8858 may include information based on the audio signatures. For example, the database 8858 may include identification information for the users that correspond to the audio signatures. Identification information may include images of the audio signal source (e.g., the user) and/or contact information, such as name, email address, phone number, etc. After obtaining 8910 the identification information (e.g., the image) corresponding to the audio signature, the electronic device 8802 may display 8912 the identification information on the user interface 8828. For example, the electronic device 8802 may display 8912 an image of the user next to the audio signal indicator 6646 on the display 6264. In other implementations, the electronic device 8802 may display 8912 at least one identification information element as part of an identification display. For example, a portion of the user interface 8828 may include the identification information (e.g., image, name, email address etc.) pertaining to the audio signature.

The electronic device 8802 may provide 8914 a sector selection feature 6232 that allows selection of at least one sector of the coordinate system 8830. In some implementations, this may be done as described in connection with FIG. 63.

Figure 90:
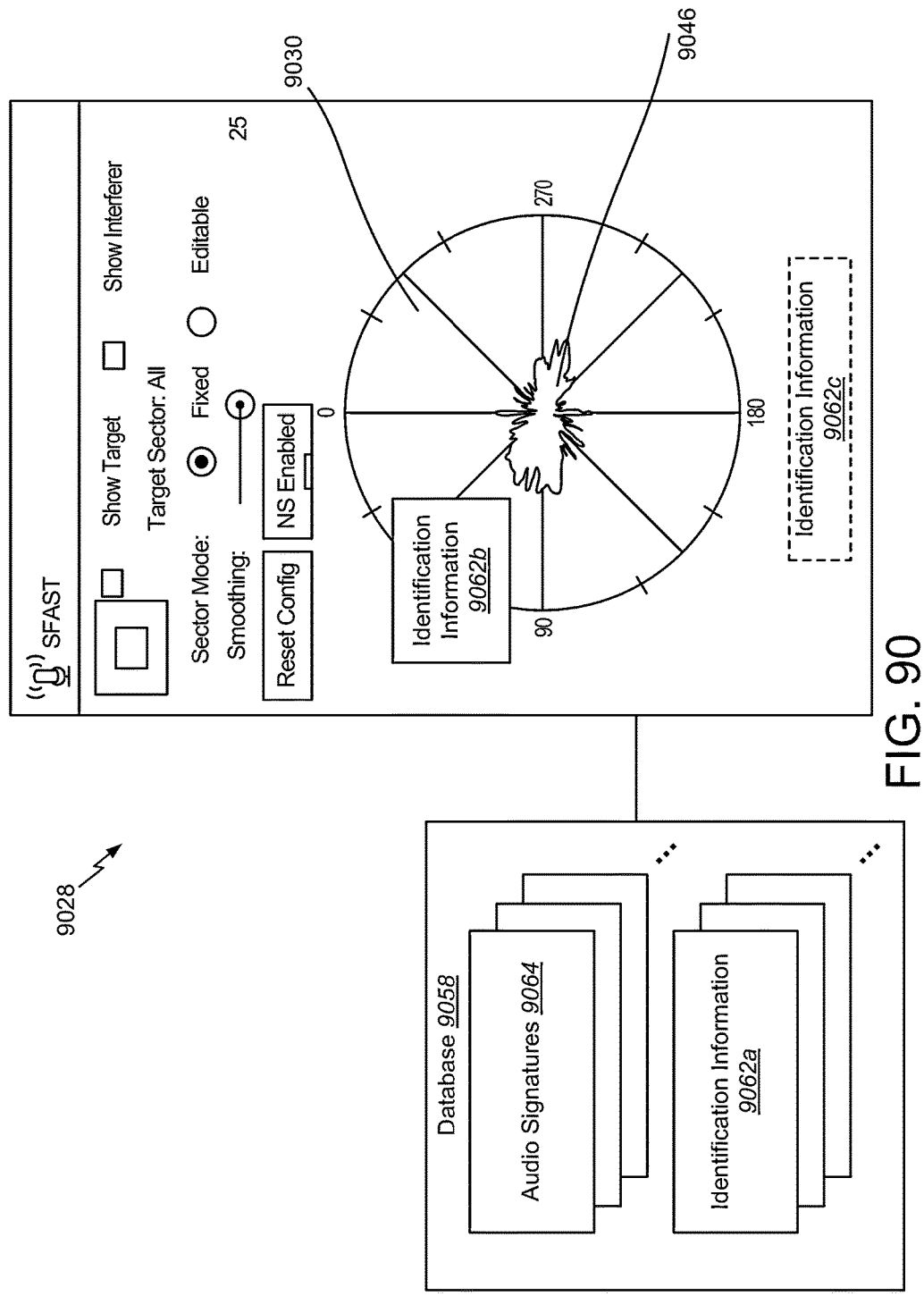

FIG. 90 illustrates an example of the user interface 9028 coupled to the database 9058. In some implementations, the user interface 9028 may be an example of the user interface 6228 described in connection with FIG. 62. The user interface 9028 may include a coordinate system 9030 and an audio signal indicator 9046 that may be examples of corresponding elements described in connection with at least one of FIGS. 62 and 66. As described above in some implementations, the user interface 9028 may be coupled to the database 9058 that includes at least one audio signature 9064 and/or identification information 9062*a* corresponding to the audio signature 9064 that may be examples of corresponding elements described in connection with at least one of FIGS. 88 and 89. In some configurations, the electronic device 6202 may recognize an audio signature 9064 and look up the audio signature 9064 in the database 9058. The electronic device 6202 may then obtain (e.g., retrieve) the corresponding identification information 9062*a* corresponding to the audio signature 9064 recognized by the electronic device 6202. For example, the electronic device 6202 may obtain a picture of the speaker or person, and display the picture (and other identification information 9062*b*) of the speaker or person by the audio signal indicator 9046. In this way, a user can easily identify a source of an audio signal. It should be noted that the database 9058 can be local or can be remote (e.g., on a server across a network, such as a LAN or the Internet). Additionally or alternatively, the electronic device 6202 may send the identification information 9062 to another device. For instance, the electronic device 6202 may send one or more user names (and/or images, identifiers, etc.) to another device (e.g., smartphone, server, network, computer, etc.) that presents the identification information 9062 such that a far-end user is apprised of a current speaker. This may be useful when there are multiple users talking on a speakerphone, for example.

Optionally, in some implementations, the user interface 9028 may display the identification information 9062 separate from the coordinate system 9030. For example, the user interface 9028 may display the identification information 9062*c* below the coordinate system 9030.

Figure 91:
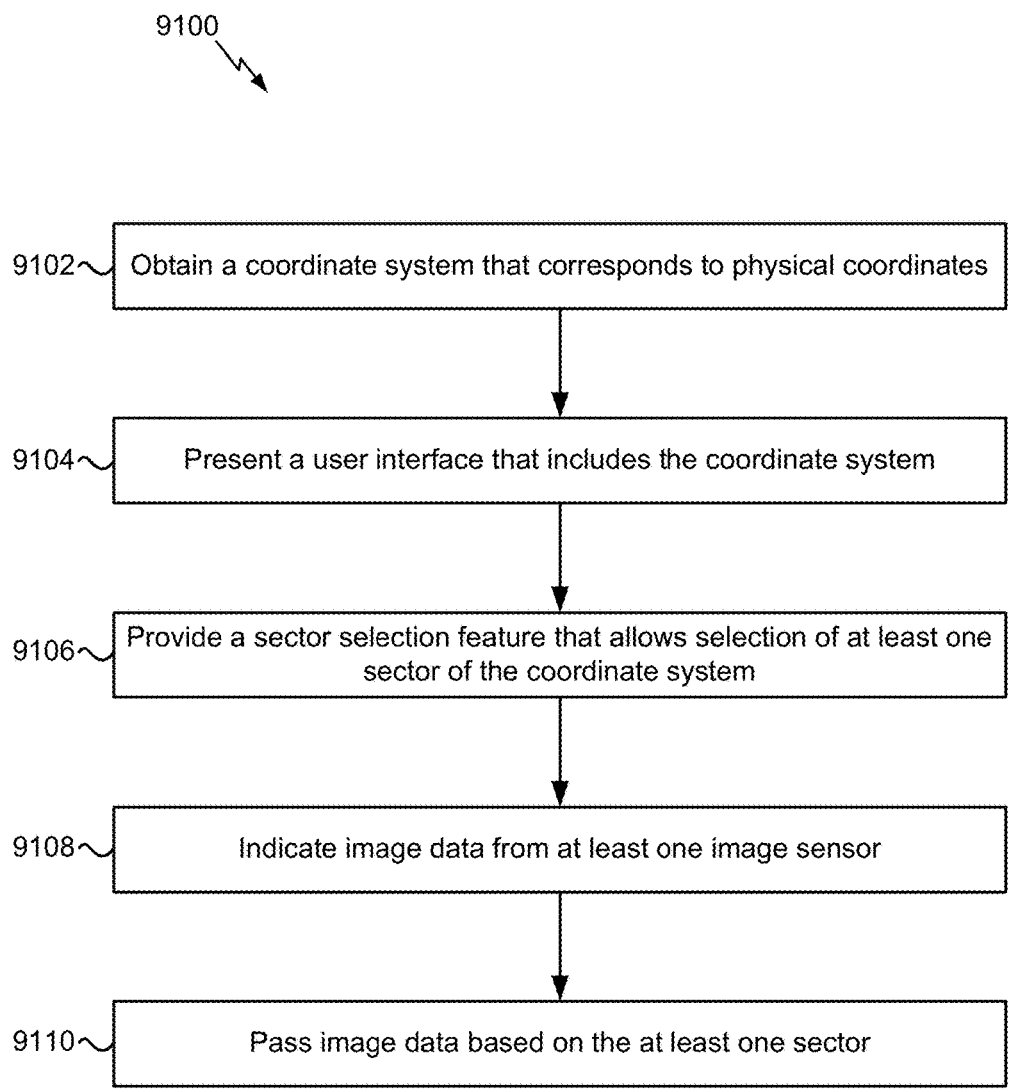

FIG. 91 is a flow diagram illustrating another configuration of a method 9100 for displaying a user interface 6428 on an electronic device 6402. The method 9100 may be performed by the electronic device 6402. The electronic device 6402 may obtain 9102 a coordinate system 6430 that corresponds to physical coordinates. In some implementations, this may be done as described in connection with FIG. 63.

The electronic device 6402 may present 9104 the user interface 6428 that may include the coordinate system 6430. In some implementations, this may be done as described in connection with FIG. 63.

The electronic device 6402 may provide 9106 a sector selection feature 6432 that allows selection of at least one sector of the coordinate system 6430. In some implementations, this may be done as described in connection with FIG. 63.

The electronic device 6402 may indicate 9108 image data from at least one sector. As described above, the electronic device 6402 may include at least one image sensor 6434. For example, several image sensors 6434 that collect data relating to the electronic device 6402 may be included on the electronic device 6402. More specifically, the at least one image sensor 6434 may collect image data. For example, a camera (e.g., an image sensor 6434) may generate an image. In some implementations, the at least one image sensor 6434 may provide image data to the user interface 6428. In some implementations, the electronic device 6402 may indicate 9108 image data from the at least one image sensor 6434. In other words, the electronic device 6402 may display image data (e.g., still photo or video) from the at least one image sensor 6434 on the display 6464.

In some implementations, the electronic device 6402 may pass 9110 image data based on the at least one sector. For example, the electronic device 6402 may pass 9110 image data indicated in a selected sector. In other words, at least one of the techniques described herein regarding the user interface 6428 may be applied to image data alternatively from or in addition to audio signals.

FIG. 92 is a block diagram illustrating one configuration of a wireless communication device 9266 which systems and methods for mapping a source location may be implemented. The wireless communication device 9266 illustrated in FIG. 92 may be an example of at least one of the electronic devices described herein. The wireless communication device 9266 may include an application processor 9278. The application processor 9278 generally processes instructions (e.g., runs programs) to perform functions on the wireless communication device 9266. The application processor 9278 may be coupled to an audio coder/decoder (codec) 9276.

The audio codec 9276 may be an electronic device (e.g., integrated circuit) used for coding and/or decoding audio signals. The audio codec 9276 may be coupled to at least one speaker 9268, an earpiece 9270, an output jack 9272 and/or at least one microphone 9206. The speakers 9268 may include one or more electro-acoustic transducers that convert electrical or electronic signals into acoustic signals. For example, the speakers 9268 may be used to play music or output a speakerphone conversation, etc. The earpiece 9270 may be another speaker or electro-acoustic transducer that can be used to output acoustic signals (e.g., speech signals) to a user. For example, the earpiece 9270 may be used such that only a user may reliably hear the acoustic signal. The output jack 9272 may be used for coupling other devices to the wireless communication device 9266 for outputting audio, such as headphones. The speakers 9268, earpiece 9270 and/or output jack 9272 may generally be used for outputting an audio signal from the audio codec 9276. The at least one microphone 9206 may be an acousto-electric transducer that converts an acoustic signal (such as a user's voice) into electrical or electronic signals that are provided to the audio codec 9276.

A coordinate mapping block/module 9217a may be optionally implemented as part of the audio codec 9276. For example, the coordinate mapping block/module 9217a may be implemented in accordance with one or more of the functions and/or structures described herein. For example, the coordinate mapping block/module 9217a may be implemented in accordance with one or more of the functions and/or structures described in connection with FIGS. 57, 59, 60 and 61.

Additionally or alternatively, a coordinate mapping block/module 9217b may be implemented in the application processor 9278. For example, the coordinate mapping block/module 9217b may be implemented in accordance with one or more of the functions and/or structures described herein. For example, the coordinate mapping block/module 9217b may be implemented in accordance with one or more of the functions and/or structures described in connection with FIGS. 57, 59, 60 and 61.

The application processor 9278 may also be coupled to a power management circuit 9280. One example of a power management circuit 9280 is a power management integrated circuit (PMIC), which may be used to manage the electrical power consumption of the wireless communication device 9266. The power management circuit 9280 may be coupled to a battery 9282. The battery 9282 may generally provide electrical power to the wireless communication device 9266. For example, the battery 9282 and/or the power management circuit 9280 may be coupled to at least one of the elements included in the wireless communication device 9266.

The application processor 9278 may be coupled to at least one input device 9286 for receiving input. Examples of input devices 9286 include infrared sensors, image sensors, accelerometers, touch sensors, keypads, etc. The input devices 9286 may allow user interaction with the wireless communication device 9266. The application processor 9278 may also be coupled to one or more output devices 9284. Examples of output devices 9284 include printers, projectors, screens, haptic devices, etc. The output devices 9284 may allow the wireless communication device 9266 to produce output that may be experienced by a user.

The application processor 9278 may be coupled to application memory 9288. The application memory 9288 may be any electronic device that is capable of storing electronic information. Examples of application memory 9288 include double data rate synchronous dynamic random access memory (DDRAM), synchronous dynamic random access memory (SDRAM), flash memory, etc. The application memory 9288 may provide storage for the application processor 9278. For instance, the application memory 9288 may store data and/or instructions for the functioning of programs that are run on the application processor 9278.

The application processor 9278 may be coupled to a display controller 9290, which in turn may be coupled to a display 9292. The display controller 9290 may be a hardware block that is used to generate images on the display 9292. For example, the display controller 9290 may translate instructions and/or data from the application processor 9278 into images that can be presented on the display 9292. Examples of the display 9292 include liquid crystal display (LCD) panels, light emitting diode (LED) panels, cathode ray tube (CRT) displays, plasma displays, etc.

The application processor 9278 may be coupled to a baseband processor 9294. The baseband processor 9294 generally processes communication signals. For example, the baseband processor 9294 may demodulate and/or decode received signals. Additionally or alternatively, the baseband processor 9294 may encode and/or modulate signals in preparation for transmission.

The baseband processor 9294 may be coupled to baseband memory 9296. The baseband memory 9296 may be any electronic device capable of storing electronic information, such as SDRAM, DDRAM, flash memory, etc. The baseband processor 9294 may read information (e.g., instructions and/or data) from and/or write information to the baseband memory 9296. Additionally or alternatively, the baseband processor 9294 may use instructions and/or data stored in the baseband memory 9296 to perform communication operations.

The baseband processor 9294 may be coupled to a radio frequency (RF) transceiver 9298. The RF transceiver 9298 may be coupled to a power amplifier 9201 and one or more antennas 9203. The RF transceiver 9298 may transmit and/or receive radio frequency signals. For example, the RF transceiver 9298 may transmit an RF signal using a power amplifier 9201 and at least one antenna 9203. The RF transceiver 9298 may also receive RF signals using the one or more antennas 9203.

FIG. 93 illustrates various components that may be utilized in an electronic device 9302. The illustrated components may be located within the same physical structure or in separate housings or structures. The electronic device 9302 described in connection with FIG. 93 may be implemented in accordance with at least one of the electronic devices and the wireless communication device described herein. The electronic device 9302 includes a processor 9311. The processor 9311 may be a general purpose single- or multi-chip microprocessor (e.g., an ARM), a special purpose microprocessor (e.g., a digital signal processor (DSP)), a microcontroller, a programmable gate array, etc. The processor 9311 may be referred to as a central processing unit (CPU). Although just a single processor 9311 is shown in the electronic device 9302 of FIG. 93, in an alternative configuration, a combination of processors (e.g., an ARM and DSP) could be used.

The electronic device 9302 also includes memory 9305 in electronic communication with the processor 9311. That is, the processor 9311 can read information from and/or write information to the memory 9305. The memory 9305 may be any electronic component capable of storing electronic information. The memory 9305 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers, and so forth, including combinations thereof.

Data 9309a and instructions 9307a may be stored in the memory 9305. The instructions 9307a may include at least one program, routine, sub-routine, function, procedure, etc. The instructions 9307a may include a single computer-readable statement or many computer-readable statements. The instructions 9307a may be executable by the processor 9311 to implement at least one of the methods described above. Executing the instructions 9307a may involve the use of the data 9309a that is stored in the memory 9305. FIG. 93 shows some instructions 9307b and data 9309b being loaded into the processor 9311 (which may come from instructions 9307a and data 9309a).

The electronic device 9302 may also include at least one communication interface 9313 for communicating with other electronic devices. The communication interface 9313 may be based on wired communication technology, wireless communication technology, or both. Examples of different types of communication interfaces 9313 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 9302 may also include at least one input device 9386 and at least one output device 9384. Examples of different kinds of input devices 9386 include a keyboard, mouse, microphone, remote control device, button, joystick, trackball, touchpad, lightpen, etc. For instance, the electronic device 9302 may include at least one microphone 9306 for capturing acoustic signals. In one configuration, a microphone 9306 may be a transducer that converts acoustic signals (e.g., voice, speech) into electrical or electronic signals. Examples of different kinds of output devices 9384 include a speaker, printer, etc. For instance, the electronic device 9302 may include at least one speaker 9368. In one configuration, a speaker 9368 may be a transducer that converts electrical or electronic signals into acoustic signals. One specific type of output device that may be typically included in an electronic device 9302 is a display device 9392. Display devices 9392 used with configurations disclosed herein may utilize any suitable image projection technology, such as a cathode ray tube (CRT), liquid crystal display (LCD), light-emitting diode (LED), gas plasma, electroluminescence, or the like. A display controller 9390 may also be provided for converting data stored in the memory 9305 into text, graphics, and/or moving images (as appropriate) shown on the display device 9392.

The various components of the electronic device 9302 may be coupled together by at least one bus, which may include a power bus, a control signal bus, a status signal bus, a data bus, etc. For simplicity, the various buses are illustrated in FIG. 93 as a bus system 9315. It should be noted that FIG. 93 illustrates only one possible configuration of an electronic device 9302. Various other architectures and components may be utilized.

Some Figures illustrating examples of functionality and/or of the user interface as described herein are given hereafter. In some configurations, the functionality and/or user interface may be referred to in connection with the phrase "Sound Focus and Source Tracking," "SoFAST" or "SFAST."

In the above description, reference numbers have sometimes been used in connection with various terms. Where a term is used in connection with a reference number, this may be meant to refer to a specific element that is shown in at least one of the Figures. Where a term is used without a reference number, this may be meant to refer generally to the term without limitation to any particular Figure.

The term "couple" and any variations thereof may indicate a direct or indirect connection between elements. For example, a first element coupled to a second element may be directly connected to the second element, or indirectly connected to the second element through another element.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, at least one microprocessor in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to at least one programs, routines, subroutines, functions, procedures, etc. "Instructions" and "code" may comprise a single computer-readable statement or many computer-readable statements.

It should be noted that at least one of the features, functions, procedures, components, elements, structures, etc., described in connection with any one of the configurations described herein may be combined with at least one of the functions, procedures, components, elements, structures, etc., described in connection with any of the other configurations described herein, where compatible. In other words, any compatible combination of the functions, procedures, components, elements, etc., described herein may be implemented in accordance with the systems and methods disclosed herein.

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, time division multiple access (TDMA), frequency division multiple access (FDMA), and/or time division synchronous code division multiple access (TDSCDMA)) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

Examples of codecs that may be used with, or adapted for use with, transmitters and/or receivers of communications devices as described herein include the Enhanced Variable Rate Codec, as described in the Third Generation Partnership Project 2 (3GPP2) document C.S0014-C, v1.0, titled "Enhanced Variable Rate Codec, Speech Service Options 3, 68, and 70 for Wideband Spread Spectrum Digital Systems," February 2007 (available online at www.3gpp.org); the Selectable Mode Vocoder speech codec, as described in the 3GPP2 document C.S0030-0, v3.0, titled "Selectable Mode Vocoder (SMV) Service Option for Wideband Spread Spectrum Communication Systems," January 2004 (available online at www.3gpp.org); the Adaptive Multi Rate (AMR) speech codec, as described in the document ETSI TS 126 092 V6.0.0 (European Telecommunications Standards Institute (ETSI), Sophia Antipolis Cedex, FR, December 2004); and the AMR Wideband speech codec, as described in the document ETSI TS 126 192 V6.0.0 (ETSI, December 2004). Such a codec may be used, for example, to recover the reproduced audio signal from a received wireless communications signal.

The presentation of the described configurations is provided to enable any person skilled in the art to make or use the methods and other structures disclosed herein. The flowcharts, block diagrams and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 32, 44.1, 48, or 192 kHz).

An apparatus as disclosed herein (e.g., any device configured to perform a technique as described herein) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein may be implemented in whole or in part as one or more sets of instructions arranged to execute on one or more fixed or programmable arrays of logic elements, such as microprocessors, embedded processors, intellectual property (IP) cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of a method as disclosed herein, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. The term "computer-program product" refers to a computing device or processor in combination with code or instructions (e.g., a "program") that may be executed, processed or computed by the computing device or processor.

It is noted that the various methods disclosed herein may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF)

link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments. Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices that incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for displaying a user interface on an electronic device, comprising:
   presenting a user interface, wherein the user interface comprises a coordinate system, wherein the coordinate system corresponds to physical coordinates based on sensor data;

providing a sector selection feature that allows selection of at least one sector of the coordinate system, wherein the at least one sector corresponds to captured audio from multiple microphones, and wherein a sector selection comprises an audio signal indicator;

providing a sector editing feature that allows adjusting a size of the at least one sector based on a received input providing an adjustment to at least one boundary of the at least one sector of the coordinate system; and performing an audio operation on the captured audio corresponding to the audio signal indicator based on the sector selection.

2. The method of claim 1, further comprising displaying a directionality of at least one audio signal captured by the multiple microphones.

3. The method of claim 2, wherein the at least one audio signal comprises a voice signal.

4. The method of claim 2, further comprising displaying an icon corresponding to the at least one audio signal.

5. The method of claim 4, wherein displaying an icon further comprises displaying at least one of an icon for a target audio signal and an icon for an interference audio signal.

6. The method of claim 1, further comprising passing audio signals indicated within the at least one sector.

7. The method of claim 1, further comprising attenuating audio signals not indicated within the at least one sector.

8. The method of claim 1, further comprising indicating image data from one or more image sensors.

9. The method of claim 1, further comprising passing image data based on the one or more sectors.

10. The method of claim 1, wherein at least one of the sector selection feature and the sector editing feature operate based on at least one of a group consisting of single-touch input and multi-touch input.

11. The method of claim 1, further comprising:
displaying at least one touch point corresponding to the at least one sector;
receiving a touch input corresponding to the at least one touch point; and
editing the at least one sector based on the touch input.

12. The method of claim 1, further comprising aligning at least a part of the user interface with a reference plane.

13. The method of claim 12, wherein the reference plane is horizontal.

14. The method of claim 12, wherein aligning at least a part of the user interface comprises mapping a two-dimensional polar plot into a three-dimensional display space.

15. The method of claim 1, wherein the physical coordinates are earth coordinates.

16. The method of claim 1, wherein the physical coordinates represent a physical space independent of earth coordinates.

17. The method of claim 1, wherein the coordinate system maintains an orientation independent of electronic device orientation.

18. The method of claim 1, further comprising:
recognizing an audio signature;
looking up the audio signature in a database;
obtaining identification information corresponding to the audio signature; and
displaying the identification information on the user interface.

19. The method of claim 18, wherein the identification information is an image of a person corresponding to the audio signature.

20. The method of claim 1, further comprising providing at least one of a show target control and a show interferer control.

21. The method of claim 1, further comprising padding a selected sector.

22. The method of claim 1, wherein the sector selection feature enables selection of multiple sectors at once.

23. The method of claim 1, wherein the sector editing feature enables adjusting the sector based on single- or multi-touch input.

24. The method of claim 1, wherein the sector selection feature is based on one or more swipe inputs.

25. The method of claim 24, wherein the one or more swipe inputs indicate a circular region.

26. The method of claim 24, wherein the one or more swipe inputs are a single swipe.

27. An electronic device, comprising:
a display, wherein the display is configured to:
present a user interface, wherein the user interface comprises a coordinate system, wherein the coordinate system corresponds to physical coordinates based on sensor data;
present a sector selection feature that allows selection of at least one sector of the coordinate system, wherein the at least one sector corresponds to captured audio from multiple microphones, and wherein a sector selection comprises an audio signal indicator;
present a sector editing feature that allows adjusting a size of the at least one sector based on a received input providing an adjustment to at least one boundary of the at least one sector of the coordinate system; and
operation circuitry coupled to the display, wherein the operation circuitry is configured to perform an audio operation on the captured audio corresponding to the audio signal indicator based on the sector selection.

28. The electronic device of claim 27, further comprising the multiple microphones, wherein the multiple microphones are configured to capture at least one audio signal, and wherein the display is configured to present a directionality of the at least one audio signal captured by the multiple microphones.

29. The electronic device of claim 28, wherein the at least one audio signal comprises a voice signal.

30. The electronic device of claim 28, wherein the display is configured to present an icon corresponding to the at least one audio signal.

31. The electronic device of claim 30, wherein the display is configured to present at least one of an icon for a target audio signal and an icon for an interference audio signal.

32. The electronic device of claim 27, wherein the operation circuitry is configured to pass audio signals indicated within the at least one sector.

33. The electronic device of claim 27, wherein the operation circuitry is configured to attenuate audio signals not indicated within the at least one sector.

34. The electronic device of claim 27, wherein the display is configured to indicate image data from one or more image sensors.

35. The electronic device of claim 27, wherein the operation circuitry is configured to pass image data based on the one or more sectors.

36. The electronic device of claim 27, wherein at least one of the sector selection feature and the sector editing feature operate based on at least one of a group consisting of single-touch input and multi-touch input.

37. The electronic device of claim 27, wherein the display is configured to present at least one touch point corresponding to the at least one sector, and wherein the electronic device further comprises a touch sensor that is configured to receive a touch input corresponding to the at least one touch point, and wherein the user interface is configured to edit the at least one sector based on the touch input.

38. The electronic device of claim 27, wherein the display is configured to present a user interface aligning at least a part of the user interface with a reference plane.

39. The electronic device of claim 38, wherein the reference plane is horizontal.

40. The electronic device of claim 38, wherein the display is configured to present a user interface mapping a two-dimensional polar plot into a three-dimensional display space.

41. The electronic device of claim 27, wherein the physical coordinates are earth coordinates.

42. The electronic device of claim 27, wherein the physical coordinates represent a physical space independent of earth coordinates.

43. The electronic device of claim 27, wherein the display is configured to maintain a coordinate system orientation independent of electronic device orientation.

44. The electronic device of claim 27, further comprising audio signature recognition circuitry that is configured to recognize an audio signature, look up the audio signature in a database, obtain identification information corresponding to the audio signature, and is configured to pass the identification information to the display.

45. The electronic device of claim 44, wherein the identification information is an image of a person corresponding to the audio signature.

46. The electronic device of claim 27, wherein the display is configured to present the user interface providing at least one of a show target control and a show interferer control.

47. The electronic device of claim 27, wherein the display is configured to present the user interface padding a selected sector.

48. The electronic device of claim 27, wherein the display is configured to provide the sector selection feature enabling selection of multiple sectors at once.

49. The electronic device of claim 27, wherein the display is configured to provide the sector editing feature enabling adjusting the sector based on single- or multi-touch input.

50. The electronic device of claim 27, wherein the display is configured to receive one or more swipe inputs indicating the at least one sector.

51. The electronic device of claim 50, wherein the display is configured to receive one or more swipe inputs indicating a circular region.

52. The electronic device of claim 50, wherein the display is configured to receive a single swipe.

53. A computer-program product for displaying a user interface, comprising a non-transitory tangible computer-readable medium having instructions thereon, the instructions comprising:
   code for causing an electronic device to present a user interface, wherein the user interface comprises a coordinate system, wherein the coordinate system corresponds to physical coordinates based on sensor data;
   code for causing the electronic device to provide a sector selection feature that allows selection of at least one sector of the coordinate system, wherein the at least one sector corresponds to captured audio from multiple microphones, and wherein a sector selection comprises an audio signal indicator;
   code for causing the electronic device to provide a sector editing feature that allows adjusting a size of the at least one sector based on a received input providing an adjustment to at least one boundary of the at least one sector of the coordinate system; and
   code for causing the electronic device to perform an audio operation on the captured audio corresponding to the audio signal indicator based on the sector selection.

54. The computer-program product of claim 53, wherein the instructions further comprise code for causing the electronic device to display a directionality of at least one audio signal captured by the multiple microphones.

55. The computer-program product of claim 53, wherein the instructions further comprise code for causing the electronic device to pass audio signals indicated within the at least one sector.

56. The computer-program product of claim 53, wherein the instructions further comprise code for causing the electronic device to attenuate audio signals not indicated within the at least one sector.

57. The computer-program product of claim 53, wherein at least one of the sector selection feature and the sector editing feature operate based on at least one of a group consisting of single-touch input and multi-touch input.

58. The computer-program product of claim 53, wherein the sector selection feature enables selection of multiple sectors at once.

59. The computer-program product of claim 53, wherein the sector selection feature is based on one or more swipe inputs.

60. An apparatus for displaying a user interface, comprising:
   means for presenting a user interface, wherein the user interface comprises a coordinate system, wherein the coordinate system corresponds to physical coordinates based on sensor data;
   means for providing a sector selection feature that allows selection of at least one sector of the coordinate system, wherein the at least one sector corresponds to captured audio from multiple microphones, and wherein a sector selection comprises an audio signal indicator;
   means for providing a sector editing feature that allows adjusting a size of the at least one sector based on a received input providing an adjustment to at least one boundary of the at least one sector of the coordinate system; and
   means for performing an audio operation on the captured audio corresponding to the audio signal indicator based on the sector selection.

61. The apparatus of claim 60, further comprising means for displaying a directionality of at least one audio signal captured by the multiple microphones.

62. The apparatus of claim 60, further comprising means for passing audio signals indicated within the at least one sector.

63. The apparatus of claim 60, further comprising means for attenuating audio signals not indicated within the at least one sector.

64. The apparatus of claim 60, wherein at least one of the sector selection feature and the sector editing feature operate based on at least one of a group consisting of single-touch input and multi-touch input.

65. The apparatus of claim 60, wherein the sector selection feature enables selection of multiple sectors at once.

66. The apparatus of claim 60, wherein the sector selection feature is based on one or more swipe inputs.

67. The method of claim 1, wherein the at least one sector corresponds to an angular range of the captured audio.

68. The electronic device of claim 27, wherein the at least one sector corresponds to an angular range of the captured audio.

69. The method of claim 1, wherein an adjusted size of the at least one sector is expanded relative to the size of the at least one sector of the coordinate system prior to the adjustment.

70. The electronic device of claim 27, wherein an adjusted size of the at least one sector is expanded relative to the size of the at least one sector of the coordinate system prior to the adjustment.

71. The method of claim 1, wherein an adjusted size of the at least one sector is narrowed relative to the size of the at least one sector of the coordinate system prior to the adjustment.

72. The electronic device of claim 27, wherein an adjusted size of the at least one sector is narrowed relative to the size of the at least one sector of the coordinate system prior to the adjustment.

73. The method of claim 1, further comprising providing an editable mode or both a fixed mode and the editable mode.

74. The electronic device of claim 27, wherein the display is configured to present an editable mode or both a fixed mode and the editable mode.

\* \* \* \* \*